(12) United States Patent  
Berman et al.

(10) Patent No.: US 7,352,513 B2  
(45) Date of Patent: Apr. 1, 2008

(54) PRISM ASSEMBLIES AND KERNEL CONFIGURATIONS FOR USE IN PROJECTION SYSTEMS

(75) Inventors: Arthur Berman, San Jose, CA (US); Mike Detro, Los Gatos, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 0 days.

(21) Appl. No.: 11/322,631

(22) Filed: Dec. 30, 2005

(65) Prior Publication Data

US 2006/0171035 A1 Aug. 3, 2006

Related U.S. Application Data

(60) Continuation-in-part of application No. 10/202,595, filed on Jul. 24, 2002, now Pat. No. 6,999,237, application No. 11/322,631, which is a continuation-in-part of application No. 10/328,423, filed on Dec. 24, 2002, now abandoned, which is a continuation-in-part of application No. 10/382,766, filed on Mar. 5, 2003, now Pat. No. 7,280,281, which is a continuation-in-part of application No. 10/342,219, filed on Jan. 13, 2003, now Pat. No. 6,909,556, which is a continuation-in-part of application No. 10/939,180, filed on Sep. 10, 2004, now Pat. No. 7,006,297, which is a division of application No. 10/251,225, filed on Sep. 20, 2002, now Pat. No. 6,809,874, which is a continuation-in-part of application No. 10/646,291, filed on Aug. 22, 2003, now Pat. No. 6,982,829, which is a continuation-in-part of application No. 10/845,440, filed on May 12, 2004, now Pat. No. 7,042,610, which is a continuation-in-part of application No. 10/371,835, filed on Feb. 20, 2003, now Pat. No. 6,934,066, which is a continuation-in-part of application No. 10/844,071, filed on May 12, 2004, now Pat. No. 7,175,281.

(60) Provisional application No. 60/322,490, filed on Sep. 12, 2001, provisional application No. 60/348,755, filed on Jan. 14, 2002, provisional application No. 60/349,271, filed on Jan. 14, 2002, provisional application No. 60/349,273, filed on Jan. 14, 2002, provisional application No. 60/356,207, filed on Feb. 11, 2002, provisional application No. 60/362,260, filed on Mar. 5, 2002, provisional application No. 60/362,970, filed on Mar. 7, 2002, provisional application No. 60/365,008, filed on Mar. 13, 2002, provisional application No. 60/370,533, filed on Apr. 4, 2002, provisional application No. 60/405,462, filed on Aug. 23, 2002, provisional application No. 60/418,600, filed on Oct. 15, 2002, provisional application No. 60/470,042, filed on May 13, 2003, provisional application No. 60/470,115, filed on May 13, 2003.

(51) Int. Cl.  
*G02B 27/14* (2006.01)  
*G02B 27/10* (2006.01)

(52) U.S. Cl. .................... 359/634; 359/618

(58) Field of Classification Search .......... 359/634  
See application file for complete search history.

(56) References Cited

U.S. PATENT DOCUMENTS 6,490,087 B1 * 12/2002 Fulkerson et al. .......... 359/487  
2002/0001135 A1 * 1/2002 Berman et al. ............ 359/640

* cited by examiner

*Primary Examiner*—Jordan Schwartz  
*Assistant Examiner*—James C Jones  
(74) *Attorney, Agent, or Firm*—Martine Penilla & Gencarella, LLP

(57) ABSTRACT

Kernels are designed in different configurations based on design properties of an enclosure or other requirements. A prism assembly having various types of filters, waveplates, beam splitters (e.g., path length matched beam splitters)

and/or other optical components are provided to selectively direct light beams to each of red, green, and blue microdisplays that manipulate the light and then combine the manipulated lights into an output image. The prism assembly includes an input face, an output face, and other faces on which the microdisplays are attached in a number of different configurations. Requirements and exact placement of optical components varies depending on which microdisplay is attached to which face. The components of the prism assembly may be arranged in path length matched positions.

14 Claims, 91 Drawing Sheets

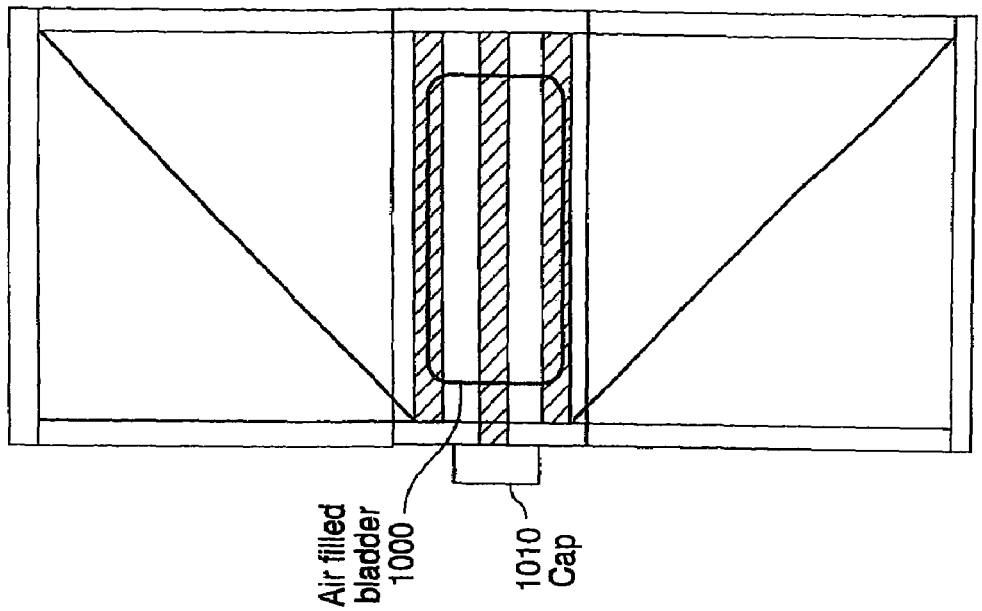
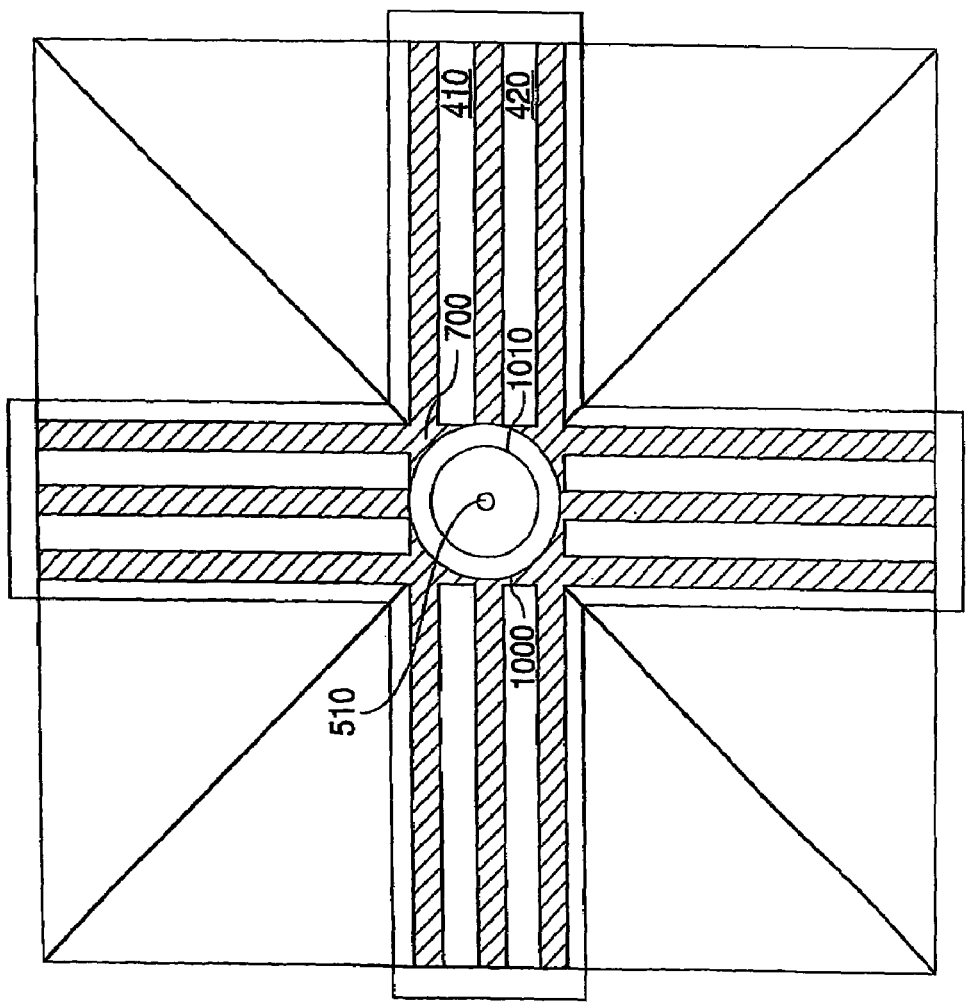

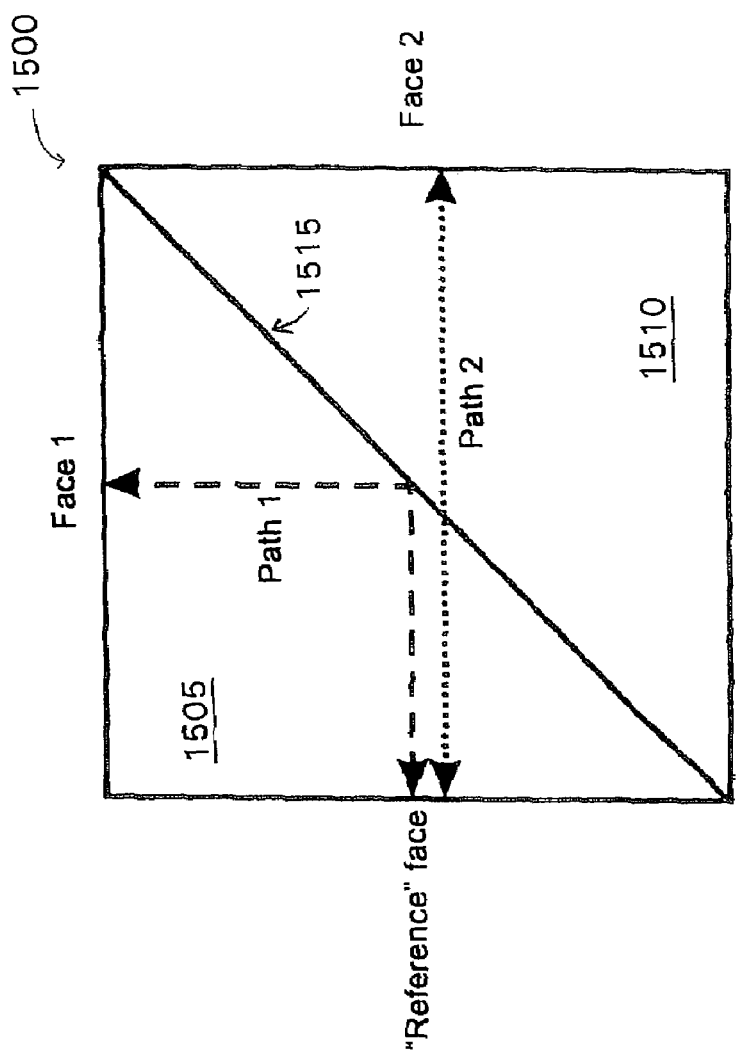

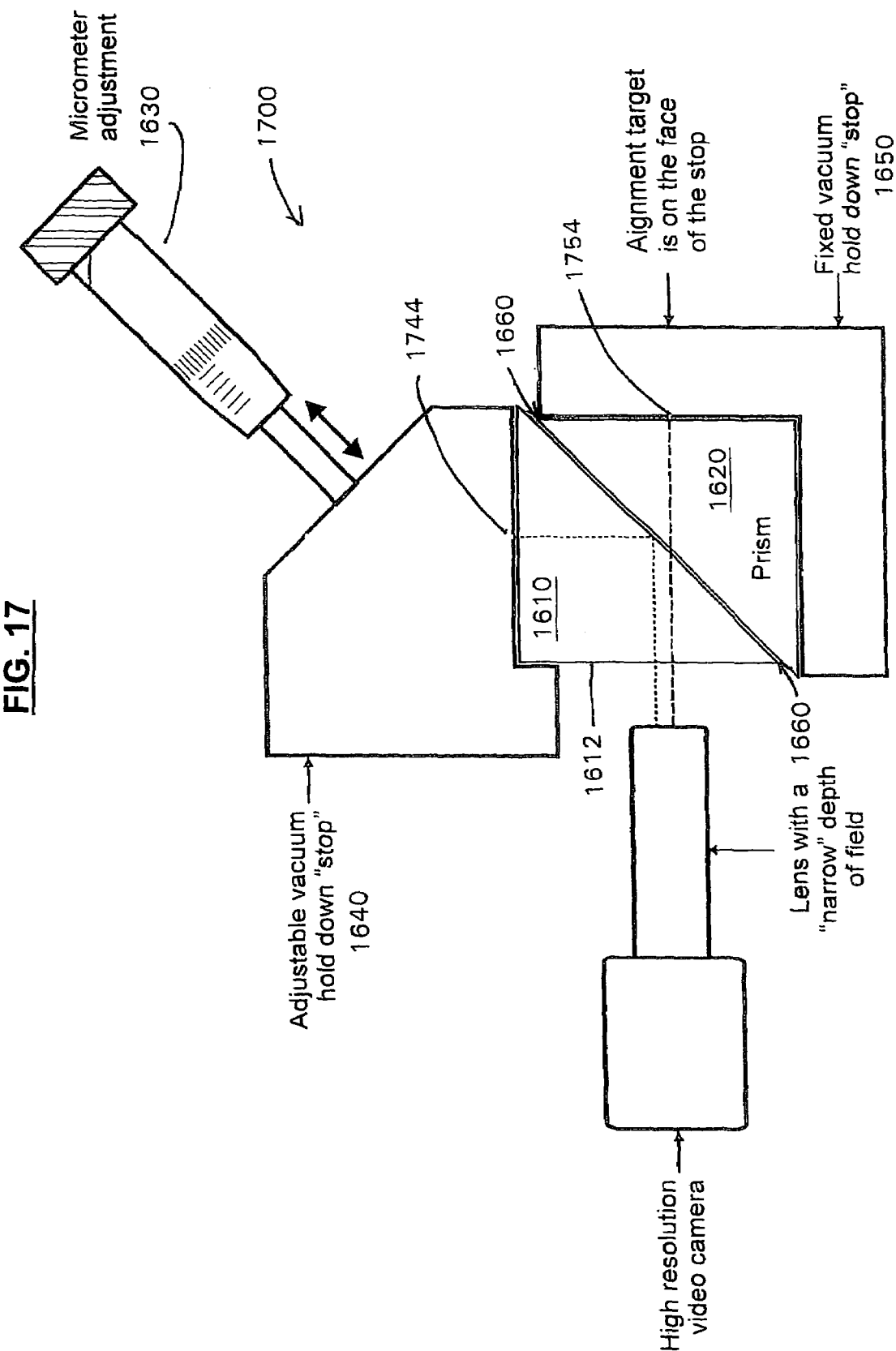

THE INTERACTION OF UNPOLARIZED WHITE LIGHT WITH A "RIGHT HAND GREEN" CHOLESTERIC FILM

THE INTERACTION OF UNPOLARIZED WHITE LIGHT WITH A "RIGHT HAND BLUE" CHOLESTERIC FILM

THE INTERACTION OF UNPOLARIZED WHITE LIGHT WITH A "RIGHT HAND RED" CHOLESTERIC FILM

FIRST CONFIGURATION OF THE CHOLESTERIC BASED KERNEL

LIGHTPATH THROUGH THE FIRST KERNEL CONFIGURATION

SECOND CONFIGURATION OF THE CHOLESTERIC BASED KERNEL.

LIGHTPATH THROUGH THE SECOND KERNEL CONFIGURATION

FIG. 84
Step 1
One side of the glass sheet is coated with a light absorbing thin film
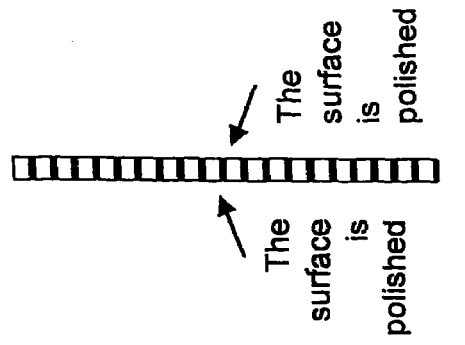
Step 4
Edge view of a single component after cutting
The surface is polished
The surface is polished
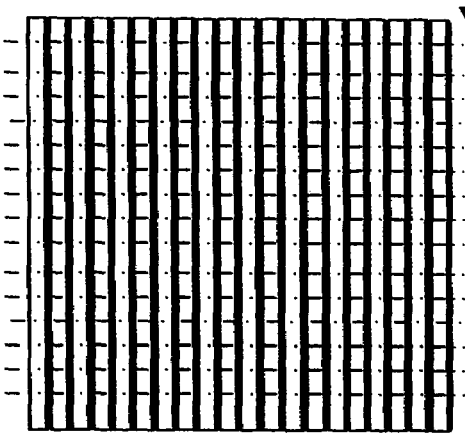
Step 3
The stacked sheets are cut along the indicated lines
Cut lines
Starting material
Plates of glass
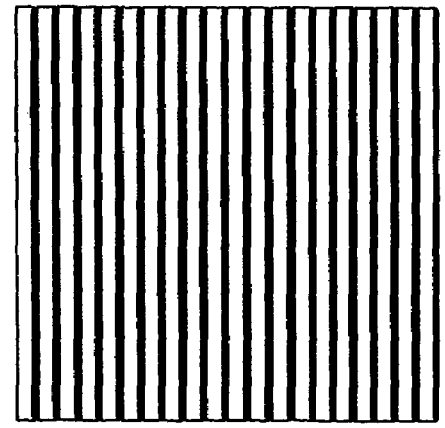
Step 2
The coated sheets are stacked and bonded together

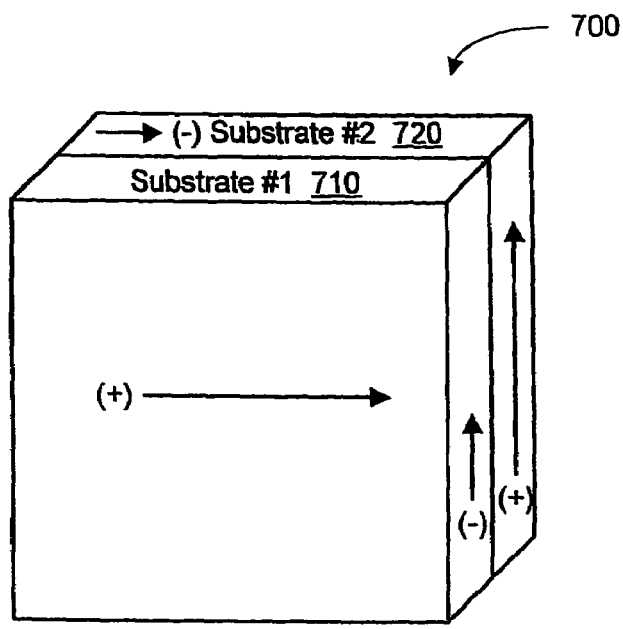
FIG. 87
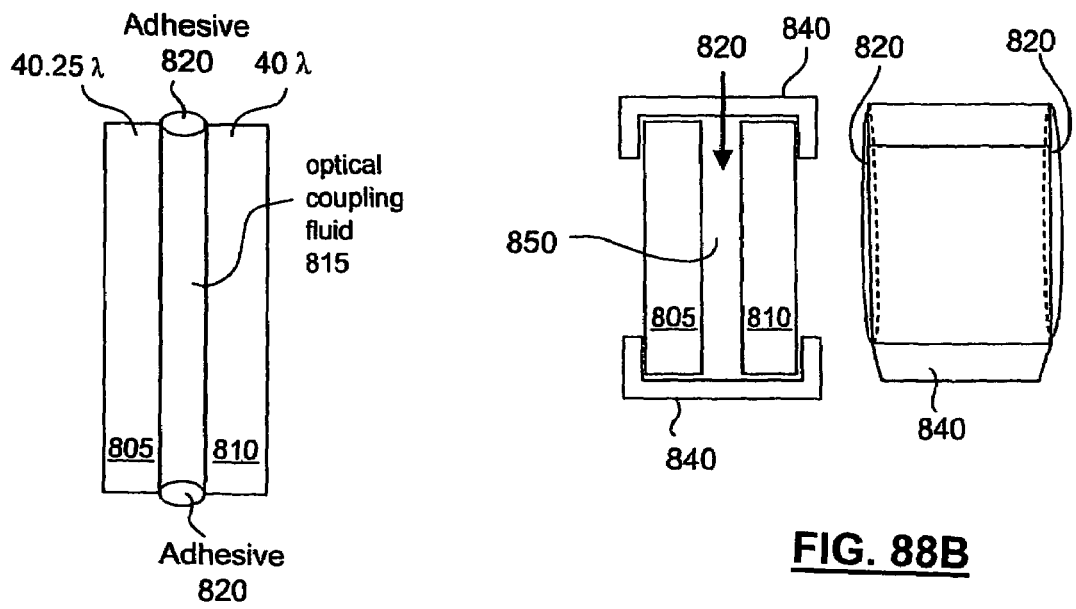
FIG. 88A
FIG. 88B

PRISM ASSEMBLIES AND KERNEL CONFIGURATIONS FOR USE IN PROJECTION SYSTEMS

This application is:

a continuation-in-part of U.S. application Ser. No. 10/202,595, filed Jul. 24, 2002 now U.S. Pat. No. 6,999,237, which claims benefit of each of U.S. provisional application Ser. No. 60/362,970, filed Mar. 7, 2002, U.S. provisional application Ser. No. 60/356,207, filed Feb. 11, 2002, and U.S. provisional application Ser. No. 60/322,490, filed Sep. 12, 2001;

a continuation-in-part of U.S. application Ser. No. 10/328,423, filed Dec. 24, 2002 now abandoned, which claims benefit of U.S. provisional application Ser. No. 60/348,755, filed Jan. 14, 2002;

a continuation-in-part of U.S. application Ser. No. 10/382,766, filed Mar. 5, 2003 now U.S. Pat. No. 7,280,281, which claims benefit of U.S. provisional application Ser. No. 60/362,260, filed Mar. 5, 2002, U.S. provisional application Ser. No. 60/365,008, filed Mar. 13, 2002, and U.S. provisional application Ser. No. 60/370,533, filed Apr. 4, 2002, and which is a continuation-in-part of U.S. application Ser. No. 10/342,219, filed Jan. 13, 2003, now U.S. Pat. No. 6,909,556, which claims benefit of U.S. provisional application Ser. No. 60/418,600, filed Oct. 15, 2002, and U.S. provisional application Ser. No. 60/349,271, filed Jan. 14, 2002;

a continuation-in-part of U.S. application Ser. No. 10/939,180, filed Sep. 10, 2004 now U.S. Pat. No. 7,006,297, which claims benefit of U.S. provisional application Ser. No. 60/349,273, filed Jan. 14, 2002, and which is a divisional of U.S. application Ser. No. 10/251,225, filed Sep. 20, 2002, now U.S. Pat. No. 6,809,874, which also claims benefit of U.S. provisional application Ser. No. 60/349,273, filed Jan. 14, 2002;

a continuation-in-part of U.S. application Ser. No. 10/646,291, filed Aug. 22, 2003 now U.S. Pat. No. 6,982,829 which claims benefit of U.S. provisional Ser. No. 60/405,462, filed Aug. 23, 2002;

a continuation-in-part of U.S. application Ser. No. 10/845,440, filed May 12, 2004 now U.S. Pat. No. 7,042,610, which is a continuation-in-part of U.S. application Ser. No. 10/371,835, filed Feb. 20, 2003, now U.S. Pat. No. 6,934,066, and claims benefit of U.S. provisional application Ser. No. 60/470,115, filed May 13, 2003; and a continuation-in-part of U.S. application Ser. No. 10/844,071, filed May 12, 2004 now U.S. Pat. No. 7,175,281, which claims benefit of U.S. provisional application Ser. No. 60/470,042, filed May 13, 2003;

the contents of each are fully incorporated herein by reference.

BACKGROUND OF THE INVENTION

1. Field of Invention

The present invention relates to optical devices. The present invention is more particularly related to optics that increase the efficiency and quality of the optical devices and/or reduce costs in producing the optical devices. The optical devices include, for example, prism assemblies and kernels used in image systems such as LCoS based video projection systems.

2. Discussion of Background

Light Management Systems (LMSs) are utilized in optical devices, particularly projection video devices and generally comprises a light source, condenser, kernel, projection lens, and a display screen, and related electronics. The function of the components of a video projector 100 is explained with reference to FIG. 1. As shown, white light 110 is generated by a light source 105. The light is collected, homogenized and formed into the proper shape by a condenser 115. UV and IR components are eliminated by filters (e.g., hot/cold mirrors 116/117). The white light 110 then enters a prism assembly 150 where it is polarized and broken into red, green and blue polarized light beams (hence, a "three channel" type prism assembly). A set of reflective microdisplays 152A, 152B, and 152C are provided and positioned to correspond to each of the polarized light beams (the prism assembly 150 with the attached microdisplays is called a kernel). The beams then follow different paths within the prism assembly 150 such that each beam is directed to a specific reflective microdisplay. The microdisplay that interacts with (reflects) the green beam displays the green content of a full color video image. The reflected green beam then contains the green content of the full color video image. Similarly for the blue and red microdisplays. On a pixel by pixel basis, the microdisplays modulate and then reflect the colored light beams. The prism assembly 150 then recombines the modulated beams into a modulated white light beam 160 that contains the full color video image. The resultant modulated white light beam 160 then exits the prism assembly 150 and enters a projection lens 165. Finally, the image-containing beam (white light beam 160 has been modulated and now contains the full color image) is projected onto a screen 170.

A number of prism assemblies are commercially available. In most, the configuration of the prism assembly consists of precisely formed optical components that have been bonded together. The specific construction techniques by which this is accomplished provides differing advantages and disadvantages, and the components and arrangements of components within the prism assemblies vary according to their designs.

One challenge in designing a light engine is to produce an image with the blackest possible dark state. One of the means by which this can be accomplished is to insert quarter waveplates between the microdisplays and the faces of the prism. One function of the waveplate is to compensate the residual birefringence that exists in the high voltage (dark) state of the microdisplay.

To obtain the blackest possible dark state, the conventional procedure is as follows:

The retardation values of the quarter waveplates should be matched to the center of the light spectrum of each channel. For example, the retardation of the waveplate in the red channel might be centered at 150 nm, the green at 135 nm and the blue at 110 nm.

The highest available voltage is applied to all three microdisplays (this produces the lowest possible value of residual retardation).

Each waveplate is cut into an "oversized" rectangular piece in which its principle retardation axes are oriented parallel and perpendicular to the edges. The "red" waveplate is placed between the "red" microdisplay and the prism. With the voltage applied to the red microdisplay, the red waveplate is rotated to the angle that produces the blackest dark state in red channel ("tuning" the waveplate). The same procedure is then applied to the green and the blue channels.

Note that the use of "tuned" waveplates is desirable in that they produce the blackest possible dark state. Tuned waveplates are not, however, strictly required. It is possible to use waveplates having arbitrary values in the visible spectra. The axis angle required to obtain the blackest possible dark state with an arbitrary waveplate will, in general, be different from that required for a tuned waveplate. More importantly, although the blackness of the dark state obtained for the arbitrary waveplate can be optimized it will not, in general, be as black as that obtained with a tuned waveplate. However, the blackness difference is likely to be small.

Thus, in the conventional procedure to obtain the blackest possible dark state, the compensating retardation of the waveplate is varied to match the fixed residual retardation of the microdisplay. In theory, this procedure works quite well. In reality, when evaluated for use in a high volume manufacturing environment, the process is found to be difficult, time consuming and expensive to implement.

In addition, in an actual high-volume manufacturing environment, it is found that there are major difficulties in accomplishing proper insertion of the waveplate. These difficulties relate to the physical properties of the quarter waveplate material.

Some waveplates are not flat. This is often the case when the waveplate material is "thick". If the material is not flat, distortion can be introduced into the focus of the image. In addition, proper lamination of the waveplate (as is required in some configurations) is difficult to accomplish.

Some waveplates are too flexible. This is the case when the waveplate material is too thin, almost like cellophane. Such a material cannot be easily manipulated during the assembly process.

In both the thick and thin varieties of waveplate, it is difficult to obtain materials that are defect free. This is particularly important in that the waveplate is close to the focal plane of the microdisplay. Any defects in the waveplate will almost certainly be in focus and visible in the projected image.

An additional difficulty is that the best commercially available waveplate materials are prohibitively expensive (expensive being defined in the context of a kernel application).

Some light engines are designed to produce polarized light and utilize a kernel that requires the input of polarized light. Other light engines are designed to produce unpolarized light and utilize a kernel that requires the input of unpolarized light.

Some desirable properties of a prism assembly are that it produce an image in which the brightness and color are spatially uniform and meet other required optical properties including those for brightness, color gamut and contrast ratio. It is equally important that the prism assembly be manufacturable. That is, that the prism assembly be producible in high volume with good yield and at a high quality level. Finally, and of equal importance, is that the prism assembly meet cost targets. Targets that, for consumer products, are inevitably very challenging.

Stray light is one factor that limits the contrast ratio produced by an image device, and particularly LCoS based video projection systems. Stray light can be generated within a prism assembly/kernel in several ways including:
 Diffraction from the microdisplay.
 Non-specular reflection from the surface of the microdisplay.
 Reflections from interfaces between the components in the optical path.
 Scattering from imperfections on the optical surfaces, in the thin film coatings or within the bulk materials.

Some of the stray light inevitably exits the kernel to be included in the projected image. The stray light adds light intensity but not content to the video image. In current light engine designs and applications, this can be a significant contrast ratio-limiting factor. Techniques used to suppress stray light include:
 The use of picture frame baffles.
 Removing light rays that impact and scatter/reflect from the walls of the prism assembly. The removal is accomplished by either absorbing or transmitting the stray light rays.

However, the present inventors have determined that, in actual light engine applications, these techniques are insufficient. And, the present inventors have realized the need for further and better suppression of stray light.

The LCoS based video projection system also utilizes a number of optical components, such as beam splitting elements, waveplates, dichroics, etc. Each of the optical components contribute to one or more of the technical challenges in producing a high quality low cost optical device.

SUMMARY OF THE INVENTION

The present inventors have realized a number of unique designs and configurations applicable to prism assemblies and kernels of light engines and other Light Management Systems (LMSs). The present inventors have also realized the need to arrange the components of prism assemblies to facilitate construction of a prism assembly optimized for a particular projection system design, and, provide herein a number of optical designs of prism assemblies, kernel configurations, and light engine improvements that may be applied to any one or more projection system designs (LMSs, video projectors, light engines, etc.).

In one embodiment, the present invention provides a kernel, comprising, a prism assembly arranged in four quadrants, comprising, an input face on the first quadrant, a first face and a second face on the second quadrant, an output face on the third quadrant, and a third and a fourth face on a fourth of the four quadrants, wherein one of the four faces has an attached red microdisplay, one of the four faces has an attached green microdisplay, one of the four faces has an attached blue microdisplay, and the prism assembly includes optical components that facilitate the division of light entering the prism assembly through the input face into component red, green and blue light beams that are individually directed to a corresponding one of the red, green, and blue microdisplays where the light beams are reflected and then directed to the output face.

In one embodiment, the second quadrant is cater-cornered with respect to the fourth quadrant, the input face is adjacent to the fourth face, and the output face is adjacent to the third face. In another embodiment, the second quadrant is cater-cornered with respect to the fourth quadrant, the input face is adjacent to the first face, and the output face is adjacent to the third face.

Red, green, and blue microdisplays are attached to various of the faces of the prism assembly, and corresponding additional optical components such as waveplates, filters, etc, along with beam splitting devices are placed in the prism assembly at strategic positions to direct corresponding light beams to each of the microdisplays. The figures illustrate the most useful combinations and preferred arrangements of the various optical components, however, other combinations and arrangements will be apparent to the ordinarily skilled artisan after review of the present disclosure.

In one embodiment, the beam splitters include path length matched beam splitters wherein light paths through the beam splitters are equal. And, components of the prism assemblies, including any beam splitters, may be placed in path length matched positions wherein light paths through the entire prism assembly are equal. In addition to prism assembly pathlength matching, the beam splitters themselves may be pathlength matched.

The present inventors have realized the need for design of light engines that can accept either polarized or unpolarized light and do so without unacceptable light loss. In one embodiment, the present invention is a kernel, comprising, an input face configured to receive input polarized light, and a beam separating dichroic arranged on a diagonal to the input polarized light and configured to separate the input polarized light into a first color beam and a second color beam.

The present inventors have also realized the need to manufacture, in large quantities, LCoS based devices that can produce the blackest dark state of the microdisplays. In one embodiment, the present invention provides a method for adjustment of a voltage amplitude of the microdisplays to be set to produce a maximum black state of the LMS in a manner that is cost effective for large scale production. The invention also includes the use of passive nematic cells as waveplates within a kernel.

The present inventors have discovered a number of advantages in prism systems that utilize cholesteric layers in one of more optical components of the prism systems. This relates particularly to video projection systems utilizing reflective microdisplays. More particularly, in one embodiment, a configuration provides a prism assembly that is based on cholesteric optical components and is suitable for use within, for example, a "three channel" LCoS video projector.

The present inventors have also realized the need for improvements in stray light suppression, and the need for varying configurations of optical elements, such as waveplates, within optical systems. Most notably, and although applicable to other optical systems, the techniques and improvements discussed herein are particularly applicable to Liquid Crystal on Silicon (LCoS) based Light Management Systems (LMSs), and LMSs used in projection systems such as LCoS based projection televisions.

In one embodiment, a stray light suppressing optical element comprising a first set of parallel louvers. The louvers are, for example sandwiched between layers of transparent materials. The louvers are oriented with respect to another similarly constructed stray light suppressing optical element for greater effectiveness. The orientation is, for example, 90 degrees.

The construction of the louvers includes a method, comprising the steps of, coating a surface of a set of transparent materials with a light absorptive thin film layer, bonding the set of coated transparent materials to create a multi-layer sandwich having layers in an order comprising light absorptive thin film, transparent material, light absorptive thin film, transparent material, and so forth, cutting the bonded materials into thin sheets, each sheet comprising a strip of transparent material, thin film layer, a strip of transparent material, a thin film layer, and so forth, and polishing the cut surfaces of the thin sheets. In one embodiment, the transparent material is bi-refringent and has a principle axis of retardation that is set to be either perpendicular or parallel to the thin film coating.

In yet another embodiment, a stray light suppressing compensated higher order waveplate is provided, comprising, a first substrate having a first axis of retardation, a first series of louvers disposed in the first substrate, and a second substrate having a second axis of retardation, wherein the first substrate and the second substrate are positioned such that the first axis of retardation is set at an angle to the second axis of retardation.

In still yet another embodiment, a wavelength band specific retarder is provided, comprising, a set of compensated higher order waveplates each having a principle axis of retardation and a predetermined target wavelength, wherein, the set of higher order waveplates are arranged in series, and the waveplate main axes are oriented at individual angles of orientation to a reference line such that the specific wavelength band is retarded when passing through the wavelength band specific retarder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a drawing of an embodiment of a bladder equipped prism assembly according to an embodiment of the present invention;

FIG. 15 is an illustration of a pathlength matched Polarizing Beam Splitter (PBS) cube;

FIG. 17 is an illustration of a device used to produce a pathlength matched PBS cube according to another embodiment of the present invention;

FIG. 84 is an illustration of a fabrication technique of a stray light suppressing component according to an embodiment of the present invention;

FIG. 87 is a drawing of a compensated higher order waveplate 700 constructed according to an embodiment of the present invention;

FIG. 88A is a drawing of liquid coupled optical elements (e.g., waveplates) according to various embodiments of the present invention;

FIG. 88B is a drawing of a frame according to embodiments of the present invention;

DESCRIPTION OF THE PREFERRED EMBODIMENTS

Figure 1:
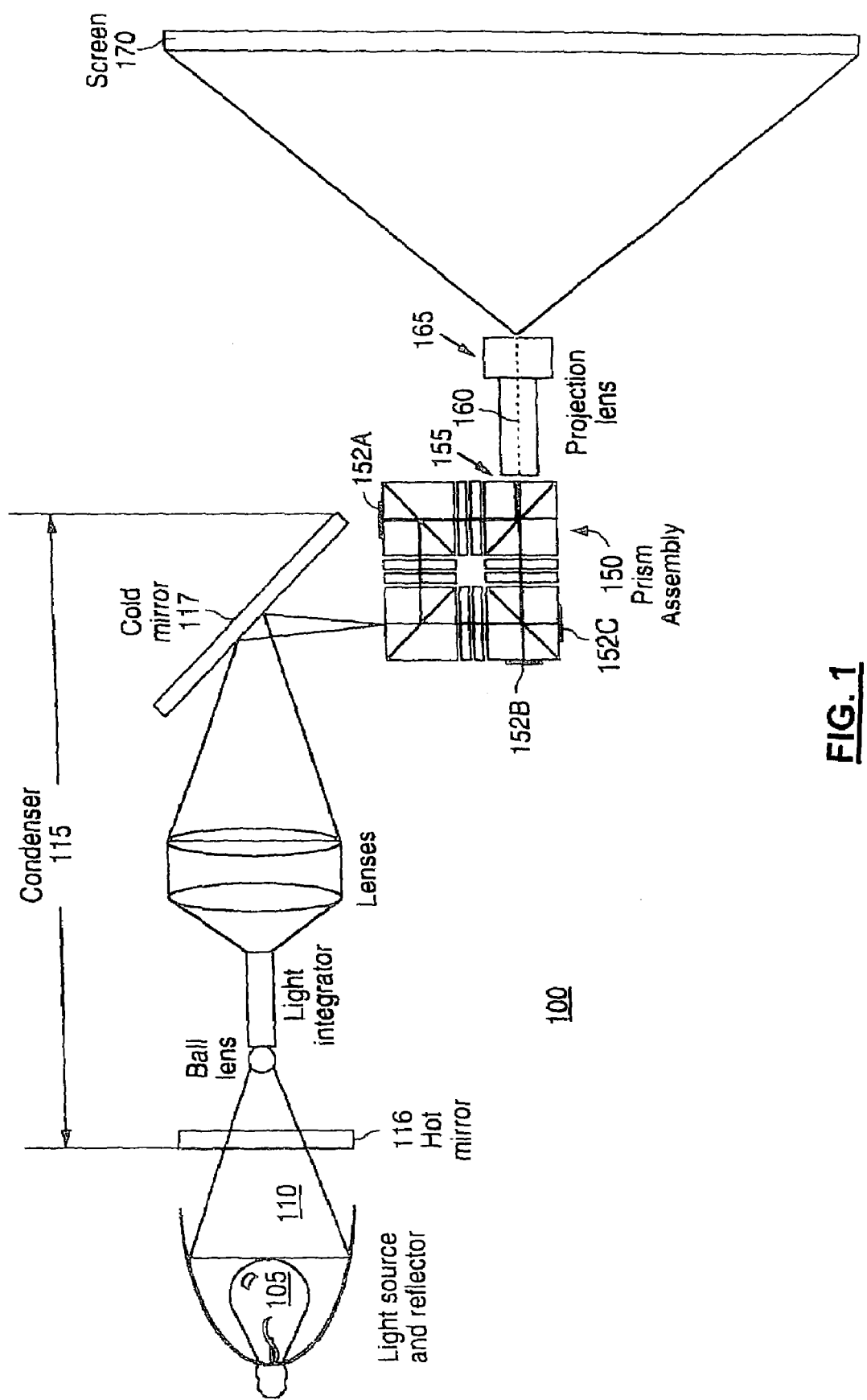
FIG. 1 is a drawing of a Light Management System (LMS) video projector.
Figure 2:
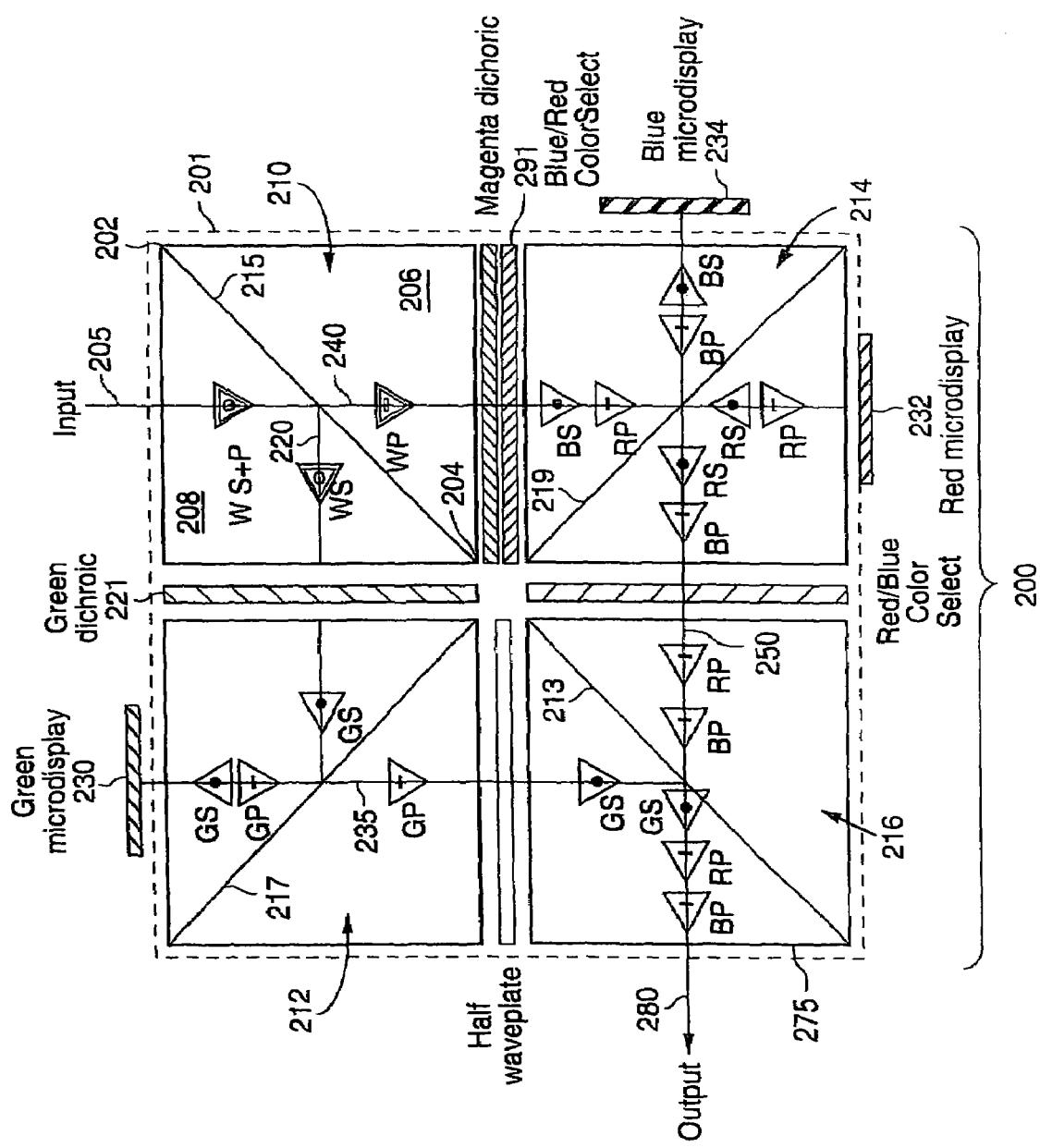
FIG. 2 is a drawing of a simplified example kernel illustrating lightpaths and components of one possible configuration of a prism assembly in which the present invention is applied.

Referring again to the drawings, wherein like reference numerals designate identical or corresponding parts, and more particularly to FIG. 2 thereof, there is illustrated a Light Management System (LMS) kernel 200 illustrating lightpaths and components of one possible configuration of a prism assembly in which the present invention is applied. Path length matching and other features are provided based on the present invention. The kernel 200 includes a prism assembly 201, attached microdisplays ("Green" microdisplay 230, "Red" microdisplay 232, and "Blue" microdisplay 234—the colors are in quotations because the color identifies the content of an image to be displayed, or the light being manipulated, by the individual microdisplay). The kernel is a fundamental component of a video projection system.

The prism assembly 201 comprises a set of optical components, films, and matching elements making a single prism assembly unit. A white light 205 is directed at a Polarizing Beam Splitter (PBS) 210. A polarizing beam splitter thin film 215 perpendicularly polarizes and splits the white light into two beams of polarized light 220 and 240. The lightpaths through the prism assembly are each labeled to indicate the color and polarization of each light path. For example, incoming white light 205 is labeled W S+P (meaning White S and P polarized); light beam 220 is initially labeled WS (meaning white, s-polarized). The s-polarized white light 220 passes through a green dichroic filter 221 (passing green light, making beam 220 a green s-polarized beam (and labeled GS)), and enters a second Beam Splitter 212. A polarizing beam splitter thin film 217 reflects the s-polarized green light to "green" microdisplay 230.

The green microdisplay 230 manipulates the polarized green light according to green content of an image to be displayed. The "green" microdisplay modulates the polarization of the green light on a pixel-by-pixel basis. For example, a no green content pixel of the image to be displayed will be left unaltered, a strong green content pixel of the image to be displayed will have its polarization rotated 90°, and other pixels having varying levels of green content will have their polarization rotated in varying amounts in proportion to the amount of green content. The microdisplay also reflects (reflection or other polarization effects on the light are accounted for by the polarization manipulation of the microdisplay) the green light (now modulated) back toward the polarizing beam splitter thin film 217.

The polarizing beam splitter thin film 217 then reflects some portions and passes other portions of the green light. The amount of light reflected versus passing is based on the amount of modulation performed on the reflected green light. Light with the same polarization as was reflected into the green microdisplay is again reflected. Light that is oppositely polarized (or at least different from a polarization sensitivity of the polarizing beam splitter thin film 217) is passed. Amounts of green light less than the full amount of original green light and more than 0 depend on the amount of modulation (modulation in this example is the amount of polarization rotation).

Beam 235 represents the modulated green light that passes back through the polarizing beam splitter thin film 217 (e.g. green light sufficiently modulated to pass through the polarizing beam splitter thin film 217). Beam 235 enters final Beam Splitter 216 and is reflected off polarizing beam splitter thin film 213. Each of the red and blue components are similarly modulated and passed or reflected from corresponding polarization sensitive materials, to produce beam 250. After reflecting off polarizing beam splitter thin film 213, the modulated green light beam 235 is combined with the red and blue components of beam 250 and then exits the prism assembly through output face 275 as white light 280 containing the image to be displayed.

PBSs 210, 212, 214, and 216 are constructed similarly. In this configuration, each PBS contains 2 optical components (e.g., prisms 208 and 206) and a polarizing beam splitter thin film (e.g. 215). The polarizing beam splitter thin film is, for example, a coating that reflects s-polarized light and passes p-polarized light. Optical elements (e.g., retarders, rotators, etc) are utilized to change the polarization so that desired light beams are either reflected or passed by the polarizing beam splitter thin film so that subsequent polarizing beam splitter thin films may pass or reflect the desired light beams depending on the configuration of optical components and the desired path of each light beam (FIG. 2 is one example configuration and desired paths). For example, when PBS 210 splits the incoming white light into 2 beams, the second beam 240 passes through a wavelength specific retarder (Blue/Red ColorSelect 291) so that PBS 214 can also split beam 240 into component beams directed to each of the red microdisplay 232 and blue microdisplay 234 (without the retarder, the blue component of the white light in beam 240 would remain p-polarized and PBS 214 would then pass the blue light to the red microdisplay 232 instead of reflecting it to the blue microdisplay 234).

The configuration of FIG. 2 illustrates a prism assembly made from 4 similarly constructed PBSs, an advantage over systems utilizing optical components performing a variety of functions (and hence, a variety of differently configured optical components) because the similarly constructed PBSs reduce the number of parts and different functionality of components in a particular optical design. Hence, a corresponding production line benefits from economies of scale, reduced inventory, etc. However, it can also be seen that many different combinations of optical elements can be utilized to make the various beams properly reflect or pass and then re-combine into final light beam 280. Furthermore, the prism assemblies using optical components having a variety of different functions can be constructed. And, as noted above, prism assemblies of all these varieties (different sizes, different shapes, different configurations, etc.) may be constructed using the techniques and processes discussed herein.

Optical components are combined to create the beam splitters. For example, individual prisms 206 and 208 are optical components that are combined to produce the Polarizing Beam Splitter (PBS) 210. Before manufacture of the prism assembly, the beam splitting optical components are built. Prism assembly 201 illustrates four beam splitting optical components, polarizing beam splitters (PBSs) 210, 212, 214, and 216. Each of the polarizing beam splitters (hereinafter referred to as PBSs) contains a polarizing beam splitter thin film (e.g., 215, 217, 219, and 213). Preferably, the polarizing beam splitter thin films are at the diagonal of the beam splitters and extend through the corner as defined by the outside surfaces of the PBS. For example, the polarizing beam splitter thin film 215 extends along the diagonal of 206 and 208 through corners 202 and 204 of the PBS 210. The PBSs may be constructed so that the polarizing beam splitter thin film is on a plane of the diagonal and need not extend through the corners, particularly if light does not pass through the entire range of the diagonal.

The assembly of such PBS is accomplished by the use of optical pathlength matching. Referring to PBS 210, it can be noted that the two optical components (prisms) 206 and 208 need not be exactly the same size (and, consequently, the outside dimensions of the PBS need not meet any specific dimensional requirement). Since there are no specific dimensional requirements for the PBS, optical components with a "loose" mechanical tolerance may be utilized. Such optical components (and prisms used to construct those components) can be produced at modest cost and in high volume by existing vendors of optical components.

Figure 3:
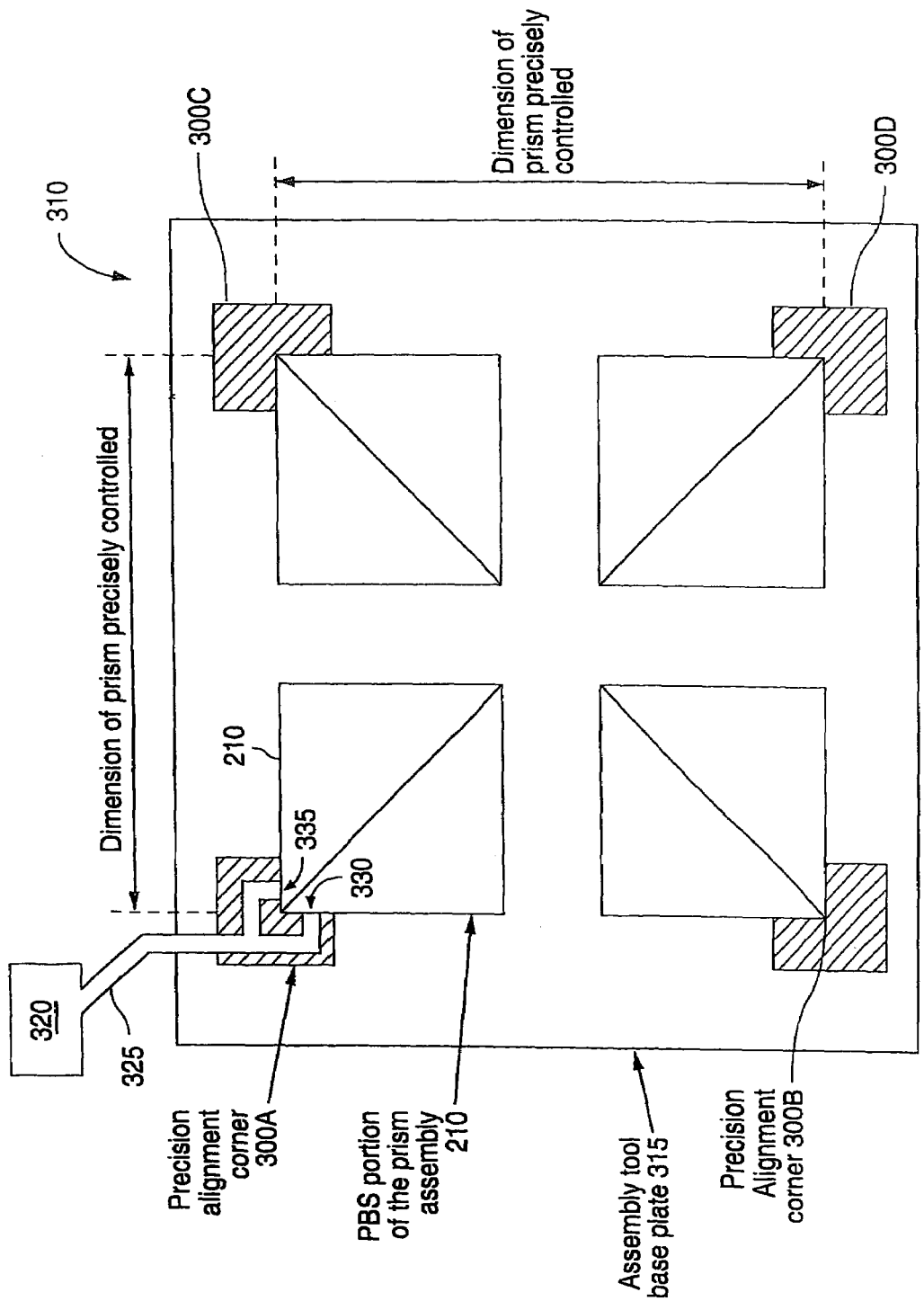
FIG. 3 is drawing illustrating a construction technique of an LMS prism assembly according to an embodiment of the present invention.

The optical components are assembled from the "outside in". As shown in FIG. 3, the two outside surfaces of each of the four PBSs in the prism assembly 201 are accurately held in position by precision alignment corners 300 of an assembly tool 310. For example, outside surfaces of PBS 210 are held in a fixed position determined by alignment corner 300A.

Assembly tool includes an assembly tool base plate 315 to which the precision alignment corners 300 are fixed. Construction of the alignment corners 300A, 300B, 300C, and 300D can be performed using mechanical tooling. The alignment corners are constructed to a tolerance and positioned on the assembly tool base plate such that they precisely fix the outside dimensions of each PBS. Each alignment corner includes a device for securing the PBS in position during assembly. For example, PBS 210 is held tight in alignment corner 300A via vacuum holders 330 and 335. The vacuum holders are connected to vacuum pump 320 via vacuum-tube 325. In one embodiment, there is a single vacuum holder in the corner of the alignment corner.

The alignment corners provide the precise dimensional accuracy required to achieve pathlength matching and is accomplished by mechanical tooling rather than expensive tightly toleranced optical components. However, pathlength matching alone does not produce an acceptable prism assembly. Although pathlength matched, because the optical components are of varying non-precise tolerances (different sizes), the PBS do not fit precisely together (e.g., intersection of PBS 210 and 214, and any dichroics or filters placed therebetween, do not fit exactly) and an air gap is introduced between the internal optical surfaces of the PBSs. The air gap itself introduces other problems including refraction and other optical variations that need to be reduced or eliminated.

Figure 4:
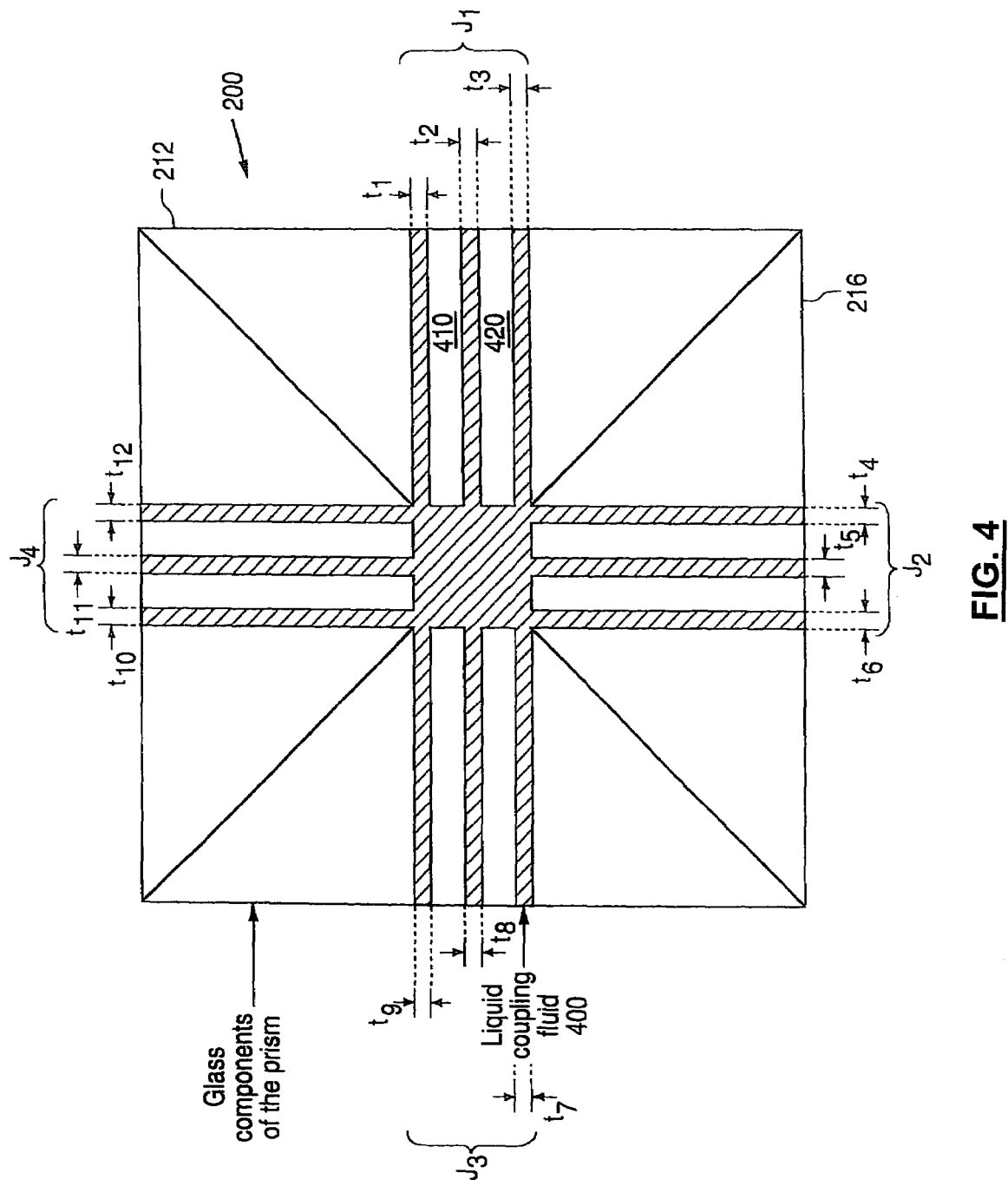
FIG. 4 is a drawing of liquid coupling of components in an LMS prism assembly according to an embodiment of the present invention.

Undesirable effects from the imprecisely fit PBSs is reduced by coupling the PBSs with a liquid. In one embodiment, all internal optical surfaces of the prism assembly are coupled using a liquid. FIG. 4 is a drawing of liquid coupling of components of an optical assembly according to an embodiment of the present invention. Between adjacent PBSs is a joint that is filled with liquid. The thickness of the liquid filled joints is varied based on variations in size of the individual PBSs (or other optical components utilized in other prism assembly configurations) to maintain the desired exterior dimensions of the prism assembly (e.g., to maintain desired matched pathlengths within the prism assembly). For example, Liquid filled joint J1, the joint between PBS 212 and PBS 216 comprises liquid between the PBSs, the entire joint comprising the liquid coupling fluid 400 in spaces t1, t2, and t3, and dichroics and other optical elements placed between the PBS (e.g., optical element 410 and 420 placed between the PBS). The other optical elements may be, for example, any combination of dichroics or other filters. Accommodation in the liquid coupling fluid will prevent stress from building up in the components.

Figure 5:
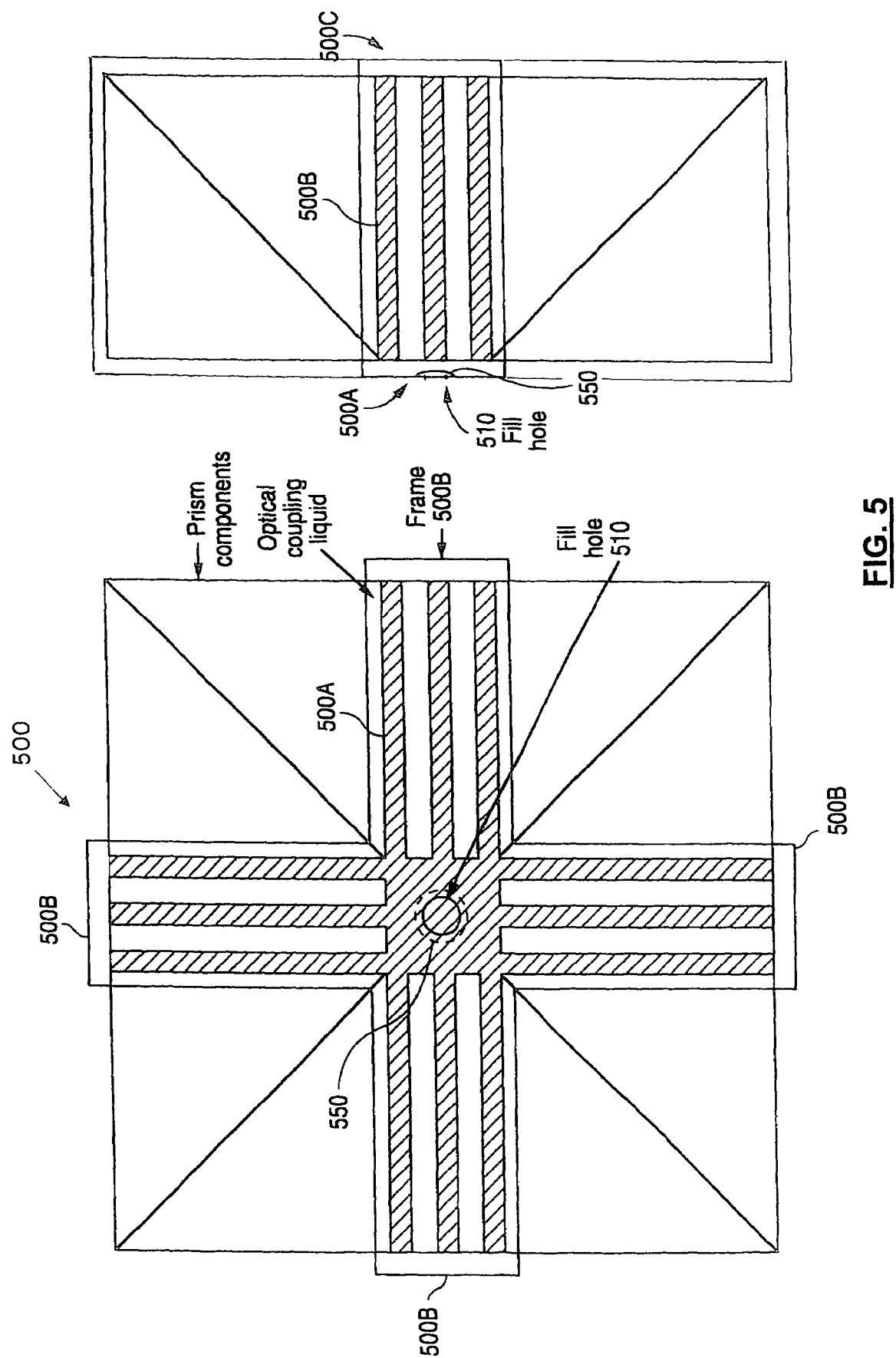
FIG. 5 is a drawing of top and side views of a frame that holds components of an LMS prism assembly according to an embodiment of the present invention.

In one embodiment, a frame, glued to the external surfaces of the prism assembly, is used to contain the liquid and hold the components in place. FIG. 5 is a drawing of top and side views of a frame 500 that holds components of an LMS prism assembly according to an embodiment of the present invention. The frame 500, which can be made of one or several pieces (note that there are not any optical requirements on the frame material), is placed over each of the joints between the PBSs. In this embodiment, the frame 500 comprises 2 side components 500A and 500 C, and 4 edge components 500B. Each side component is a plus sign (+) shaped glass, plastic, acrylic, etc., or other material, each appendage of the plus sign covering a joint, and the middle of the plus sign covering a conjunction of all 4 joints. The edge components 500B cover the edge of each of one of the joints. The top side component 500A includes a fill hole 510 to which fluid may be applied and/or added as needed. A cap (not shown) is used to cap off the fill hole to prevent spillage of the fluid. An air bubble 550 is provided to compensate for liquid expansion/contraction and prevent stress build up on the optical components. The frame 500 is illustrated as a plus sign shape, but may be completely rectangular or any other shape, so long as it covers each joint sufficiently. Glue or other adhesive applied to the frame creates a seal between the frame and the PBSs so as to fully contain the coupling fluid. The glue or other adhesive also fixes the position of the PBSs to the frame to assure non-movement of the PBSs with respect to each other (maintaining the monolithic nature of the LMS).

Using the adhesive between the frame and PBSs to fix the matched pathlengths is performed by determining the matched pathlength positions of the prism assembly components (e.g., using a tool having corner pieces or other positioning devices to assure the correct optical pathlengths), and then gluing the components (e.g., PBSs) to one or more parts of the frame at those matched pathlength positions. Additional optical elements are then positioned in the joints (e.g., optical elements 410 and 420), the joints are then at least partly filled with optical coupling fluid (liquid coupling fluid), the joints are then capped with a top frame piece, and then the coupling fluid is topped off (except for the air bubble or other expansion air space), and then the fill hole is capped. Although optical coupling fluid is mainly envisioned, a gas mixture (e.g., air) or gel may be utilized, or a curable substance such as an epoxy, uv adhesive, etc, may also be utilized.

Figure 7:
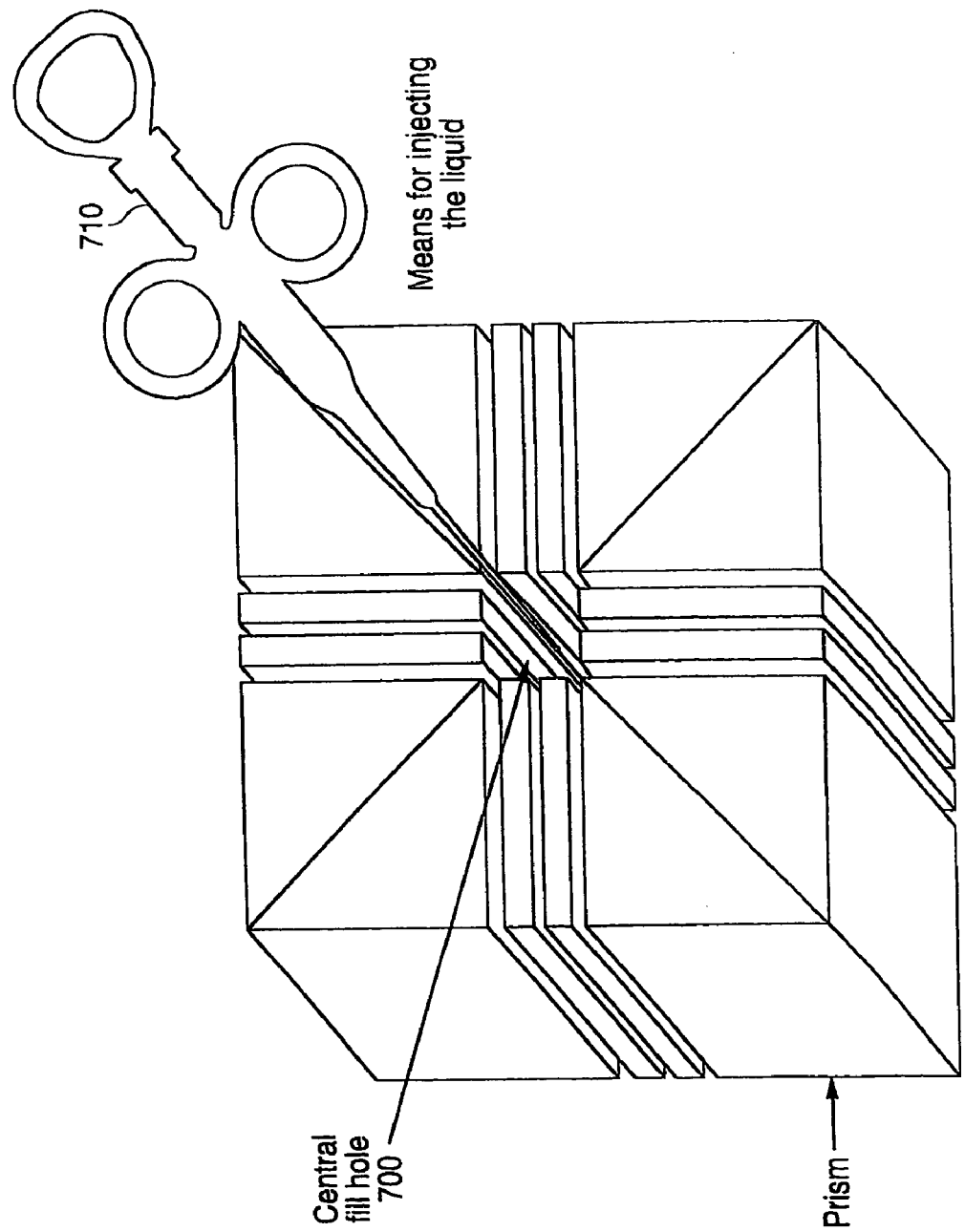
FIG. 7 is a drawing illustrating a coupling fluid filling method according to an embodiment of the present invention.

Various methods and devices have been developed to fill the prism assembly with the coupling fluid/liquid. For example, FIG. 7 is a drawing illustrating a coupling fluid filling device and method according to an embodiment of the present invention. The coupling liquid is injected into a central fill hole 700 utilizing a syringe filled with coupling fluid. The central fill hole 700 is a center area of the prism assembly, and generally has no optical components therein. However, it is possible that one or more of the optical components may be positioned at least part way into the central fill hole. In one embodiment, the prism assembly is at least partly filled prior to affixing a top portion of the frame onto the prism assembly. If the top portion of the frame is not attached, the coupling fluid may also be applied in an area other than the central fill hole, but filling at the central fill hole is preferred. Also preferable, is injecting the coupling fluid at the bottom of the central fill hole. Capillary action between the optical elements and PBSs in both vertical and horizontal directions will assist the filling process. In other embodiments, the same process occurs with the top portion of the frame in place, in which case the syringe is inserted through the fill hole 510 (cap removed) to the bottom of the central fill hole 700, and the prism assembly is filled with coupling fluid. Other devices including tubes, pumps, or other pouring mechanisms may be used to place the fluid in the central fill hole.

Figure 6:
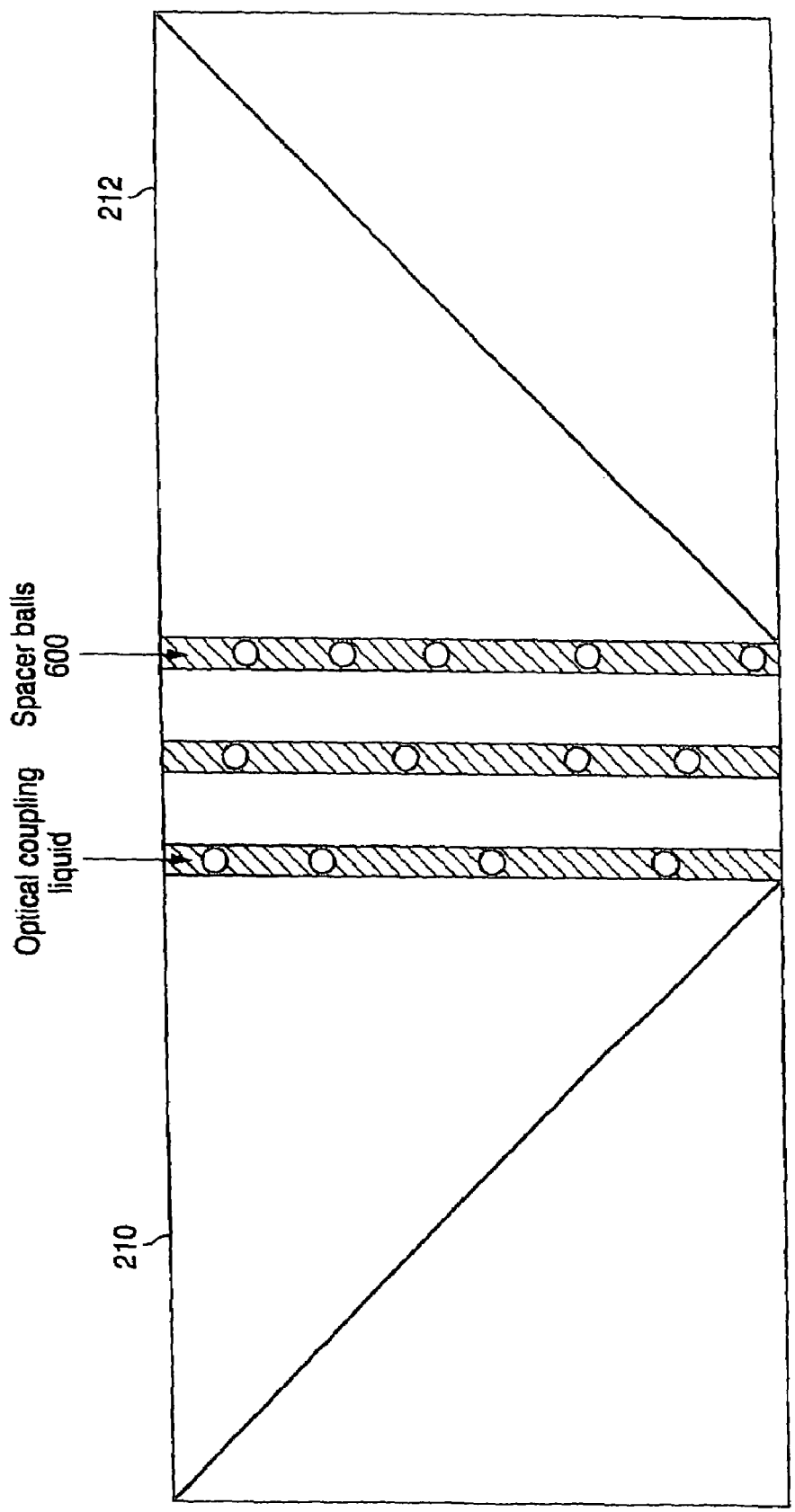
FIG. 6 is a drawing of spacers and liquid coupling of components of an LMS prism assembly according to an embodiment of the present invention.

Recognize that, if the components within the prism assembly were to directly touch (e.g., optical element 410 directly touching either optical element 420 or PBS 212), the result could be a visible artifact in an image projected by the prism assembly. The solution to this problem is to assure that a thin layer of liquid exists between the components and or elements of the optical assembly. Many different methods and/or devices may be implemented to assure that a layer of liquid exists between components. For example, the optical elements may be physically separated during filling of the coupling fluid, spacers may be affixed to portions of the frame to separate the elements and PBSs. In one embodiment, spacers are applied between the optical surfaces. FIG. 6 is a drawing of spacers (spacer balls 600) and liquid coupling of components of an LMS prism assembly according to an embodiment of the present invention. The spacers can be glass rods or balls with diameter on the order of thousandths of an inch. The index of refraction of the liquid coupling fluid is chosen to match that of the spacers thus rendering them invisible.

Various methods and devices have been developed for application of the spacers. In one set of embodiments, the spacers are applied directly to the optical surfaces of the PBSs and/or optical elements. In one embodiment, the spacers are sprayed onto the optical surfaces. Spraying spacers onto optical surfaces may be performed using liquid crystal display manufacturing techniques and machinery. Either wet or dry spacer application may be utilized. In other embodiments, the spacers are suspended in the liquid coupling fluid at least during manufacture. After manufacture of the prism assembly, suspended spaces remain lodged between the optical surfaces and/or settle to a bottom portion of the prism assembly out of the viewing area.

The liquid coupling fluid is an optical coupling fluid selected to have an index of refraction that matches (or closely matches) the index of refraction of the PBSs and any optical elements spaced within the fluid. The index of refraction changes depending on wavelength, and is different for each of the components and elements in the prism assembly. Typical values are 1.52 for plastic elements, and 1.71 for glass components. The optical coupling fluid generally preferred to have an index of refraction in the 1.50-1.85 range. A 1.6 index of refraction optical coupling fluid has worked well in experiments carried out by the inventors. Similarly, in the embodiments using spacers, the optical coupling fluid is chosen to have an index of refraction preferably matching each of the PBSs, optical elements, and spacers as closely as possible. Matching the index of refraction can be done by splitting the difference between the index of refraction of the optical components and elements. Another method would be to perform an impedance matching type of arithmetic (e.g., taking the square root of the sum of the squares of the index of refraction of each optical component/element). However, the present inventors note that selection of any index of refraction between the high and low index of refraction of the optical components and elements provides better matching than any other embodiments of the pathlength matched prism assembly, including the gel, cured epoxy, and air filled embodiments discussed elsewhere herein. The chosen index of refraction of the coupling fluid may also be weighted toward matching component interfaces that occur more frequently in the prism assembly. In one embodiment, the index of refraction of the coupling fluid matches the index of refraction of the spacers.

Important properties for the coupling fluid are toxicity, flammability, yellowing propensity, chemical properties, and cost. Toxicity and flammability are safety considerations, the product is preferably non-toxic and non-flammable. Also, the optical coupling fluid, to be practical; needs to be resistant to yellowing, particularly under intense light and heat conditions. The optical coupling fluid has to have chemical properties that do not react with other optical elements, components, and parts of the prism assembly. And, to be commercially practical, the optical coupling fluid needs to be relatively inexpensive and readily available. In one embodiment, the optical coupling fluid is, for example, mineral oil. Many different types and properties of optical coupling fluid are commercially available (e.g., Cargille Corp makes many different types of index matching fluid).

In one embodiment, the optical coupling fluid is a UV curing adhesive, which, when cured, makes a solid prism assembly, the cured adhesive coupling the optical elements/components without fluids. However, the liquid filled embodiments have better index of refraction matching than commercially practical UV curing adhesive, so the liquid filled embodiments are preferred. In another embodiment, optical coupling is performed by inserting an optical coupling gel between the various components/elements of the prism assembly. NYE corporation makes one such gel (matching gel). In yet another embodiment, the coupling material is air, or another gas is utilized as a coupler between the optical components and elements. In the air-filled embodiment, anti-reflection coating are places on the surfaces of the optical elements and components to eliminate or reduce reflections.

Note that variations of the assembly techniques described herein can be applied to any of the prism assembly configurations discussed in this document.

There are several other advantages offered by the configuration and manufacturing method described above. These include the following:

Several prism assembly configurations include polarization-rotating component(s) (rotators) (e.g., rotating beam 235 after being passed by polarizing beam splitter thin film 217 so it is then reflected by polarizing beam splitter thin film 213). Rotators are generally constructed of layers of polycarbonate plastic bonded together. In prior systems, the adhesive needs to be able to bond the polycarbonate plastic of the rotator to the glass of the prism assembly components. The common solution to this problem is to purchase the polarizing rotator from the vendor in the form of a "sandwich". In "sandwich" form, the rotator has been bonded between two cover glasses. The cover glasses make it easier for the prism assembly manufacturer to bond the rotator into the prism assembly (e.g., bonding between surfaces of adjacent cover glasses). However, compared to the polycarbonate rotator itself, the sandwich may be available only in limited supply and is more expensive. In contrast, in the present invention, The liquid coupling method allows the direct use of the inexpensive, readily available polycarbonate component. Since with liquid coupling the polycarbonate is not bonded with adhesive, this class of problems is eliminated.

The precise outside dimensions of the prism assembly obtained using the new manufacturing method not only allow direct mounting of the microdisplays onto the prism assembly, but also allows for the use of precision (or fixed) mounting points for mounting the completed kernel (prism assembly with microdisplays attached) into the device in which it is to be used (e.g., light engine). The use of precision or fixed mounting points reduces or eliminates the need for a physical adjustment mechanism and procedure when mounting the kernel into the light engine.

Conventional prism assemblies generally utilize a series of glue cure steps. As the prism assembly grows in size and complexity, it becomes progressively more difficult to cure the adhesives due to the absorption of light by the glass and/or the optical properties of the components. Liquid coupling as provided by the present invention eliminates this problem and can greatly reduce the time required for prism assembly.

The present invention includes a device and method to hold the optical elements (e.g., optical elements 410 and 420) in place. The optical elements are also generally referred to as flat components because they are generally rectangular in shape and flat (having a thin width). However, the present invention may be practiced using different shapes and widths of the optical components.

Figure 8B:
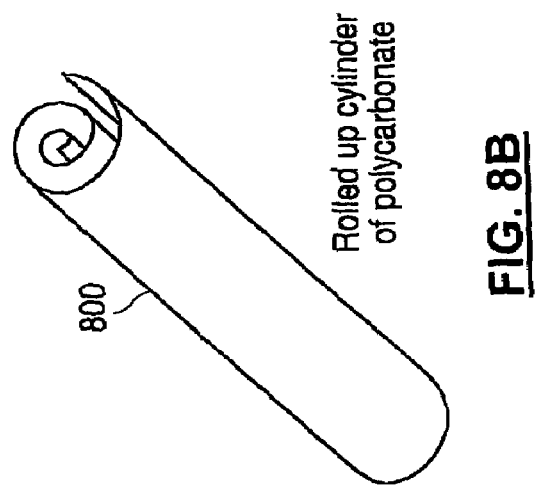
FIG. 8 is a drawing of an example mechanism utilized to hold prism assembly components according to an embodiment of the present invention.
Figure 8A:
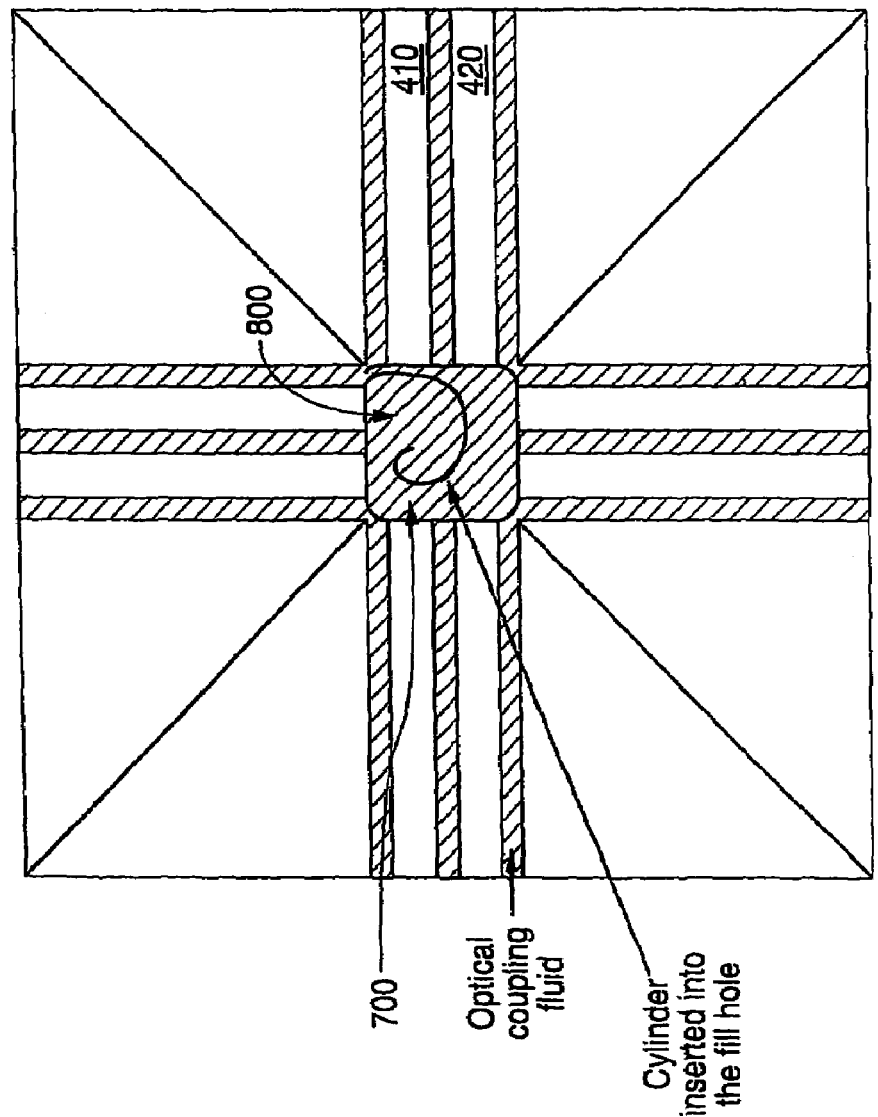

One concern at any time, including manufacture, shipping, storage, and/or during actual use is the potential movement of optical components in the coupling fluid. Movement towards the central fill hole 700 could potentially leave the moved component (or parts of the moved component) out of the optical path. A spacer device is placed in the central fill hole 700 to hold the flat components in a stable general location. FIG. 8 is a drawing of an example spacer device 800 utilized to hold optical components according to an embodiment of the present invention. In the illustrated embodiment, the spacer device 800 is a sheet of polycarbonate rolled into a tight cylinder. The spacer device 800 is inserted into the central fill hole 700. Once in place, the cylinder will "unroll" and press on the components so as to keep them out of the central hole.

As previously discussed an air bubble may be left inside the prism assembly to account for expansion of the various components. One problem with expansion of the components is that the components expand at different rates. As the optical coupling fluid expands, so does the optical components of the prism assembly. However, the expansion of the liquid and optical components is at different rates (differential expansion). In most cases, the optical coupling fluid expands at a higher rate than the optical components. Without the air bubble, an amount of stress is applied against the optical components by the expanding fluid. Without the air bubble, this stress can cause an undesirable amount of stress induced birefringence effecting the various light beams passing through the optical components of the prism assembly as the liquid coupling fluid expand.

Referring back to FIG. 5, an air bubble 550 is illustrated. The air bubble 550 is permanently maintained within the prism assembly once the fill hole 510 is capped. In FIG. 5, the "frame" elements (500A, 500B, and 500C) on the outside of the prism assembly serve both to contain the liquid and to hold the prism assembly components rigidly in space.

In the example embodiment of FIG. 5, the volume within the prism assembly surrounded by frame 500 is occupied by glass of the prism assembly components (e.g., PBSs), optical elements, and the optical coupling liquid. As the temperature of the prism assembly rises (as it will during operation) the linear and volume dimensions of all components increase. However, at least partly due to the fact that the coefficient of thermal volumetric expansion of the optical coupling liquid is considerably higher than that of the glass and other materials, when the temperature rises, the volume of the liquid expands faster that of the glass "container" (optical components and frame bounding the liquid). In addition to the undesirable optical effects, excessive stress caused by this differential expansion could potentially cause the bonded components to separate. The air bubble 550 is one way to accommodate the effects of differential expansion and avoid the build up of stress.

Figure 9:
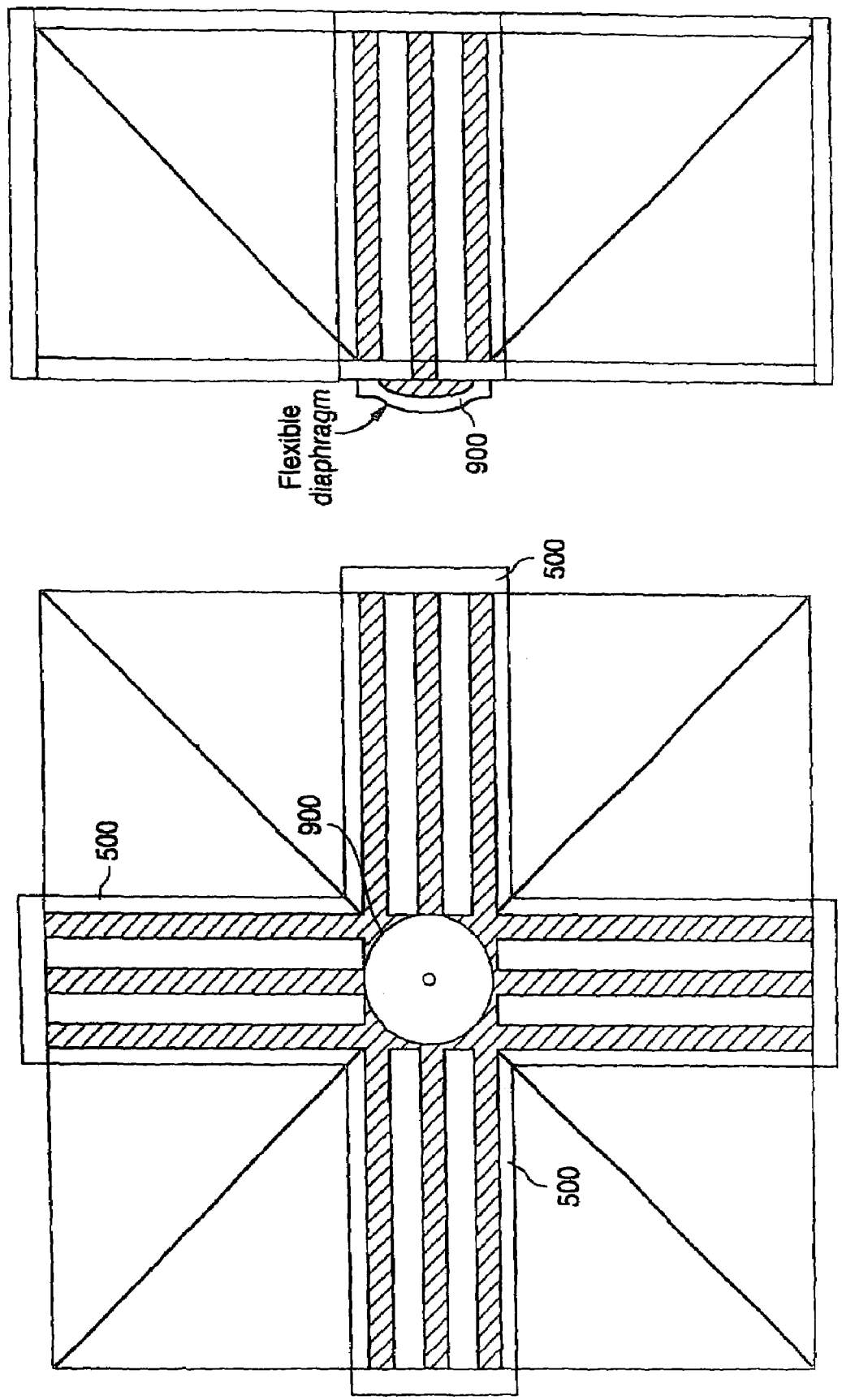
FIG. 9 is a drawing of a prism assembly equipped with a diaphragm 900 according to an embodiment of the present invention.

FIG. 9 is a drawing of a prism assembly equipped with a diaphragm 900 according to an embodiment of the present invention. The diaphragm 900 is constructed of a flexible material such as rubber, plastic, or another material with sufficient strength and flexibility to accommodate the expanding fluid and thereby relieve stress. The diaphragm 900 flexes as the volume of liquid increases or decreases. Preferably, the diaphragm 900 is circular and affixed over the fill hole 510 using an adhesive. However, other shapes and attachment mechanisms may be utilized (e.g., the flexible material fitted under a ring clipped to the frame around the fill hole).

FIG. 10 is a drawing of an air bladder 1000 equipped prism assembly according to an embodiment of the present invention. In one embodiment, the frame 500 is capped (e.g., cap 1010), and a bladder is inserted inside the optical assembly. The bladder expands and contracts as the volume of liquid decreases and increases.

The air filled bladder 1000 is inserted into the fill channel (central fill hole 700). The volume of the bladder can increase or decrease to accommodate volumetric changes in the coupling liquid. In alternative embodiments, the bladder may be filled with any suitably compressible material (e.g., gas, liquid, solid, or combination thereof). The bladder 1000 can also serve to assist in holding those components in place that are not glued to the frame (e.g., the "flat" components (e.g., 410, 420) located between the polarized beamsplitting cubes). When configured to assist in holding the "flat" components in place, spacers such as polycarbonate roll 800 are not needed.

Figure 11B:
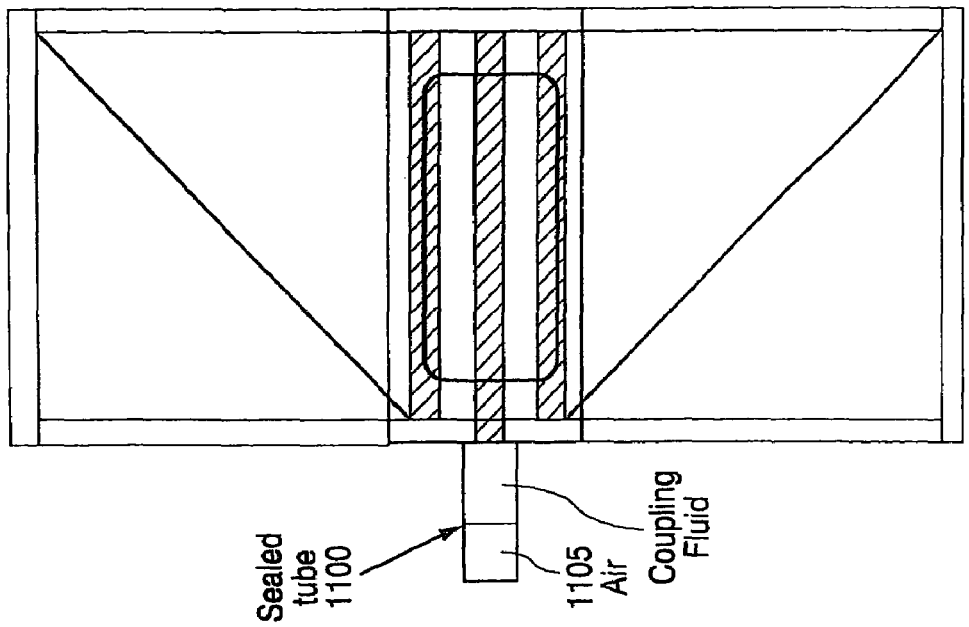
FIG. 11 is a drawing of an embodiment of a sealed tube assembly according to an embodiment of the present invention.
Figure 11A:
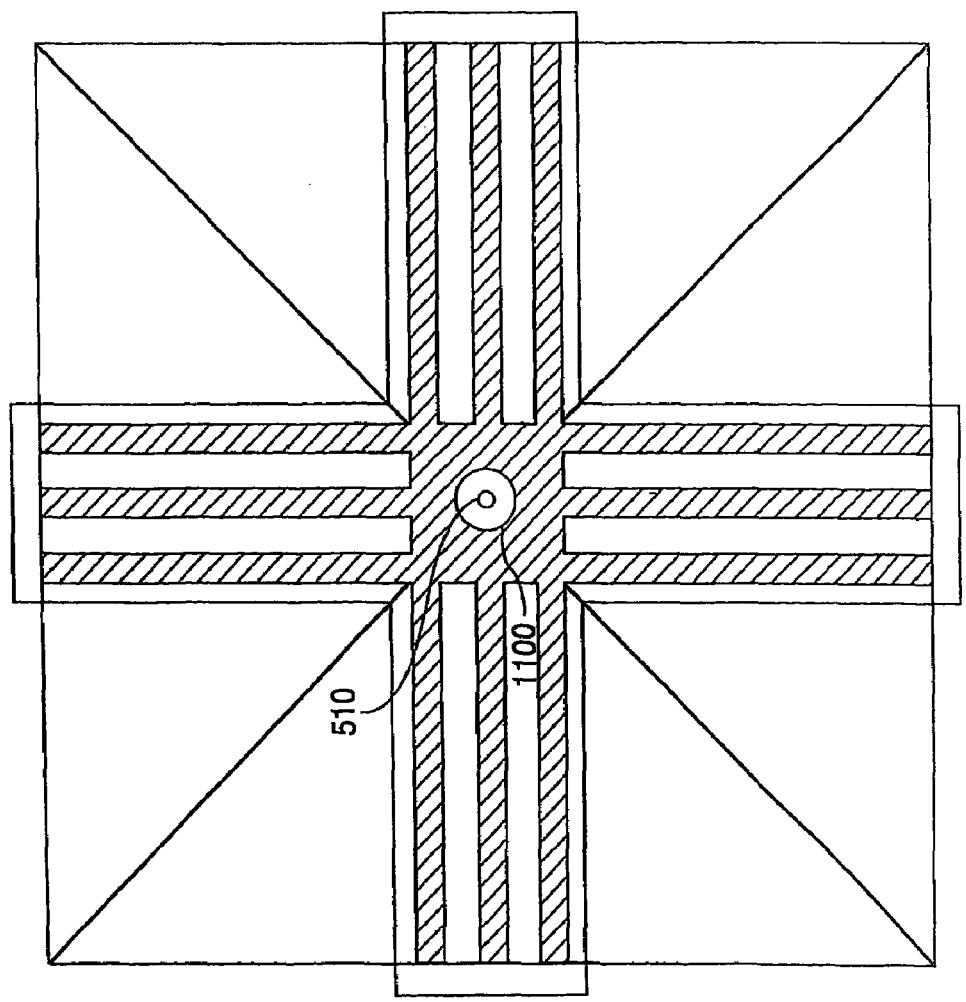

FIG. 11 is a drawing of an embodiment of a sealed tube 1100 assembly according to an embodiment of the present invention. A sealed tube 1100 is attached to the fill hole 510. A portion of the sealed tube 1100 contains an air bubble 1105. The air bubble 1105 will enlarge or shrink to accommodate expansion or contraction of the liquid within the prism assembly. In this approach, similar to the air bubble only approach discussed above, it is important to understand the orientation of the prism assembly in the light engine application. The reason being that the air bubble 1100 will migrate to the highest point within the prism assembly. It is therefore necessary to design the system such that the end of the tube is a high point. The tube may be configured with an elbow or other structure to direct the air bubble to an appropriate location. In the case of the air bubble only approach, it is therefore important that the high point of the prism assembly (high point of fluid in the prism assembly) is not at a point in of the optical paths of the prism assembly.

Figure 12B:
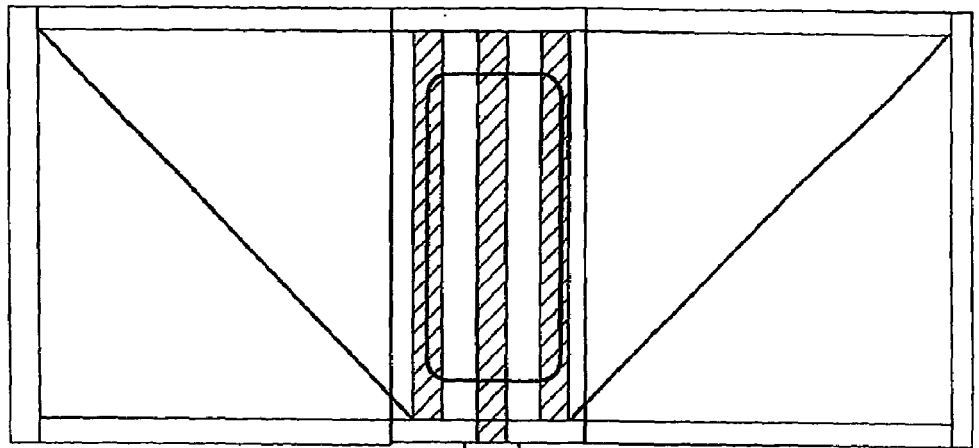
FIG. 12 is a drawing of an open air piston arrangement according to an embodiment of the present invention.
Figure 12A:
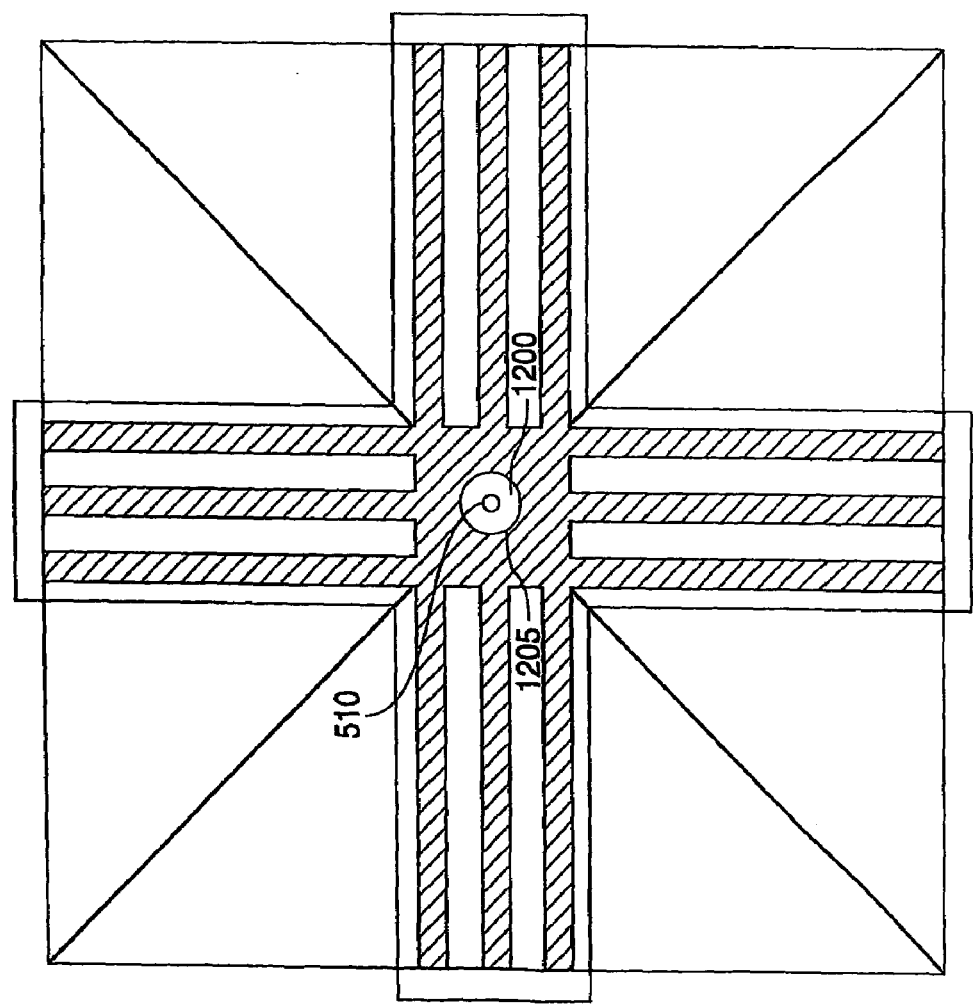

FIG. 12 is a drawing of an open air piston 1200 arrangement according to an embodiment of the present invention. An open ended tube 1205 is attached to the fill hole 510. A sliding piston 1200 fits snugly inside the open ended tube. As the optical coupling liquid expands with increasing temperature, the piston 1200 slides outward within the open ended tube. As the optical coupling liquid shrinks with decreasing temperature, surface tension (and/or pressure variance between the inside and the outside of the prism assembly) causes the piston to slide inward within the open ended tube 1205. In one embodiment, the open ended tube is longer than a predicted maximum expansion of the optical coupling fluid. In one alternative, stops 1210 are positioned inside the open ended tube to prevent the piston from reaching the open end of the tube 1205. In another alternative, the stops 1210 are electrodes connected to an emergency shut-off circuit, and the piston 1200 has a conductive material on its outer surface. When the piston contacts stops 1210, the light engine to which the prism assembly is installed is shut down at least until the prism assembly is sufficiently cooled to disengage piston 1200 from the stops 1210. As with all the embodiments listed herein, the open ended tube may be combined with one or more other embodiments (e.g., air bladder) to provide stress relief to compensate for the expanding and contracting optical coupling fluid.

The above embodiments may use an external frame (e.g., frame 500—external to the optical components of the prism assembly) that seals the prism assembly and contains the optical coupling fluid (and include any necessary attachments for any of the stress relief features discussed above). The frame also provides structural strength to the prism assembly. However, the present inventors have also realized the need for a compact arrangement for sealing the optical coupling fluid. The compact arrangement then allows for the prism assembly to be utilized in a wider variety of optical applications, including different LCoS based video projection systems.

Furthermore, any newly designed and/or previously existing light engine systems can be fitted with a fluid coupled prism assembly. In new designs, fitting the liquid coupled prism assembly may be performed by fitting mounts within the projection system to accommodate one or more liquid coupled prism assembly sizes. However, in the case of retrofit systems (fitting liquid filled prism assemblies to previously sold projection systems and/or fitting liquid coupled prism assemblies to a new projection system of a previous design), physical accommodation of the liquid coupled prism assemblies may not be so easily accomplished. That is, the physical size and shape of a fluid coupled prism assembly may not allow it to directly fit into the position provided for a conventional prism assembly within an existing light engine. The modifications of the light engine required to accommodate a fluid coupled prism assembly may be difficult, expensive or, in an extreme case, not possible. Therefore, by providing a fluid coupled prism assembly that is sealed and provides structural strength and has external dimensions that are similar to that of an equivalent conventional prism assembly, that prism assembly could be used as a drop in replacement for a conventional prism assembly in any light engine design. The invention disclosed in this document is such a means.

For these reasons, the present inventors have also developed an internally sealed prism assembly that seals and provides structural integrity to a liquid filled prism assembly.

Figure 13:
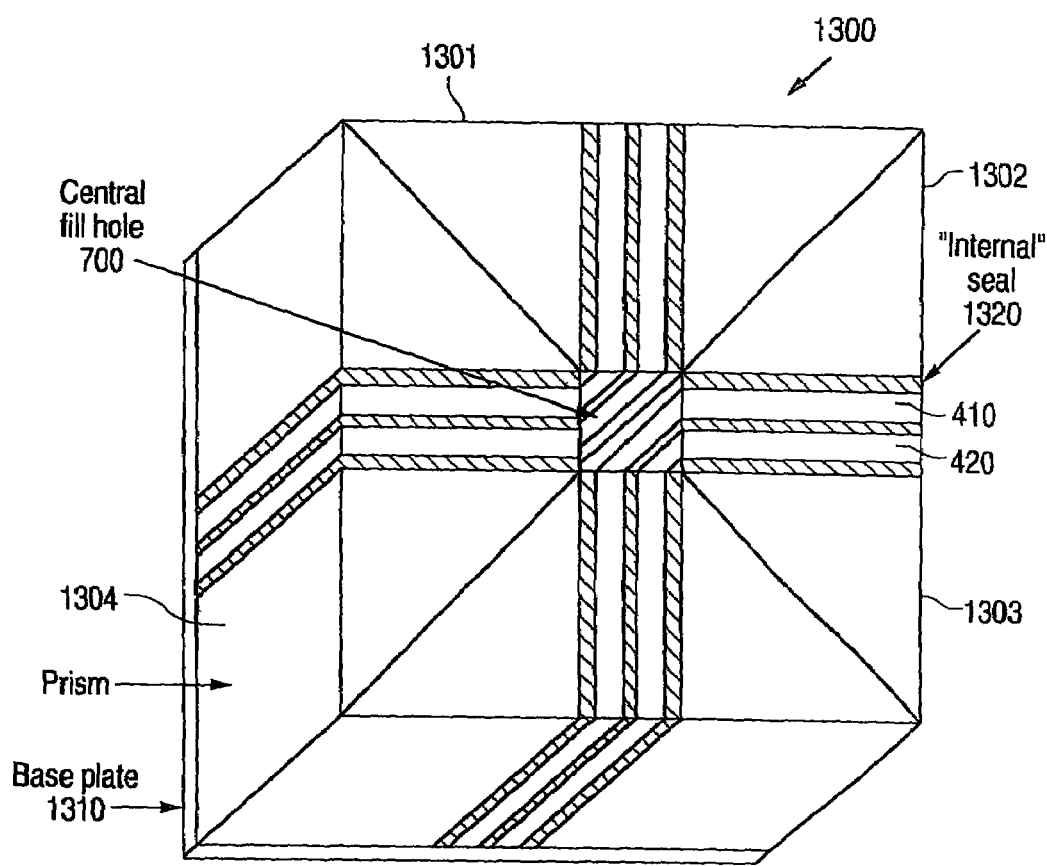
FIG. 13 is a drawing of an internally sealed prism assembly according to an embodiment of the present invention.

FIG. 13 is a drawing of an internally sealed prism assembly 1300 according to an embodiment of the present invention. The internally sealed prism assembly 1300 includes a baseplate 1310 and at least one internal seal 1320 between optical components of the prism assembly. Comparing this embodiment to the previous configurations, most features of the external frame are absent except the base plate 1310 (the base plate being a feature common to both the conventional and fluid coupled prism assembly configurations). The base plate 1310 provides a secure, firm surface for attaching the PBSs 1301-1304. As illustrated in FIG. 13, the internal seal is fitted between optical elements 410 and 420, between optical element 410 and PBS 1302, and between optical element 420 and PBS 1303. The internal seal extends downward from the top of the optical elements/PBSs a short distance (e.g., 1 mm) to produce a seal that maintains the optical coupling fluid installed into the prism assembly. In one embodiment, the internal seal also overlaps the tops of the optical elements 410 and 420, such that the seal covers the exposed surfaces of the optical elements, but preferably does not extend beyond the outer surface of the PBSs. In depth, the seals seeps between the optical elements/PBSs to a prescribed sealing depth (e.g., 1 mm).

Figure 14:
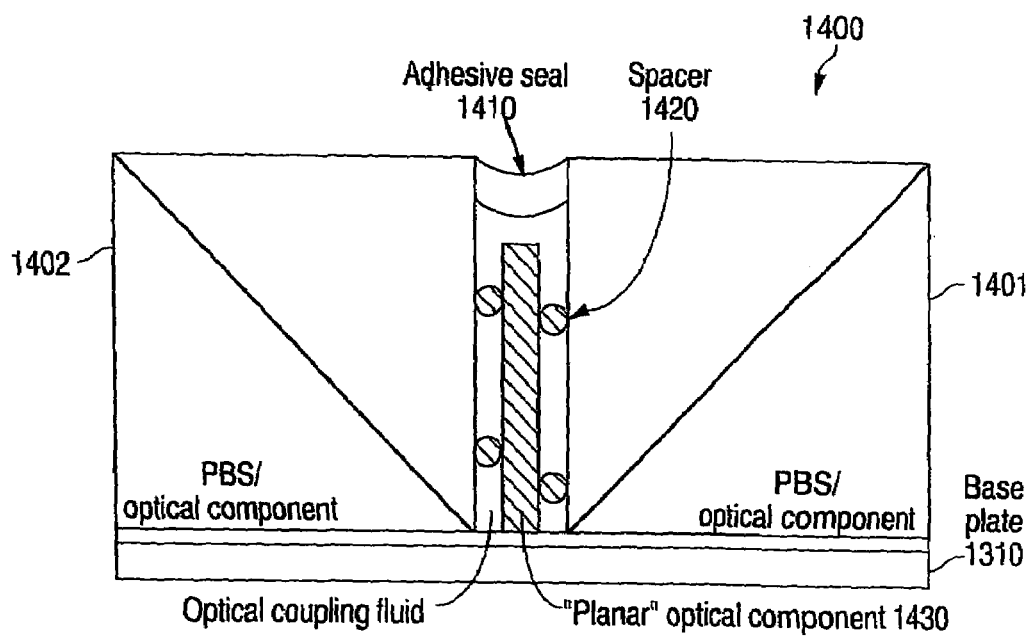
FIG. 14 is a close-up of an internal seal of an internally sealed prism assembly according to an embodiment of the present invention.

FIG. 14 is a close-up of an internal seal of an internally sealed prism assembly 1400 (part view) according to an embodiment of the present invention. In FIG. 14, 2 PBSs 4101 and 1402 have an internal seal 1410 between them. The internal seal may be described as a "picture frame" between the PBS elements. The adhesive does not extend beyond the outer surface of the prism assembly. Preferably, the internal seal is an adhesive agent that not only seals the prism assembly, preventing leakage of the optical coupling fluid, but may also provide additional rigidity to the entire structure. The adhesive may be, for example a 1 or 2 part epoxy or a UV cured adhesive that both hardens and seals.

Alternatively, the adhesive seal may be a pliant adhesive such as silicone based adhesives. However, flexing of the prism assembly can become an issue if non-hardened sealant is utilized. While the bottom plate of the frame provides enough rigidity that pliant adhesives may be acceptable in some applications, a top plate (on the side of the prism assembly opposite the base plate) in addition to the base plate adds enough rigidity that pliant adhesives are fully acceptable in most all applications.

FIG. 14 also illustrates an optical element ("Planar" optical component 1430) separated by spacers 1420. The optical element is shorter than a bottom height of the adhesive sealant. The optical element is representative and may in fact be several optical elements also separated from the PBSs and each other via additional spacers. The "planar" optical components 1410 are items such as dichroics, reflective polarizers and wavelength specific retarders contained between the PBSs and suspended in the optical coupling liquid. The planar components are spaced from the glass surfaces by use of spacer elements as discussed previously. Penetration (the prescribed sealing depth) of the adhesive 1410 is confined to a region out of the optical path. The base plate 1310 provides the required rigidity to the prism assembly.

As explained above, the principle advantages of the disclosed liquid coupled prism assembly techniques and configurations include the ability to use less expensive, low tolerance glass components, and the ability to fabricate a prism assembly with "perfect" outside dimensions and in so doing, enabling the attachment of microdisplays directly to the prism assembly. In turn, the latter provides several advantages the foremost being that the resulting monolithic assembly will remain in a alignment under a wide range of conditions.

An alternative means by which these advantages can be obtained is to utilize the "build from the outside in" procedure described previously but, rather than filling the prism assembly with an optical coupling liquid, leaving the assembly empty therefore "filling" with air. However, in this approach, it will be necessary to coat all surfaces now exposed with an anti-reflection thin film (AR coatings) to suppress reflections. The expansion port is not required in this configuration. In some applications it may be possible to also omit the side rails of the frame (e.g., 500B) and possibly the top (500C).

In yet another alternative, the prism assembly is filled with an epoxy that cures. Preferably the cured epoxy has an index of refraction that closely matches the index of refraction of the PBSs and optical elements utilized. In still yet another embodiment, a gel substance may also be used to fill the joints between adjacent PBSs. Again, preferably, the gel has an index of refraction that approximates that of the other parts of the prism assembly. An example gel that could be utilized is manufactured by NYE Corporation.

Figure 16A:
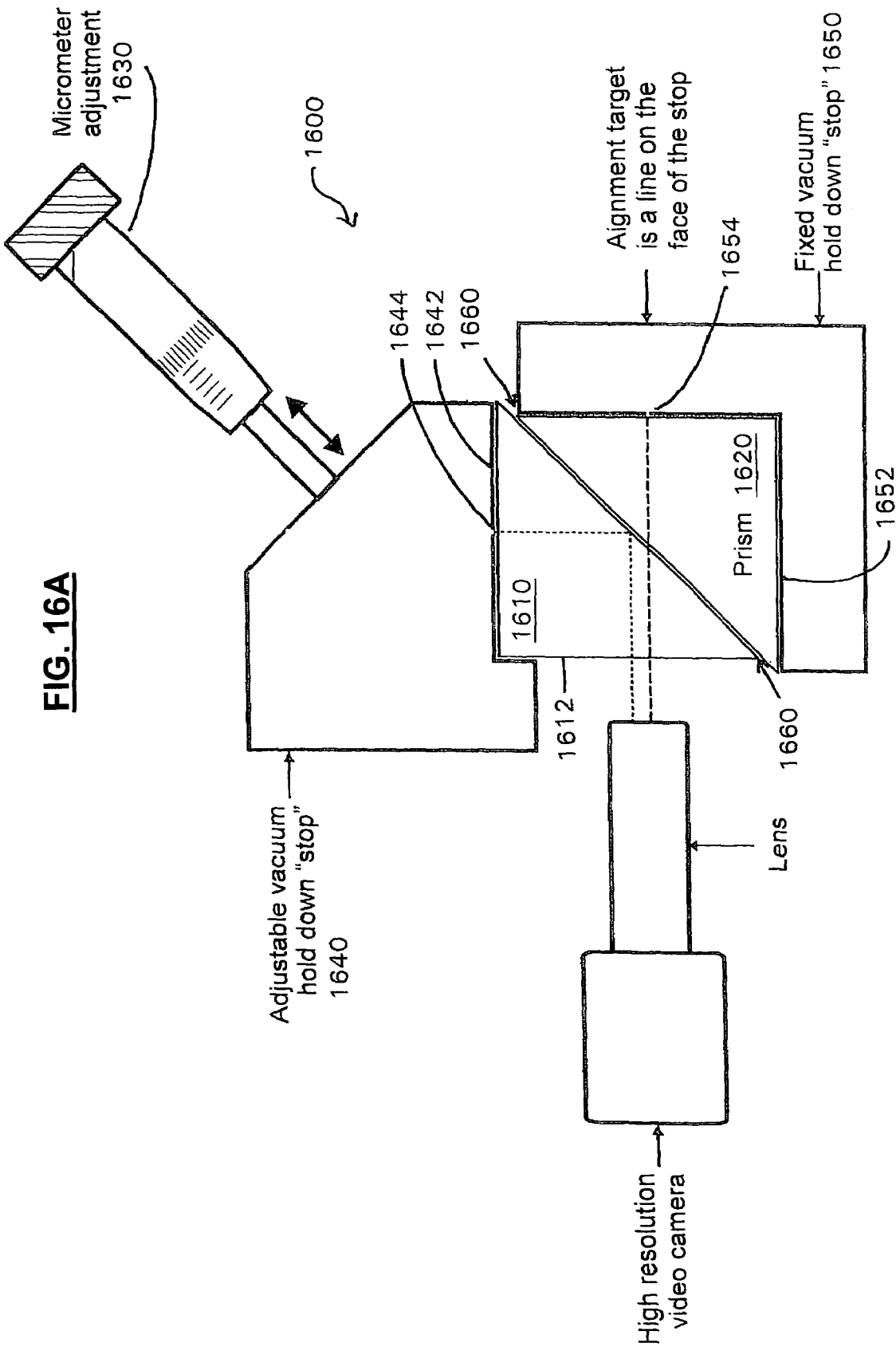
FIG. 16A is an illustration of a device used to produce a pathlength matched PBS cube according to an embodiment of the present invention.

FIG. 15 is an illustration of a pathlength matched Polarizing Beam Splitter (PBS) cube. FIG. 16A illustrates a pathlength matching device 1600 used to produce a pathlength matched PBS or beam splitting cube. A production process of a pathlength matched PBS cube is now described. A pathlength matched beam splitter (whether based on polarization, dichroics, or cholesterics) may be constructed using a similar process. The pathlength matched beam splitter is then utilized in the construction of a pathlength matched prism assembly and/or kernel.

The pathlength matching device 1600 is configured to hold two prisms (e.g., prism 1610 and 1620) and provide a fine adjustment (e.g. micrometer adjustment 1630) for aligning or matching selected pathlengths through the two prisms. The two prisms (1610 and 1620) that will compose a PBS upon completion of the production process are positioned onto precision "stops" (1640, 1650) of the pathlength matching device 1600. Using the terminology defined in FIG. 15, Face 1 (on the top prism 1610) is attached to the adjustable stop 1640 along side 1642, and Face 2 (on the side of prism 1620) is attached to the fixed stop 1620 along side 1652.

One method to achieve a firm but temporary attachment of the prisms to the stops is to use a vacuum hold down. For example, a vacuum chuck (not shown) is placed in at least one location on each stop and a vacuum line attached to the chucks provides suction that holds the prisms in place. However, other devices such as a clamp may be utilized. Thus the prisms are placed in position in corresponding stops of the pathlength matching device.

An adhesive (e.g., a UV curable adhesive) is dispensed to fill the gap between the top and bottom prism. On the face of each stop is a precisely located alignment target. The alignment target is a fine line (on the order of 10 microns). Stop 1640 includes alignment target 1644 and stop 1650 includes alignment target 1654. A high-resolution video camera "looks into" the as yet unassembled PBS through a Reference Face 1612 of prism 1610. Both alignment lines are observed through the video camera. Pathlength matching is achieved when the two alignment lines coincide. The lines can be made coincident by "sliding" the top prism along diagonal 1660 between the top prism 1610 and the bottom prism 1620.

The amount of adjustment is performed by visually viewing and adjusting the prism assembly. With experience, an assembler will be able to estimate an amount of adjustment and dial that amount into the micrometer, and then perhaps make one or two smaller adjustments to position the prisms in a pathlength matched position. However, knowledge of a precise number to dial into the micrometer is not essential, and the pathlength matched positions can be reached simply by viewing and adjusting. Therefore, the micrometer 1630 may be replaced by a fine adjustment screw or any device that can be configured to move the relative positions of the two prisms along their diagonals.

Also, note that the pathlength adjustment is fine tuned by sliding the prisms along their diagonals, and since the prisms are generally not of precisely the same dimensions, the prism corners will not perfectly align (note overhand at each end of the diagonals). In the finished pathlength matched beamsplitter (e.g., PBS), the amount of overhang is proportional to an amount of non-uniformity, or non-equality, in the dimensions of the prisms. With uniform prisms having equal dimensions, the prisms would mate together evenly, however, as noted above, such precision in prism construction is very costly. Thus, the present invention allows pathlength matched construction without the need for precisely sized prisms.

In the embodiment of FIG. 16A, a micrometer 1630 is utilized to adjust the position of the top prism and make the alignment lines coincide. In one embodiment, an operator watches an output of the video camera on a display screen and manually turns the micrometer adjustment until the alignment targets coincide. In another embodiment, the video camera feeds a computing device having vision system software that recognizes when the alignment targets are aligned. Computer generated signals inform an operator how much to adjust the micrometer, or the micrometer is adjusted by a stepping motor (or other control motor) as commanded by the vision system. In another embodiment, the video camera is replaced with an eyepiece in which the operator directly observes the alignment targets and then manually adjusts the micrometer 1630.

Figure 16B:
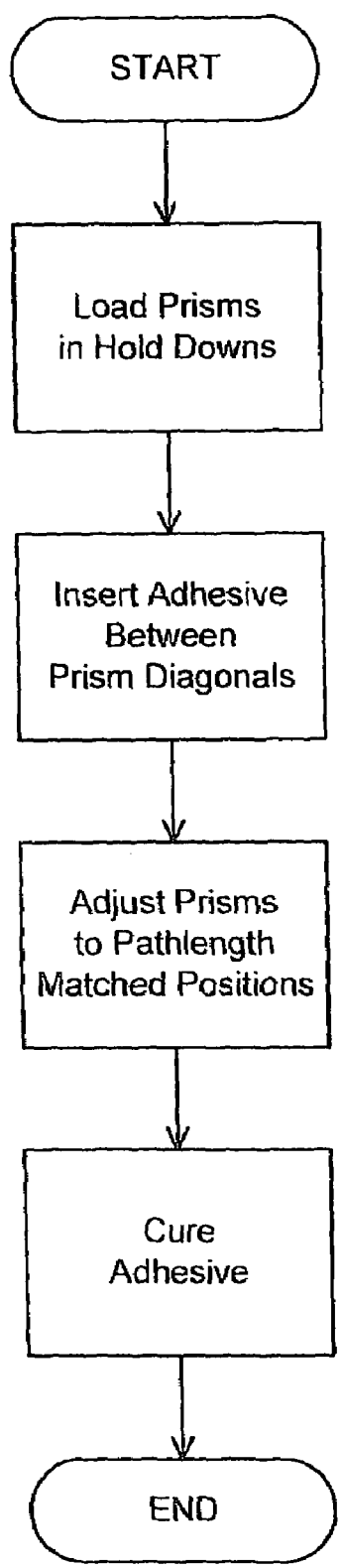
FIG. 16B is a flow chart of a process for producing a pathlength matched beamsplitter according to an embodiment of the present invention.

Finally, once alignment is satisfactory, a UV lamp is used to illuminate the PBS curing the adhesive and locking the components into place. An entire process for producing a pathlength matched beam splitting cube, using the device shown in FIG. 16A, is illustrated in FIG. 16B. To produce a Polarizing Beam Splitter (PBS) an additional step of applying a polarizing layer, thin film, to a diagonal of one of the prisms or between each of the diagonals of the prisms is added. Other types of beam splitters may be constructed by adding or substituting a different thin film (e.g., colorized beam splitter with the addition of a color layer).

A second method of production of a pathlength matched PBS cube is now described. FIG. 17 is an illustration of a device used to produce a pathlength matched PBS cube according to another embodiment of the present invention. Several features of the device in FIG. 17 are the same as the device in FIG. 16A. The two prisms that will compose the PBS are held onto precision stops 1640 and 1650. Face 1 (on the top prism 1610) is attached to the adjustable stop 1640 and Face 2 (on the bottom prism 1620) is attached to the fixed stop 1650. Again, a vacuum hold down is used to achieve a firm but temporary attachment of the prisms to the stops. As before, an adhesive (probably an UV adhesive) is dispensed to fill a gap between the top and bottom prism along diagonal 1660.

An alignment target is located on the face of each stop. In this embodiment, the location of the alignment target need not be precise. A high-resolution video camera "looks into" the as yet unassembled PBS through the Reference Face 1612 (of the top prism 1610). In this embodiment, the depth of field (DOF) of the video camera (as determine by the lens) is chosen to be very limited. The position of the top prism is adjusted by micrometer 1630 until the video camera has both alignment targets simultaneously in focus. An equal distance (matched pathlength) from both alignment targets to the reference face (and video camera focal plane) is achieved when both alignment targets are in focus. DOF of the video camera is limited such that the alignment targets can only be simultaneously in focus when the prisms are arranged in a pathlength matched position within a tolerance needed for a product in which the PBS is to be used. As before, when alignment is satisfactory, the final step is to use a UV lamp to illuminate the PBS and cure the adhesive.

The present invention includes a number of configurations of kernels that may be constructed using any one or more of the parts, features, or techniques described above. A particular configuration may be advantageous over other configurations based on availability and cost of certain components (e.g., costs/availability of needed dichroics, filters, etc), and based on physical design parameters such as the size and shape of an enclosure used to house a finished product using the kernel. A number of example enclosure designs for televisions and video projection are described in Berman et al., Provisional Application Ser. No. 60/433,125, entitled "Designs of Display Appliances," filed Dec. 13, 2002, the contents of which are incorporated herein by reference in their entirety. Other example design packages are readily available in Television related literature and promotional materials available from manufacturers.

Figure 18:
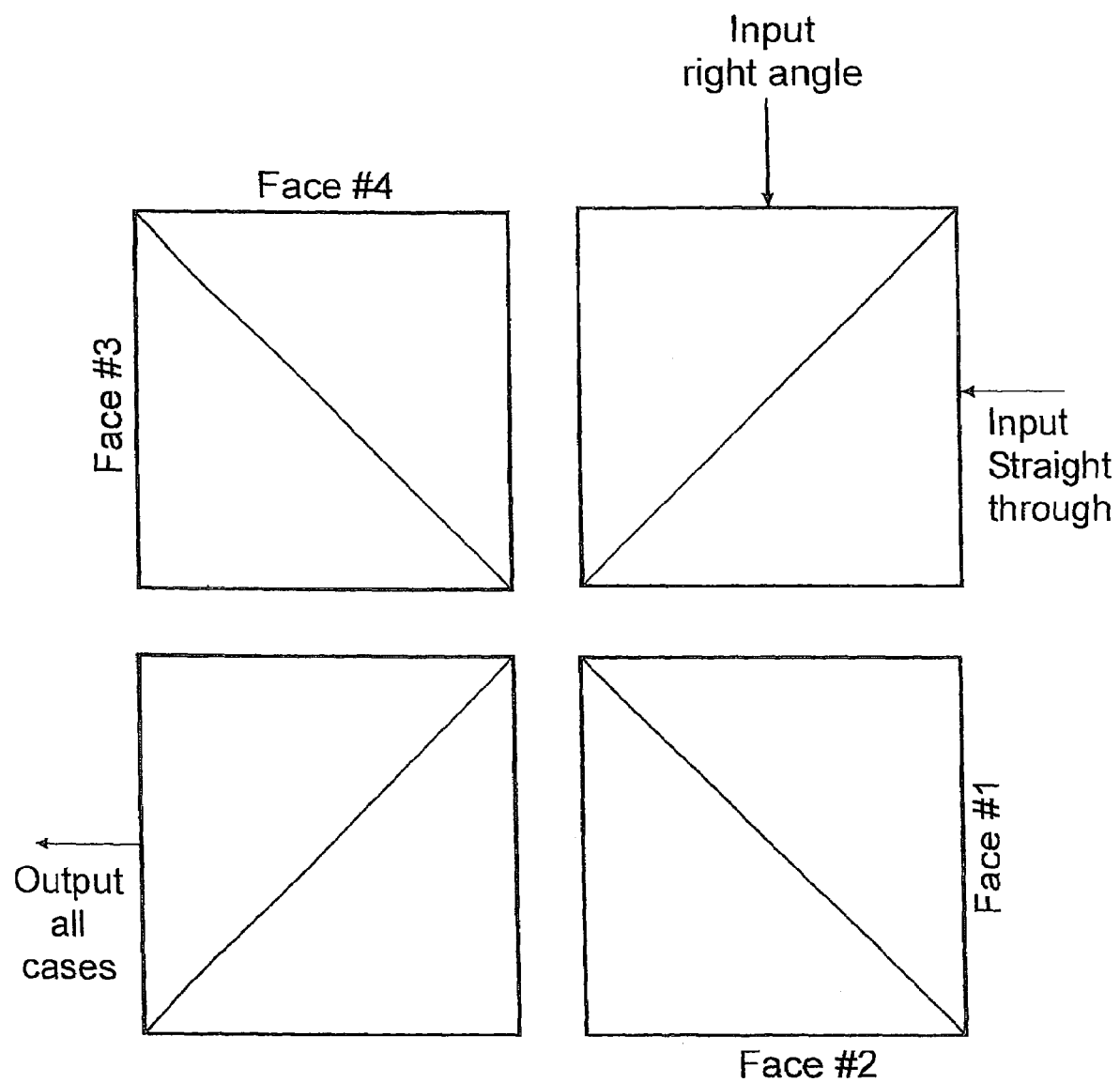
FIG. 18 is a block diagram of a layout of optical components applicable to a number of different kernel configurations.
Figure 19:
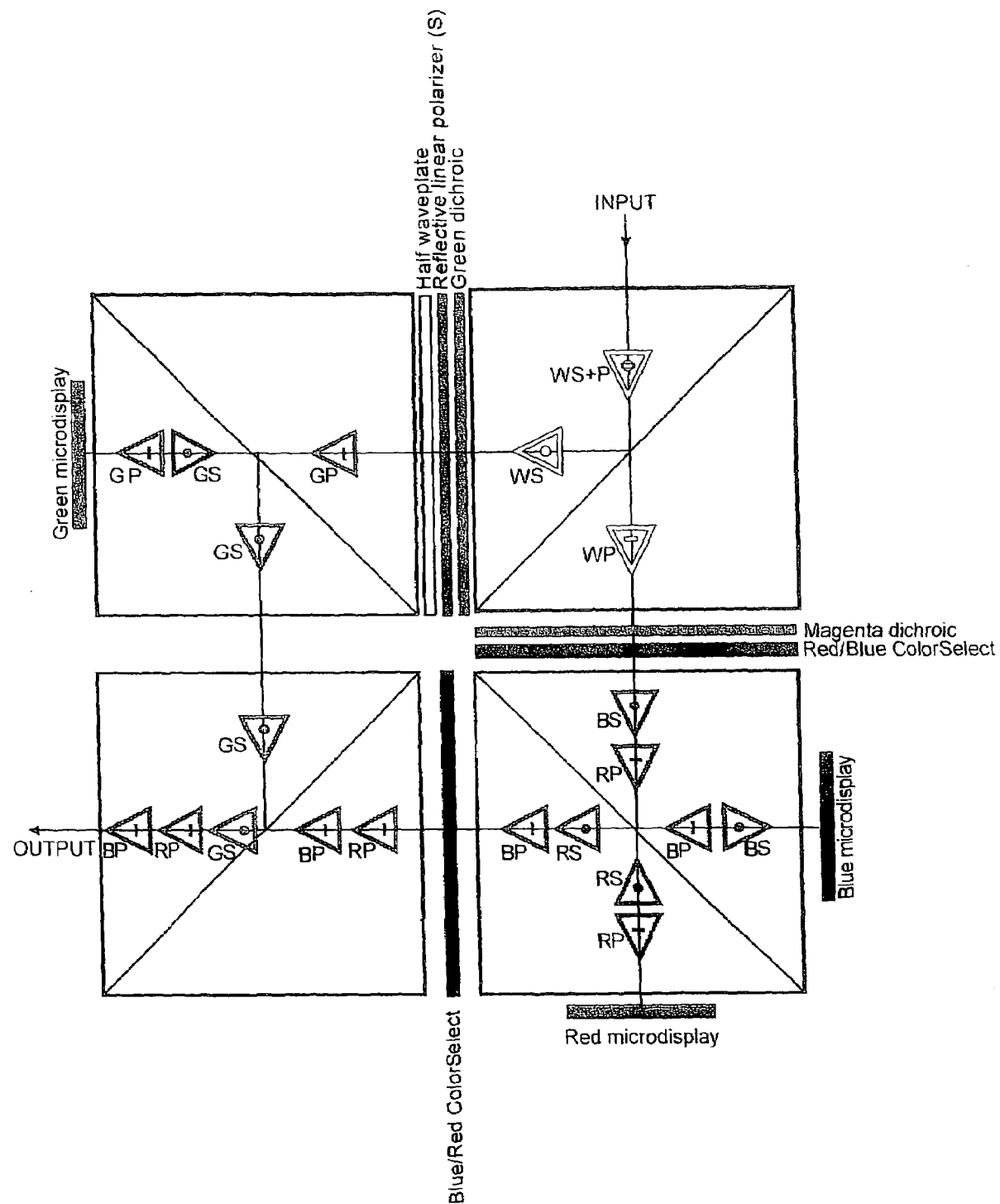
FIGS. 19-66 are illustrations of kernel configurations according to various embodiments of the present invention.

FIG. 18 is a block diagram of a layout of optical components applicable to a number of different kernel configurations. Table 1 provides a listing of several kernel configurations provided by the present invention:

TABLE 1

| FIG. NUMBER | INPUT ORIENTATION | FACE 1 | FACE 2 | FACE 3 | FACE 4 |
|---|---|---|---|---|---|
| 19 | Right angle | Blue | Red | Green | — |
| 20 | Right angle | Blue | Red | — | Green |
| 21 | Right angle | Blue | Green | Red | — |
| 22 | Right angle | Blue | Green | — | Red |
| 23 | Right angle | Blue | — | Red | Green |
| 24 | Right angle | Blue | — | Green | Red |
| 25 | Right angle | Red | Blue | Green | — |
| 26 | Right angle | Red | Blue | — | Green |
| 27 | Right angle | Red | Green | Blue | — |
| 28 | Right angle | Red | Green | — | Blue |
| 29 | Right angle | Red | — | Green | Blue |
| 30 | Right angle | Red | — | Blue | Green |
| 31 | Right angle | Green | Red | Blue | — |
| 32 | Right angle | Green | Red | — | Blue |
| 33 | Right angle | Green | Blue | Red | — |
| 34 | Right angle | Green | Blue | — | Red |
| 35 | Right angle | Green | — | Red | Blue |
| 36 | Right angle | Green | — | Blue | Red |
| 37 | Right angle | — | Blue | Red | Green |
| 38 | Right angle | — | Blue | Green | Red |
| 39 | Right angle | — | Red | Blue | Green |
| 40 | Right angle | — | Red | Green | Blue |
| 41 | Right angle | — | Green | Blue | Red |
| 42 | Right angle | — | Green | Red | Blue |

TABLE 1-continued

| FIG. NUMBER | INPUT ORIENTATION | FACE 1 | FACE 2 | FACE 3 | FACE 4 |
|---|---|---|---|---|---|
| 43 | Straight through | Blue | Red | Green | — |
| 44 | Straight through | Blue | Red | — | Green |
| 45 | Straight through | Blue | Green | Red | — |
| 46 | Straight through | Blue | Green | — | Red |
| 47 | Straight through | Blue | — | Red | Green |
| 48 | Straight through | Blue | — | Green | Red |
| 49 | Straight through | Red | Blue | Green | — |
| 50 | Straight through | Red | Blue | — | Green |
| 51 | Straight through | Red | Green | Blue | — |
| 52 | Straight through | Red | Green | — | Blue |
| 53 | Straight through | Red | — | Green | Blue |
| 54 | Straight through | Red | — | Blue | Green |
| 55 | Straight through | Green | Red | Blue | — |
| 56 | Straight through | Green | Red | — | Blue |
| 57 | Straight through | Green | Blue | Red | — |
| 58 | Straight through | Green | Blue | — | Red |
| 59 | Straight through | Green | — | Red | Blue |
| 60 | Straight through | Green | — | Blue | Red |
| 61 | Straight through | — | Blue | Red | Green |
| 62 | Straight through | — | Blue | Green | Red |
| 63 | Straight through | — | Red | Blue | Green |
| 64 | Straight through | — | Red | Green | Blue |
| 65 | Straight through | — | Green | Blue | Red |
| 66 | Straight through | — | Green | Red | Blue |

Figure 20:
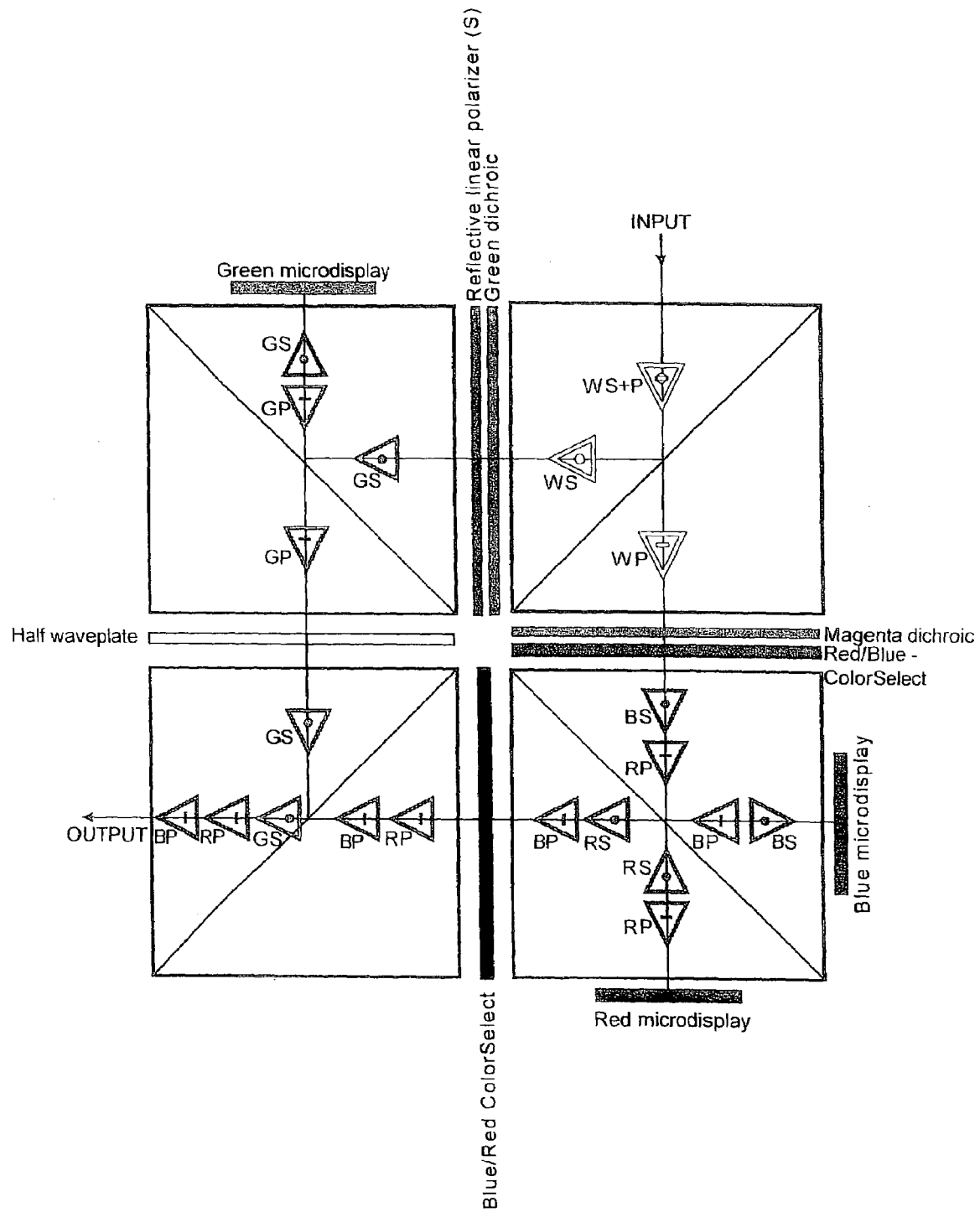
Figure 21:
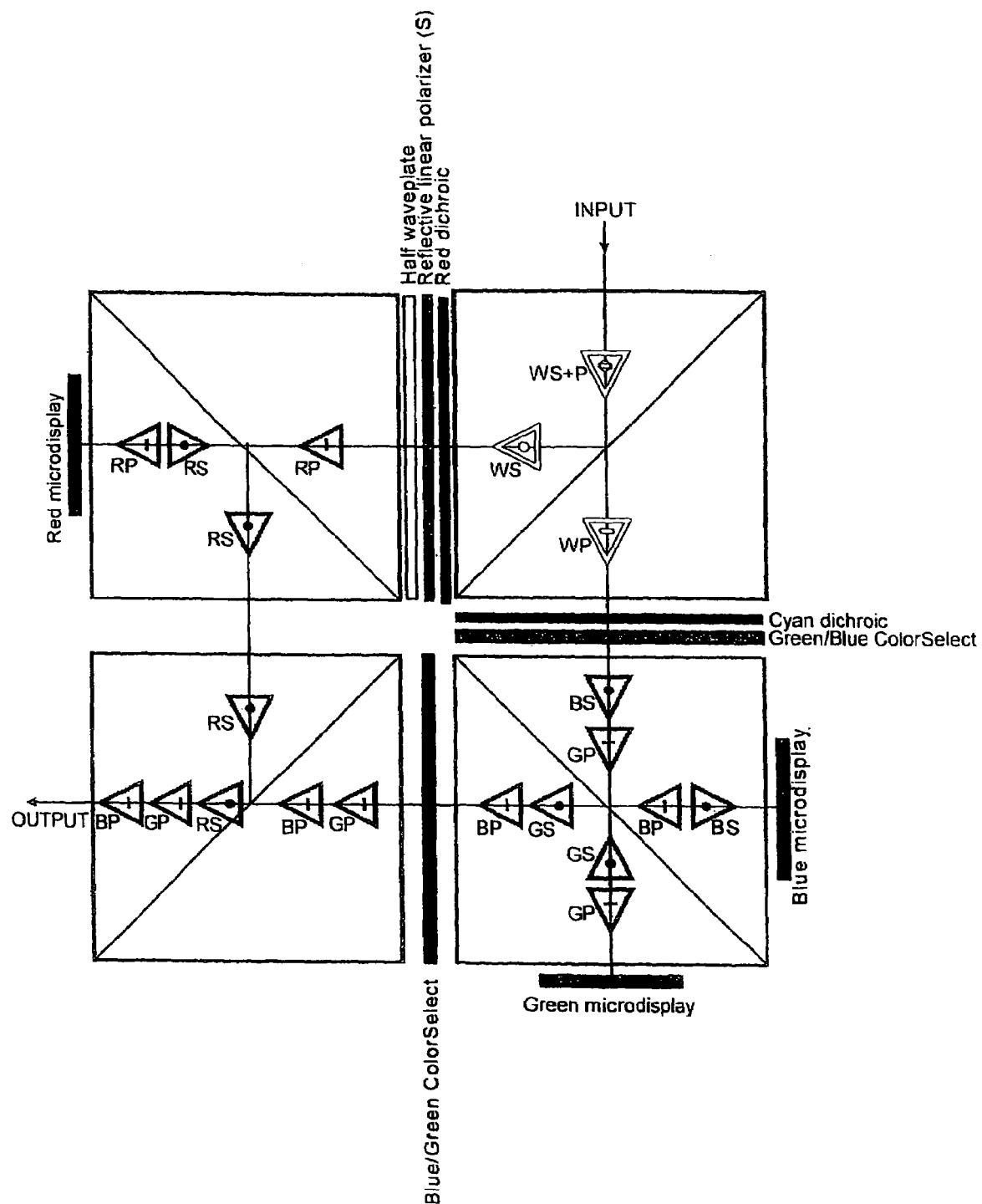
Figure 22:
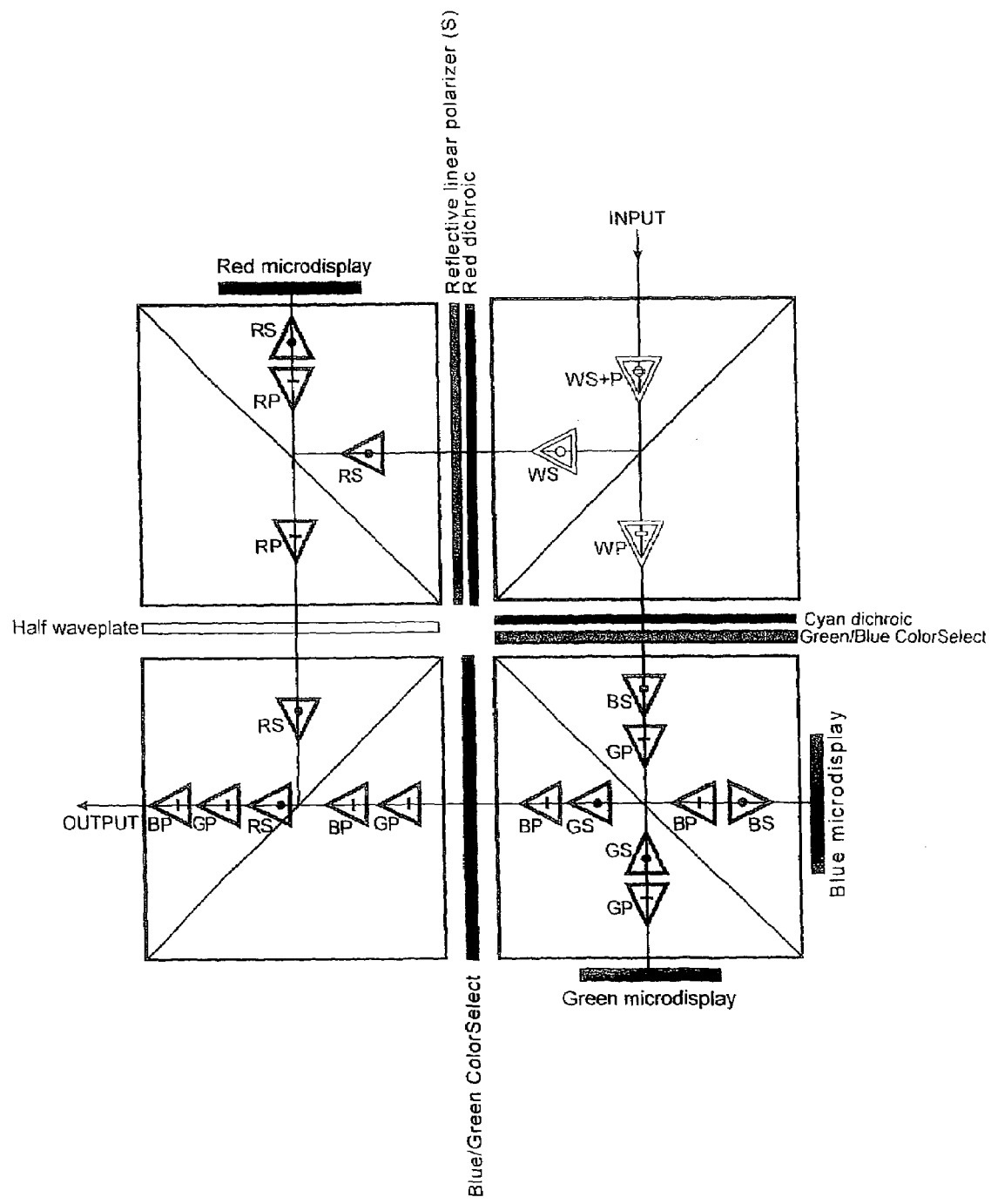
Figure 23:
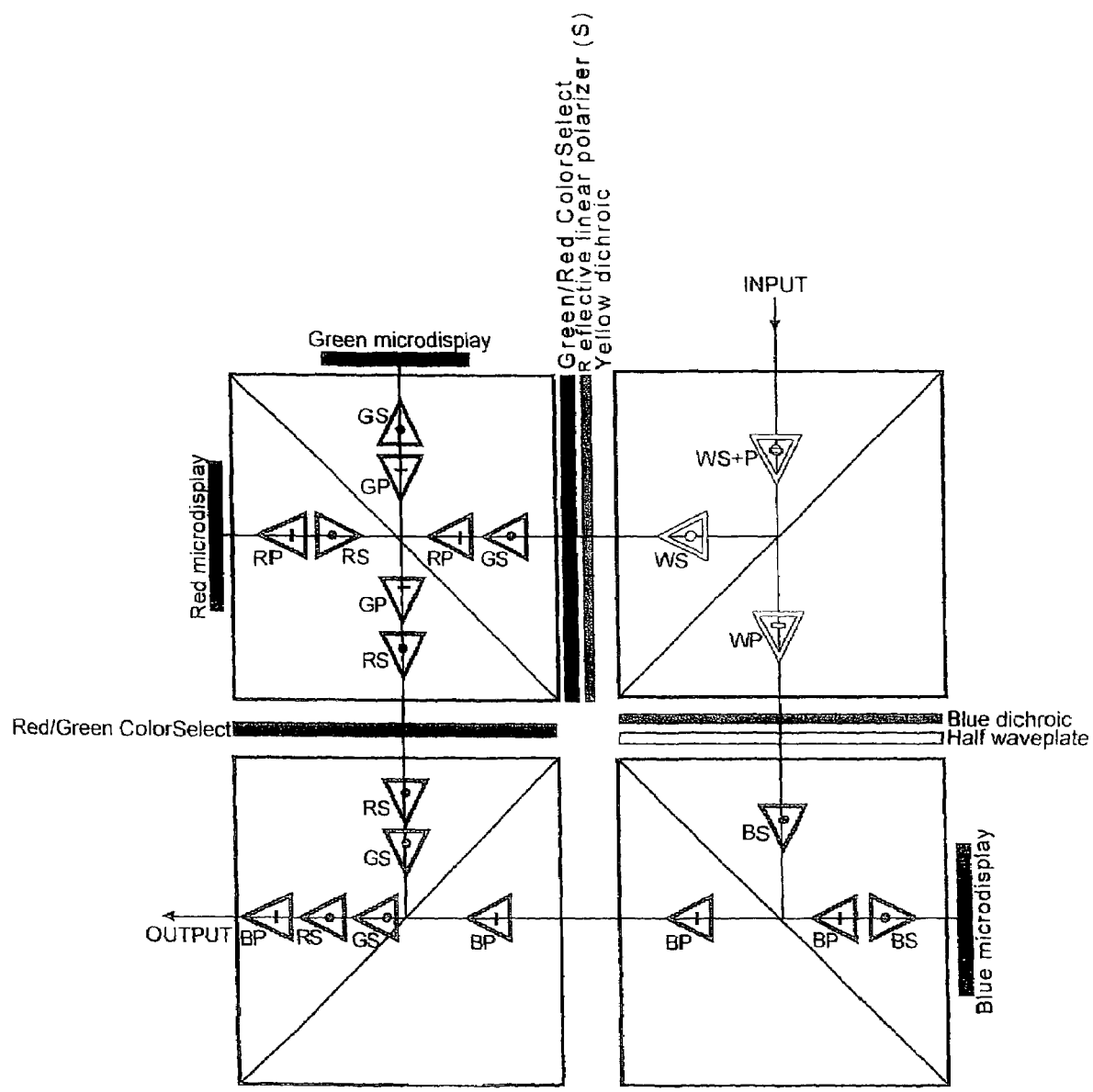
Figure 24:
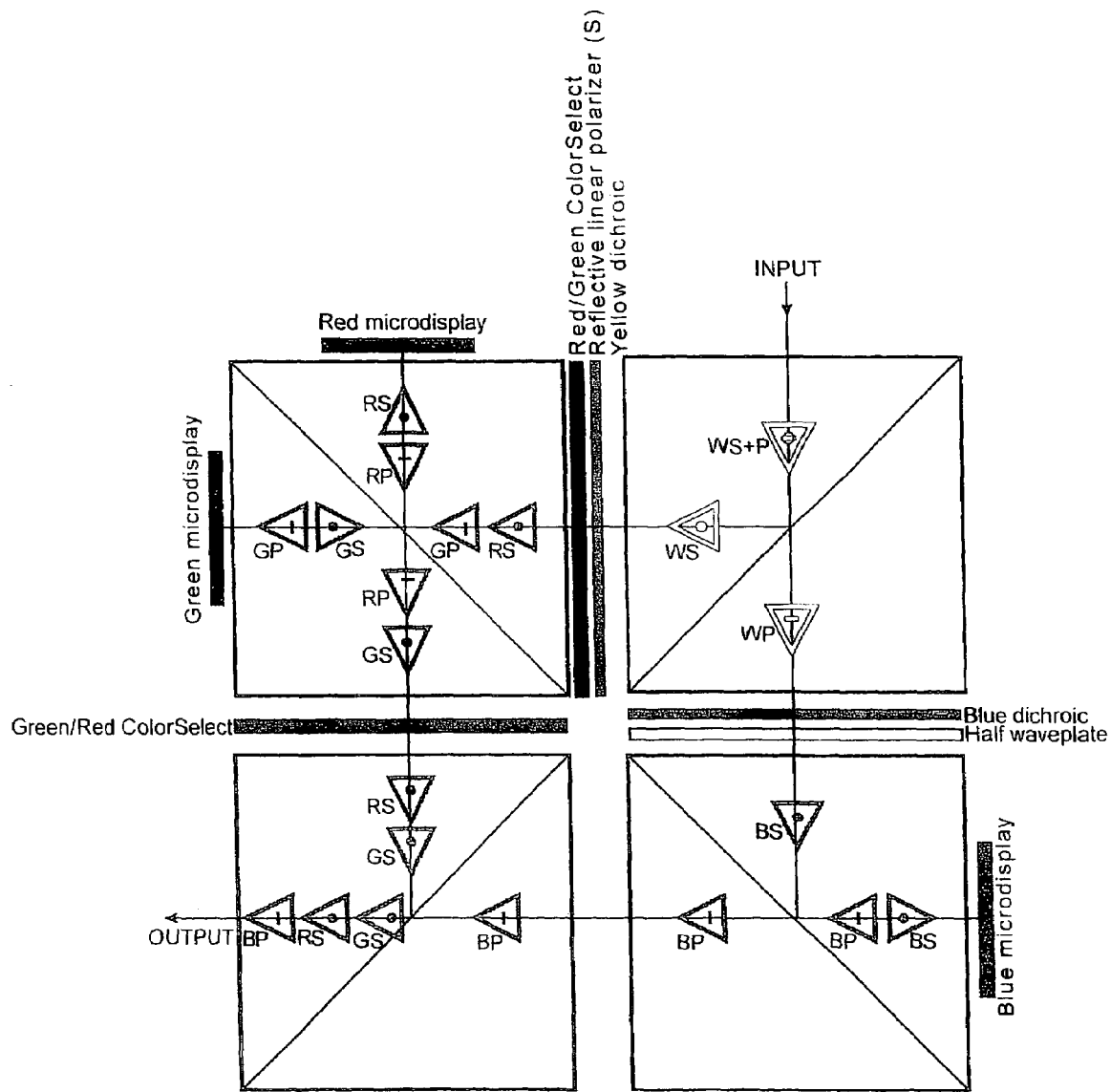
Figure 25:
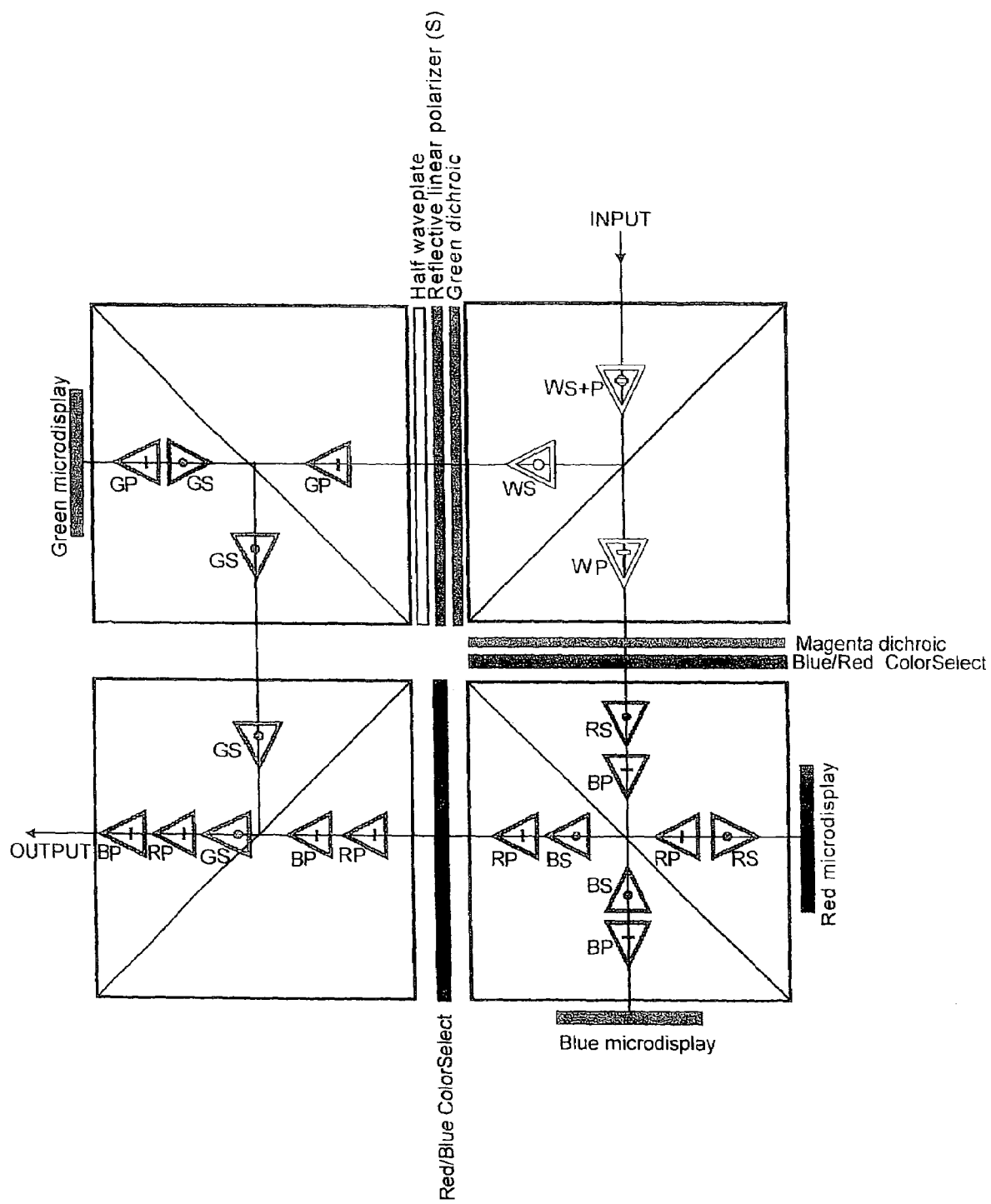

The terminology used in Table 1 is defined in FIG. 18. A basic kernel configuration is listed in FIG. 20 which shares several similarities to that disclosed in FIG. 2.

Note that some features have been left out of the Kernel Configuration drawings (not shown) in order to simplify the illustrations, including:

Glass spacers or other adjustments to the gaps between the PBSs or other optical components to equalize the optical path lengths.
Dump light paths.
Antireflection coatings on certain prism faces.
ColorSelect material at the input to the kernel that allows the input of polarized light.
ColorSelect material at the output of the kernel to rotate all linear output polarizations into one plane.
Compensating waveplate, cover glass or black mask on the microdisplays.
Features associated with the assembly of the kernel such as adhesive layers or optical coupling fluid.
Structural features (the frame) external to the optical components in a fluid coupled kernel.
Spacing elements between the PBS and "flat" components to assure that they do not touch thus allowing the inclusion of the optical coupling fluid.

Any of the above listed or other features not shown in the figures can be applied to modify any of the kernel configurations described herein.

Figure 67:
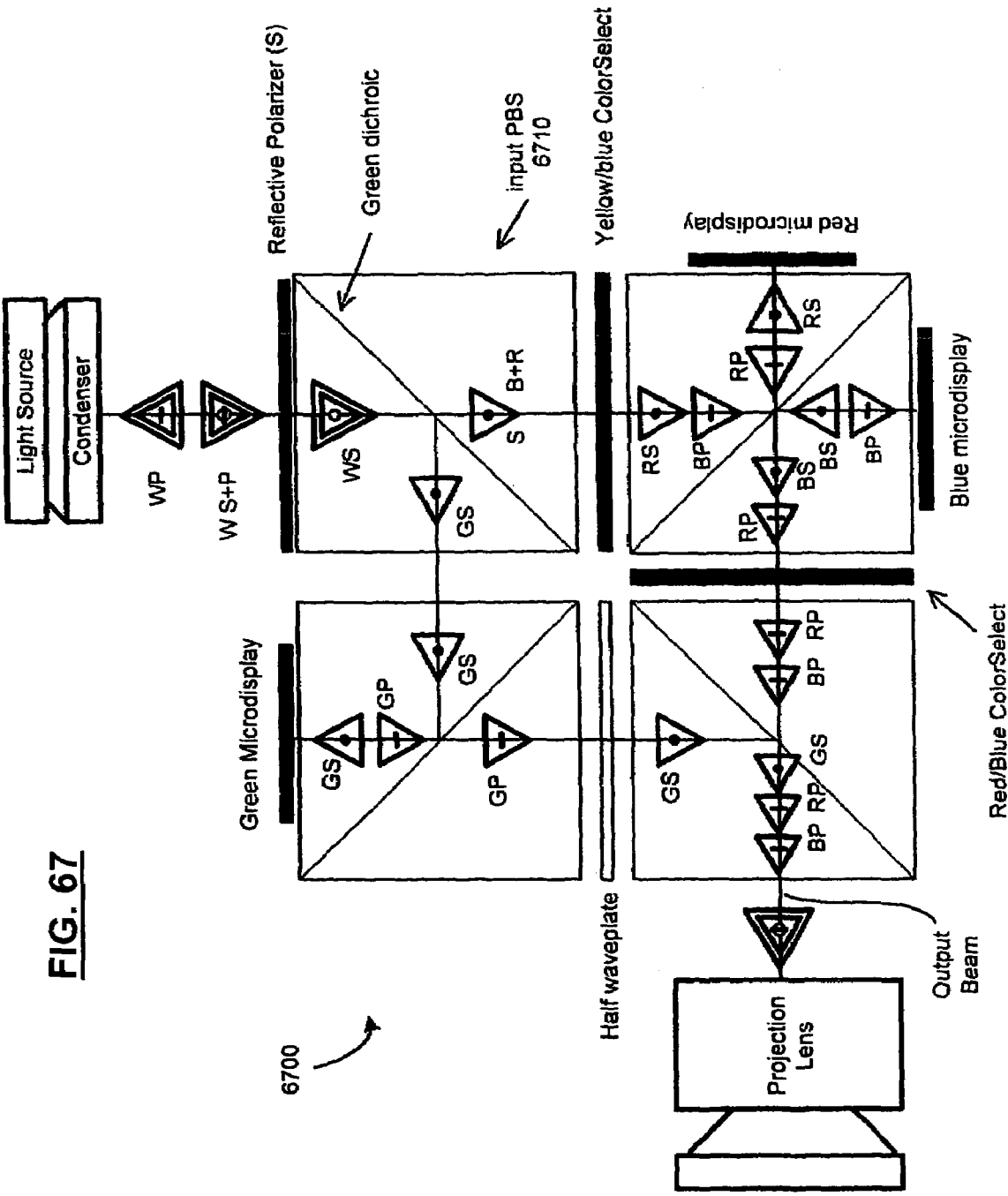
FIG. 67 is yet another kernel configuration according to an embodiment of the present invention.
Figure 68:
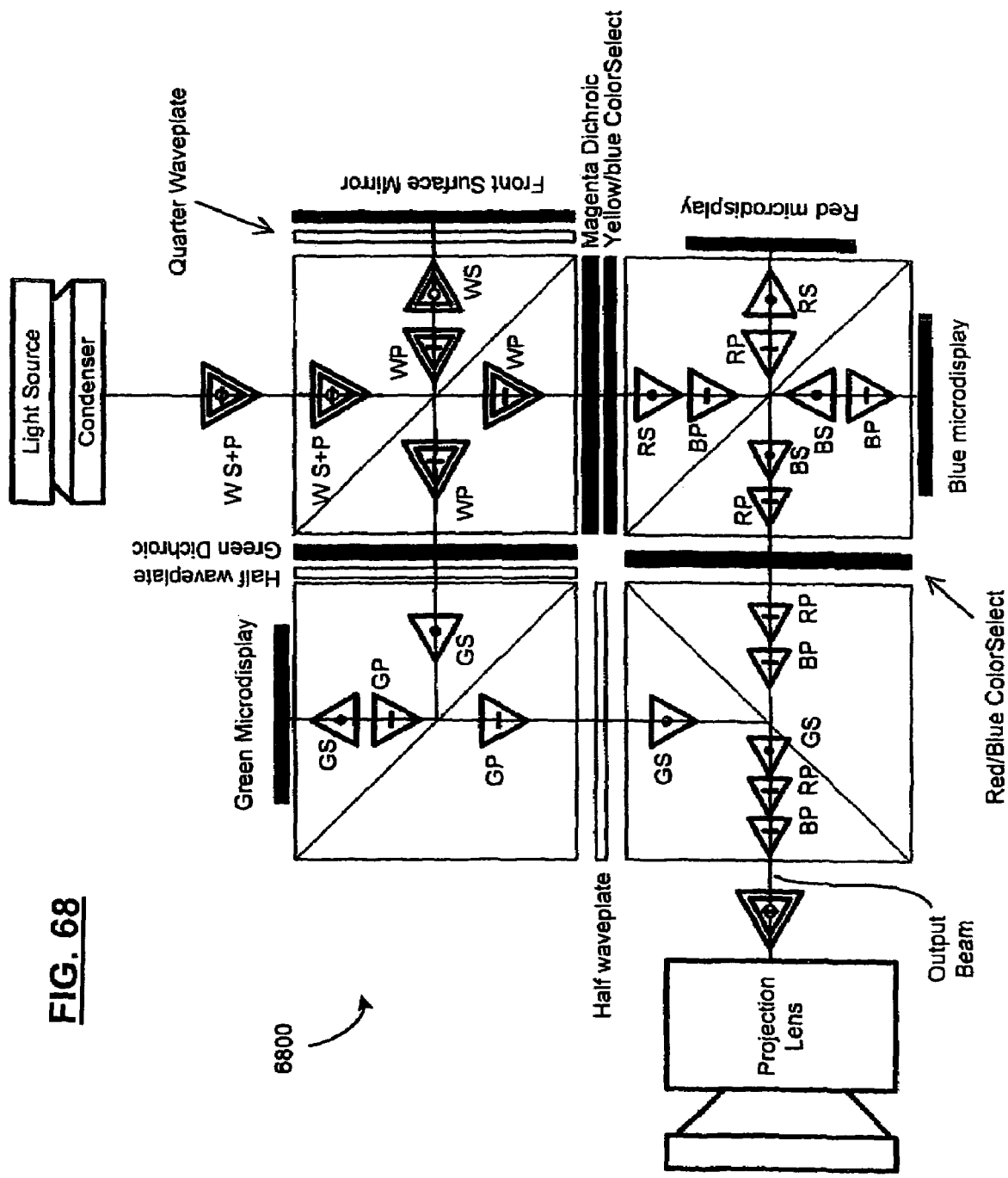
FIG. 68 is yet another kernel configuration according to an embodiment of the present invention.

FIG. 67 illustrates a prism and kernel configuration 6700 where each of the optical components is named and the path and polarization of the light at each point within the prism is indicated (as in previous diagrams, S and P indicate polarization, and W (White), G (Green), R (Red), and B (Blue) indicate color). Other components of a light management system utilized with the kernel configuration are also shown (Light Source, Condenser, and projection lens). FIG. 68 illustrates yet another prism and kernel configuration 6800.

Again, note that the illustrations indicate only the optics of the configuration. The actual prism may require additional components. For example, a "clean-up" polarizer can be inserted to the left and/or below the input PBS 6710 to improve the contrast ratio. Preferably, this would be a reflective polarizer. In addition, "spacer glasses" can be inserted between any of the PBSs to equalize the optical pathlengths from the reflective surfaces of the microdisplays to the output face of the output PBS. As with any of the kernel configurations described herein, liquid coupling and/or precision alignment corners may be utilized (e.g., see FIGS. 3 and 5), and, the PBSs can be pathlength matched PBS devices (e.g., similar to that illustrated in FIG. 15, and constructed according any of FIGS. 16A, 16B, and 17).

One advantage of utilizing liquid joints is that the coupling is much more efficient (e.g., less reflections). Another advantage is the possibility of reducing component count by eliminating the spacer glasses and adjusting the thickness of the liquid joints. Alternatively, the "joints" between the components in the optical path can be conventional, that is, a rigid adhesive.

An additional configuration alternative available to both prism and kernel configurations is to replace one or more of the PBSs with a reflective polarizer oriented at 45 degrees. (At this time, such reflective polarizers are produced by Moxtek, Inc.).

In both FIG. 67 and FIG. 68, the light output from the prism is linearly polarized but the green polarization direction is orthogonal to that of the red and the blue. In some video projector applications, such as those in which the screen contains a linear polarizer, it is desirable that all the light output by the prism be linearly polarized in one direction. This can be accomplished by placing a Magenta/green ColorSelect in optical series with the output beam.

Figure 69:
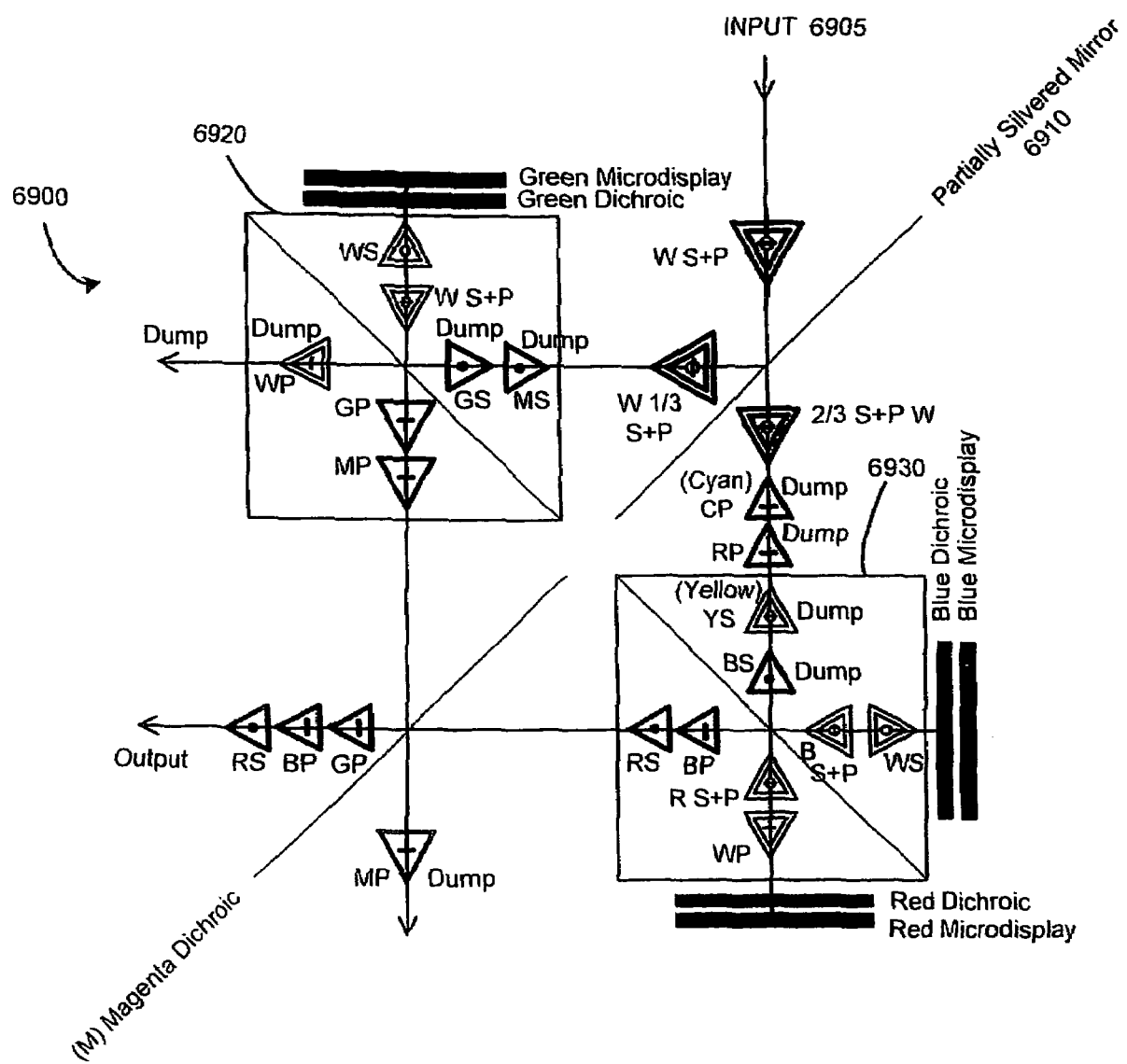
FIG. 69 is yet another kernel configuration according to an embodiment of the present invention.

FIG. 69 illustrates a prism assembly and kernel configuration 6900 according to an embodiment of the present invention. Components of the kernel configuration are named and the path and polarization of the light at each point within the prism assembly is indicated. Note that the division of the input unpolarized light (input 6905) by the partially silvered mirror 6910 can be adjusted to match that output by the light source and the properties of the prism (and/or other components in an entire light management system) and the eye response of the viewer. Only for the purposes of an example has the value been chosen to be ⅓ and ⅔. Note also that to simplify the drawing, the intensity of the light beams has been left off at all other points within the figure.

Note that FIG. 69 indicates only the optics of the configuration. The actual prism assembly may require additional components. More specifically, for example, a quarter waveplate can be inserted after either or both PBS for skew ray compensation. In addition, "spacer glasses" can be inserted as needed to equalize the optical pathlengths from the reflective surfaces of the microdisplays to the output of the prism assembly. Again, either liquid coupling ("liquid joints") between components in the optical paths can be utilized, or a conventional rigid adhesive. One further advantage of utilizing liquid joints is the possibility of reducing component count by eliminating the spacer glasses and adjusting the thickness of the liquid joints.

As with most of the embodiments discussed herein, an additional configuration alternative available to the configuration of the prism assembly is to replace one or both (all) of the PBSs with a reflective polarizer oriented at an angle (e.g., 45 degrees) Such reflective polarizers have been produced by Moxtek, Inc.). With regard to mounting of the microdisplays, direct mounting may be utilized, such as applying the microdisplay to one or more faces of PBSs of a prism assembly with an adhesive, or by utilizing other attachment techniques (e.g., see Berman et al., U.S. patent application Ser. No. 10/251,104, entitled "Method and Apparatus for Mounting Liquid Crystal on Silicon (LCOS) and Other Sensitive Devices," filed Sep. 20, 2002, and Berman, U.S. patent application Ser. No. 11/2003,014, entitled "Method and Apparatus for Attaching Microdisplays and Other Sensitive Devices," filed Aug. 11, 2005, the contents of each of which are incorporated herein in their entirety.

Figure 70:
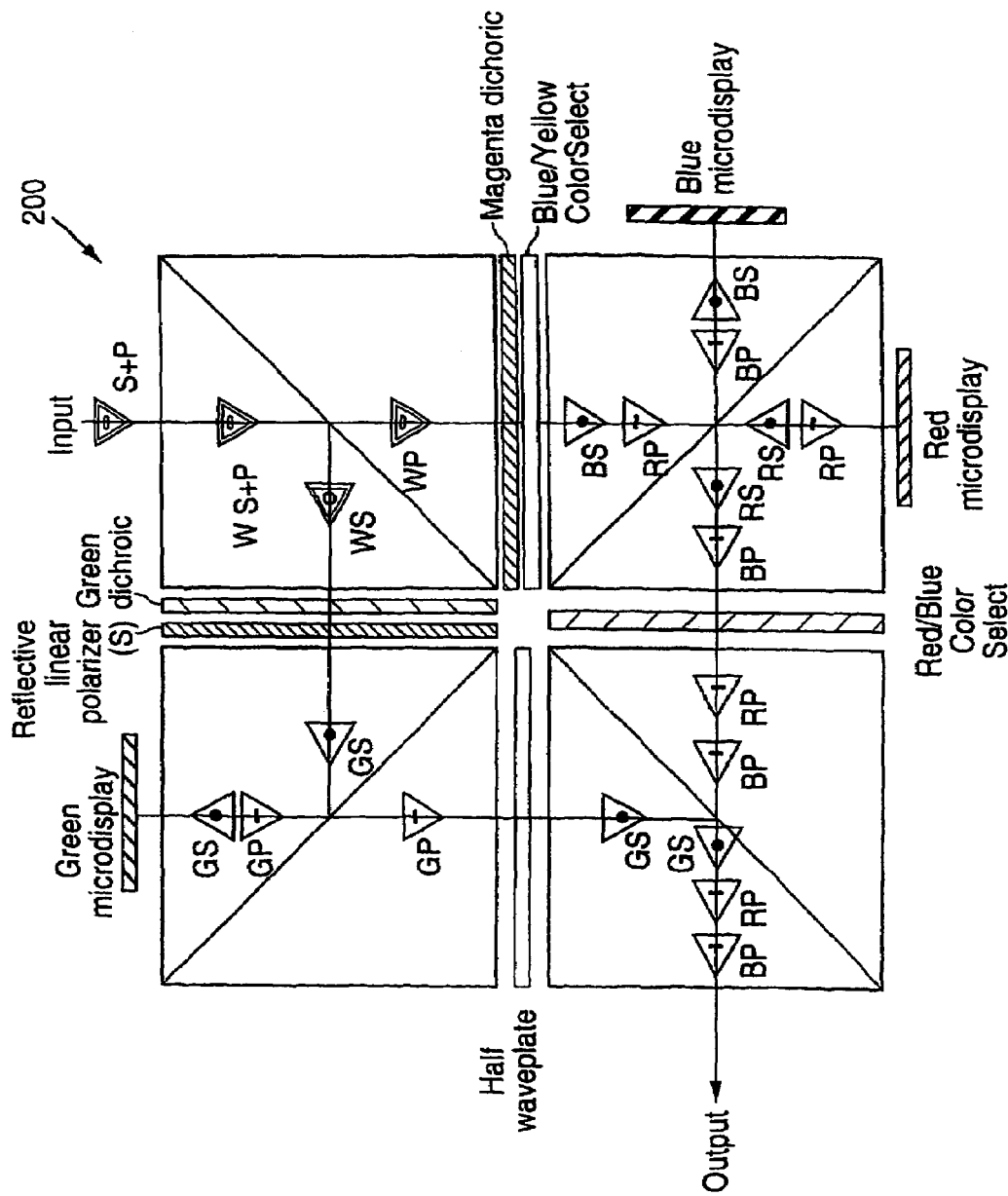
FIG. 70 is a drawing of an example kernel illustrating lightpaths and components of one possible configuration of a prism assembly.

FIG. 70 illustrates a kernel configuration 70200 that requires the input of unpolarized light. It is desirable to have a cost effective modification to the LMS kernel that allows it to operate in a light engine that produces polarized light and to do so without additional light loss.

Figure 71:
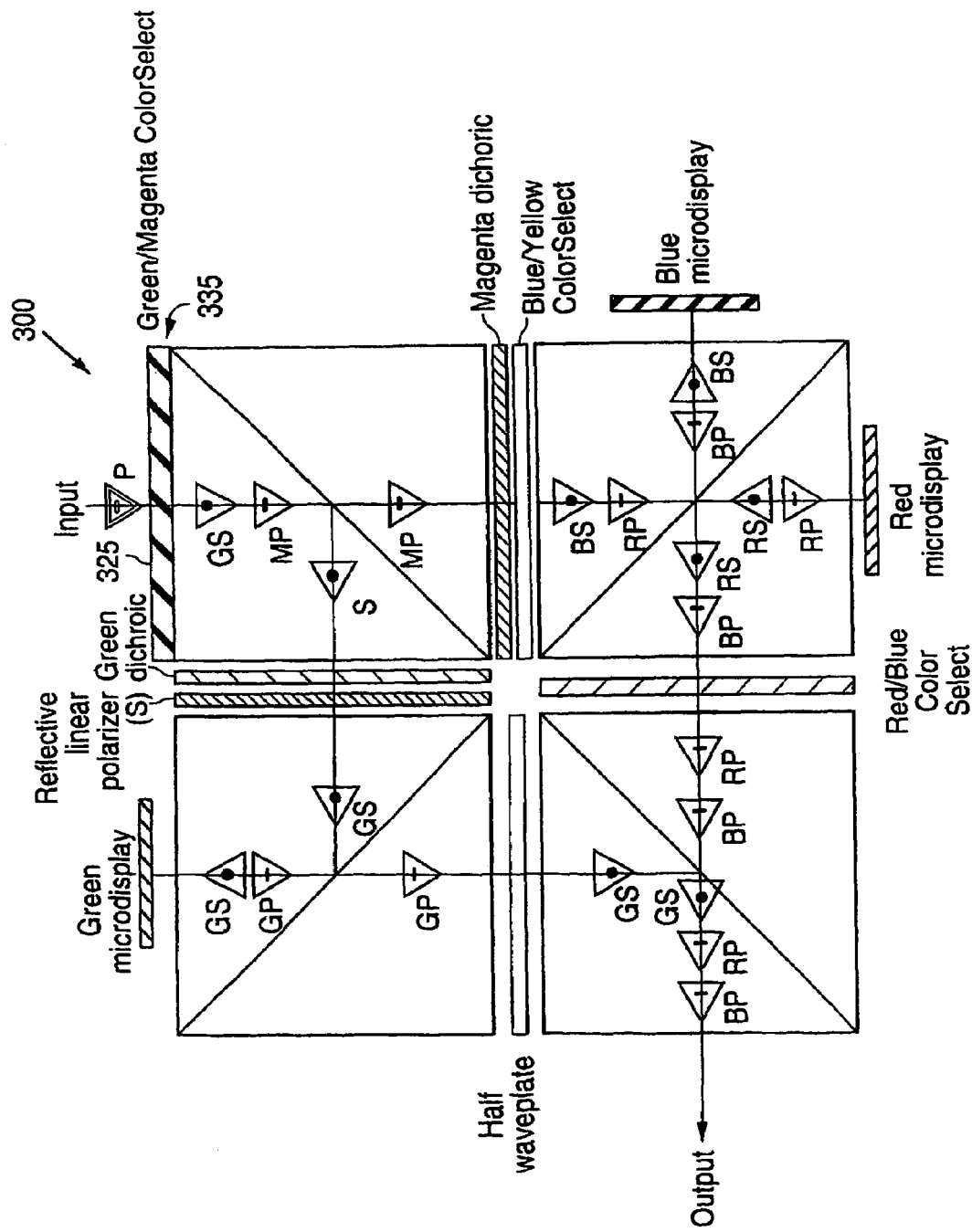
FIG. 71 is drawing illustrating a construction technique of an LMS prism assembly according to an embodiment of the present invention.

In one embodiment, a kernel is provided that operates in a light engine that produces polarized light and does so without unacceptable light loss. For example, an implementation is disclosed in FIG. 71. Note that the modification to the original kernel configuration presented in FIG. 71 is the addition of a green/magenta ColorSelect wavelength specific retarder 71325 at an input face 71335 of the prism assembly of kernel 71300. The paths, colors and polarizations of the light traveling through the modified kernel are also indicated in FIG. 71.

Figure 72:
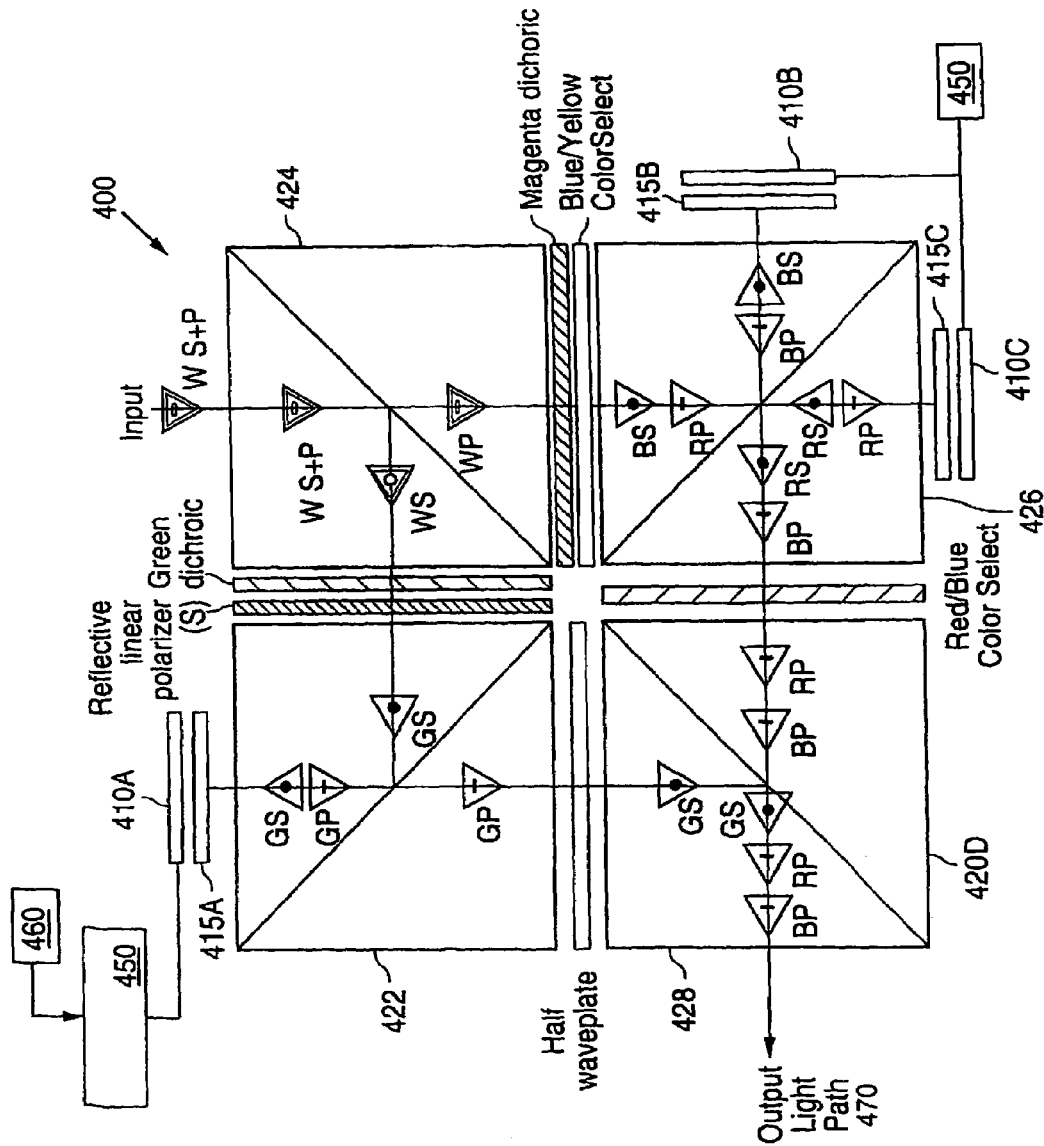
FIG. 72 is a drawing of a kernel according to another embodiment of the present invention.

In one embodiment, the application of waveplates is optimized between the microdisplays and the prism assembly being accomplished in the context of a high volume manufacturing environment. FIG. 72 illustrates a set of microdisplays 72410A (Green), 72410B (Blue), and 72410C (Red) utilized in an LCoS based kernel 72400. The kernel 72400 includes optical components (beam splitters) 72422, 72424, 72426, and 72428. Between the optical components and each microdisplay is a waveplate (e.g., waveplates 72415A, 72415B, and 72415C). The waveplates have retardation values matched to approximately the center of the spectrum in each channel. For example, waveplate 72415A is centered in the green channel, 72415B centered in the blue channel, and 72415C centered in the red channel.

The waveplates are cut into rectangular pieces the size of the microdisplay in which the axes are oriented at an angle to the edges. The nominal value of the angle will be unique to each type of microdisplay, drive condition and color channel. Blue has the smallest angle and red the largest. In all cases the angles are usually small, a few degrees. The nominal angles are determined experimentally in a procedure that is separate and apart from the manufactured process.

The "red" waveplate 72415C is coupled to the "red" microdisplay 72410C, the "blue" waveplate 72415B is coupled to the "blue" microdisplay 72410B, and the "green" waveplate 72415A is coupled to the "green" microdisplay 72410A.

Figure 73:
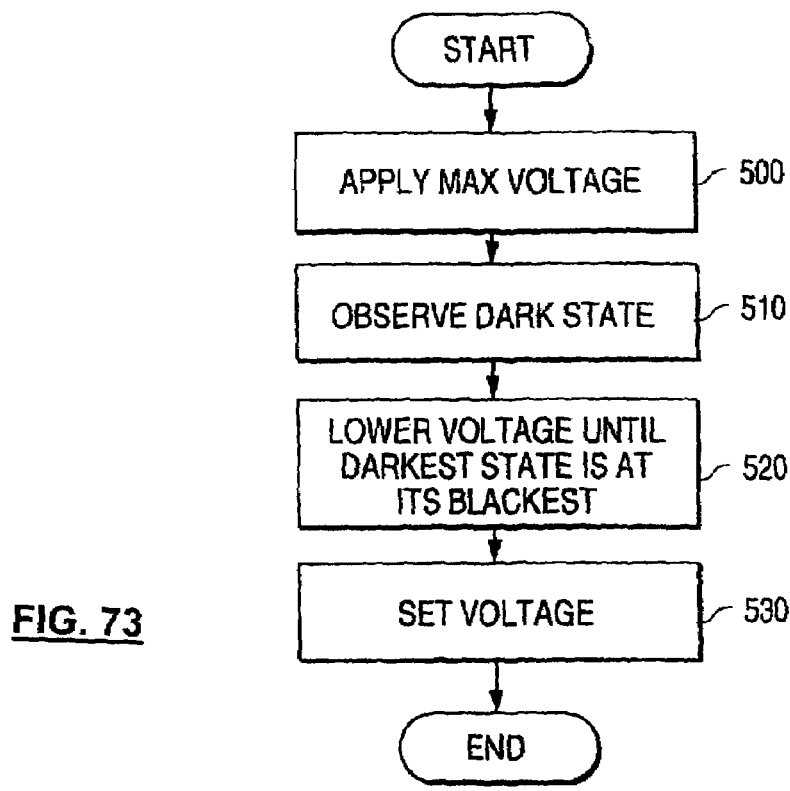
FIG. 73 is a flow chart of a black state adjustment process according to an embodiment of the present invention.

As part of a kernel quality control procedure a test image is projected. During this procedure, an amplitude of a Vdd voltage applied to each microdisplay is adjusted to produce the blackest possible dark state. In this case, the Vdd voltage is a voltage that determines the highest voltage that is applied to the liquid crystal layer and which thereby effects the max dark (or max black) state of the microdisplay. FIG. 73 is a flow chart of an embodiment of the dark state adjustment process.

At step 73500, the maximum available voltage is applied to all three microdisplays. For example, a control unit 72450, applies a maximum voltage to each microdisplay. The blackness of the dark state is then observed (step 73510). The voltage amplitude is lowered on each channel individually until the blackest possible dark state is obtained (step 73520). Feedback 72460 is provided to the control unit to identify a max black state or local max black state. A local max black state is the darkest black state that can be achieved by adjusting just one of the microdisplays. Thus, the control unit adjusts the voltage amplitude applied to each microdisplay individually to a local black max and when the final voltage amplitude is adjusted a max black state is achieved. Feedback 72460 may be provided by a sensitive light intensity meter placed in the output light path 72470, or may be user provided input (e.g., from menu selections) based on observation of a screen that displays the output light path. The relationship between the light level reflected from the microdisplay and the applied voltage (voltage amplitude) is called an "S" curve. The voltage adjustment required to tune the residual retardation of the microdisplay affects the end point of the S curve. The shape of the S curve and the voltage required to produce any shade of gray is unchanged.

The step of lowering, or otherwise adjusting, the voltage amplitude applied to each microdisplay results in varying the residual retardation of the microdisplay to match the fixed compensating retardation of the waveplate. This process is suitable for high volume manufacturing environments.

Figure 74:
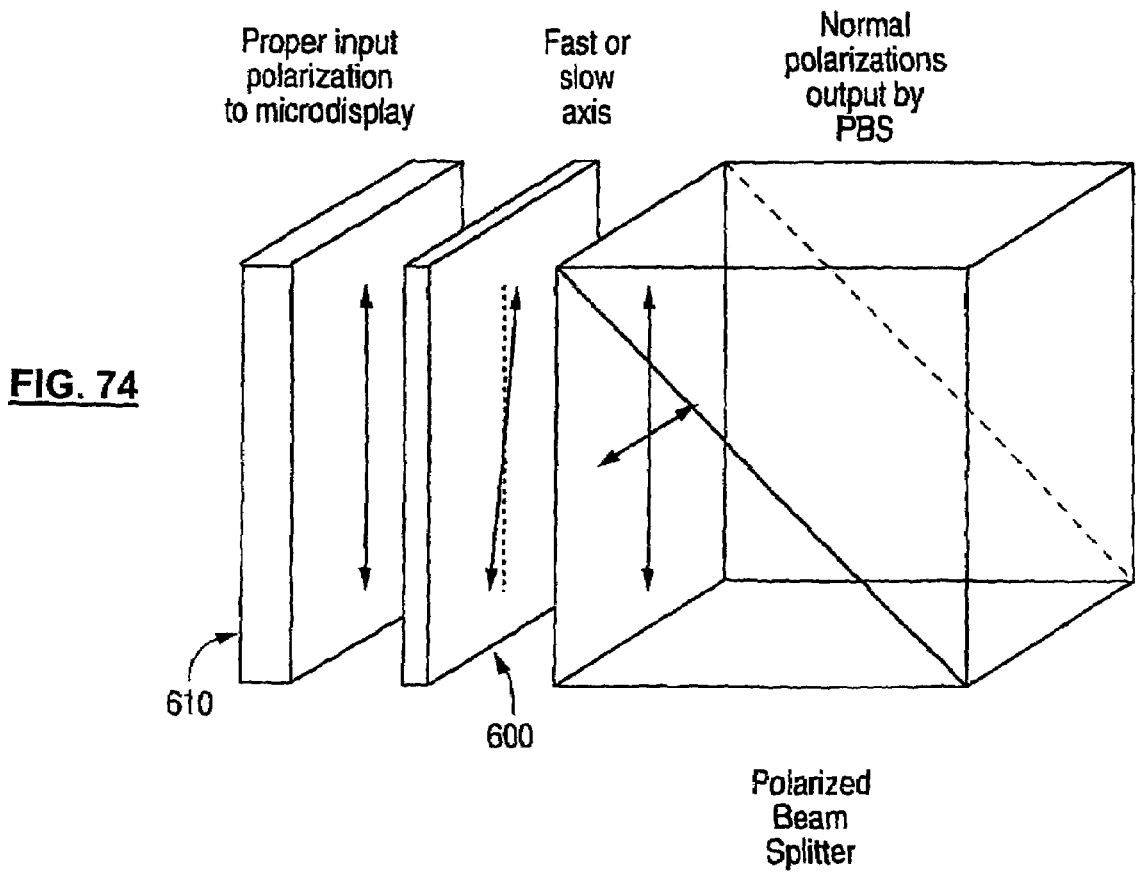
FIG. 74 is a drawing illustrating residual compensation in a conventional LCoS based prism assembly.

A conventional means of producing an image with the blackest possible dark state is to include a quarter waveplate between the mixed mode LCoS microdisplay and the prism assembly. The axes of the waveplate are typically adjusted to a small angle with respect to the direction of normally incident linearly polarized light that is input to the microdisplay. An example of a configuration utilizing a quarter waveplate 74600 for the indicated purpose is illustrated in FIG. 74. The function of the waveplate 74600 is to compensate the residual retardation that remains in the high voltage dark state of the microdisplay 74610.

Figure 75:
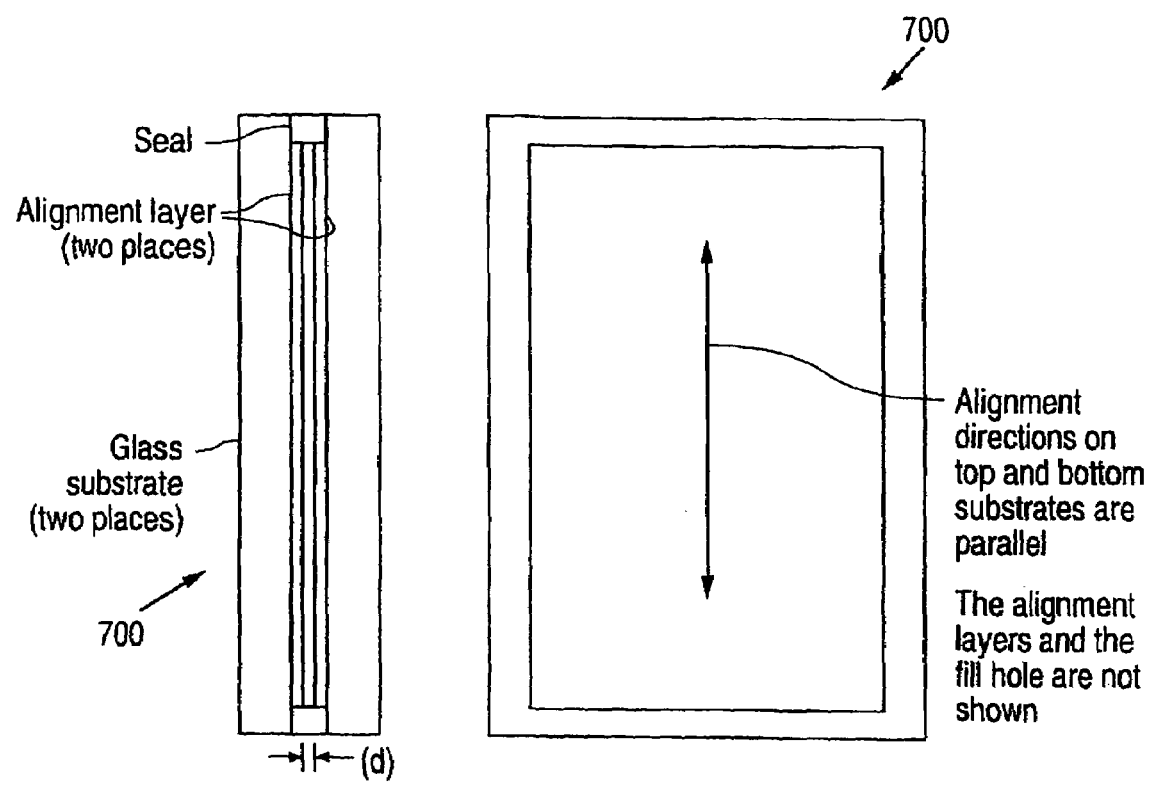
FIG. 75 is a drawing of a passive nematic cell according to an embodiment of the present invention.

In one embodiment, compensation of residual retardation is performed by utilizing a cost effective quarter wave compensator that has high optical quality and that is also easy to manipulate during the process of producing LCoS prism assemblies in high volume. A quarter waveplate 75700 according to an embodiment of the present invention is illustrated in FIG. 75. The waveplate 75700 is a passive nematic liquid crystal device. That is, the cell does not include the internal transparent electrically conductive electrodes or external contact ledges found in conventional liquid crystal displays. The nematic is homogeneously aligned. The rubbing directions on the top and bottom surfaces are parallel to each other. The thickness of the liquid crystal layer (d) (cell gap) is matched to the birefringence ($\Delta n$) of the nematic such that the retardation $d\Delta n = \frac{1}{4}\lambda$.

Note that the retardation is uniform across the entire visible portion of the cell area. In other words, the cell gap d is uniform. Note, however, that spacing elements, such as those used in liquid crystal displays, are not desirable within the viewing area of the passive cell.

In one embodiment, an LCoS prism assembly/kernel is designed for the input of linearly polarized light. The linear polarized input light is fed into the prism assembly/kernel, separated into component light beams which are each instilled with a component part of an image, and the light beams are re-combined to produce an output image.

Figure 76:
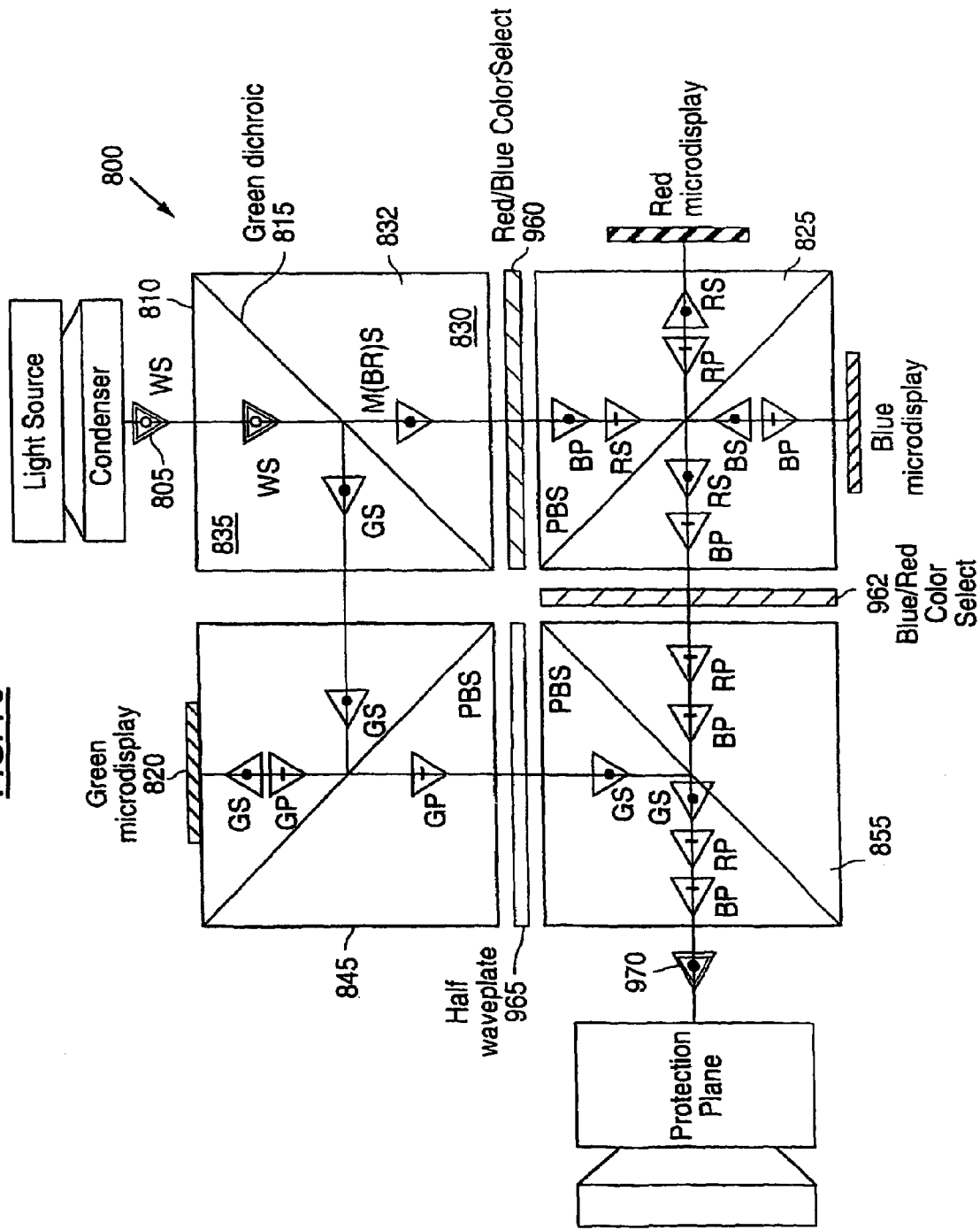
FIG. 76 is a drawing of an example of an LCoS kernel designed for the input of linearly polarized light according to an embodiment of the present invention.

FIG. 76 is a drawing of an example of an LCoS kernel 76800 designed for the input of linearly polarized light according to an embodiment of the present invention. S polarized white light 76805 enters the kernel at face 76810. A green dichroic 76815 reflects a green component of the input S polarized white light toward a green microdisplay

76820, and a magenta (M) (Red and Blue) component of the input light passes through the green dichroic into PBS 76825.

The green dichroic 76815 may be arranged in the kernel 76800 in a number of different embodiments, its main function being to properly separate the green component of the incoming light. In one embodiment, the dichroic is deposited between two triangular pieces as indicated in the drawing (e.g., between triangular piece 76830 and 76835, which, along with the dichroic comprise a beamsplitter).

PBSs 76825, 76845, and 76855 are polarization sensitive beamsplitters that either pass or reflect polarized light as shown in the figure, or in other configurations that pass color light beams to correspondingly colored microdisplays where they are reflected and then directed to output 76970. ColorSelect wavelength specific retarders 76960/76962 and half waveplate 76965 convert polarizations of various light beams as indicated in the figure.

In another embodiment, the green dichroic can be deposited on one triangle with the other face left "open". In yet another embodiment, the green dichroic can be mounted on a flat plate or pellicle.

In yet another embodiment, the dichroic may be placed in a liquid filled prism as described in Berman et al., Published Patent Application No. 20020001135, entitled "High Efficiency Prism Assembly for Image Projection," filed Jan. 3, 2002, the contents of which are incorporated herein by reference in their entirety.

The techniques described herein may be utilized in any number of kernel configurations. In some configurations, a different dichroic is utilized.

Based on the present disclosure, it will be readily apparent to the ordinarily skilled artisan that by rearranging the optical components of the LCoS kernel 76800, that the kernel may be modified to operate with input light that has a different polarization. For example, the kernel may be modified to utilize P polarized light instead of S polarized light.

Furthermore, whether P polarized, or S polarized input light is utilized as an input, many different arrangements of optical components may be utilized along with the techniques of the invention described herein to produce functionally equivalent kernels. For example, FIG. 18 is a diagram illustrating a naming convention for faces of a kernel, and Table #1 is a tabular listing of kernel configurations applicable to the present invention described using the naming conventions established in FIG. 18 as indicated in the figure.

Figure 26:
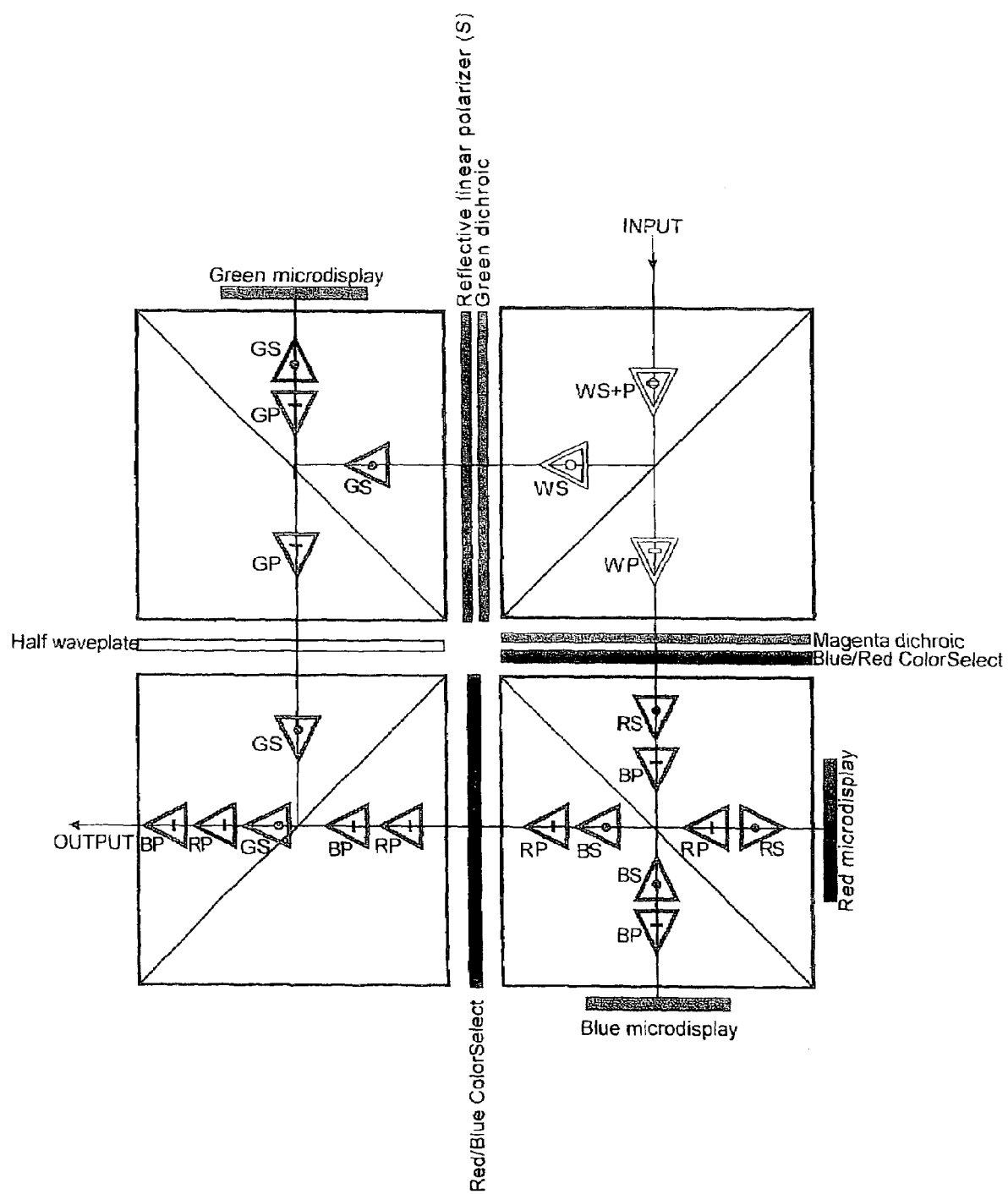
Figure 27:
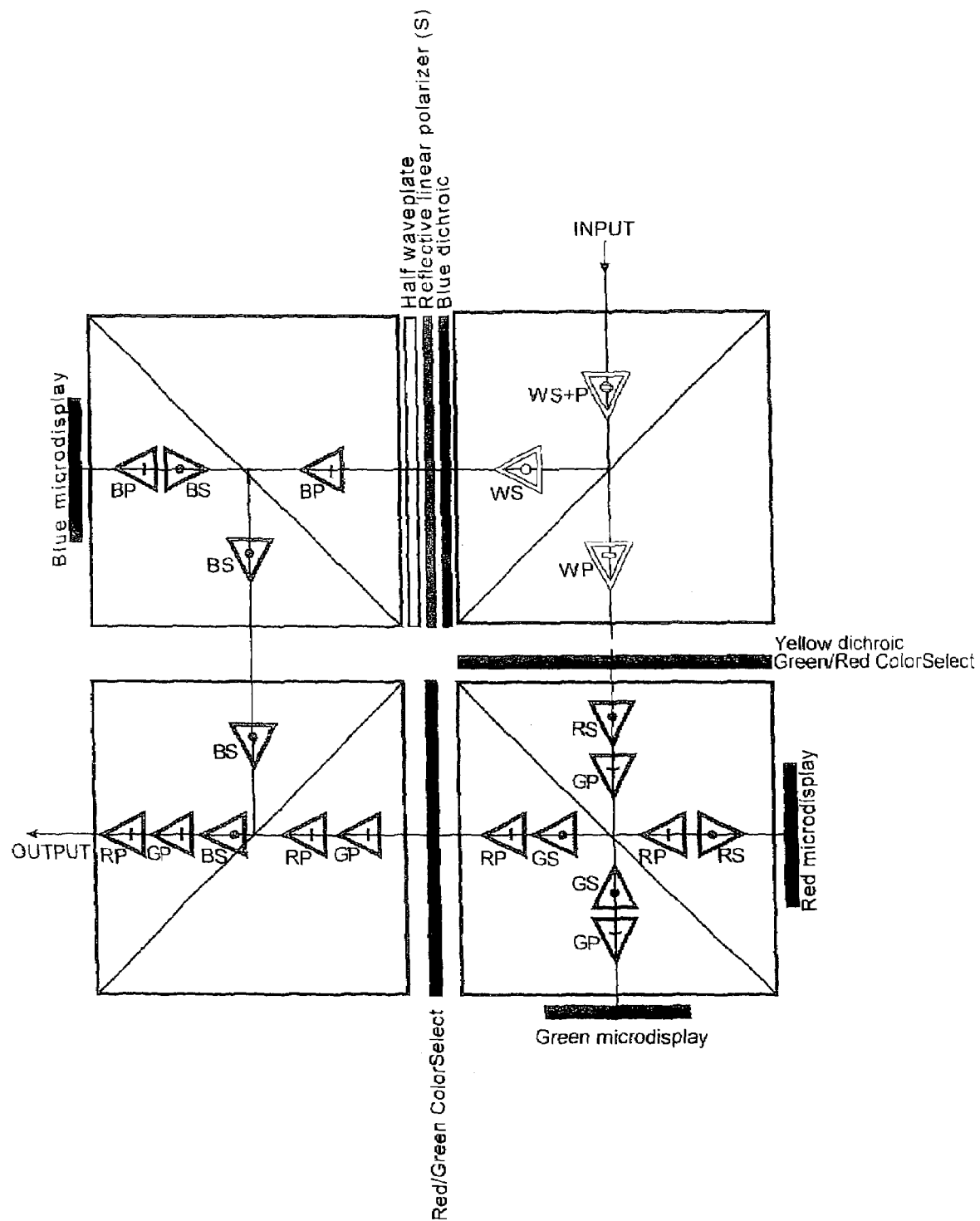
Figure 28:
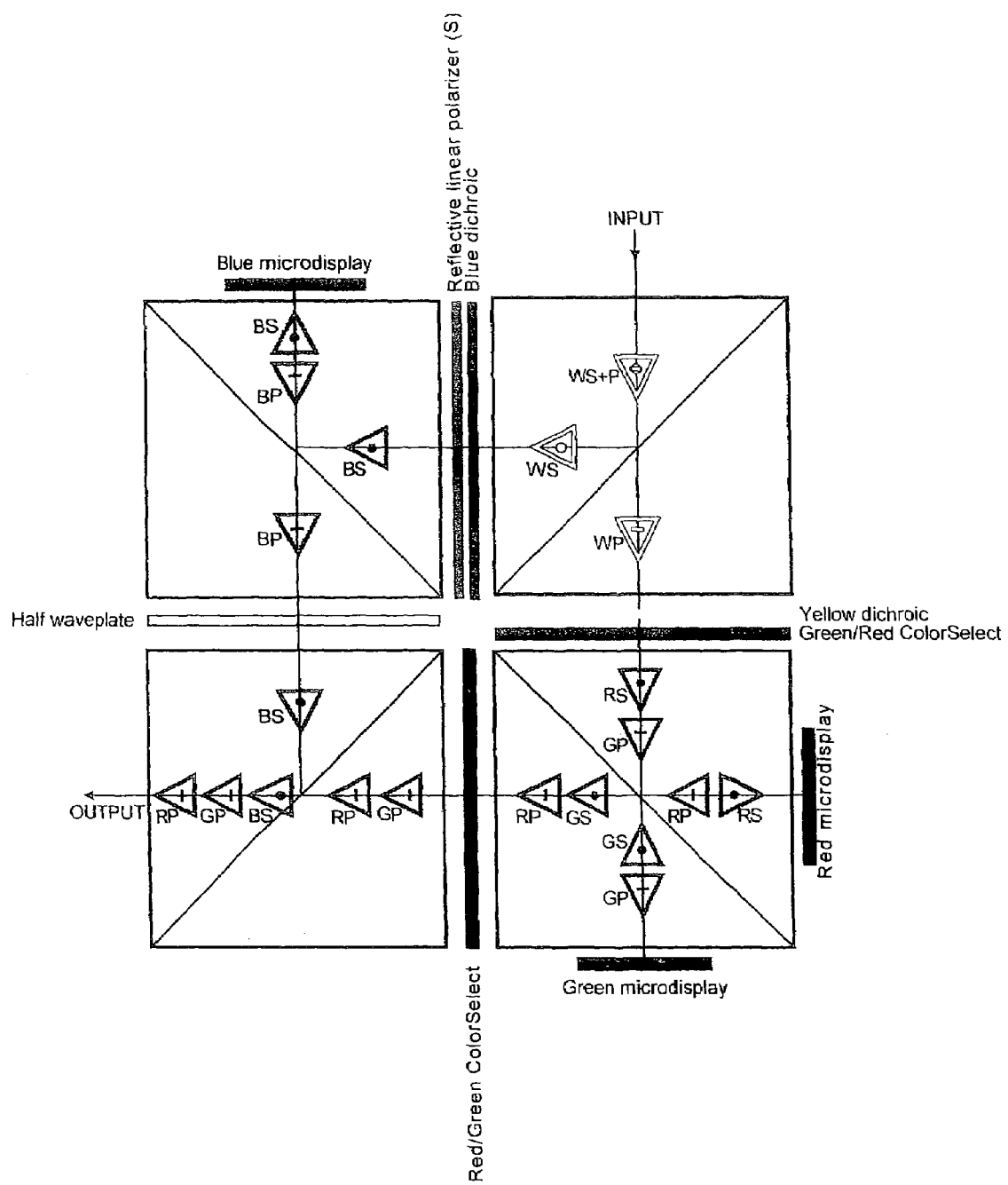
Figure 29:
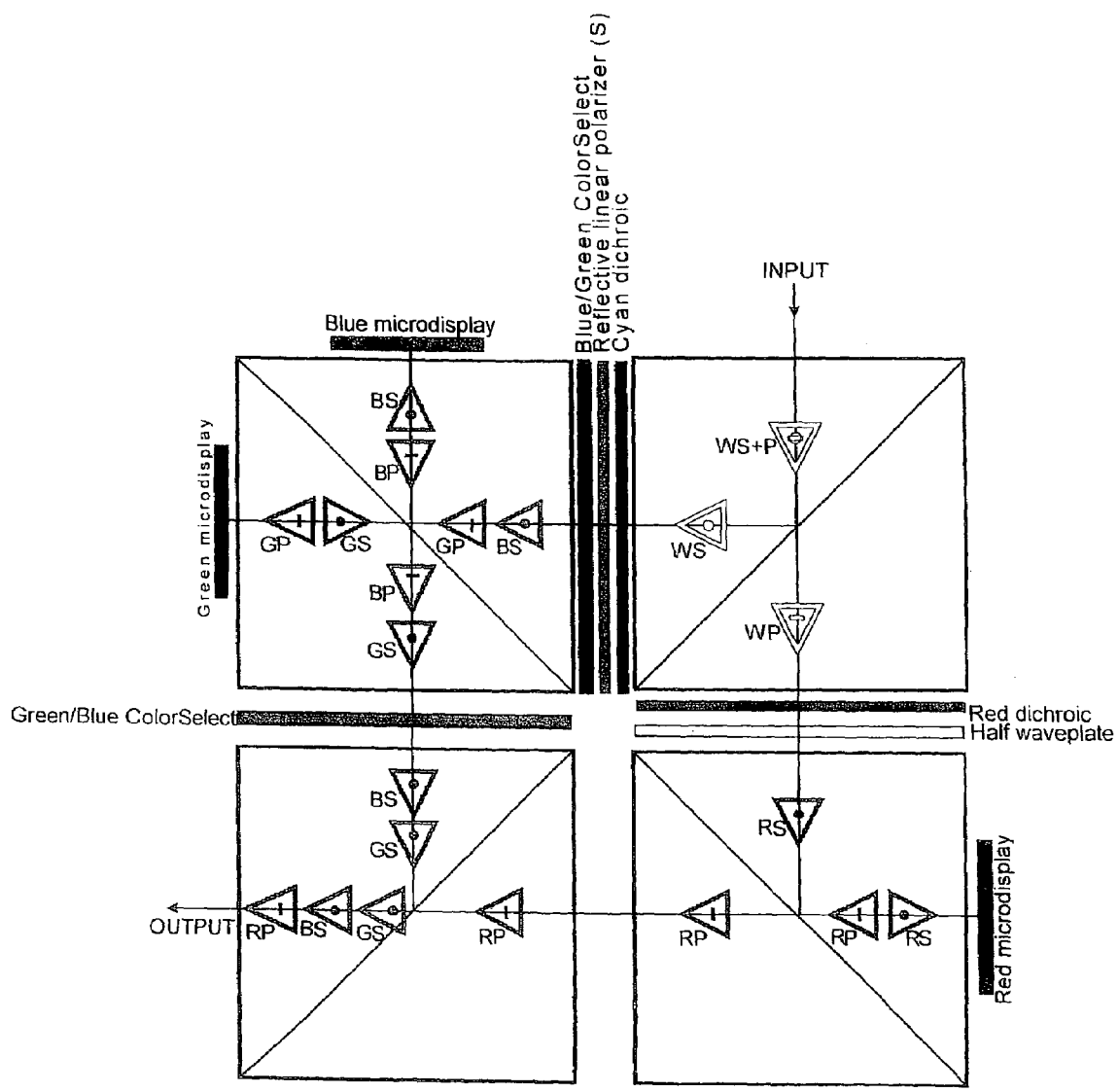
Figure 30:
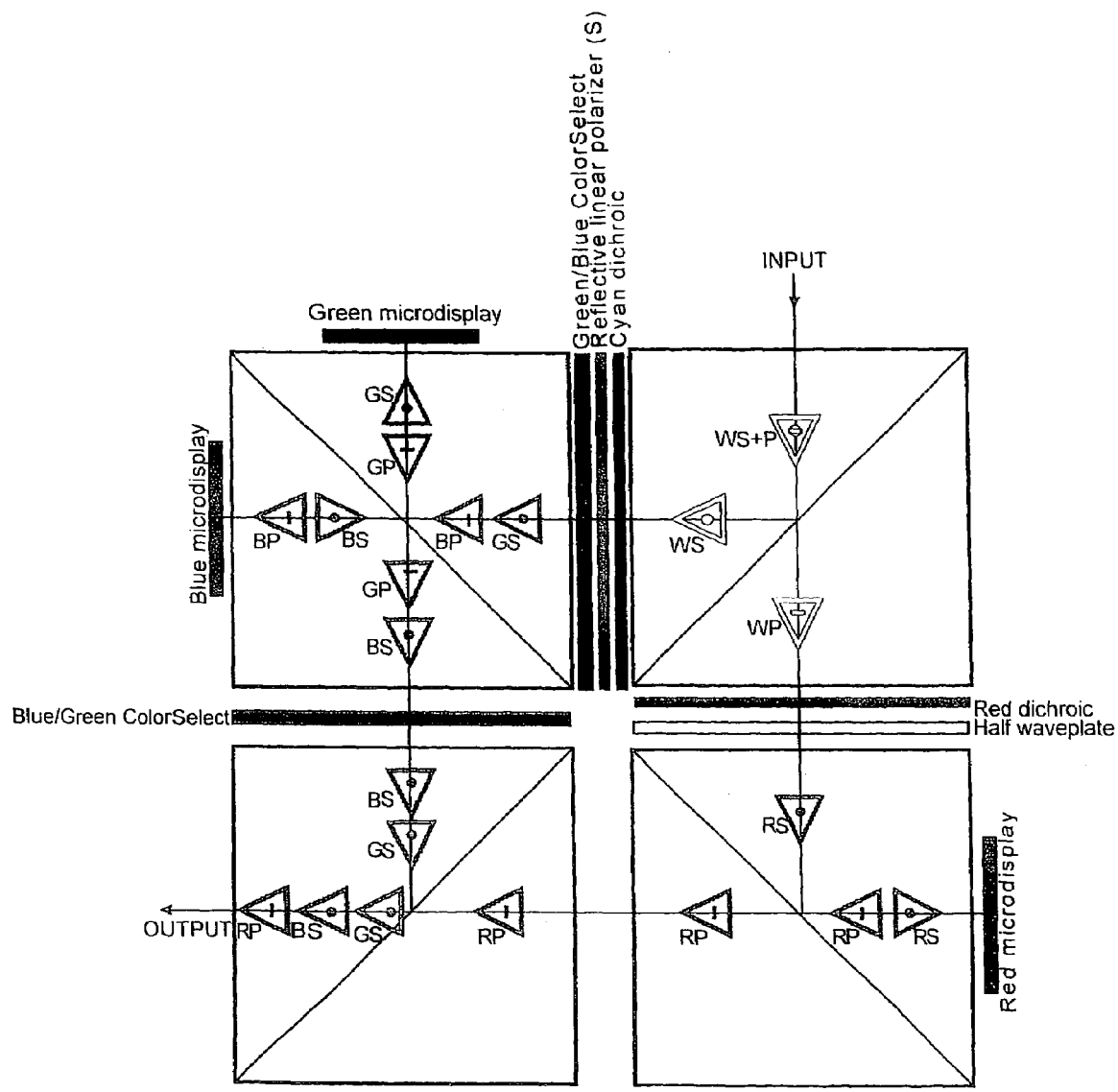
Figure 31:
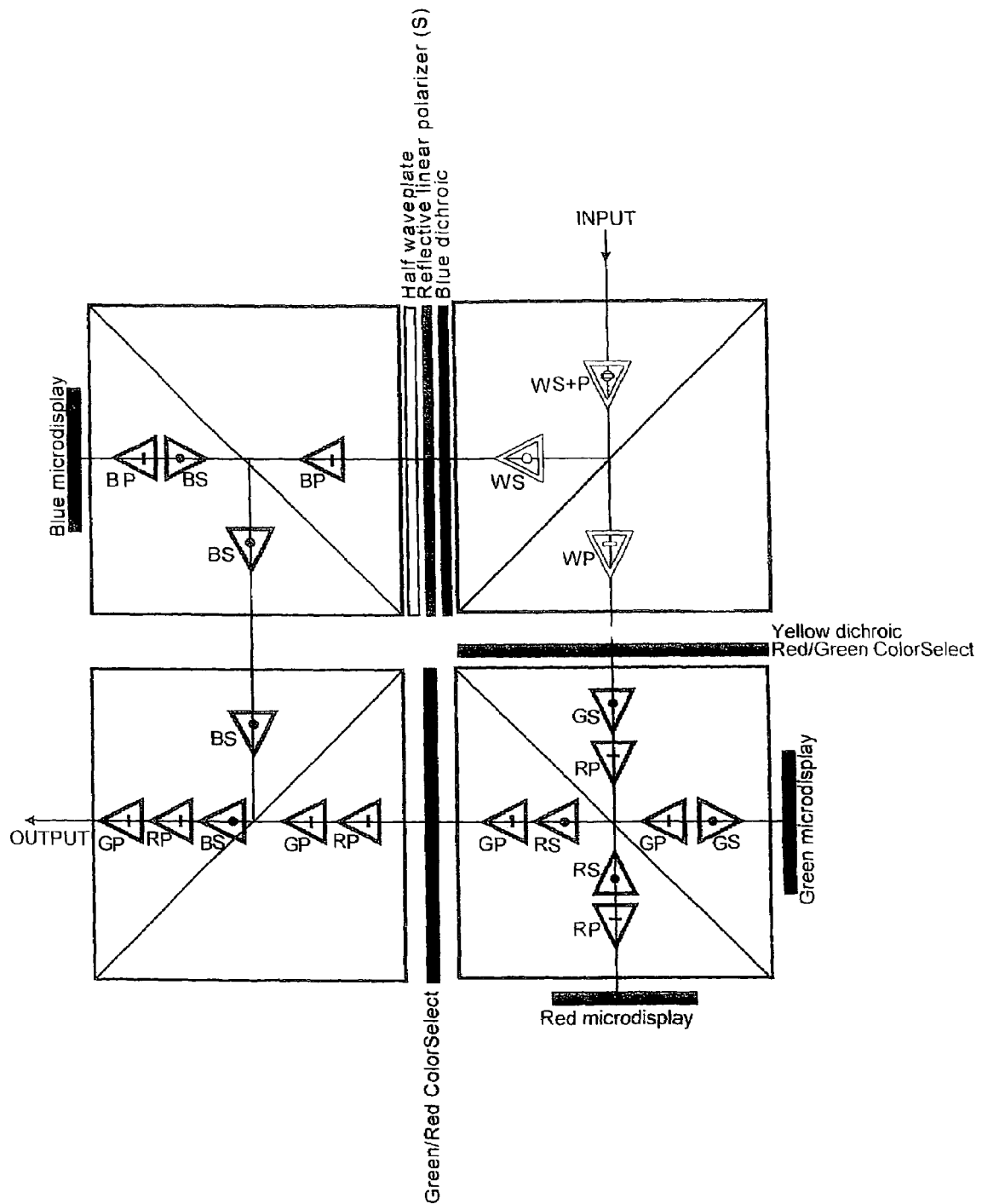
Figure 32:
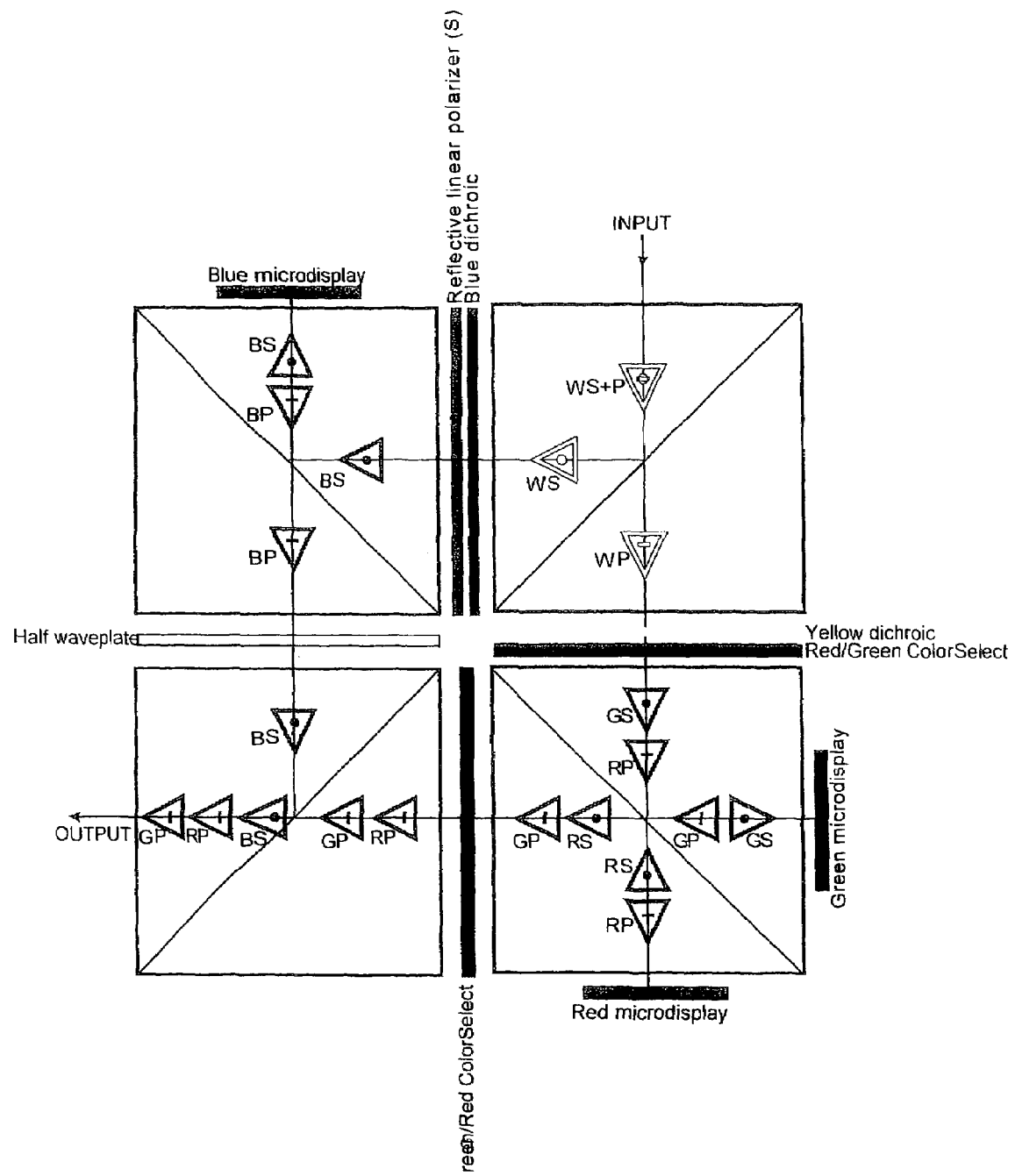
Figure 33:
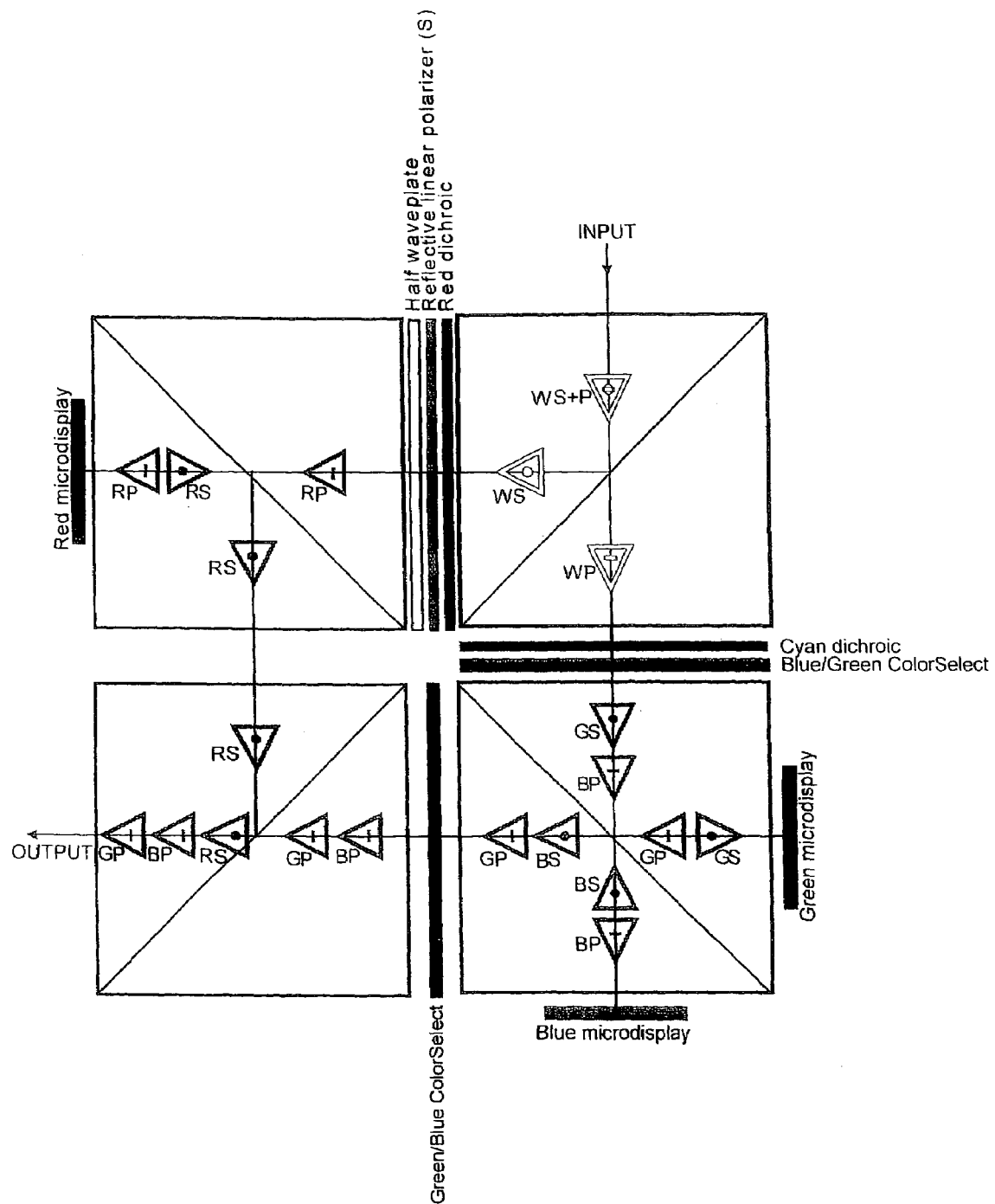
Figure 34:
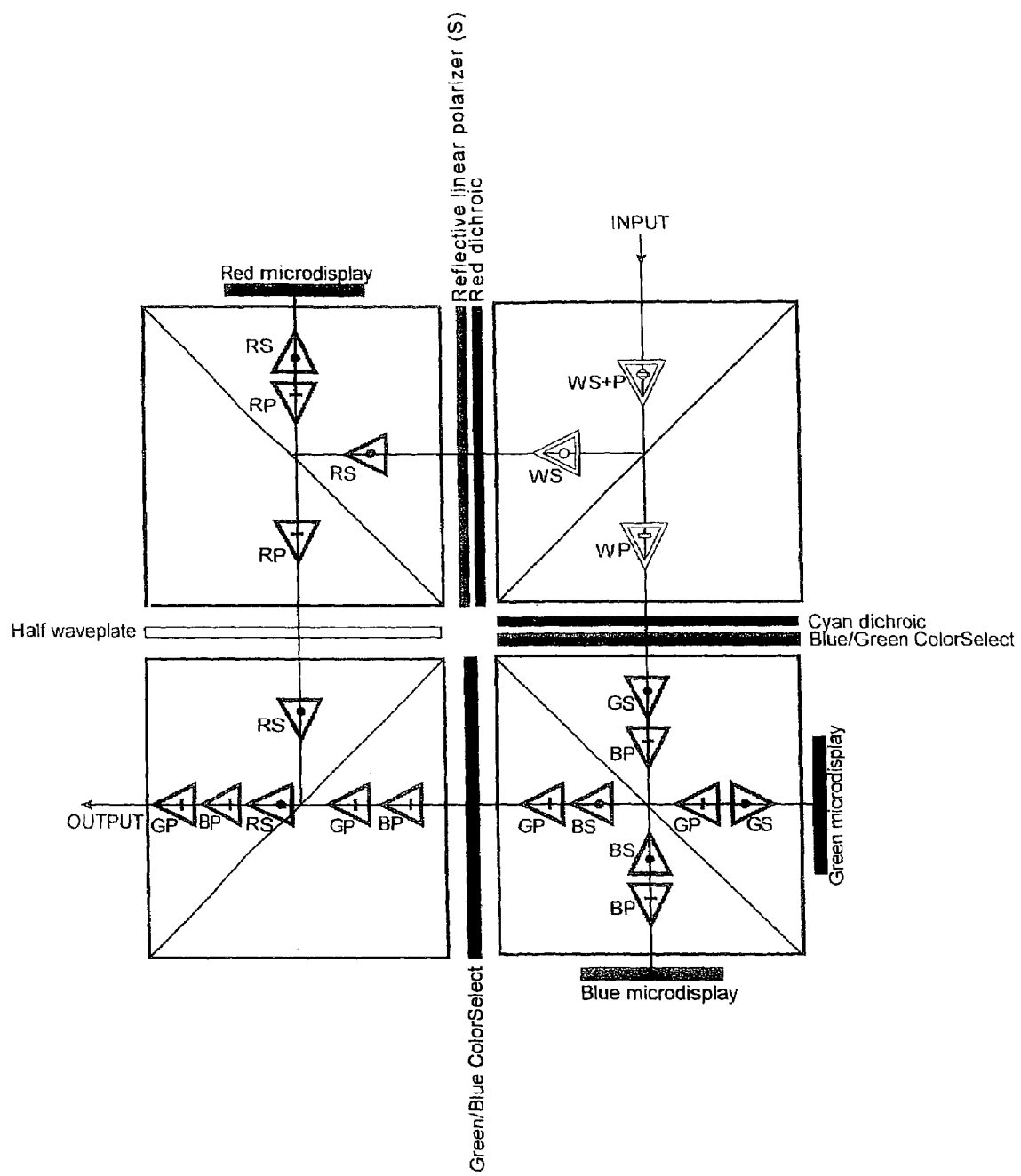
Figure 35:
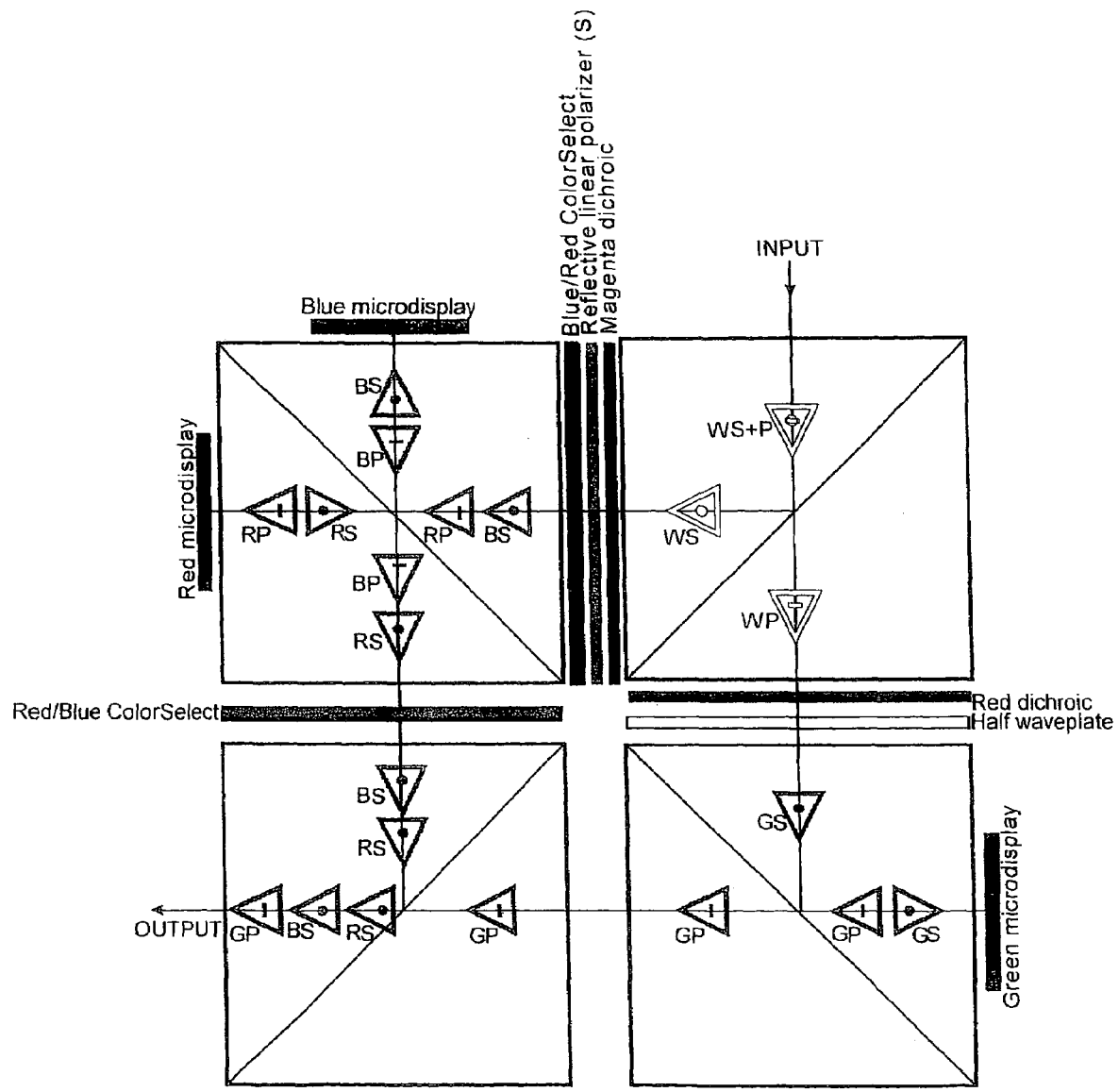
Figure 36:
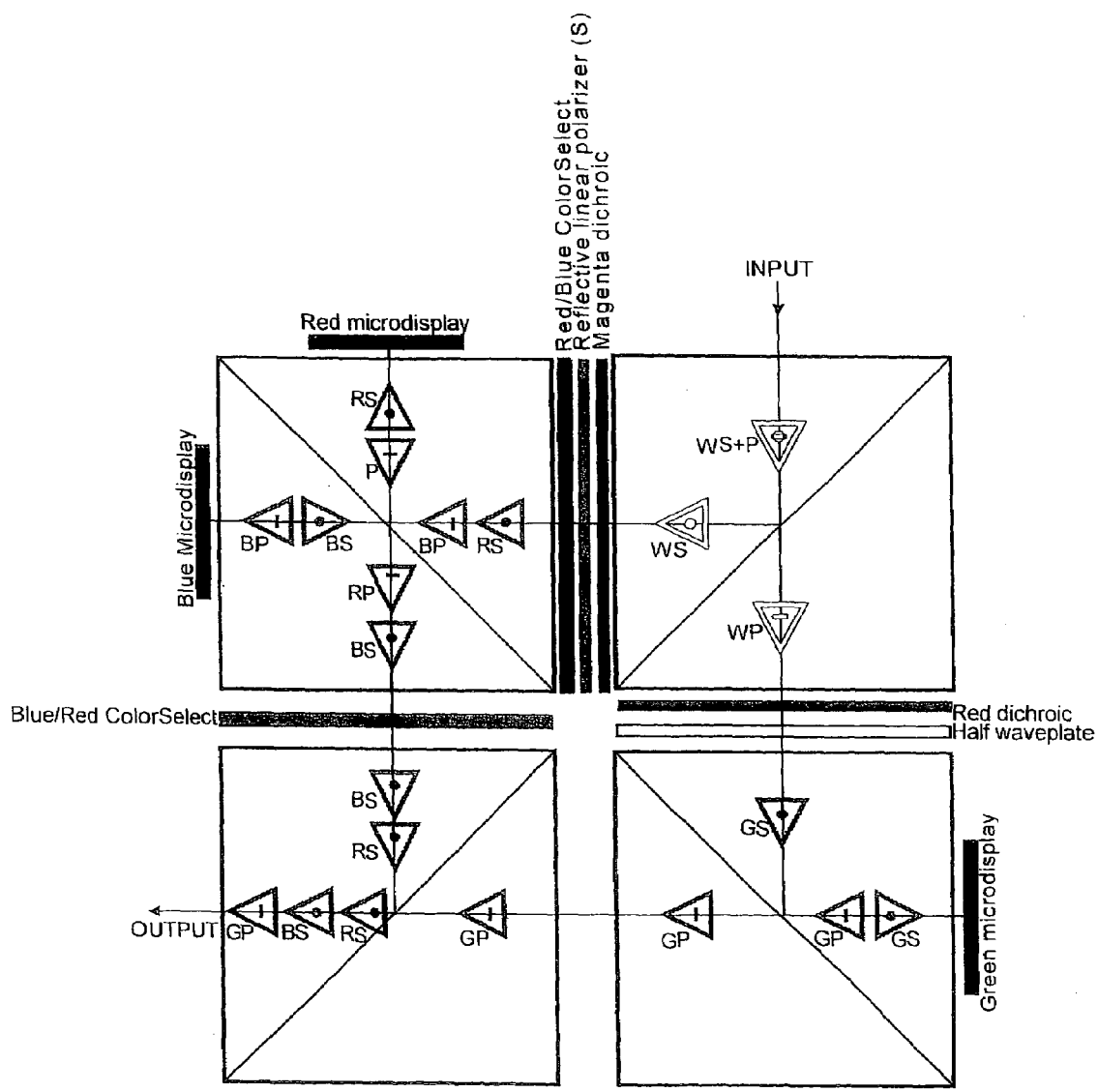
Figure 37:
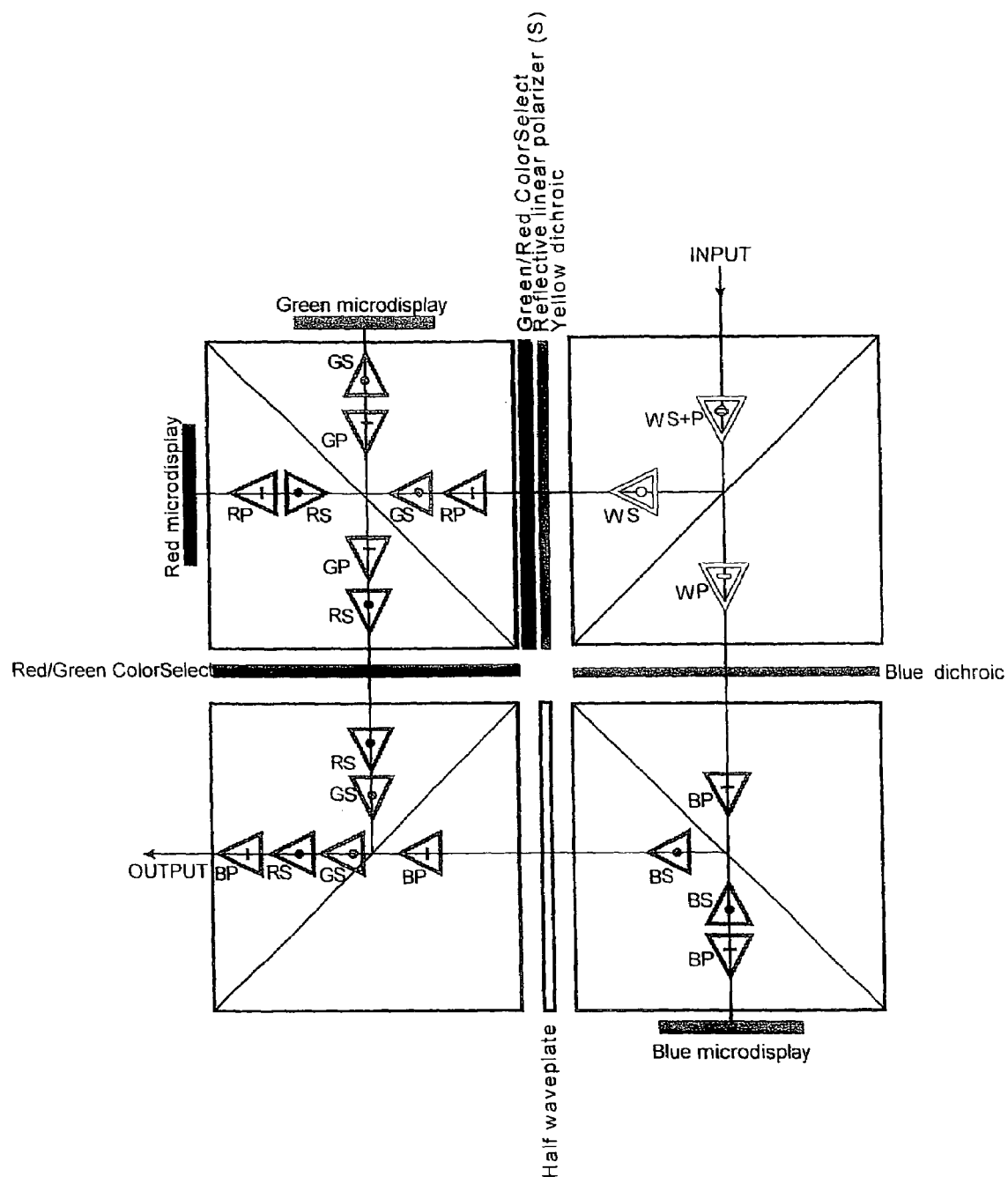
Figure 38:
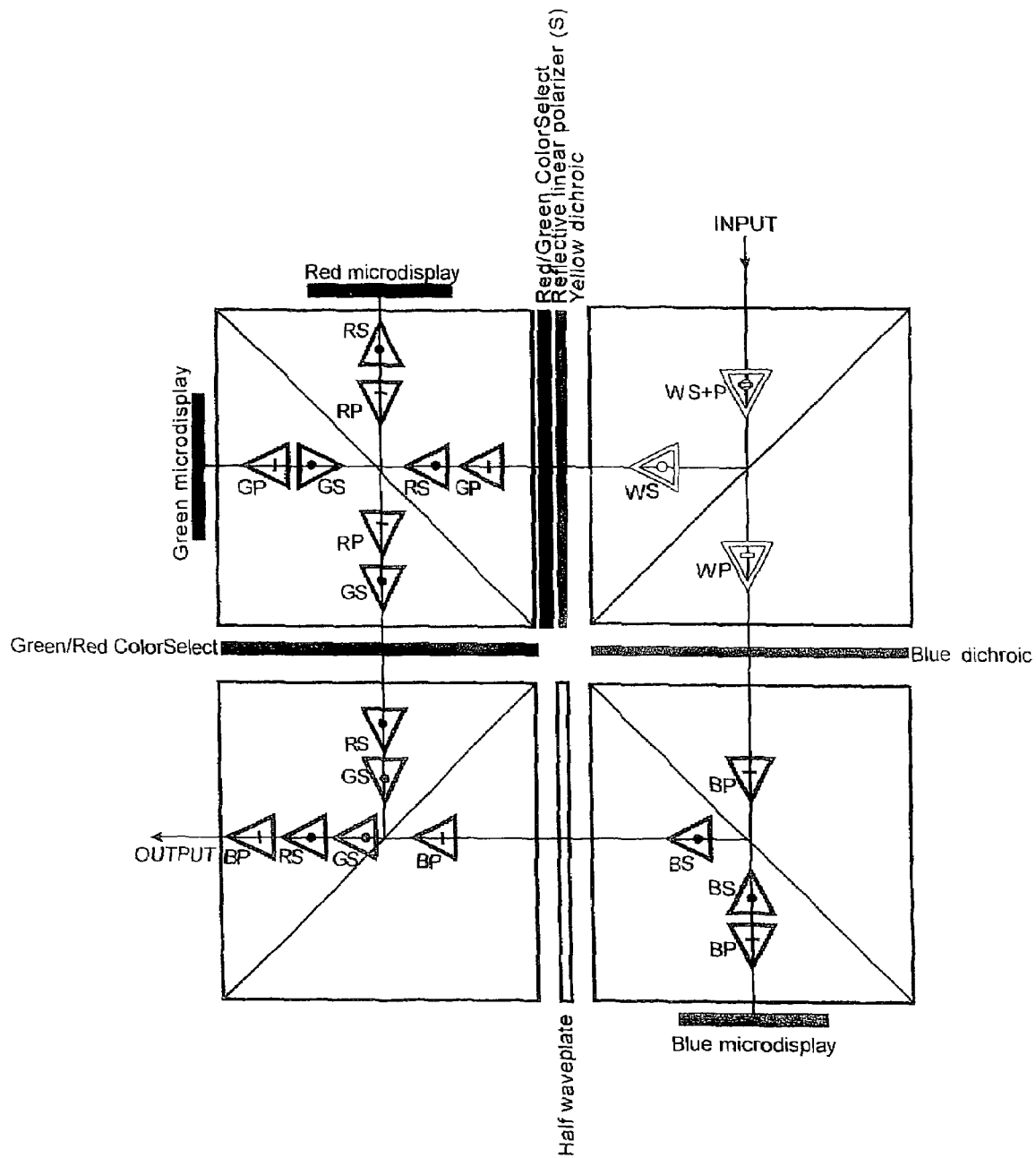
Figure 39:
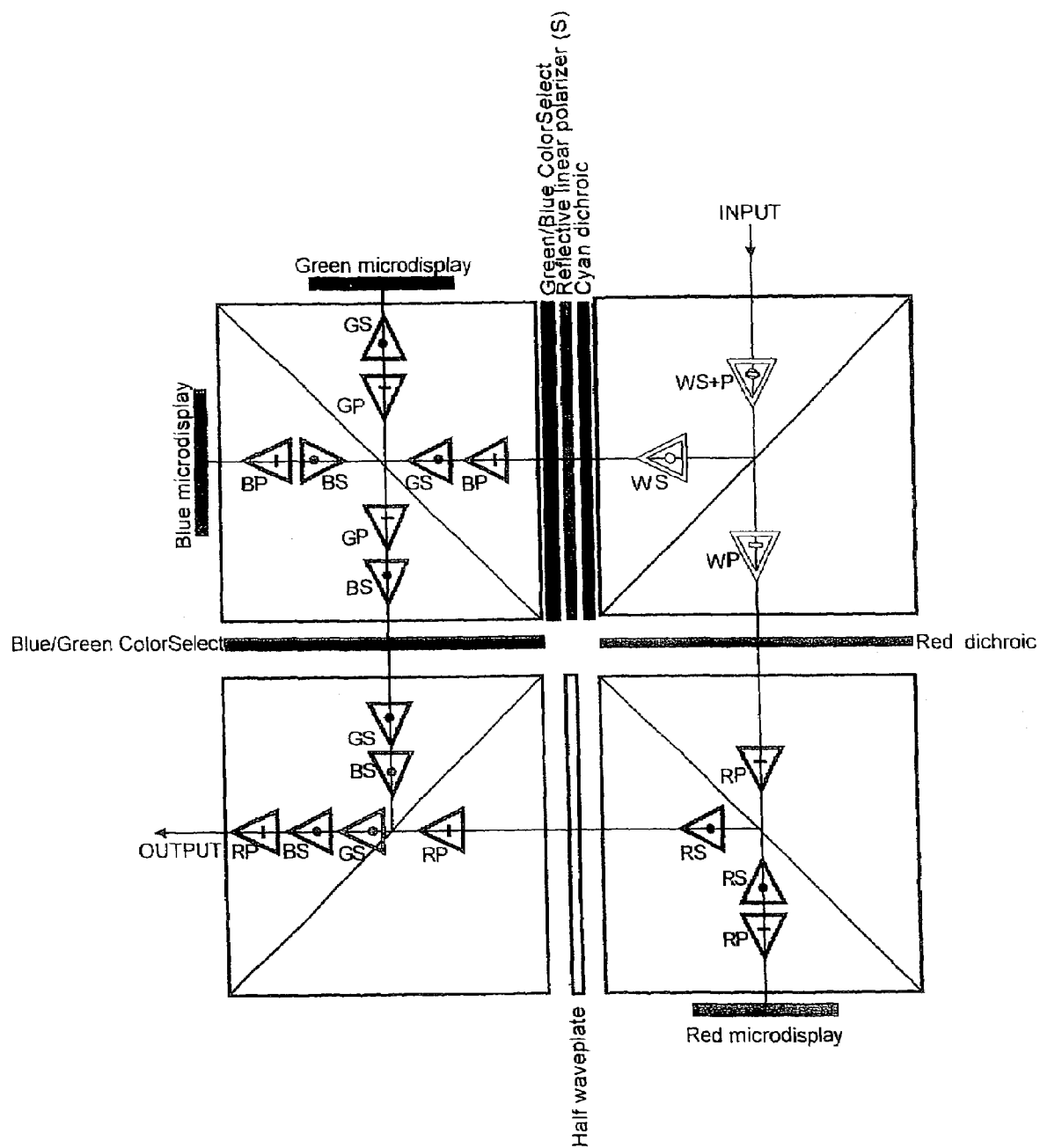
Figure 40:
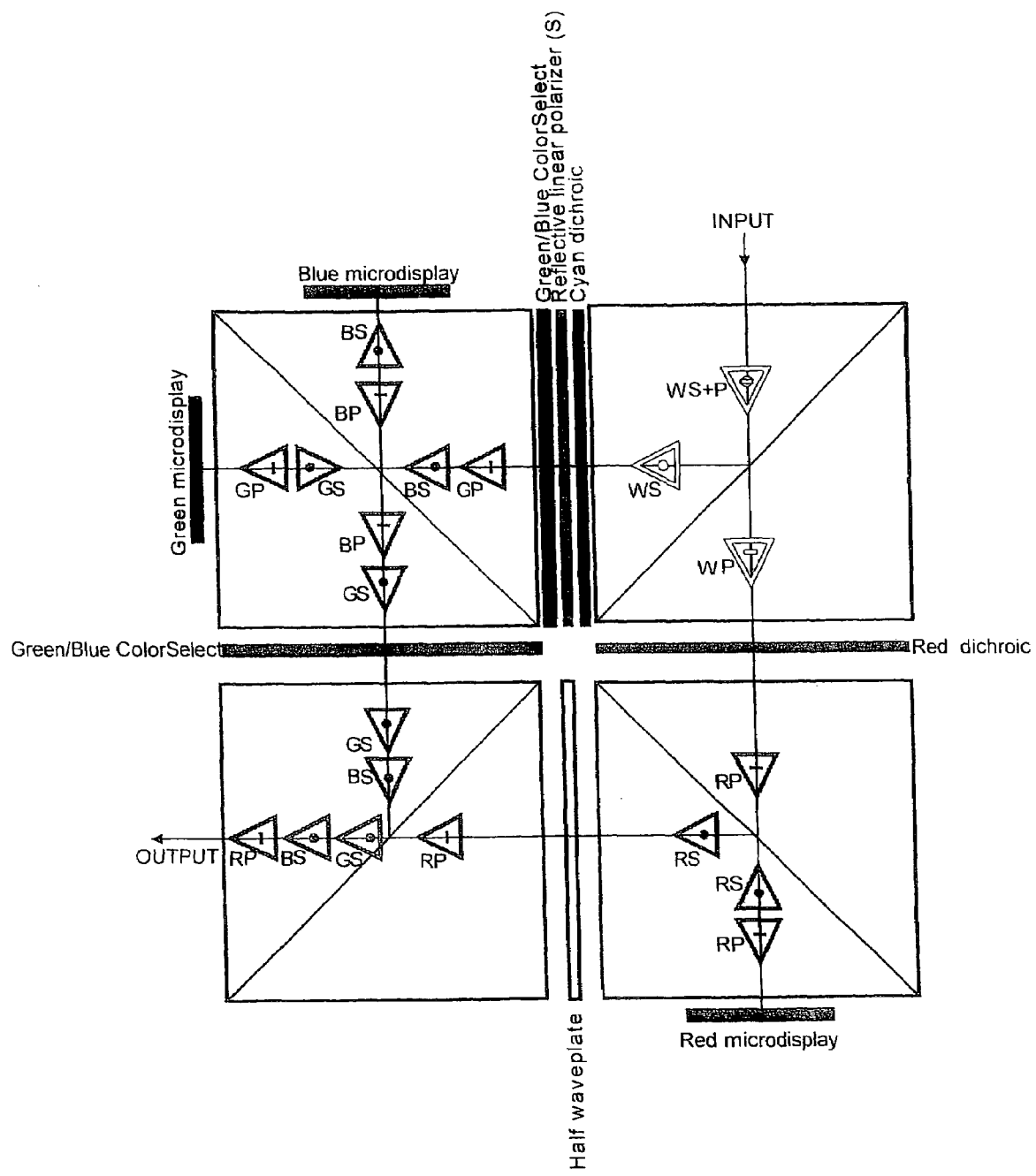
Figure 41:
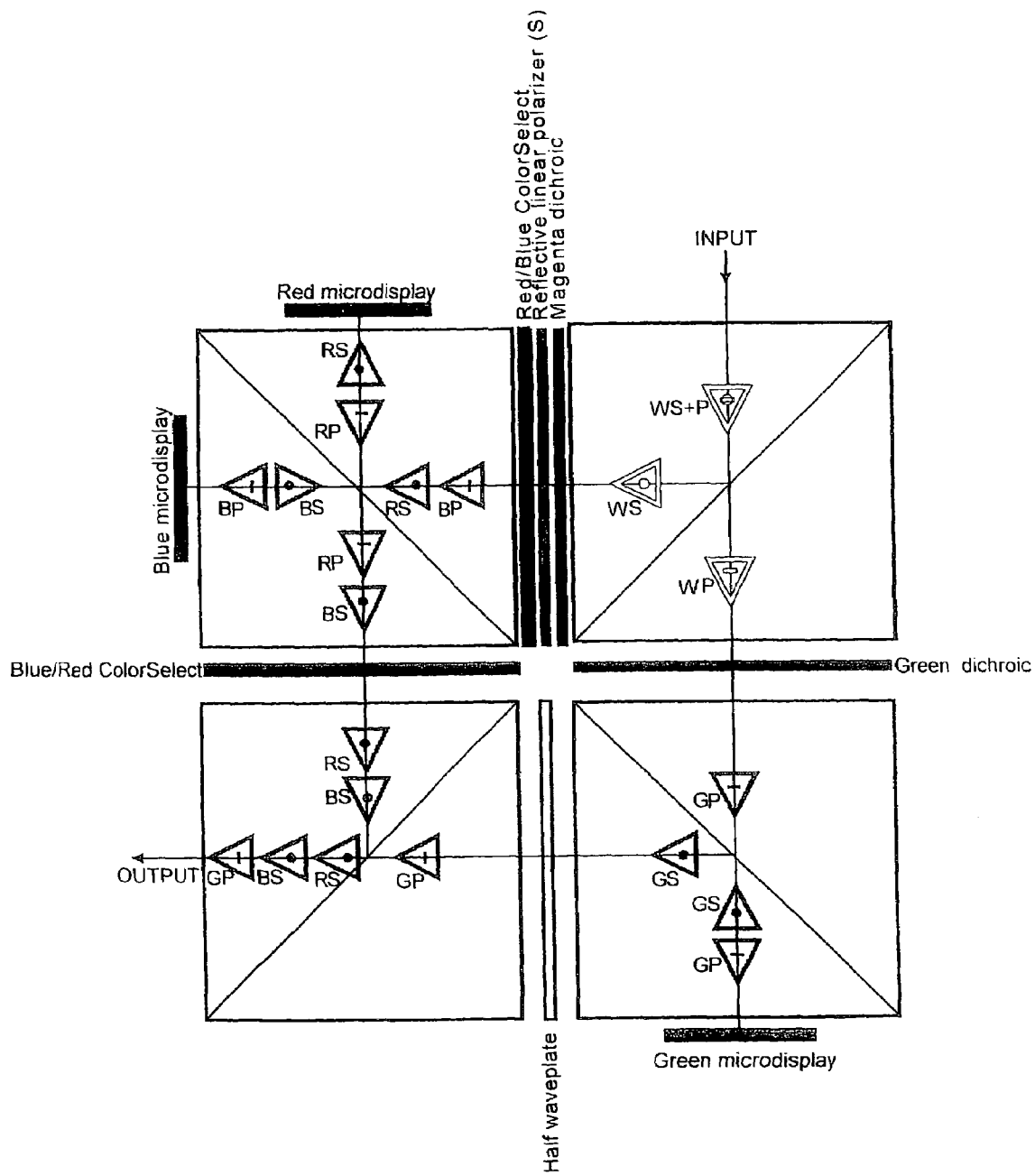
Figure 42:
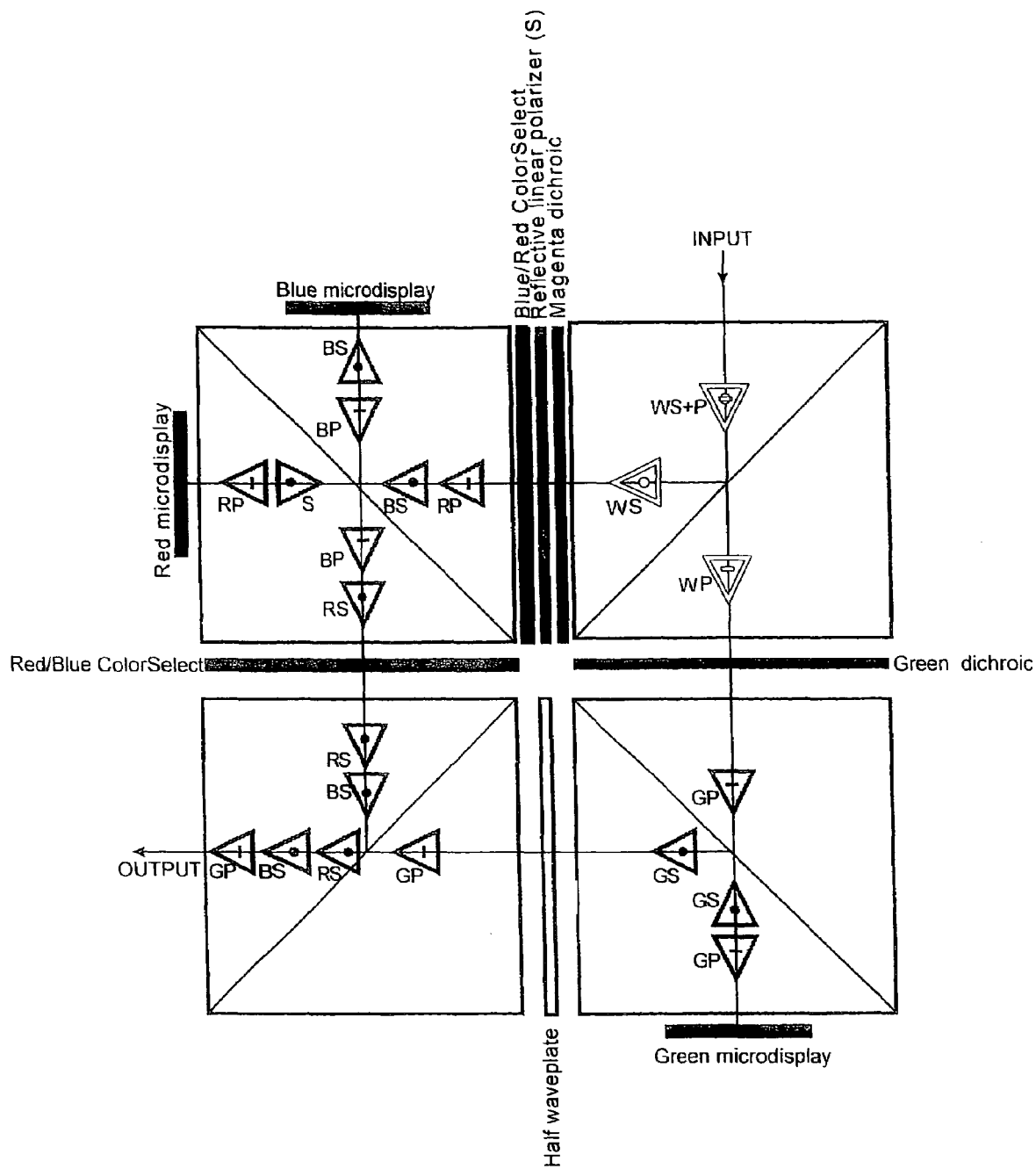
Figure 43:
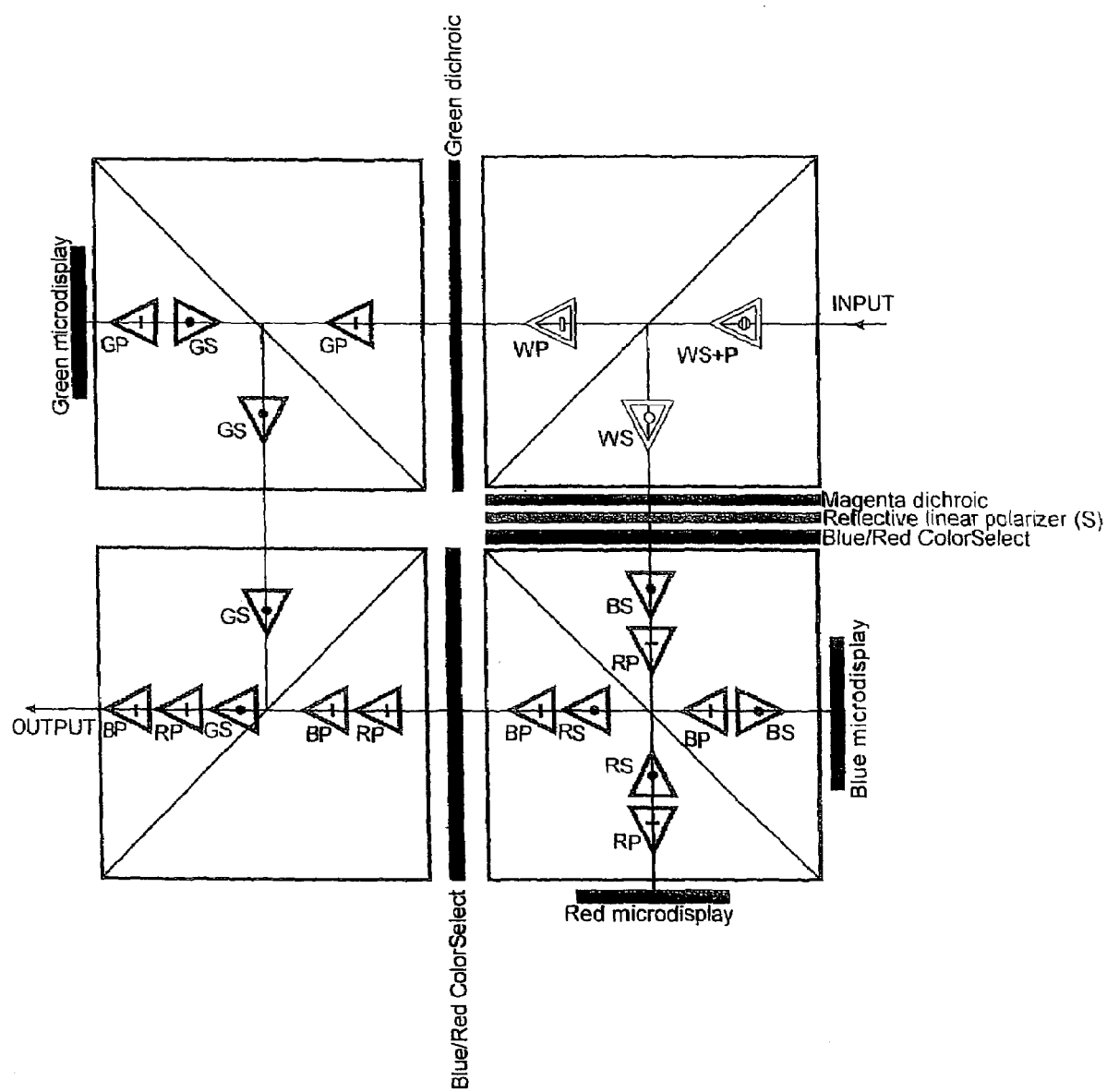
Figure 44:
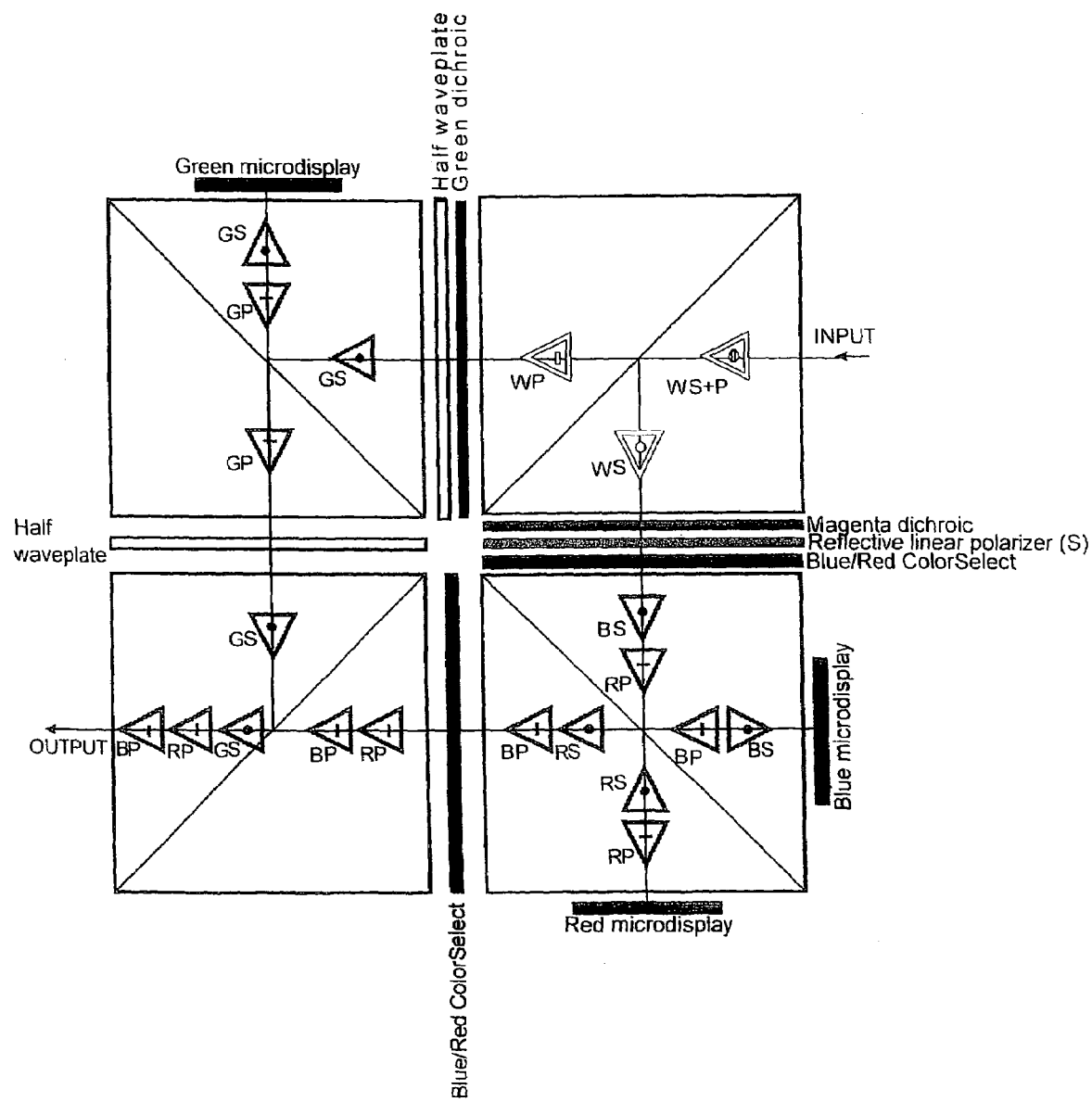
Figure 45:
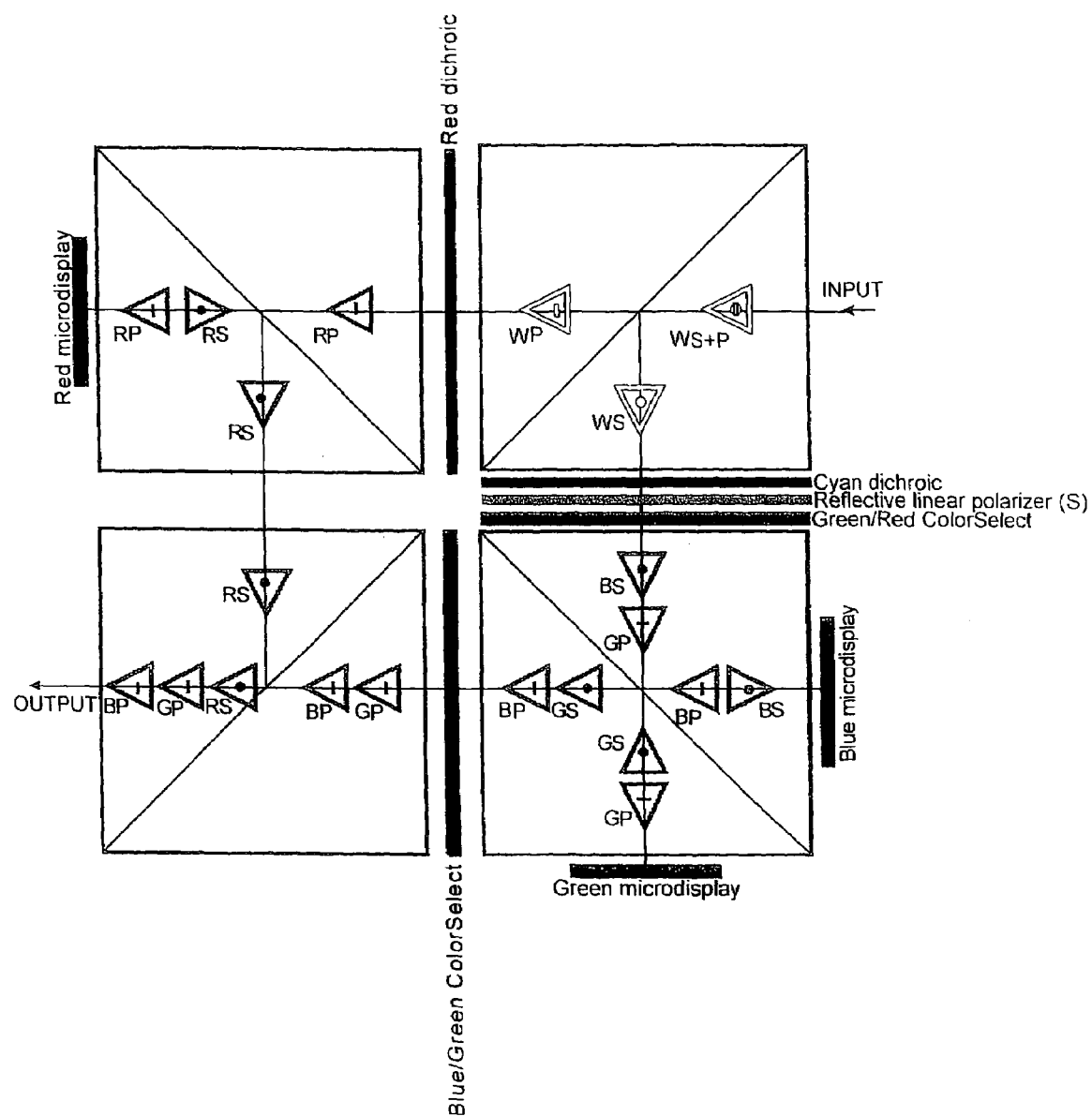
Figure 46:
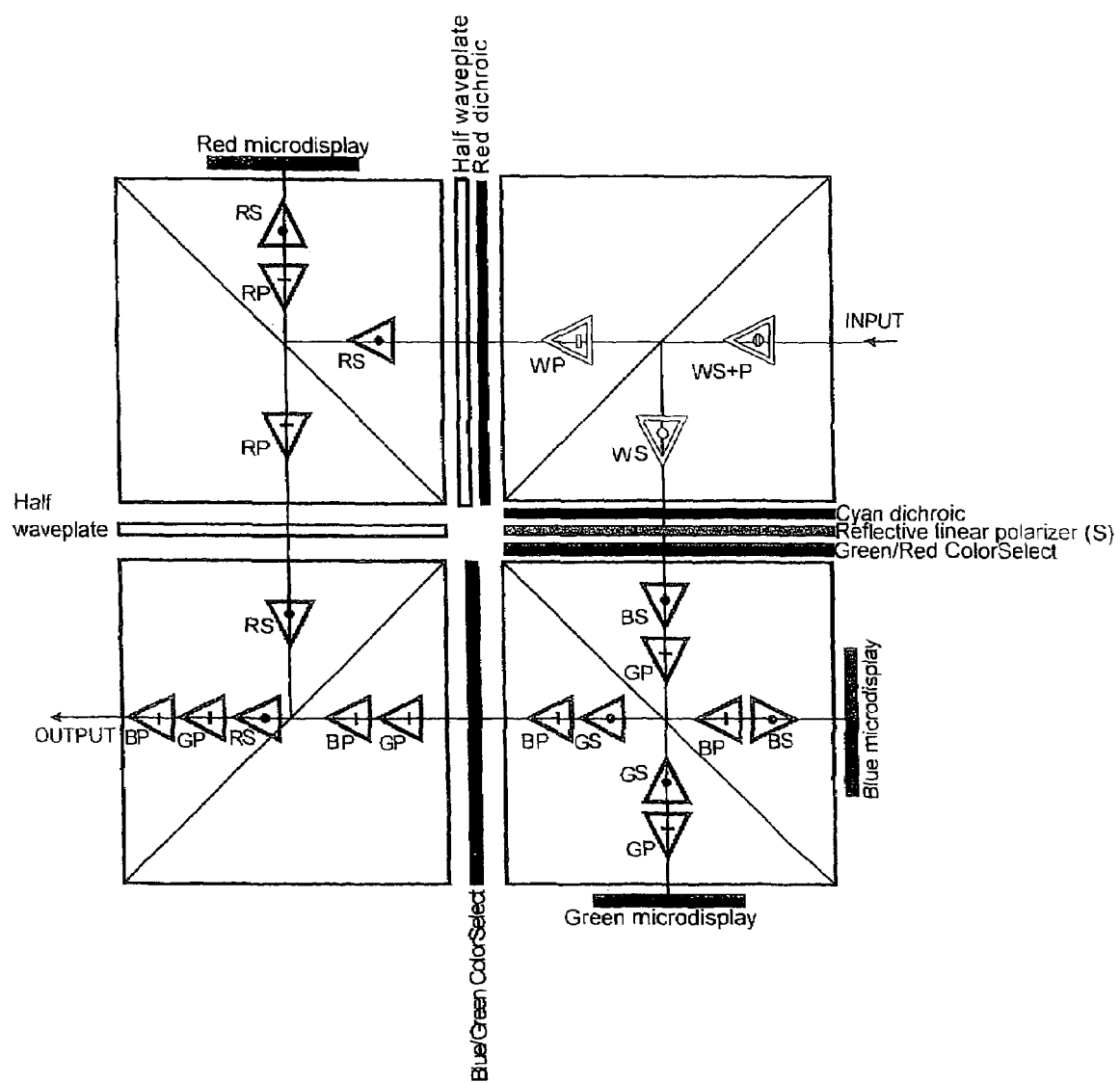
Figure 47:
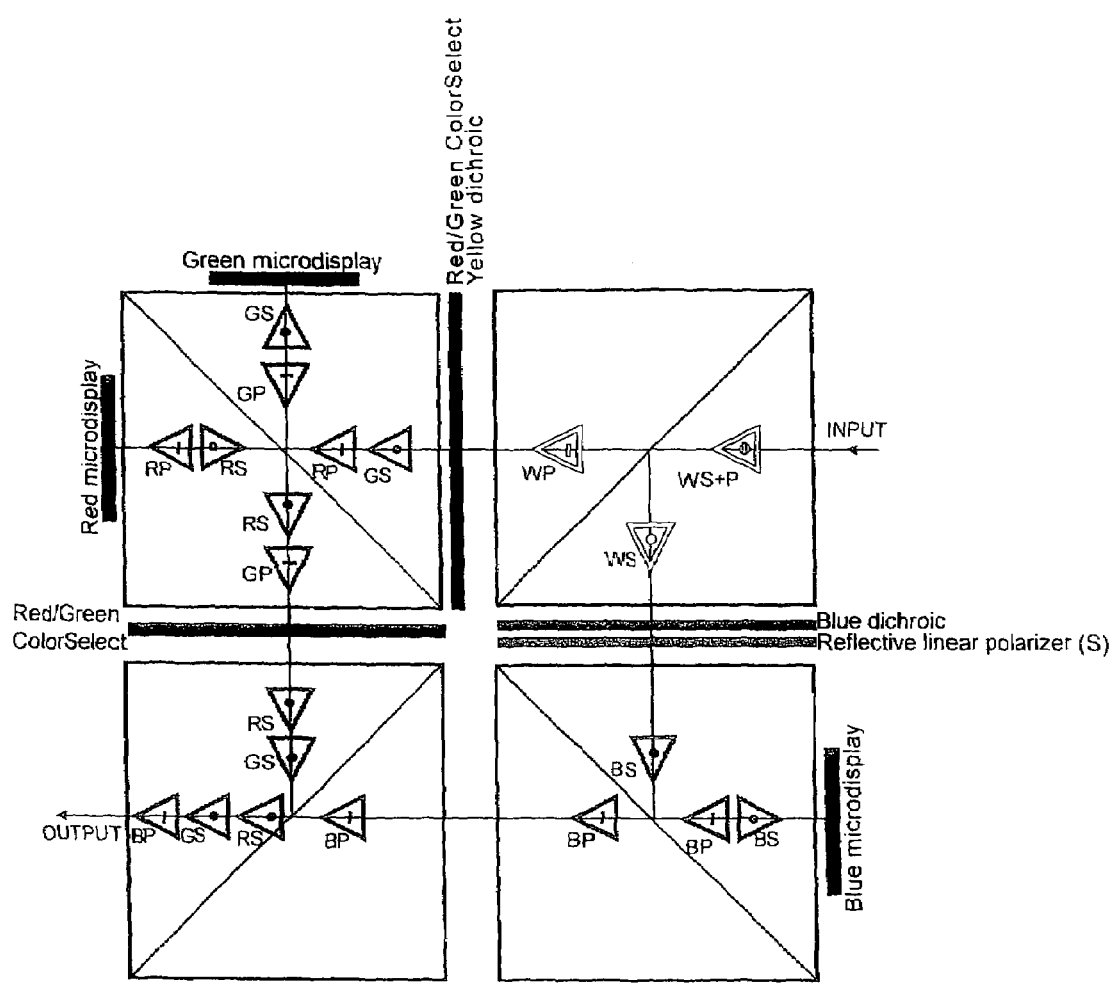
Figure 48:
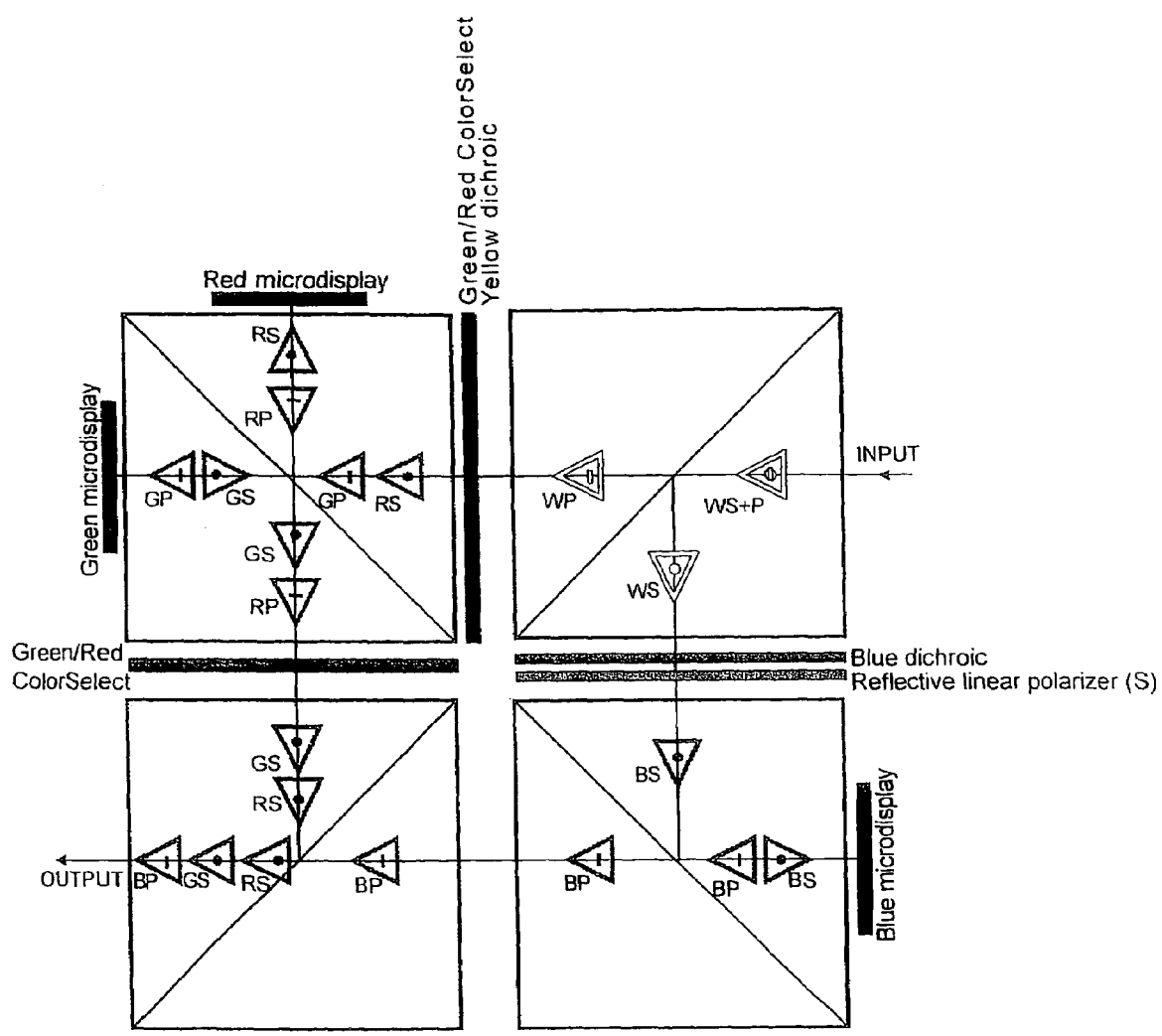
Figure 49:
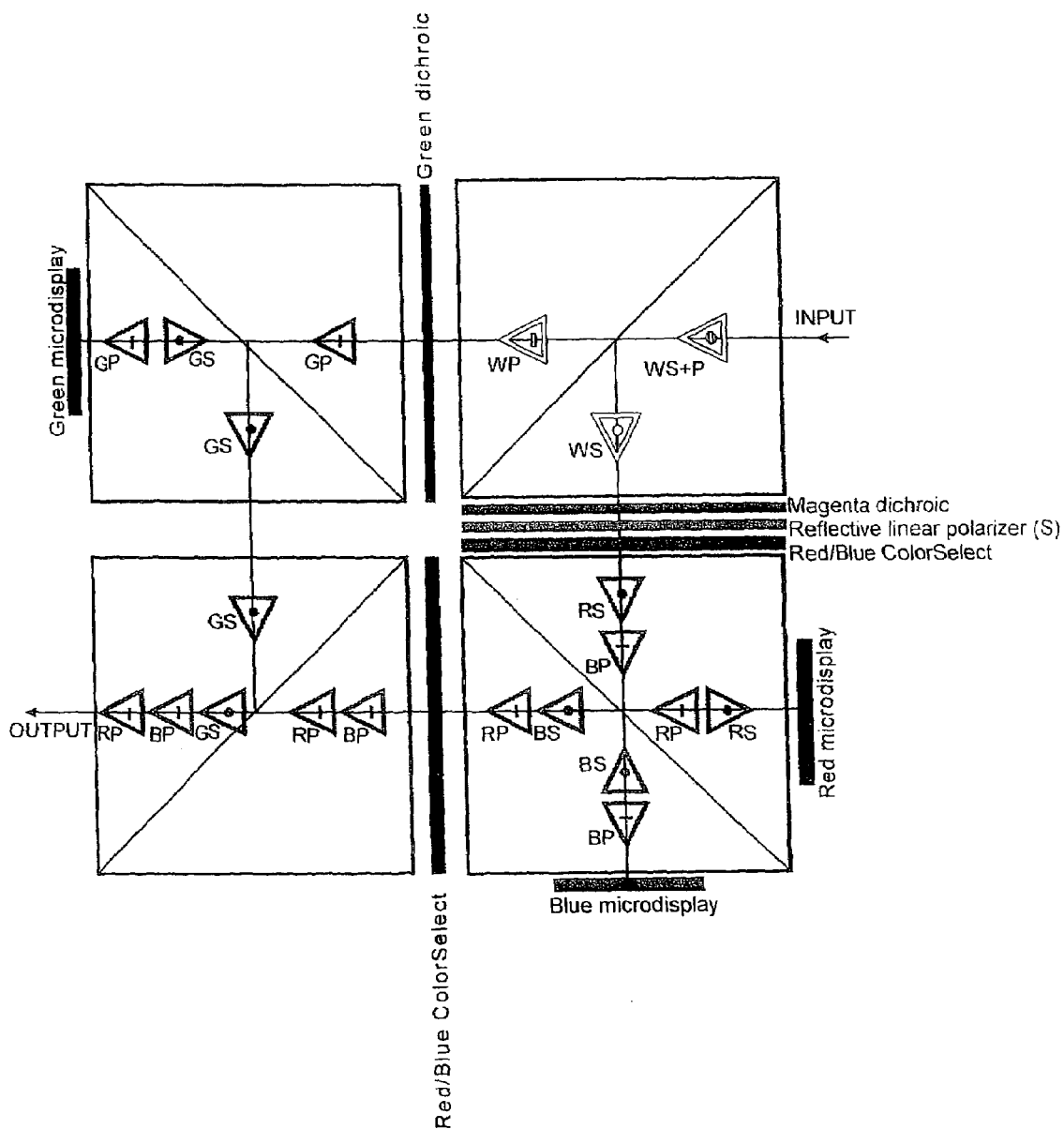
Figure 50:
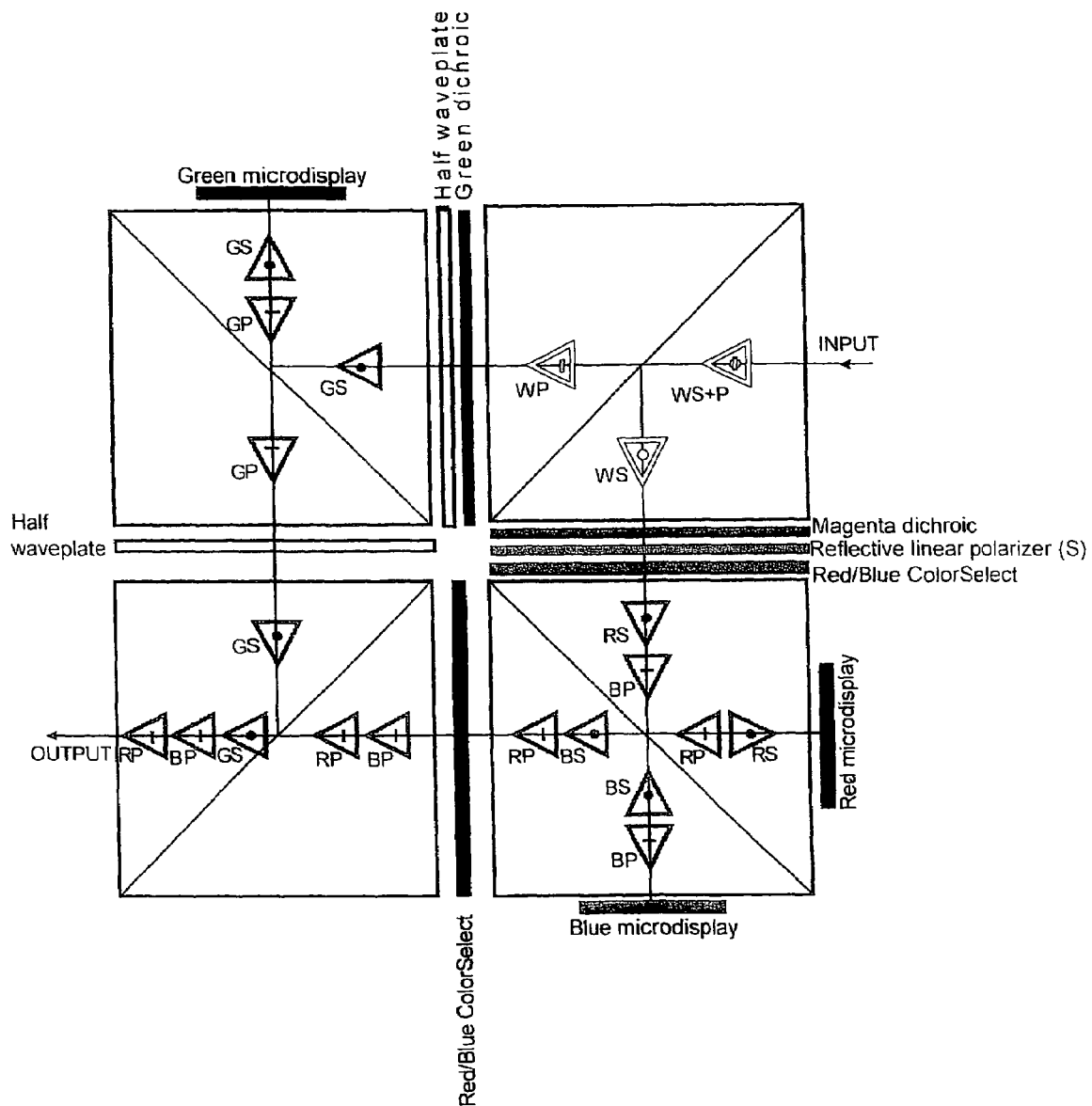
Figure 51:
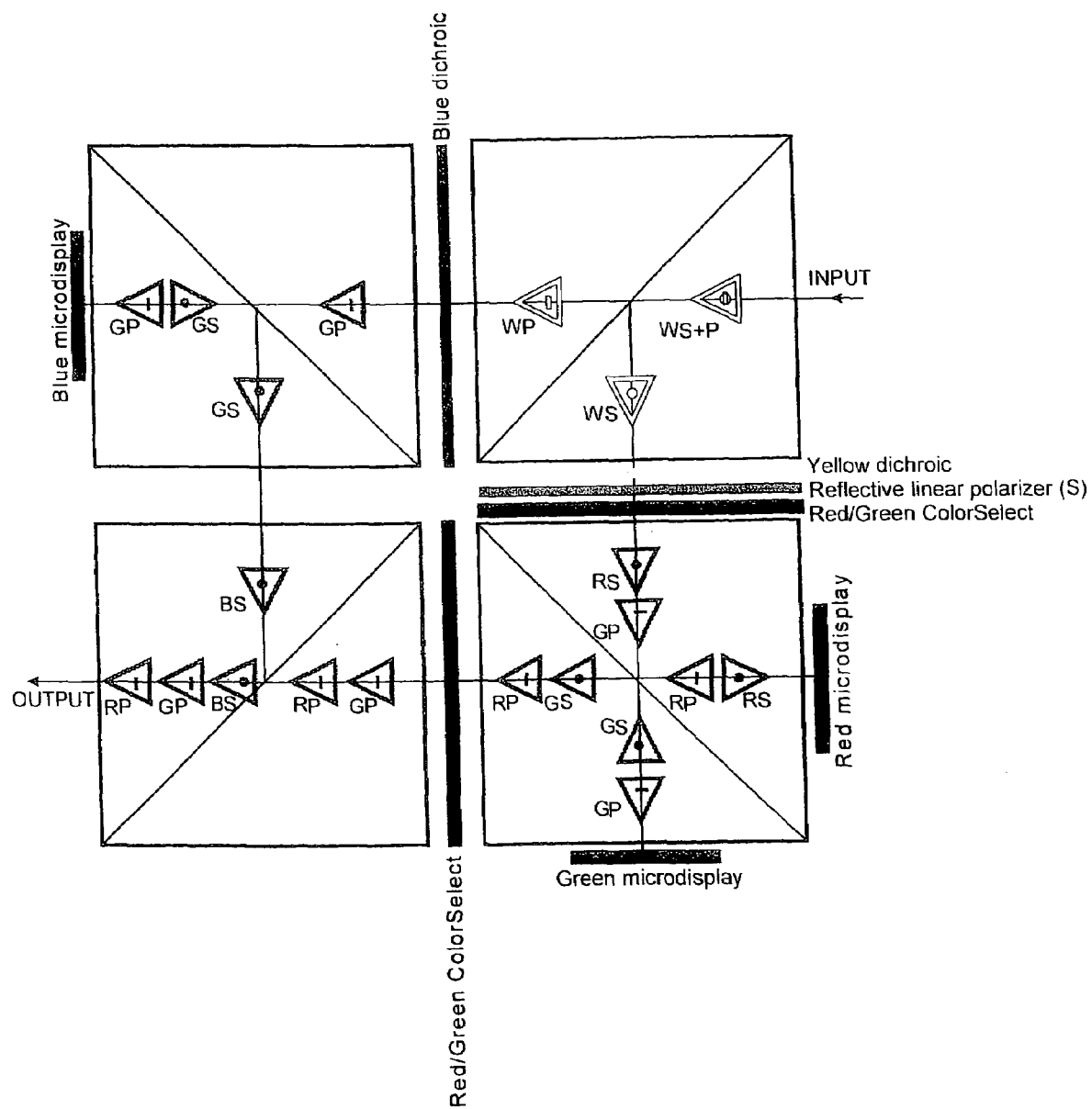
Figure 52:
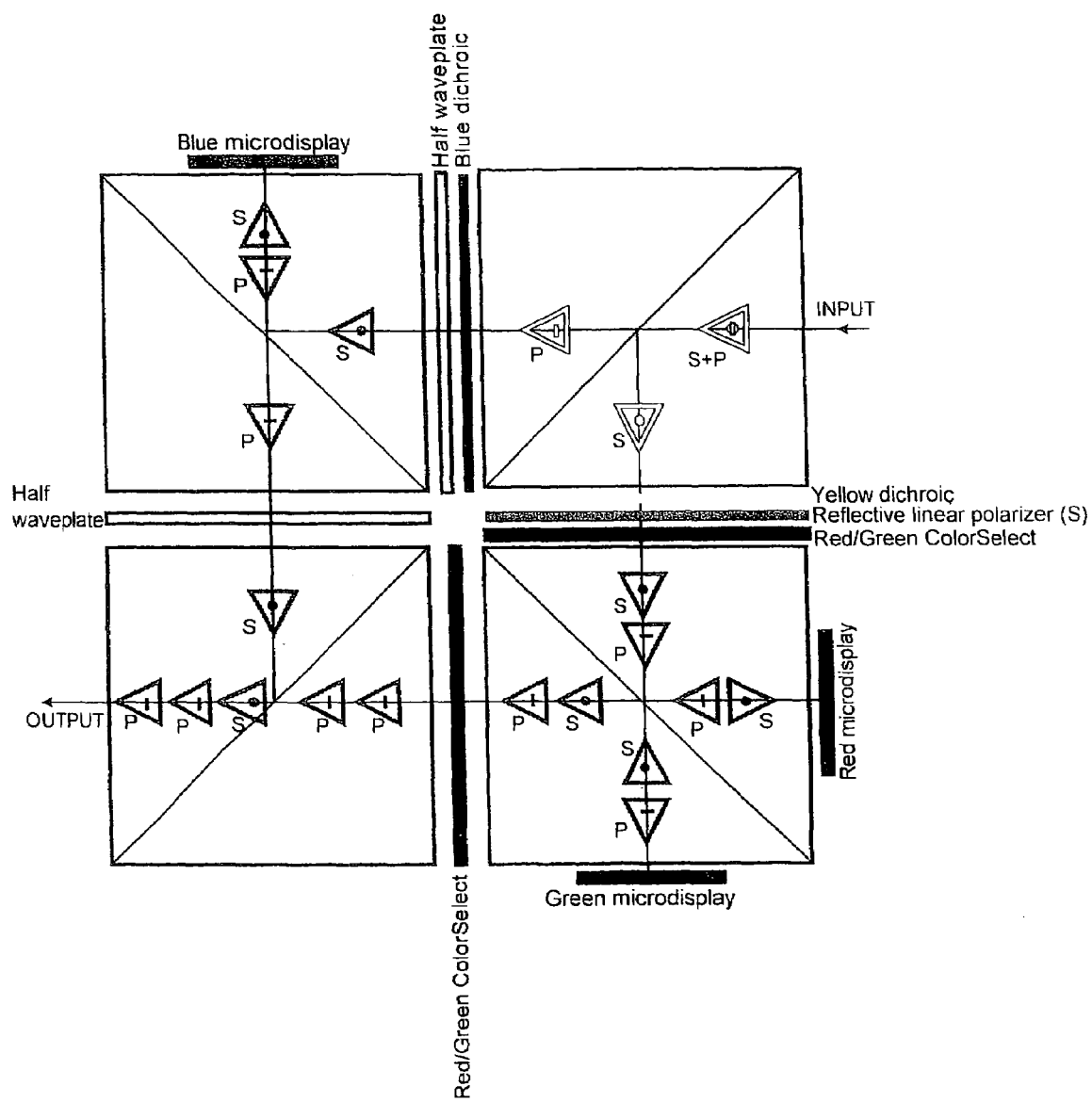
Figure 53:
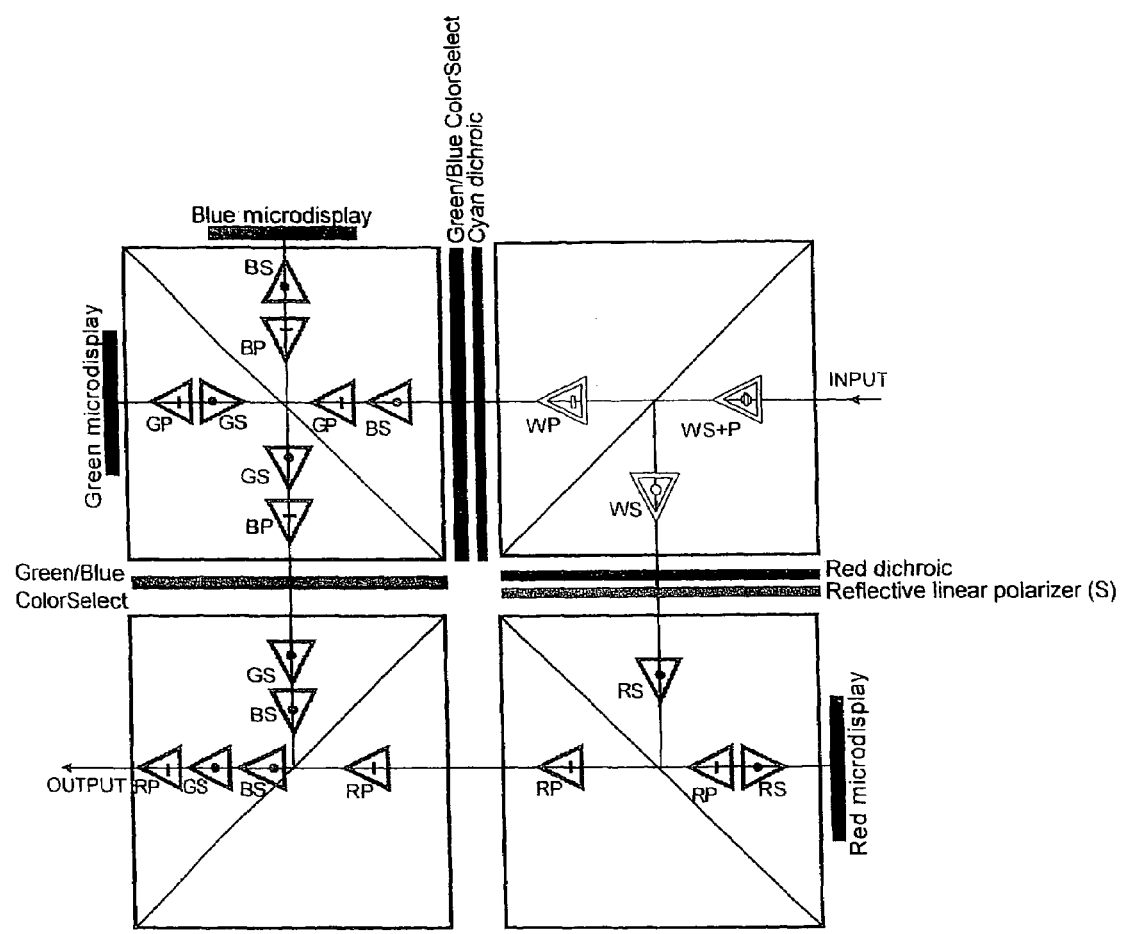
Figure 54:
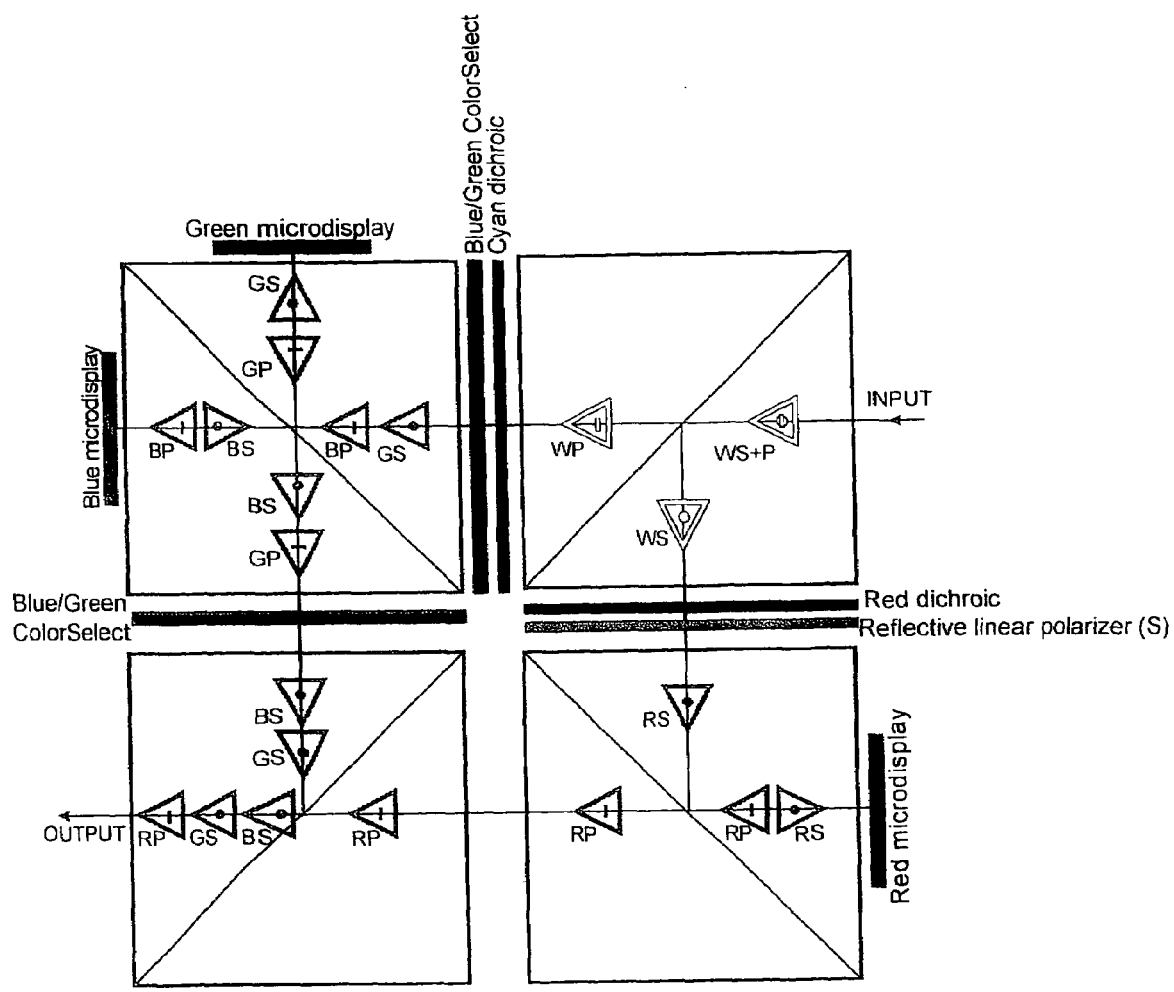
Figure 55:
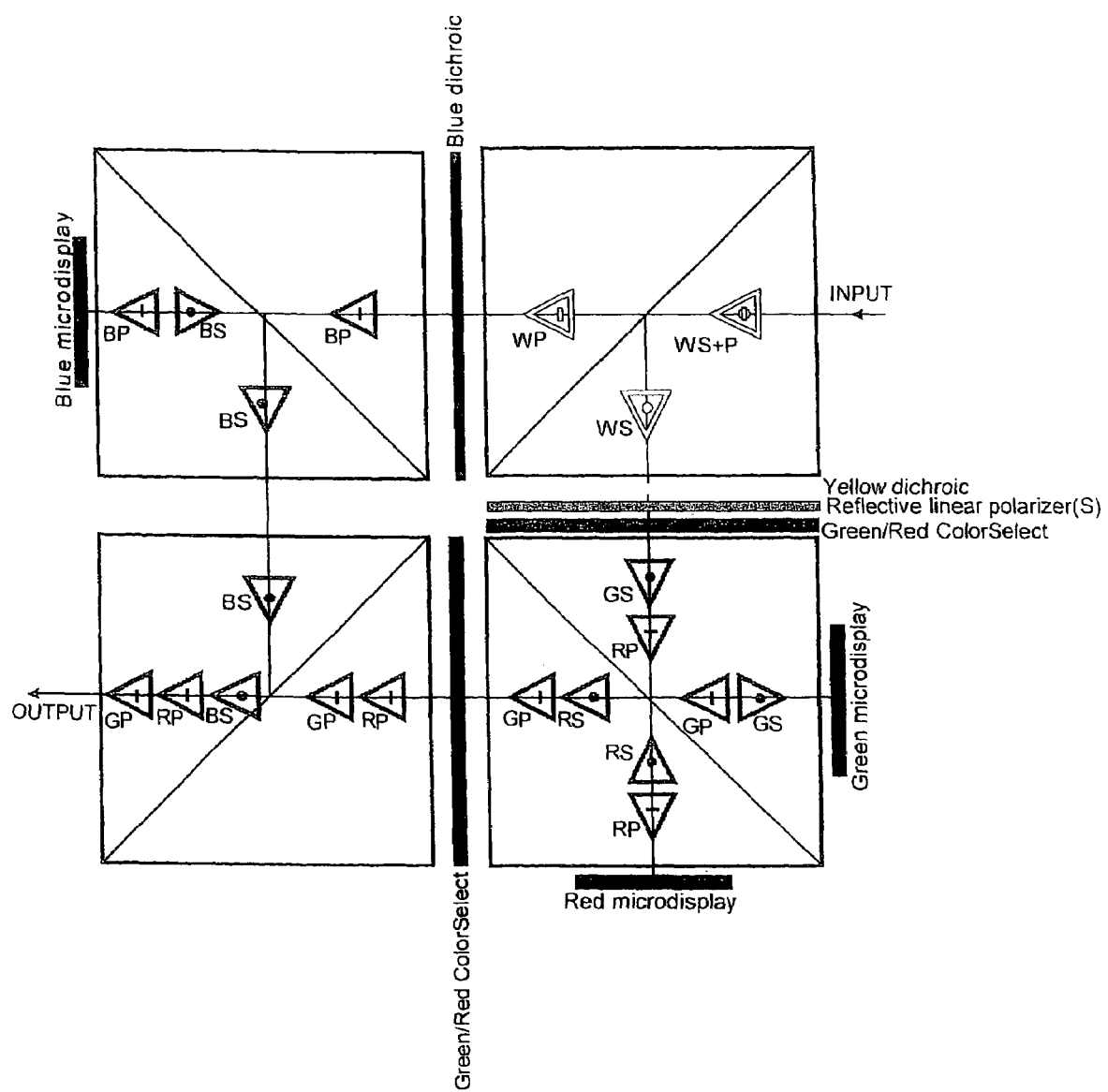
Figure 56:
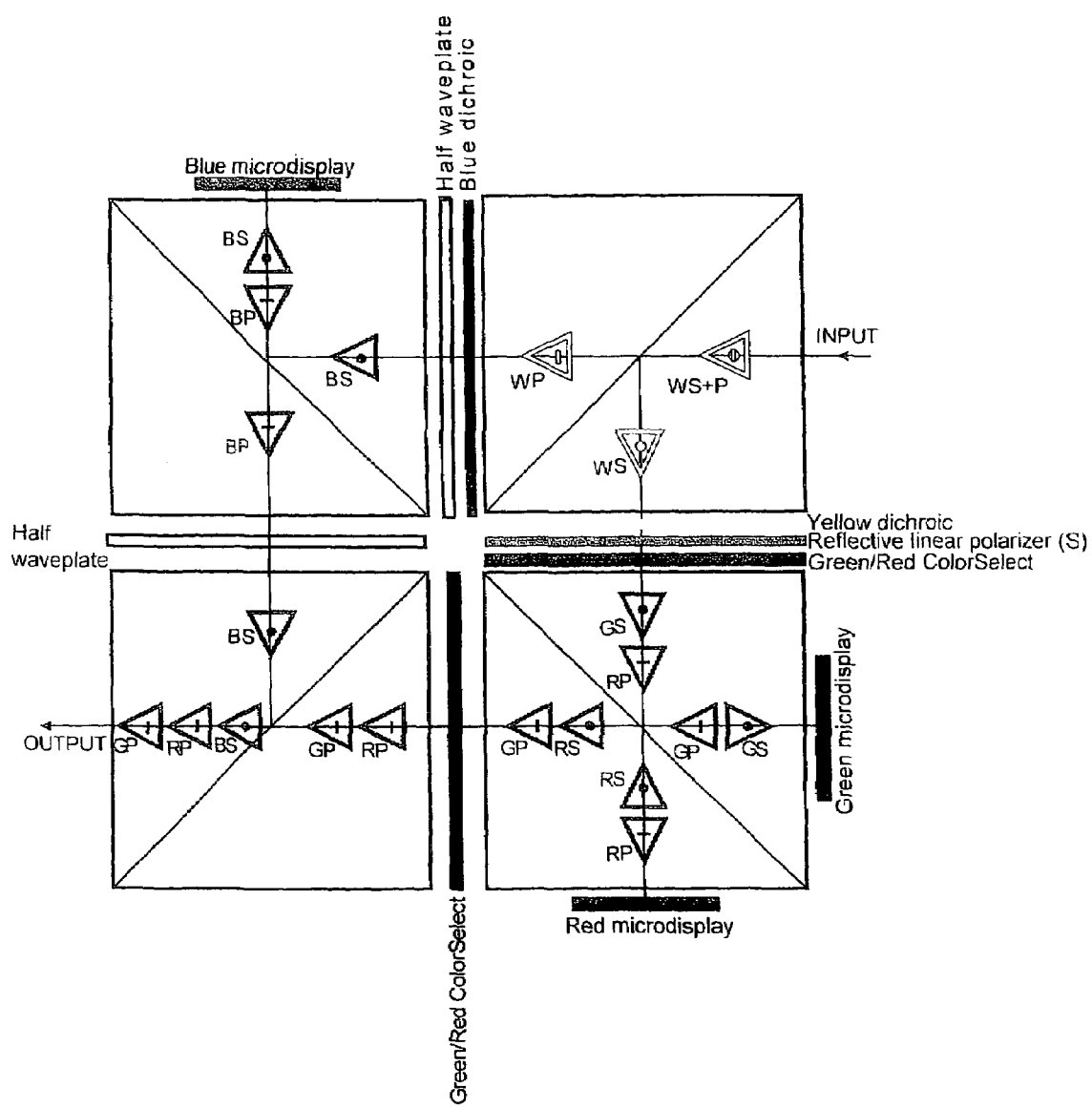
Figure 57:
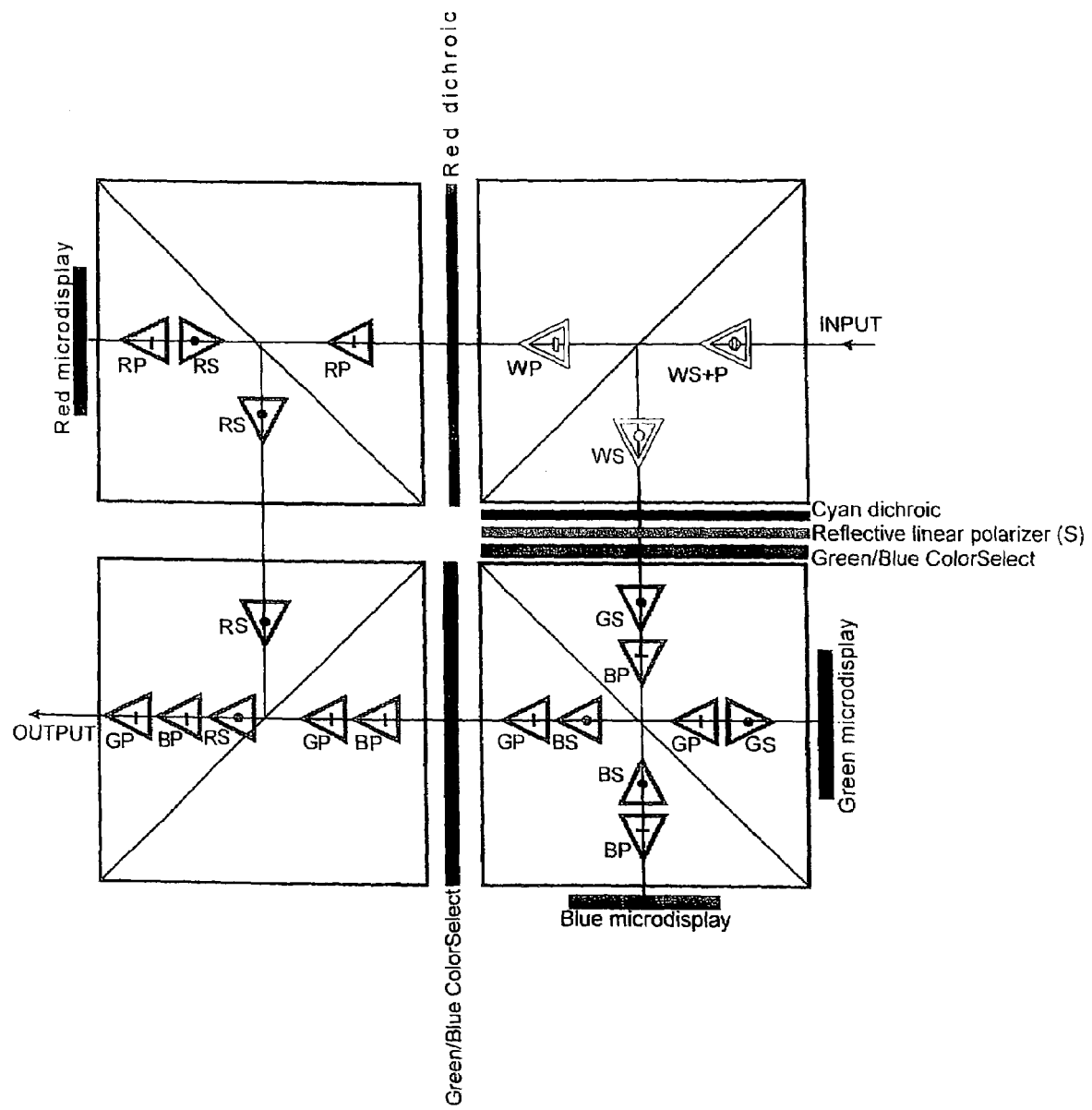
Figure 58:
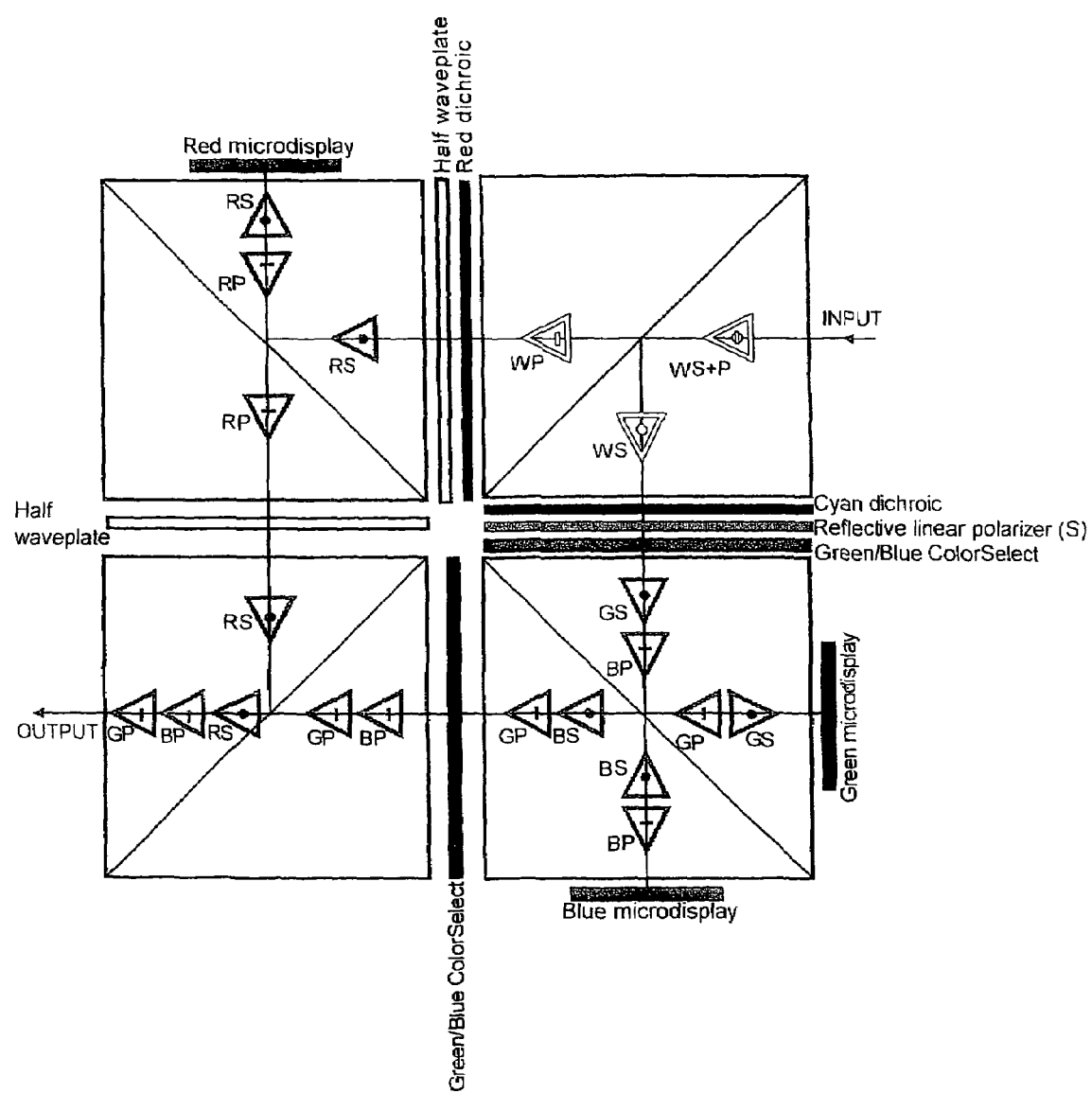
Figure 59:
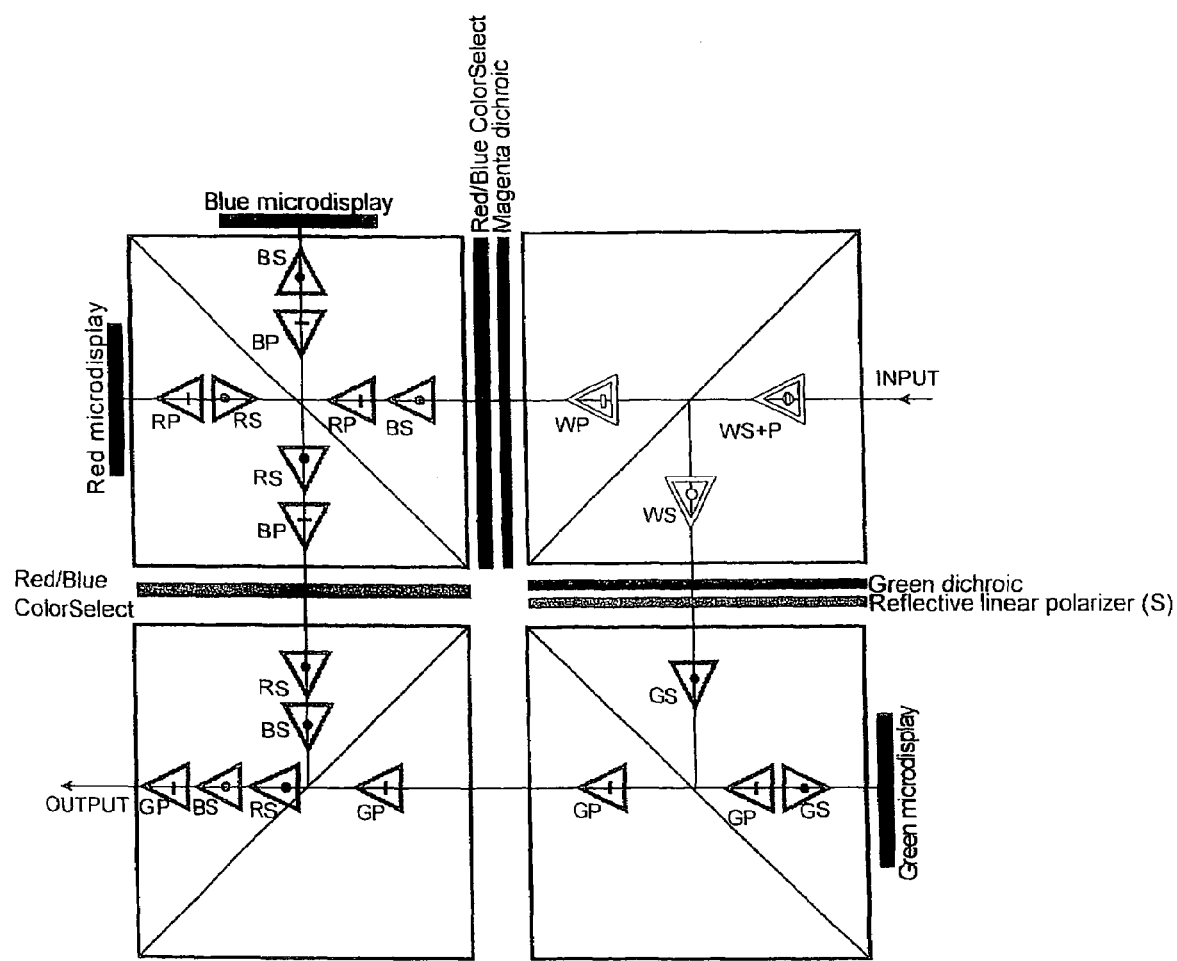
Figure 60:
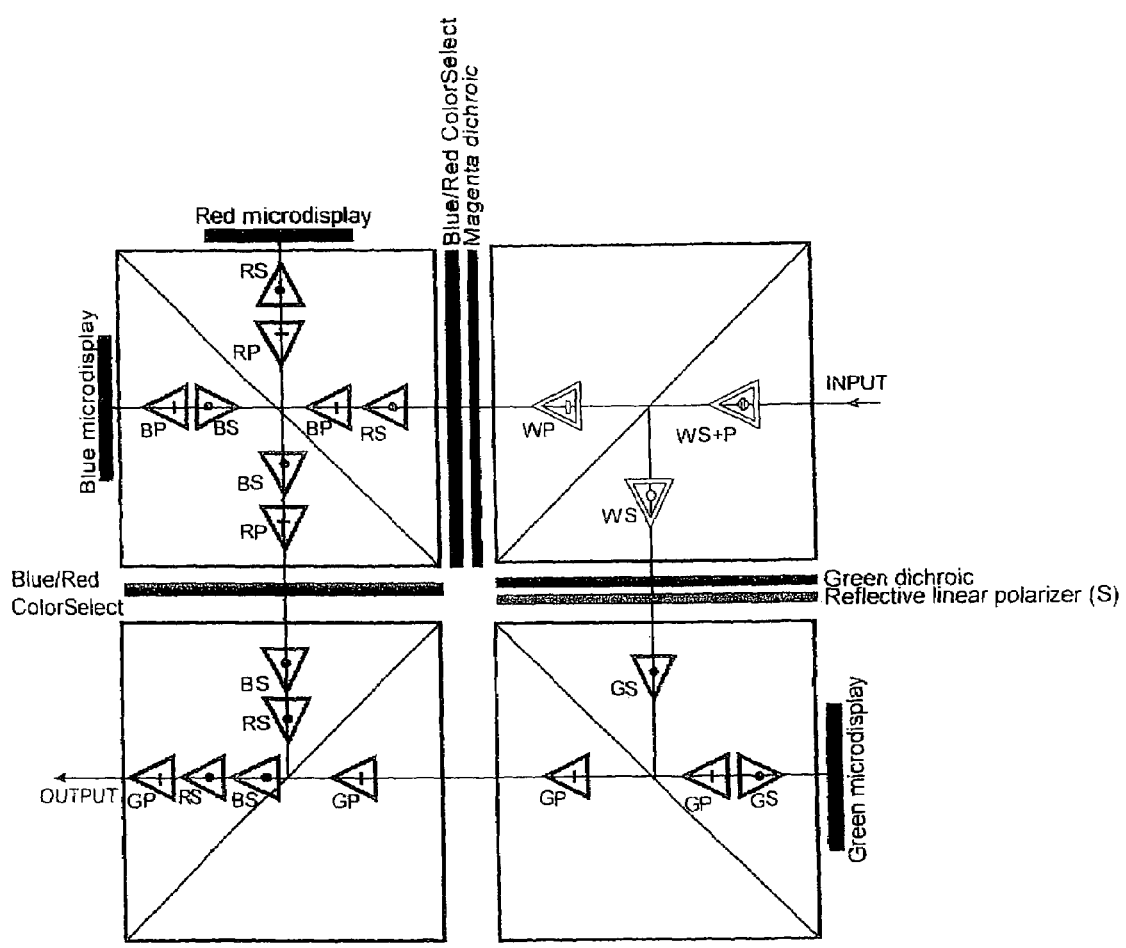
Figure 61:
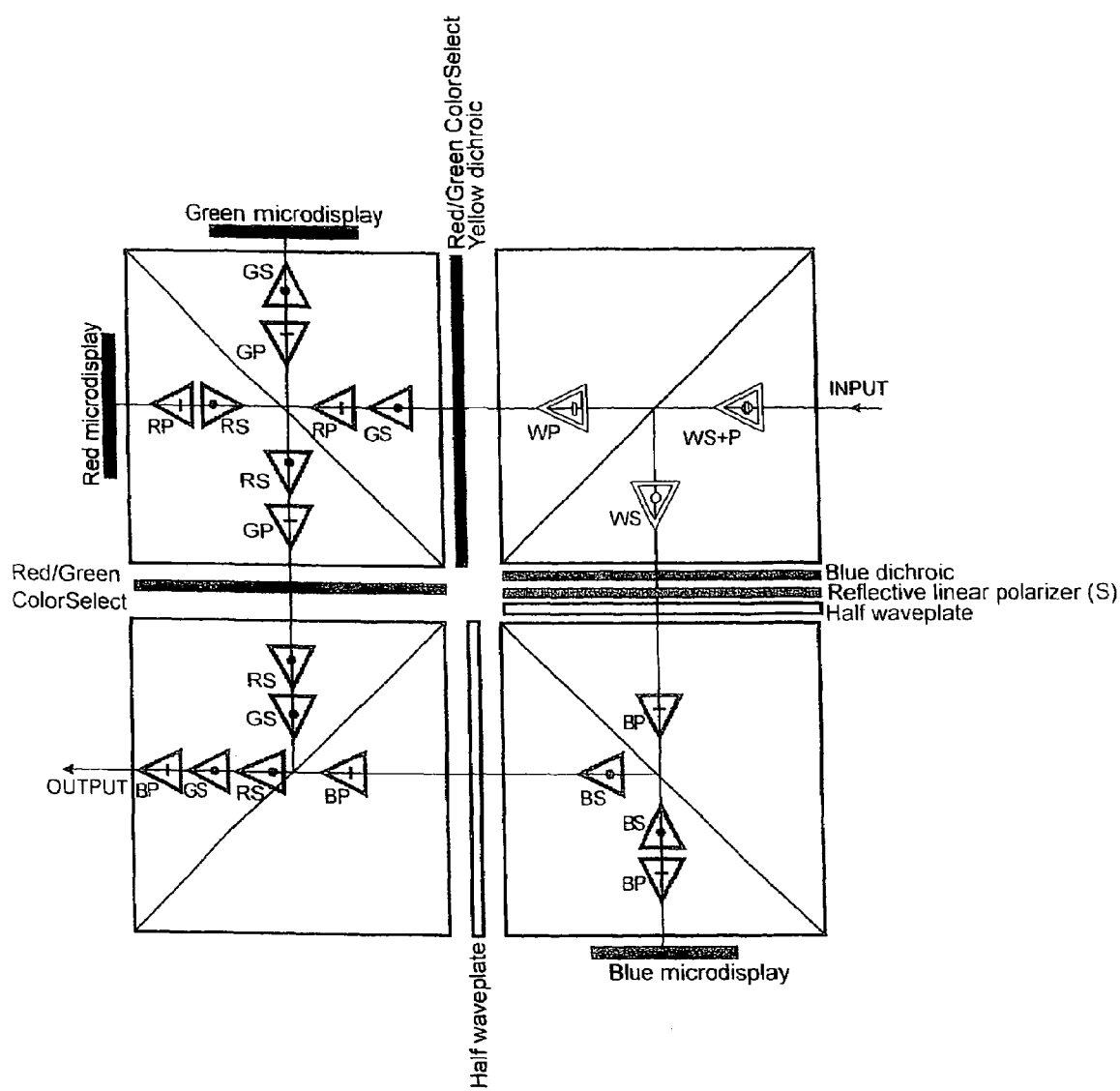
Figure 62:
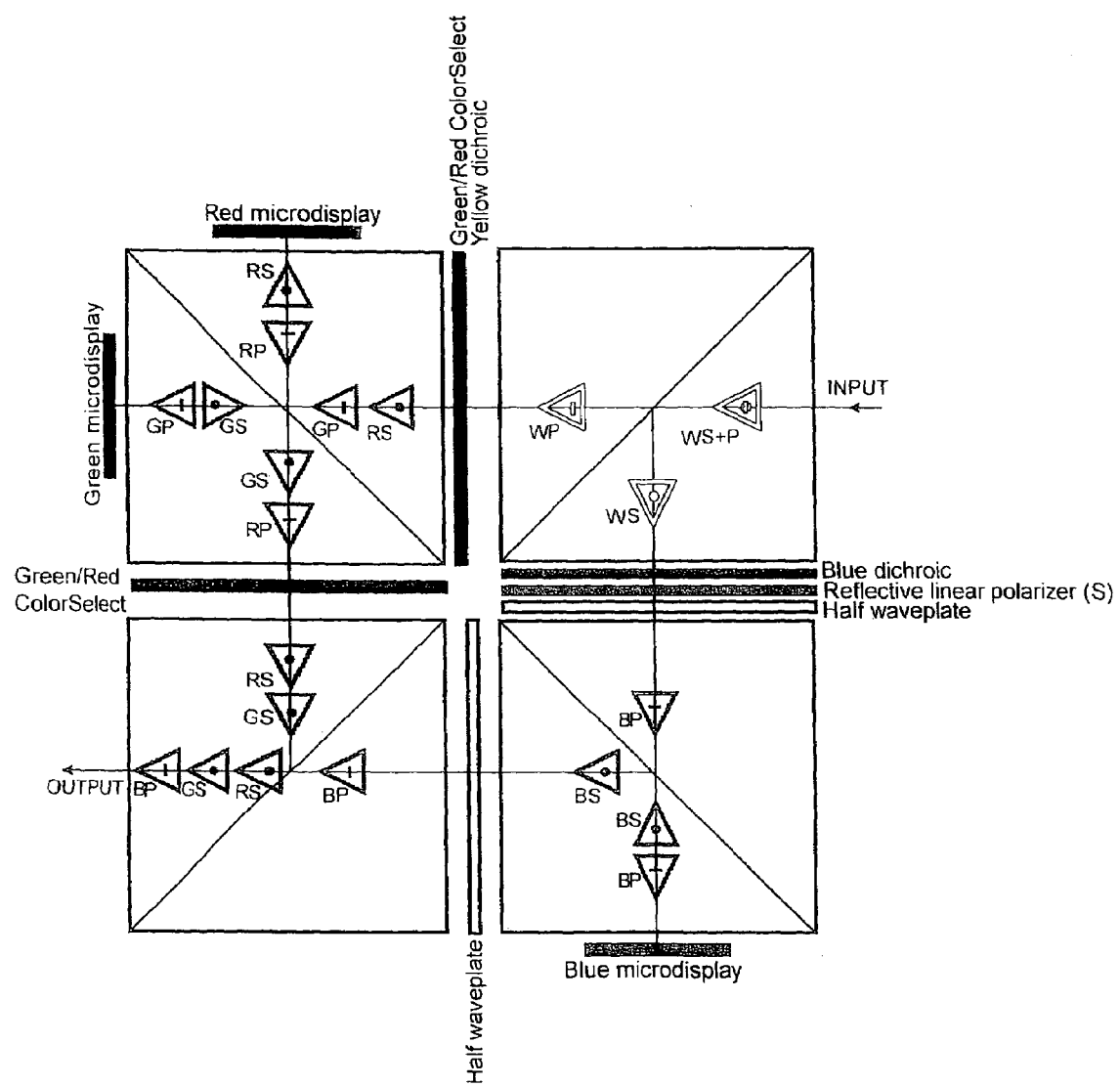
Figure 63:
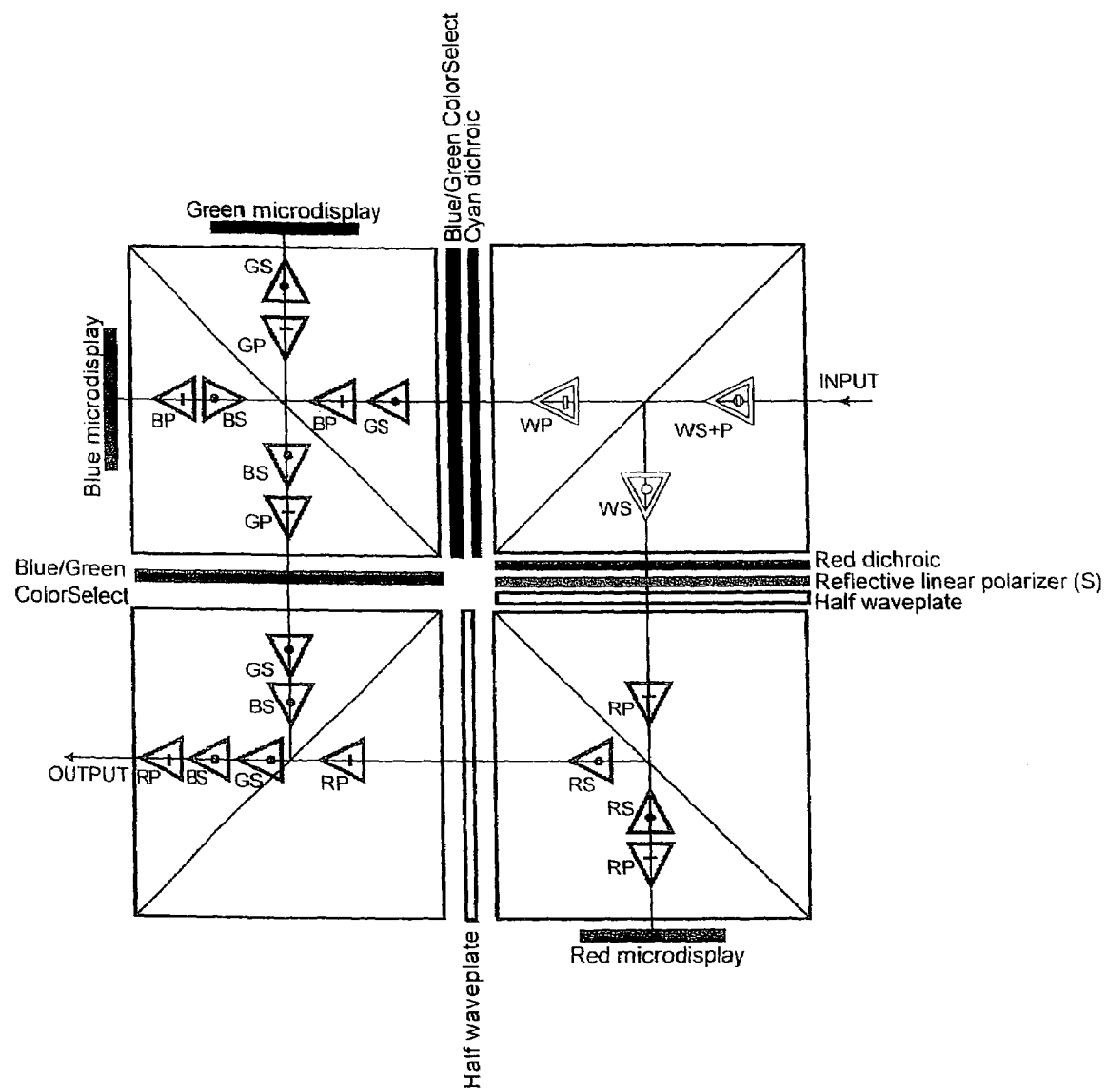
Figure 64:
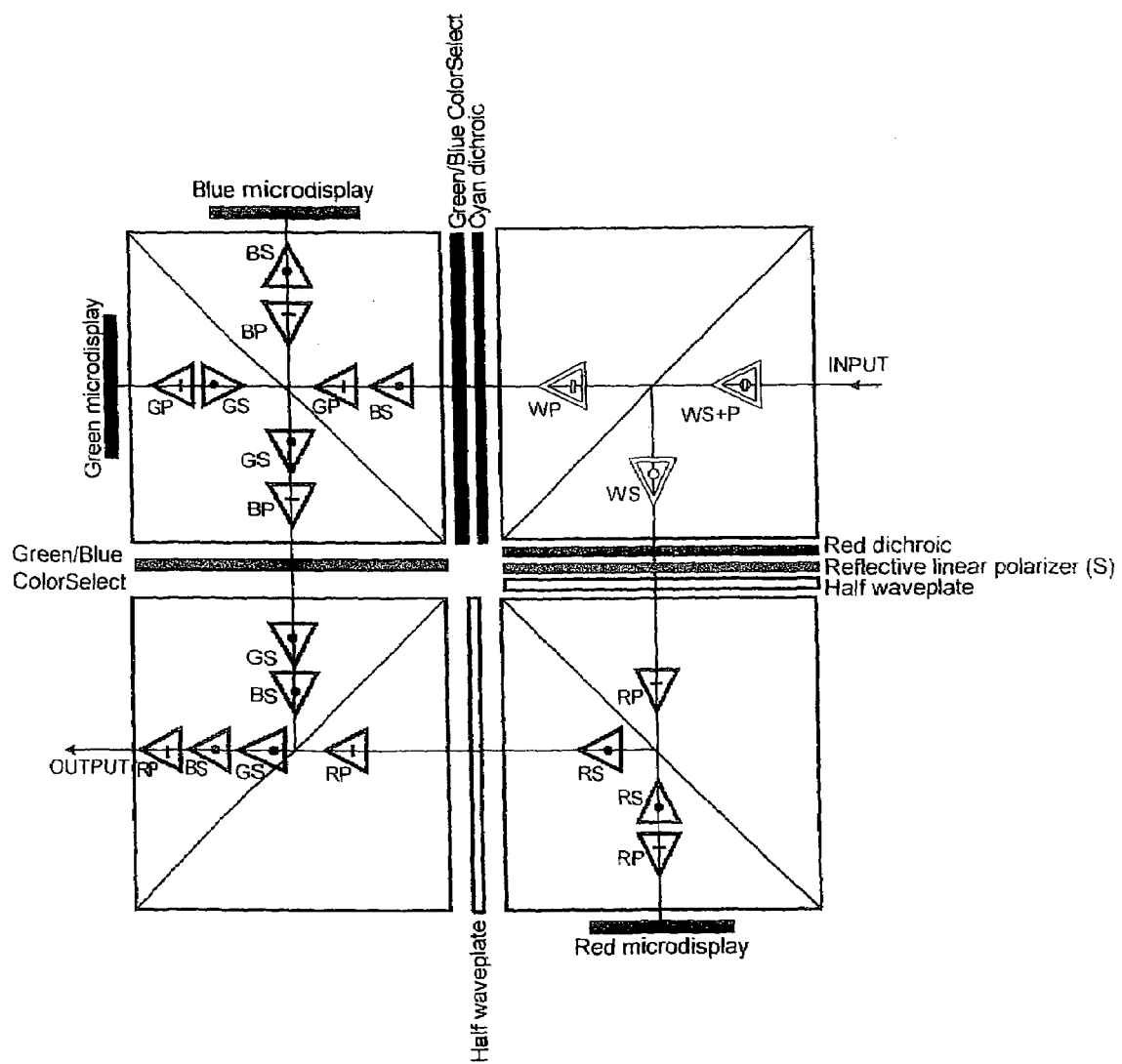
Figure 65:
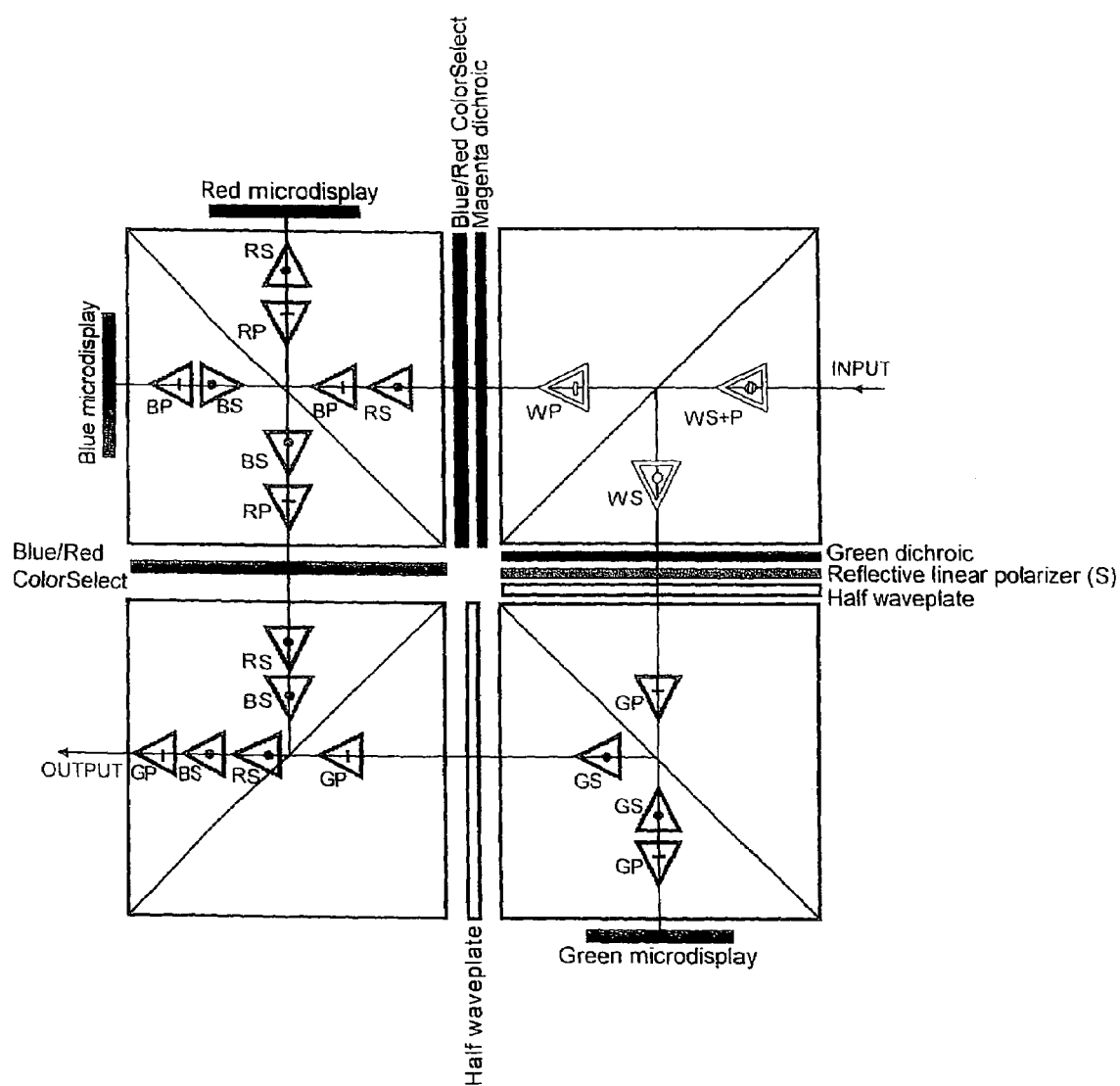
Figure 66:
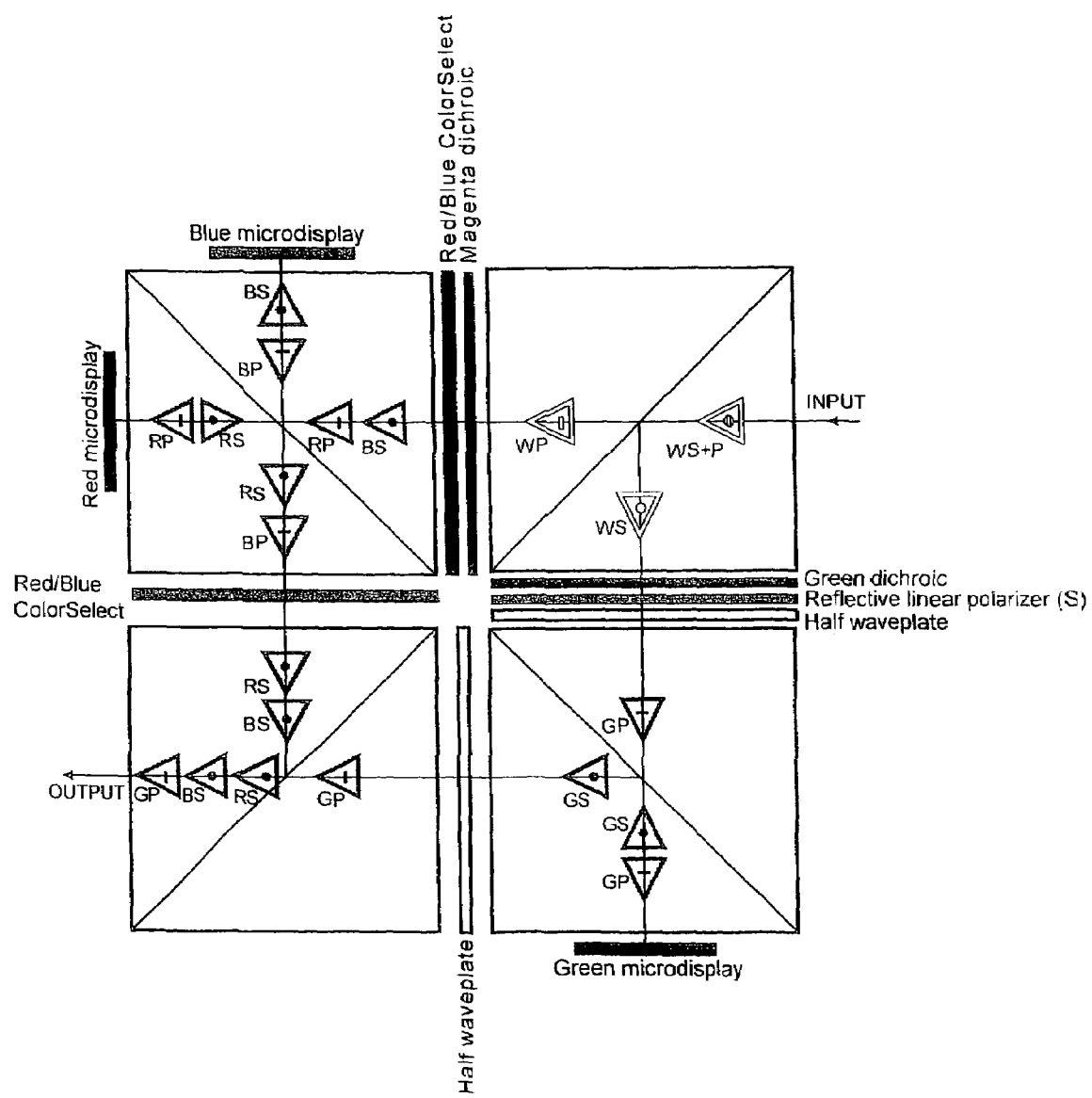

More specifically, the kernel 76800 matches the #26 kernel configuration of Table #1 (a right angle input and the microdisplays mounted on faces according to kernel configuration #26). In the example of Table #1, a green dichroic performs the initial beam separation (reflecting green polarized light) and passing magenta (red and blue) polarized light. More specifically, in FIG. 26, the green dichroic reflects green S polarized light and passes Magenta S polarized light.

As noted above, the green dichroic may also be sensitive so as to reflect P polarized input light, in which case additional modifications are needed to direct the light beams appropriately through the remaining portions of the kernel (on paths to and from the microdisplays and then finally through the output face). And, the dichroic may be configured to reflect colors other than green, and again, combined with another configuration of optical components and microdisplays to appropriately direct the separated light beams. For example, kernel configuration #45 is a straight through configuration having Blue, Green, and Red microdisplays mounted on Face #1, Face #2, and Face #3 respectively. In this example, a dichroic configured to pass red polarized light and reflect blue and green polarized light is affixed along diagonal 76815. Again, depending on the arrangement of other components or optical elements within the kernel, the input light may be S polarized or P polarized light.

In another example, kernel configuration #22 is a right angle input configuration having Blue, Green, and Red microdisplays on Face #1, Face #2, and Face #4 respectively. In this example, a dichroic configured to reflect red polarized light and pass magenta (blue and green) polarized light is affixed to diagonal 76815. The dichroic may be sensitive to various polarizations depending on the arrangement of other components and optical elements in the kernel (e.g., S or P polarized light).

Although the present invention is mainly described herein as applying to the quad style kernel based on the structure presented in FIG. 18, based on the present disclosure, it will be apparent to the ordinarily skilled artisan that the techniques and processes of the present invention applies to other kernel styles as well.

Any one or more of the kernels described herein may be arranged in a pathlength matched prism assembly as described in Berman et al., U.S. application Ser. No. 10/202, 595, entitled: "Method and Apparatus for Configuration and assembly of a Video Projection Light Management System", filed Jul. 24, 2002, incorporated herein by reference, and any one or more of the beam splitting cubes (e.g., 76825, 76845, and 76855) may be configured as a pathlength matched beam splitting cube constructed similarly as described in Detro, U.S. application Ser. No. 10/251,225, entitled: "Pathlength Matched Beam Splitter and Method and Apparatus for Assembly", filed Sep. 20, 2002, incorporated herein by reference. When the dichroic is affixed along diagonal 76815 is affixed between two triangular pieces forming roughly a cube (a beam splitting "cube"), then cube 76830 may also be constructed according to techniques similar to those described elsewhere herein or in the referenced patent application. Use of a dichroic instead of a polarization sensitive thin film produces the dichroic beam separator as opposed to a polarization sensitive beam splitter (Polarizing Beam Splitter—PBS). As discussed above other methods of affixing the dichroic to the diagonal may be utilized (e.g., pellicle, flat plate, or one triangle leaving a face of the dichroic open).

An optional structure for the prism assemblies discussed herein include one or more cholesteric layers. Technical details about the structure, construction, and operation of cholesteric layers is now discussed. The cholesteric layers are generally thin layers of cholesteric liquid crystal.

The cholesteric layers react with light in a unique way that the present invention takes advantage of to produce efficient prism assemblies. The molecular structure of a cholesteric is such that it interacts with light by either passing or reflecting light of a given wavelength band and polarization. Cholesterics can be produced to either pass or reflect light at the given wavelength and polarization for various polarizations and wavelengths of light (e.g., a "red" cholesteric that reflects light in the red light bandwidth, or a "green" cholesteric that reflects light in the green light bandwidth, for example).

Figure 77A:
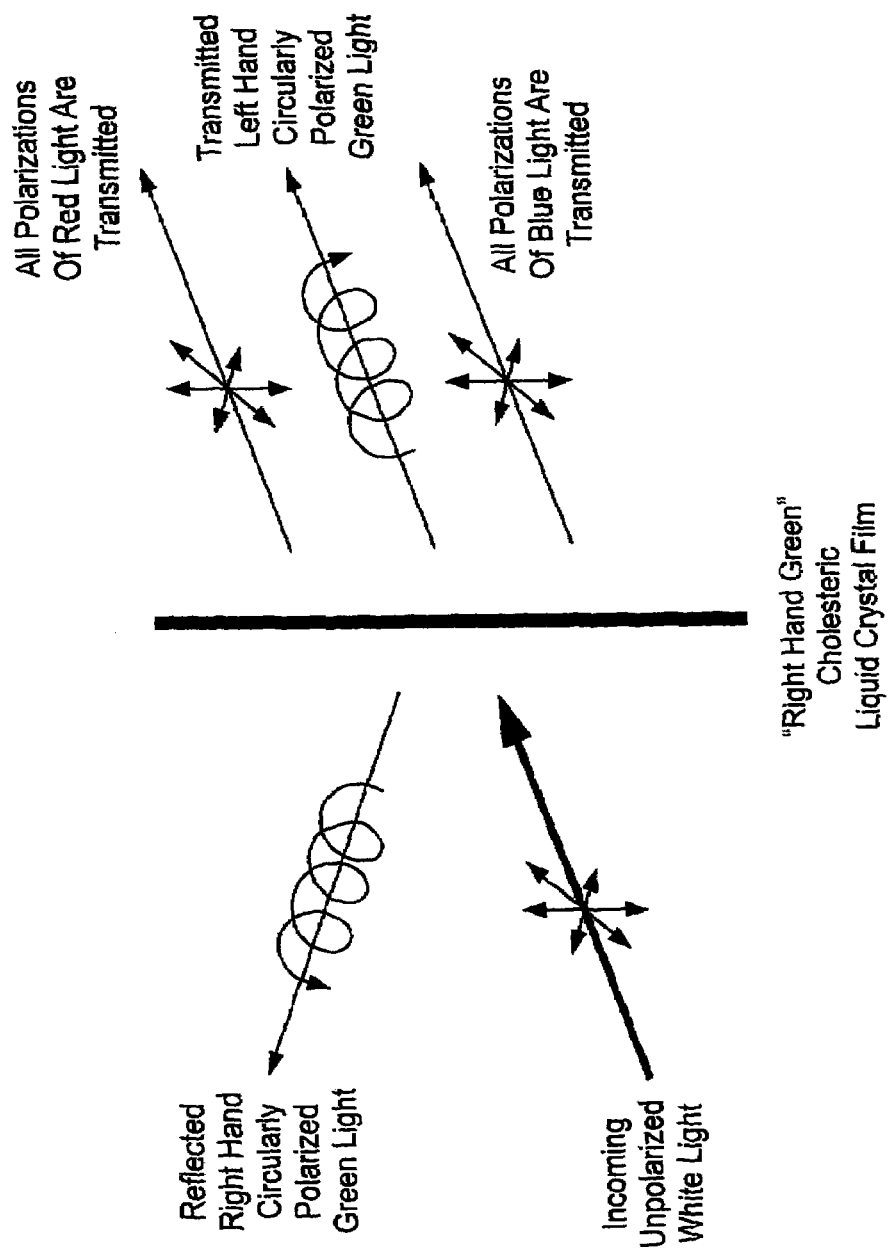
FIG. 77A is an illustration of interactions of unpolarized white light with a "right hand green" cholesteric film.

Referring now to FIG. 77A, there is illustrated the interaction of unpolarized white light with various thin layers of cholesteric liquid crystal. The variation of cholesteric layer illustrated in FIG. 77A can be called "right hand green". In this case, the molecular structure of the cholesteric is such that the layer transmits green left hand circularly polarized light. Green right hand circularly polarized light is specularly reflected. Blue and red light of both polarizations are transmitted. The width of the reflective band (bandwidth) of the cholesteric material is determined as follows:

$$\Delta\lambda = (\Delta n \lambda max)/navg$$

where $\Delta n$ is the birefringence and navg the average index of refraction of the cholesteric.

$\lambda max$ is the wavelength of maximum reflectivity (essentially, the center of the reflective band.). The efficiency of the reflection can be very high when the light is normally incident to the plane of the film. The efficiency decreases when the angle of incidence is off normal. In addition, the reflective maximum shifts to shorter wavelengths as the angle of observation increases.

Figure 77B:
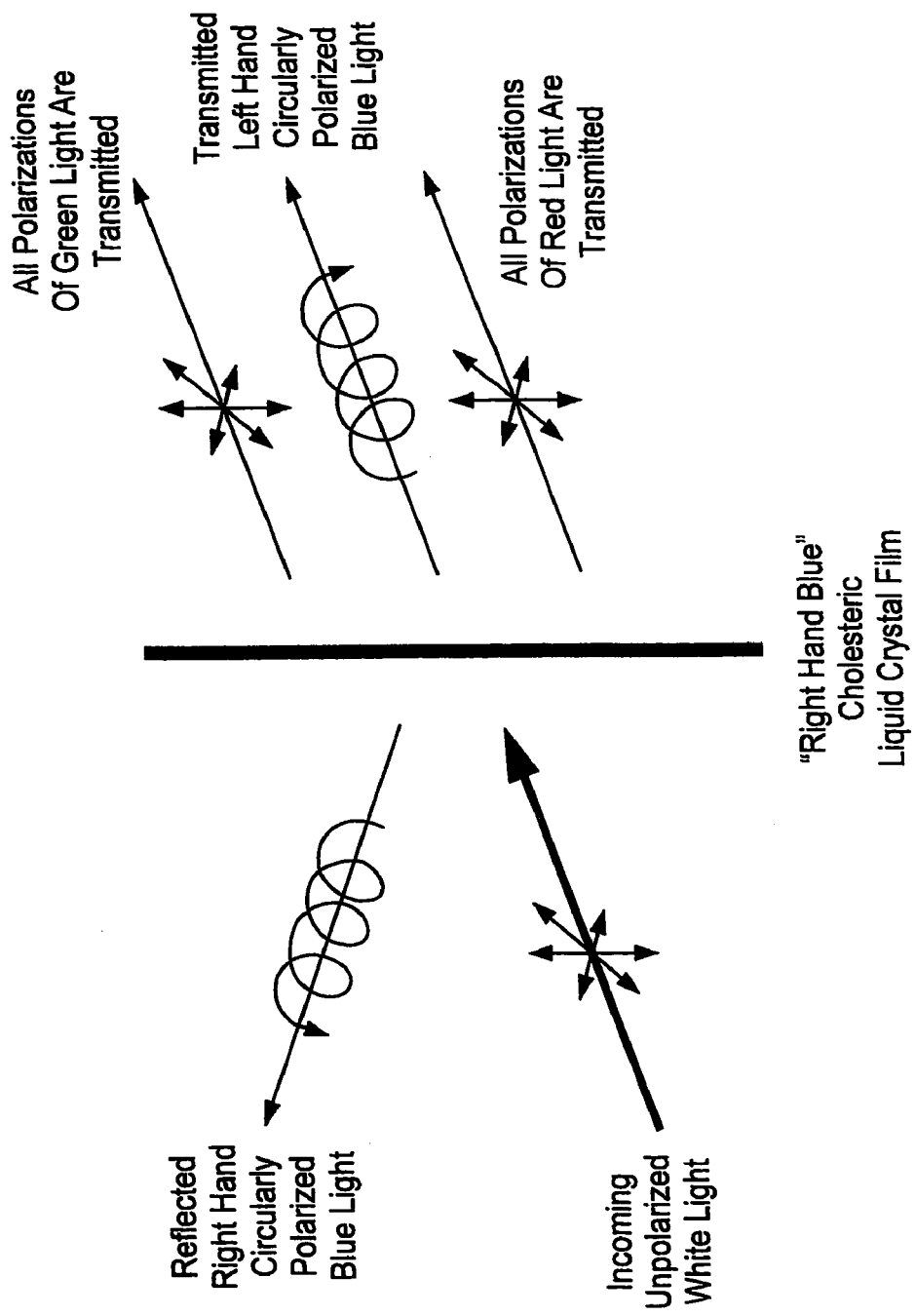
FIG. 77B is an illustration of interactions of unpolarized white light with a "right hand red" cholesteric film.

FIG. 77B illustrates the interaction of unpolarized white light with a layer of right hand, blue cholesteric. As shown, all red and green light is transmitted. Right hand blue light is specularly reflected and left hand blue light is transmitted.

Figure 77C:
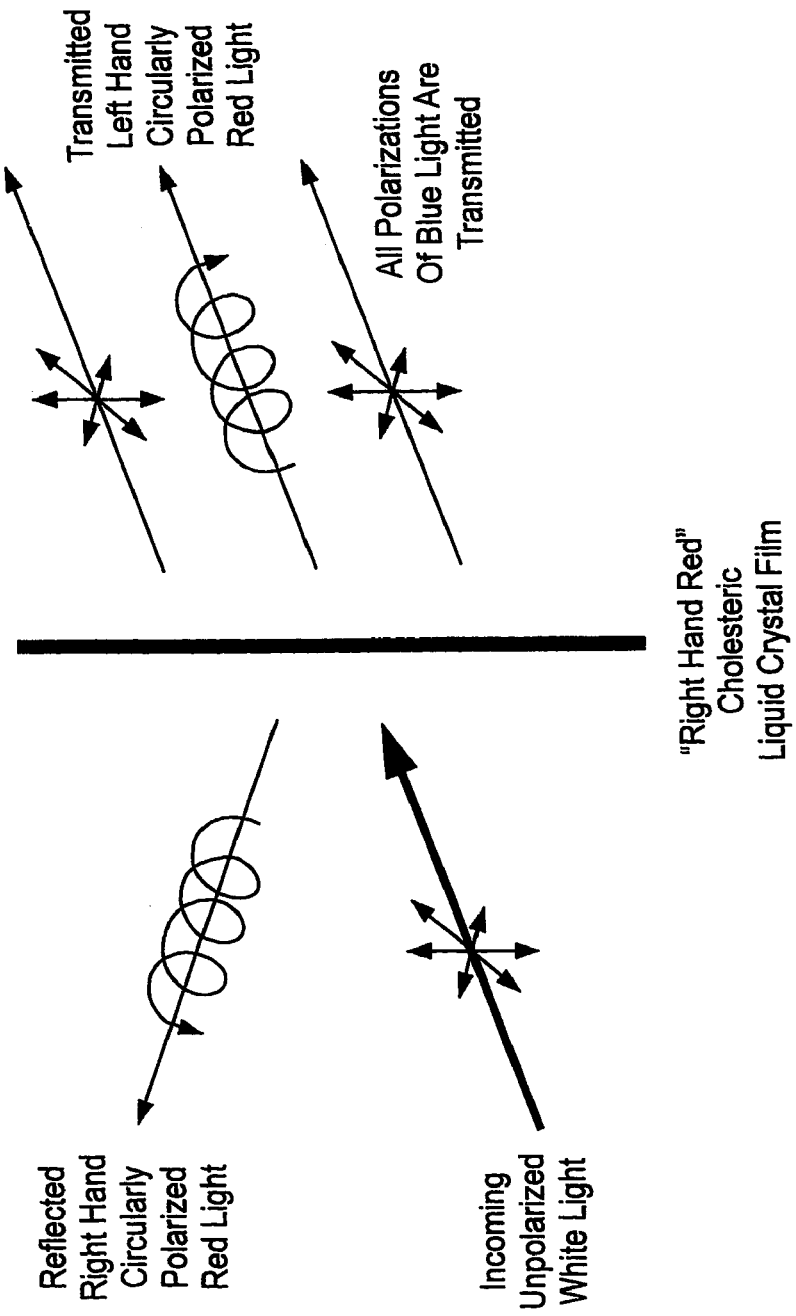
FIG. 77C is an illustration of interactions of unpolarized white light with a "right hand green" cholesteric film.

FIG. 77C illustrates the interaction of unpolarized white light with a layer of right hand, red cholesteric. As shown, all blue and green light is transmitted. Right hand red light is specularly reflected and left hand red light is transmitted.

Cholesteric layers can also be fabricated that are left-handed. In this case, left hand circularly polarized light within the appropriate bandwidth is reflected and right hand circularly polarized light is transmitted.

The cholesteric layer can be in any one of several physical forms. In the first form, the cholesteric is a fluid and must be contained between two substrates (the substrates can be cover glasses or the components in the prism assembly). The layer can also be made in the form of a polymer. It is even possible to utilize an encapsulated cholesteric in the layer.

Some current methods for producing the cholesteric layer include, for example:

A liquid precursor material is introduced into a cell (such as by vacuum filling) and then polymerized in place by exposure to UV light;

A liquid precursor material is doctor bladed onto a substrate and subsequently polymerized by exposure to UV light; and A liquid precursor material is spin coated onto a substrate and then polymerized by exposure to U light.

Figure 78:
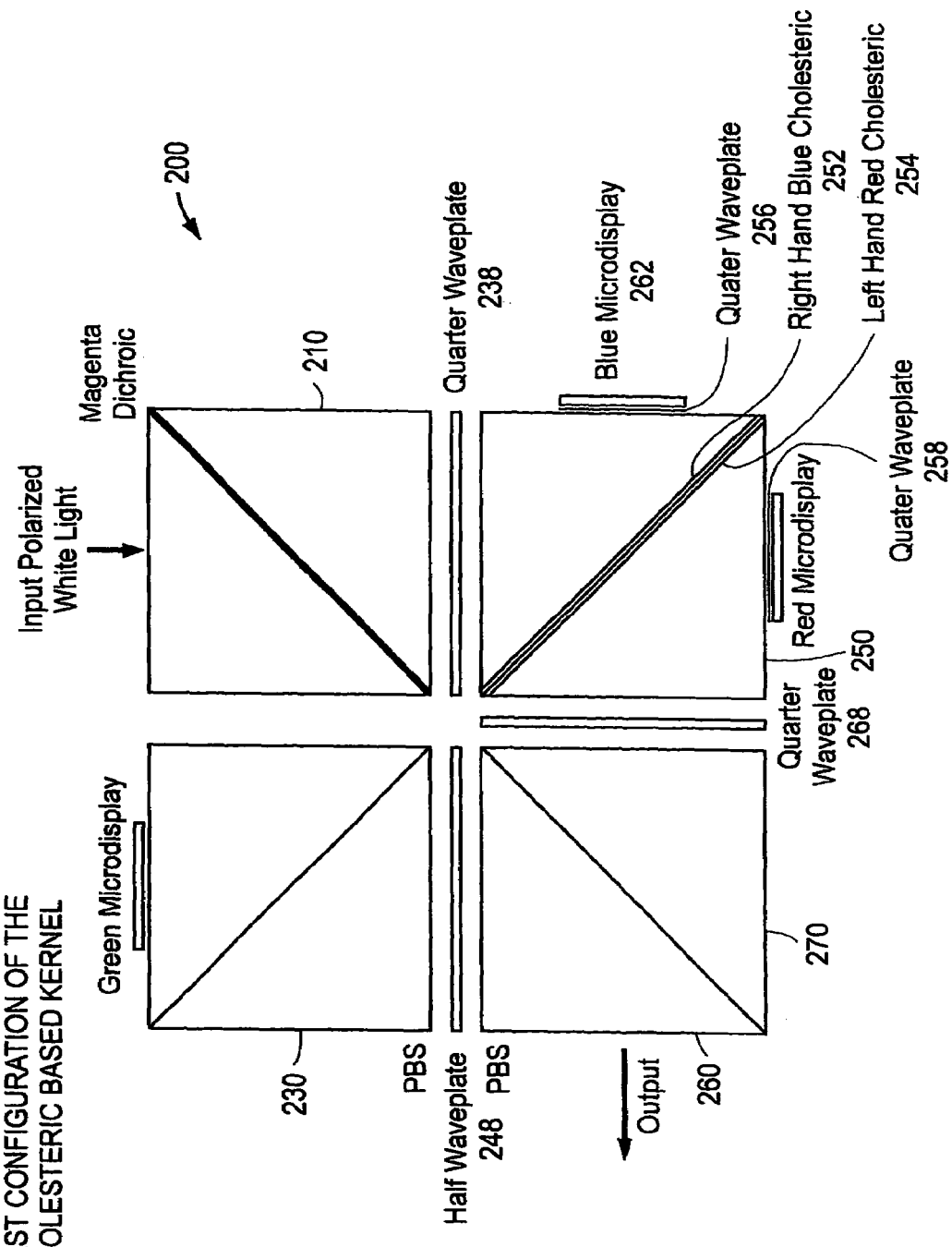
FIG. 78 is an example cholesteric based kernel according to an embodiment of the present invention.

FIG. 78 is an illustration of a new prism assembly 78200 configuration in which each component is named (the prism assembly plus the microdisplays is a kernel). The prism assembly 78200 includes 3 polarizing beamsplitters (PBSs) 78210, 78230, and 78270, and a cholesteric based beam splitter (cholesteric prism) 78250. Each of the beamsplitters and cholesteric prism perform a part of separating and/or combining, of the individual light paths in the prism assembly. Light entering the prism assembly is basically separated into green, blue and red light paths which are individually directed to corresponding green, red, and blue microdisplays, reflected off the microdisplays, and then combined to produce an output.

In one embodiment, the components of the prism assembly are set in pathlength matched positions. Pathlength matched may be described, for example, as light pathlengths between faces of the beam splitting components having microdisplays mounted thereon and a reference plane (e.g., exit face 78260, or a focal plane in a light management system in which the prism assembly is installed) are approximately equivalent. Thus, individual light beams of each of the separate light beams corresponding to a same image pixel once reflected off the microdisplays arrive at the reference plane at the same time. The prism components themselves are not precise enough, particularly in mass quantity production, to affirmatively bond the prism components directly together and end up with matched pathlengths in the prism. However, Berman et al., U.S. patent application Ser. No. 10/202,595, filed Jul. 24, 2002, entitled "Method and Apparatus for Configuration and Assembly of a Video Projection Light Management System", the contents of which are incorporated herein by reference in their entirety, describes construction of a pathlength matched prism assembly in which standard mass produced optical components may be arranged in pathlength matched positions (e.g., fixed to a plate or frame, and then spaces between the components are filled with an optical coupling fluid such as mineral oil or other commercially available index matching fluid). All of the devices and construction techniques described in the above referenced patent application may be applied to construction of prism assemblies with cholesteric based beam splitting devices.

In addition, individual beam splitting components of the prism assembly may themselves be constructed as pathlength matched beamsplitters. Construction techniques for beamsplitting devices is described in Detro, U.S. patent application Ser. No. 10/251,225, filed Sep. 20, 2002, entitled "Pathlength Matched Beam Splitter and Method and Apparatus for Assembly", the contents of which are incorporated herein by reference in their entirety. The techniques taught and devices described in the above referenced patent application and/or as also described herein are also applicable to the construction of a cholesteric based pathlength matched beam splitting device, such as cholesteric based beam splitter 250 (the polarizing element of the PBS being replaced with one or more cholesteric layers).

Figure 79:
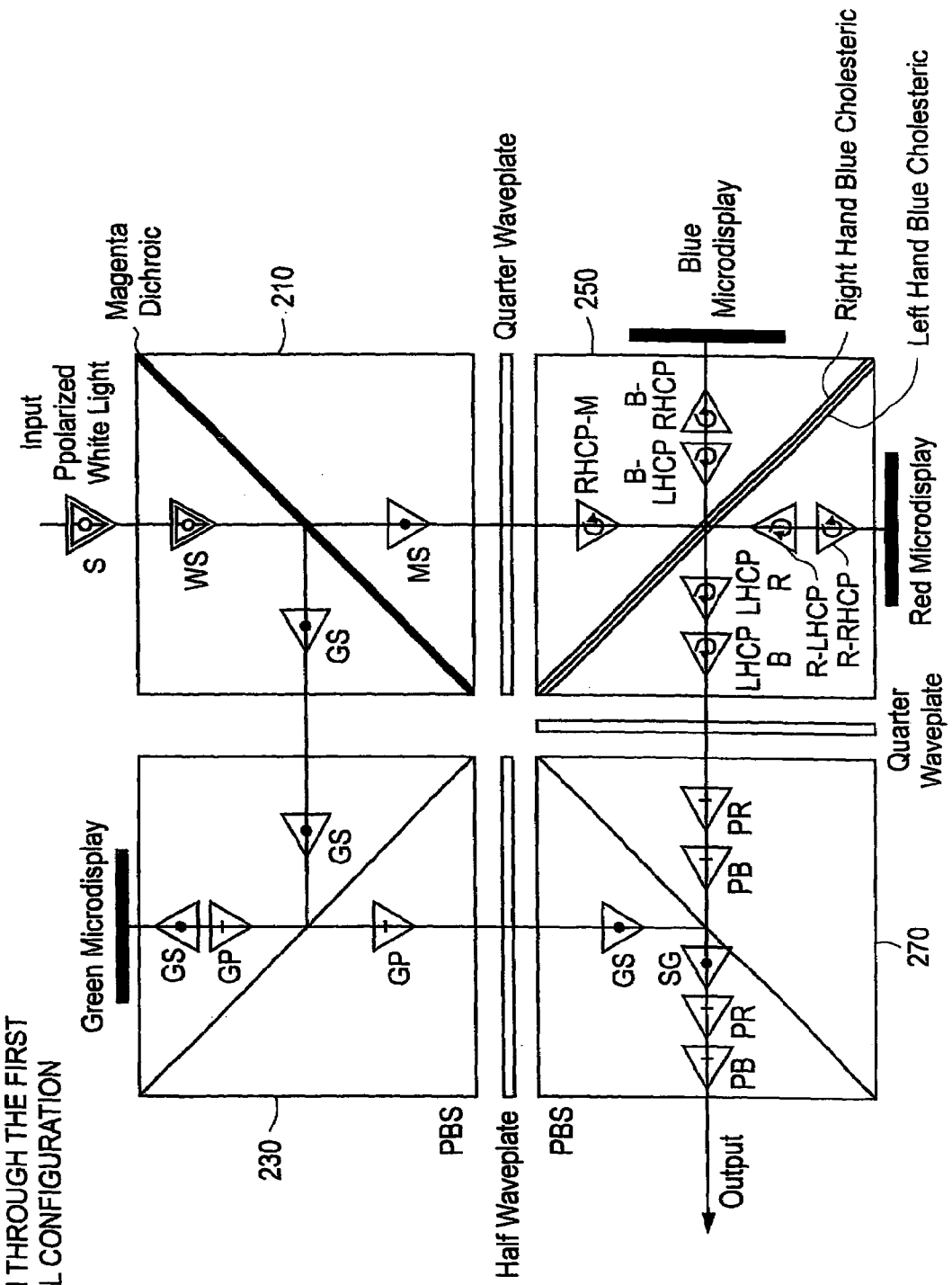
FIG. 79 is an illustration of lightpaths through the cholesteric based kernel shown in FIG. 78.

FIG. 79 illustrates the path and polarization of the light at each point within the first prism assembly configuration. PBS 79210 divides the input polarized white light into GS, green s-polarized, light and MS, magenta s-polarized light after passing through the magenta dichroic. Quarter waveplate 238 converts the MS light beam to circularly polarized light RHCP-M, right hand circularly polarized-magenta.

A blue component (B-RHCP) of the RHCP-M is reflected off the right hand blue cholesteric 79252 of the cholesteric based beam splitter 79250 toward the blue microdisplay 79262. Upon reflection by the blue microdisplay 79262, the quarter waveplate 79256 reconverts the blue component back to circular polarization (now left hand), B-LHCP, which then passes through both the right hand blue cholesteric 79252 and the red cholesteric 79254 toward the output (an additional quarter waveplate 79268 is inserted to convert the light beams back to linear polarization for output).

A red component, R-RHCP, of the RHCP-M passes both of the cholesterics 79252 and 79254 and interacts similarly with quarter waveplate 79258 and the red microdisplay 79264. Upon reflection by the red microdisplay, the red component (or red light beam), now left hand circularly polarized, reflects off the left hand red cholesteric directing it toward the output. Both the red and blue light beams are recombined with the green light beam in PBS 79270.

Orientation of the quarter waveplate 79238 determines whether the light is right hand or left hand circularly polarized (a 90 degree rotation of the physical orientation of the quarter waveplate 79238 changes the right/left handedness of the circularly polarized light emitted from the quarter waveplate 79238). In general, there are many different combinations of polarizations and orientations of the various components discussed herein may be utilized. What is needed is a consistent set of orientations, and the main point is to use cholesterics in combination with a selected polarization to direct a specific light beam to an appropriate device that processes the light (e.g., a microdisplay).

Figure 80:
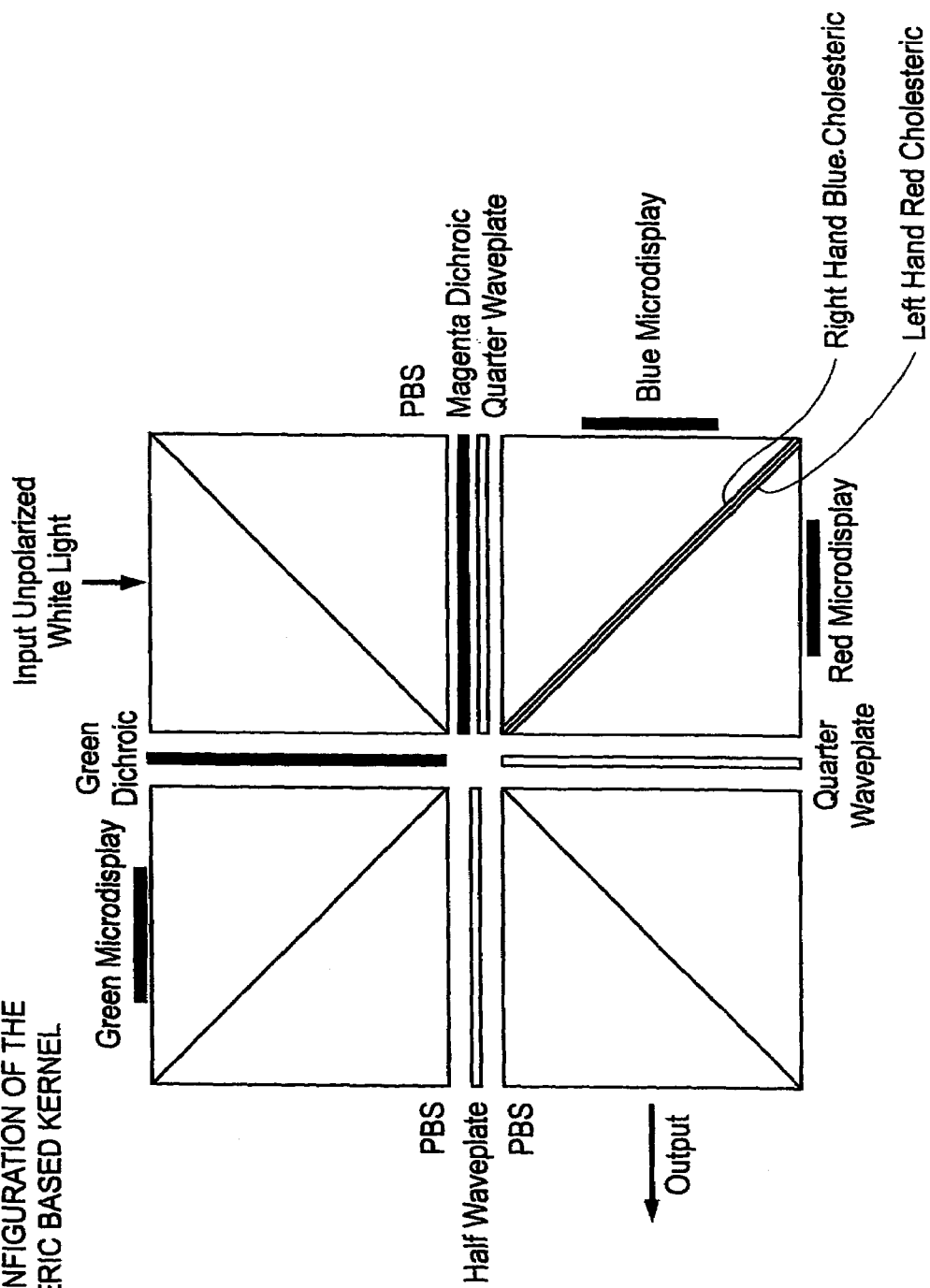
FIG. 80 is a second example embodiment of a cholesteric based kernel according to an embodiment of the present invention.
Figure 81:
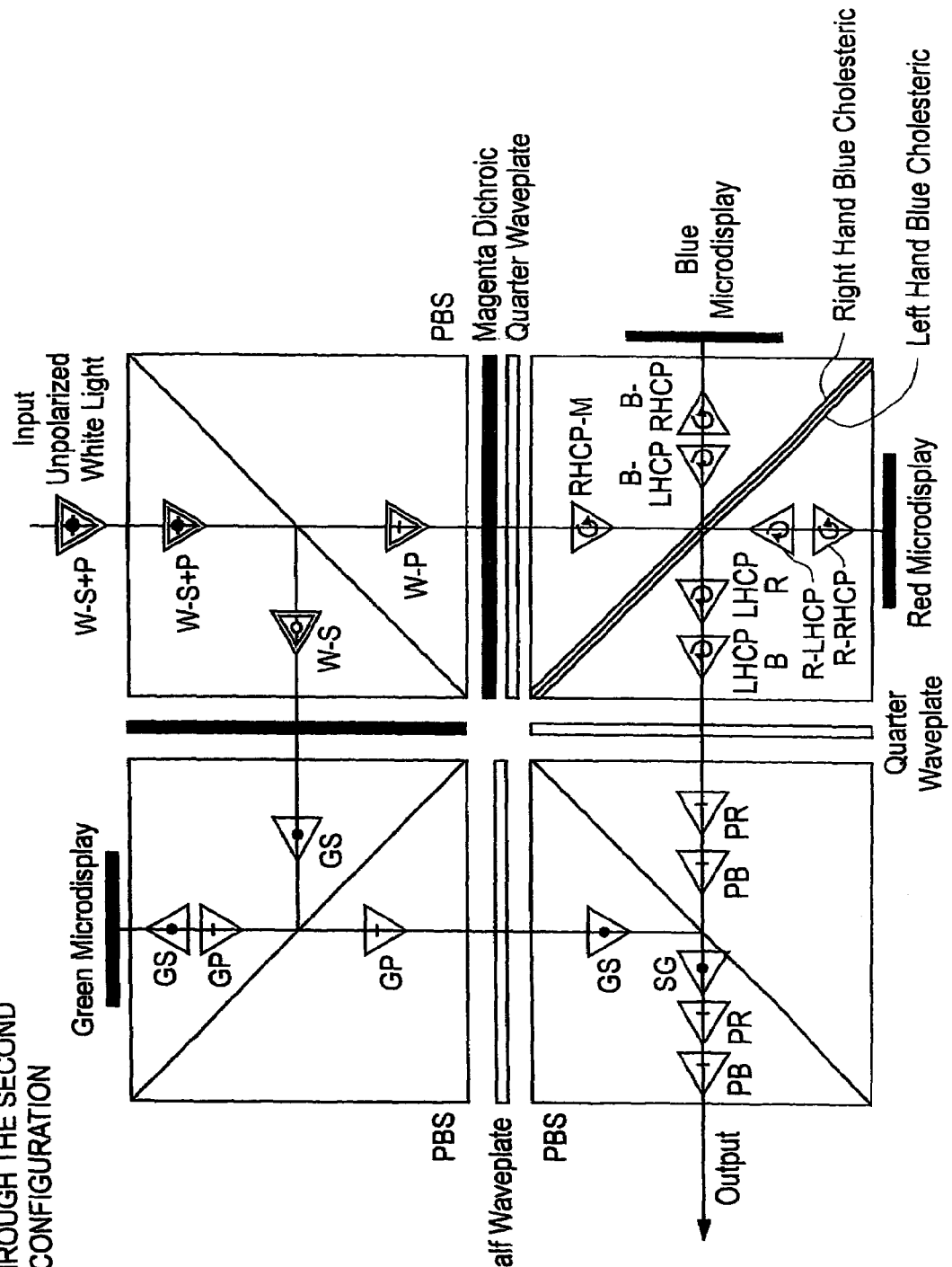
FIG. 81 is an illustration of lightpaths through the cholesteric based kernel shown in FIG. 80.

FIG. 80 is an illustration of another example prism assembly configuration. FIG. #81 illustrates the path and polarization of light at each point within the second prism assembly configuration.

Note that the illustrations indicate only the key optics in the configurations. The actual prism assembly may require additional components. More specifically, a "clean-up" polarizer can be inserted to S polarization path of the PBS to improve the contrast ratio. Preferably, this would be a reflective polarizer. In addition, "spacer glasses" can be inserted between any of the "cubes" to equalize the optical path lengths from the reflective surfaces of the microdisplays to the output face of the prism assembly.

Also note that the "joints" between the components in the optical path can be conventional, that is, a rigid adhesive. Alternately, the joints can be liquid filled as described elsewhere herein and in U.S. provisional patent application entitled "An Improved Configuration and Means of Assembling the Light Management System used in a Microdisplay Based Video Projector" submitted September 2001, and Berman et al., U.S. patent application Ser. No. 10/202,595, filed Jul. 24, 2002, entitled "Method and Apparatus for Configuration and Assembly of a Video Projection Light Management System". A further advantage of utilizing liquid filled joints is the possibility of reducing component count by eliminating the spacer glasses by adjusting the thickness of the liquid joints. Alternately, the gaps can be "filled" with air (possibly requiring anti-reflection coatings on exposed surfaces).

An additional configuration alternative available to both prism assemblies is to replace one or more of the PBS with a reflective polarizer oriented at 45 degrees (at this time, such reflective polarizers are produced by Moxtek, Inc.). Furthermore, the magenta dichroic in the second configuration can be a flat component oriented at 45° in air rather than illustrated cube structure. In both configurations it is possible to reduce part count by placing the dichroic films on adjacent prism component rather than placing them on separate components.

In both example configurations, the light output from the prism is linearly polarized but the green polarization direction is orthogonal to that of the red and the blue. In some video projector applications, such as those in which the screen contains a linear polarizer, it is desirable that all the light output by the prism be linearly polarized in one direction. This can be accomplished by placing a wavelength specific retarder in optical series with the output beam. (Such material is produced by ColorLink Corp and called a ColorSelect. It is a half waveplate in the green portion of the spectrum and a 0 or 1 lambda retarder in the red and blue portion of the spectrum.)

Note that configurations can be adjusted so that the prism assemblies can accept not only unpolarized input light but also light that is either linearly or circularly polarized. This is accomplished by the placing an appropriate waveplate at the input to the kernel.

A comment related to the cholesteric layer. Since the nominal light ray is incident on the cholesteric layer at 45 degrees, the center wavelength of the cholesteric ($\lambda$max) should be chosen such that the shift towards the blue places the reflective/polarizing band of the cholesteric at the desired portion of the spectrum.

Figure 82:
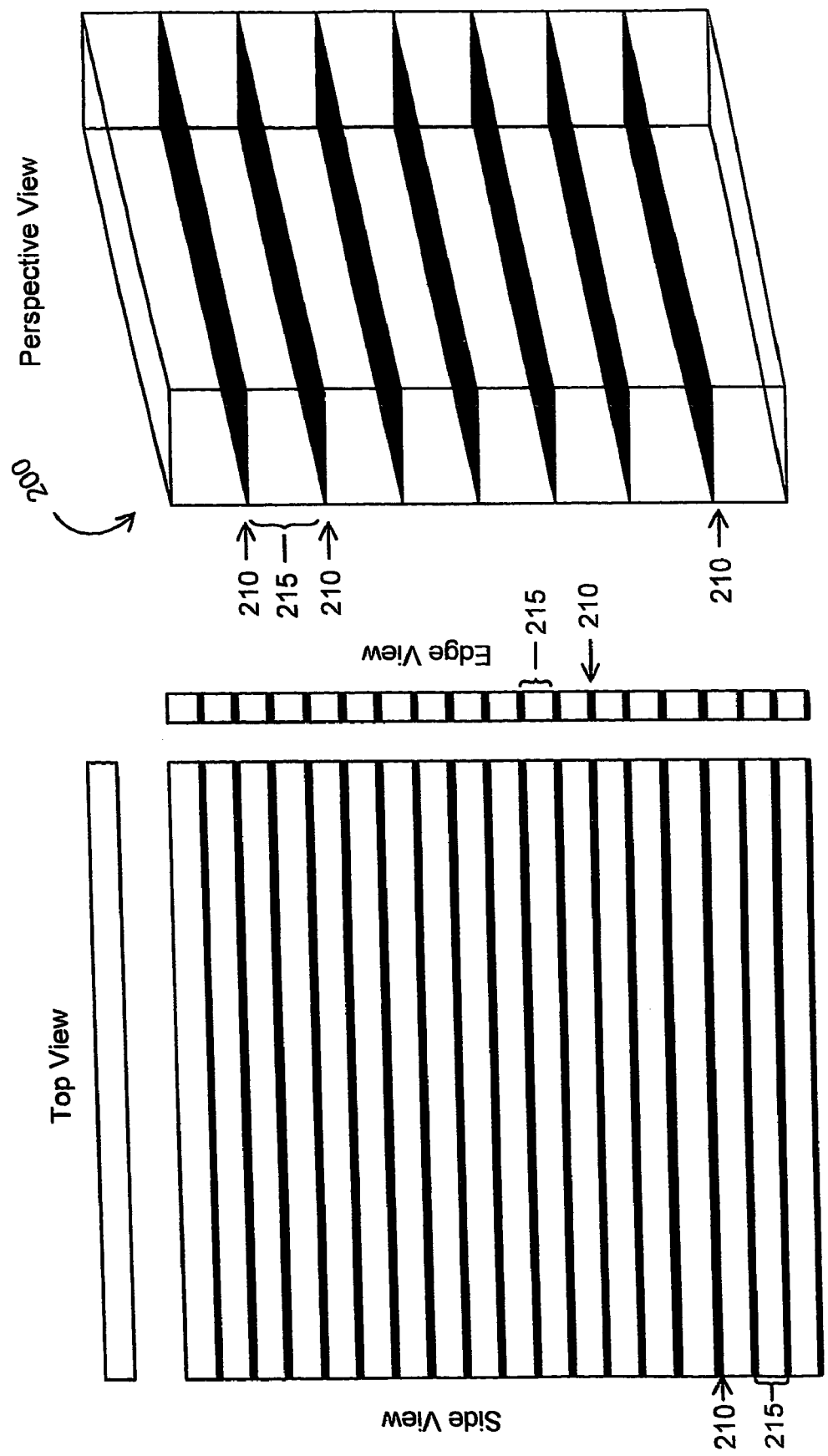
FIG. 82 is an illustration of a stray light suppressing component according to an embodiment of the present invention.

A configuration of a stray light-suppressing component 82200 is illustrated in FIG. 82 using perspective, top, side, and edge views. The stray light-suppressing component 82200 is composed of a series of parallel, absorptive louvers 82210. Spaces, or layers, between the louvers 82210 are transparent.

Figure 83:
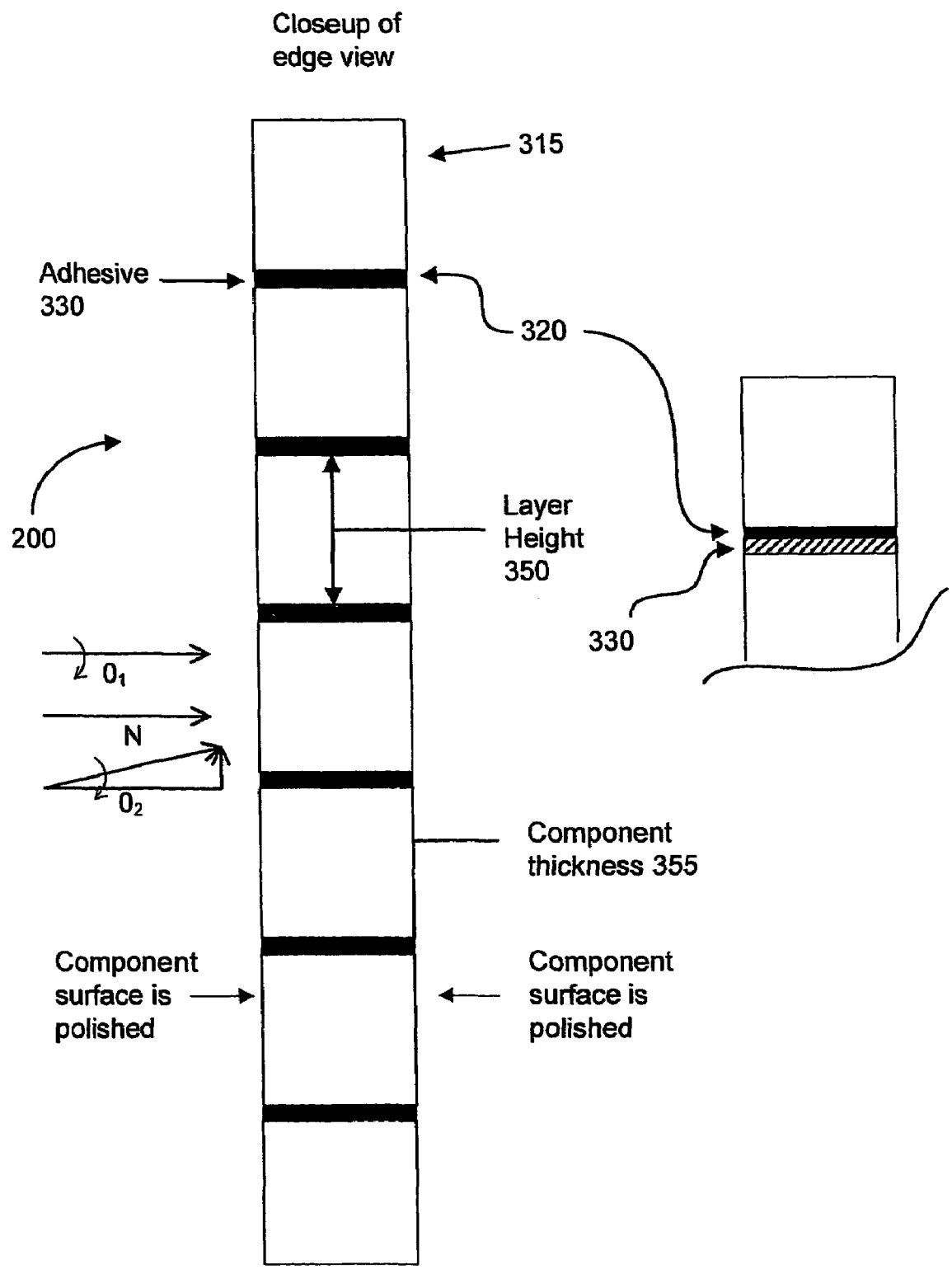
FIG. 83 is an illustration of a close up of an edge view of the stray light suppressing component according to an embodiment of the present invention.

FIG. 83 is an illustration of a close up of an edge view of the stray light suppressing component according to an embodiment of the present invention. As shown in FIG. 83, the stray light-suppressing component 83200 is composed of a stack of transparent layers 83315. The transparent layers 83315 are, for example, constructed of glass or another suitable transparent material (e.g., plastics, clear crystal, etc.). One long surface of each strip is coated with a visible light absorbing (black) thin film 83320. The strips are bonded together with an adhesive 83330 such that the louvers are parallel to each other and perpendicular or parallel to the other surfaces of the component.

The construction of the component is such that:

Light rays impacting at a right angle (normal N) to the component are transmitted at substantially 100%.

Light rays impacting at an off axis angle (e.g., $O_1$) are transmitted at substantially 100% if the projection of the impact vector is parallel to the louvers.

Light rays impacting at an off axis angle (e.g., $O_2$) will undergo attenuation if the projection of the impact vector has a component that is perpendicular to the louvers. The extent of the attenuation increases with the size of the perpendicular component.

FIG. 84 illustrates one technique by which the stray light-suppressing component can be fabricated. The starting materials are, for example, sheets of glass. The layer height is determined by the thickness of the glass sheets.

Step 1: One side of each sheet is coated with a "black" thin film coating. One such coating is the black chrome thin film "mask" material offered by Thin Film Devices Corp. located in Anaheim, Calif. Other thin films having absorption may also be utilized.

Step 2: A stack of sheets is the bonded together using an adhesive.

Step 3: The stack is cut into thin strips.

Step 4: The cut surfaces are polished.

Note that the light-blocking layer is so thin that little light loss is associated with the fill factor. In addition, the component is installed within a prism assembly/kernel in a position such that it is not near a focal plane of the prism assembly/kernel. As a result, the slight structure of the absorptive louvers in the stray light-suppressing component will not be apparent in the projected image.

The glass strip layer height 83350 and component thickness 83355 determine a relationship between light attenuation and impact angle. To illustrate this point consider the following example. Light rays traveling through a typical LCoS kernel might have an f-number of about 2.5 If the prism is made of glass with an index of refraction of 1.7, then [and] the half angle of the ray bundle is on the order of 6 degrees. The layer height of the component is likely to be determined by choice of a common glass thickness (e.g., LCD glass), which, for example, is 1.1 mm. If the component is cut to a thickness of 1.0 mm then light impacting the component normally is transmitted essentially 100%. Light rays at an extreme edge of the ray bundle impact at an angle of 6 degrees. If oriented in the unfavorable direction with respect to the louvers, 91% will be transmitted. All light impacting the component at an angle greater than 6 degrees is stray light. Such rays, when in the unfavorable orientation, are absorbed to a progressively greater degree as the impact angle goes up. For example, at an impact angle of 30 degrees the transmission is 48%. Therefore, stray light rays are preferentially absorbed.

Next, consider a prism assembly/kernel in which a stray light-suppressing component is included and that has the "louvers" (thin film) oriented horizontally. In this case, stray light rays are suppressed that have projections in the vertical plane. Stray light rays with projections in the horizontal plane are not affected. One way to address this deficiency is to combine multiple stray light suppressing components.

Figure 85:
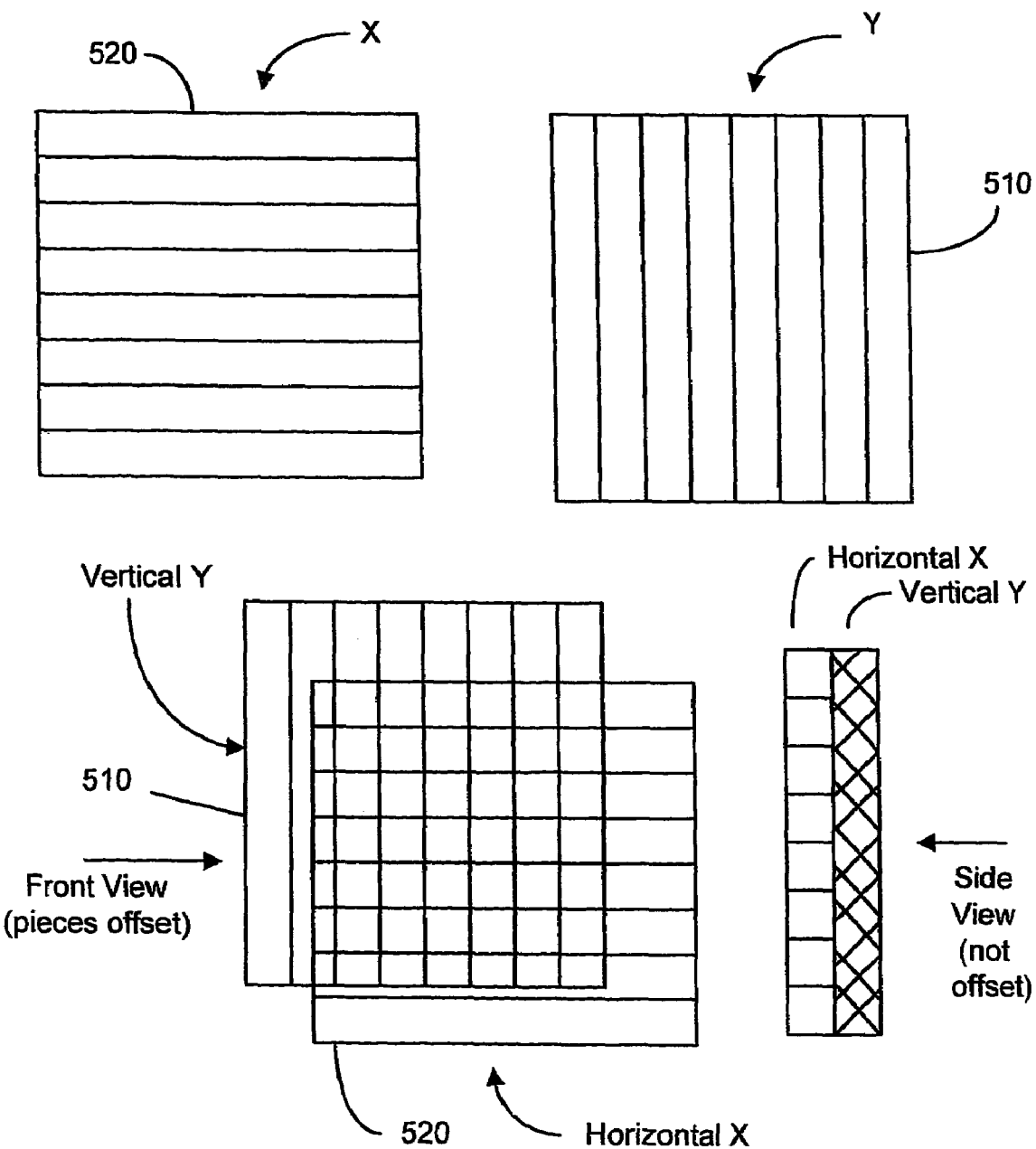
FIG. 85 is an illustration of a horizontally oriented louvered stray light suppressing component and a vertically oriented louvered stray light suppressing component according to an embodiment of the present invention.

When combining stray light suppressing components, any number of individual components may be oriented at a variety of angles. Preferably, two stray light suppressing components are utilized and oriented at 90 degrees to each other. For example, in a first component the louvers are oriented vertically while in a second component the louvers are oriented horizontally. In this way stray light rays with any orientation are suppressed. In one embodiment, the two components, stray light-suppressing component with horizontally oriented louvers 85520 and a stray light-suppressing component with vertically oriented louvers 85510 are placed in close physical proximity as illustrated in FIG. 85.

The present invention includes the substitution of "unused," or spacer components in existing optical designs with a stray light-suppressing components. To match design requirements of current prism assemblies, the combined multiple stray light suppressing elements may be constructed of thinner dimensions (e.g., x and y louvered glasses of 0.5 mm [component] thickness each), which are combined and then inserted in place of, for example, a 1 mm thick spacer glass in an existing design. In some cases, the spacer glass in the existing design may also function to hold an additional thin film layer (e.g., polarizer, dichroic, filter, etc.). A similar additional thin film may be coated onto one of the polished surfaces of the stray light-suppressing component.

However, 0.5 mm glasses are more brittle and difficult to work with when employing labor to construct prisms and/or kernels in a factory environment. Furthermore, simply making the glasses thinner also reduces the thickness of each louver and increases the angle at which stray light is attenuated by the louvers (therefore reducing the amount of stray light reduced and/or eliminated). An alternative design and construction technique is now discussed. Thin film is deposited on 0.5 mm thickness glasses. The glasses are stacked and glued together similar to the process discussed above. The stacked glasses are cut into louvered glass pieces of approximately 1 mm component thickness, also similar to that discussed above. One side of each of the cut glass pieces are polished. Next, two pieces of the approximately 1 mm thickness louvered glass pieces are glued together at the polished sides with the louvers at 90 degrees, forming a cross hatched "louvered" glass. Finally, each of the outside sides of the cross hatched "louvered" glass are polished. Polishing of the outside sides of the cross hatched "louvered" glass continues until the cross hatched "louvered" glass is the desired thickness (1 mm in this example).

The result is a louvered cross hatched glass of the desired thickness. Individually, the louvers are ½ the thickness of the louvers described in the first construction technique. However, the louvers are also ½ the distance apart. Mathematically, the amount of stray light absorbed, reduced, and/or eliminated is therefore essentially the same as that using the first construction technique. The desired thickness glass is produced, and the production process (and subsequent assembly of the prisms/kernels) do not need to make special arrangements for the thinner and more difficult to work with glass. And finally, again, the optical pieces produced will fit into exiting prism/kernel configurations. Using similar techniques, louvered optical pieces/components of nearly any dimensions may be produced to fit other existing or proposed designs.

Figure 86:
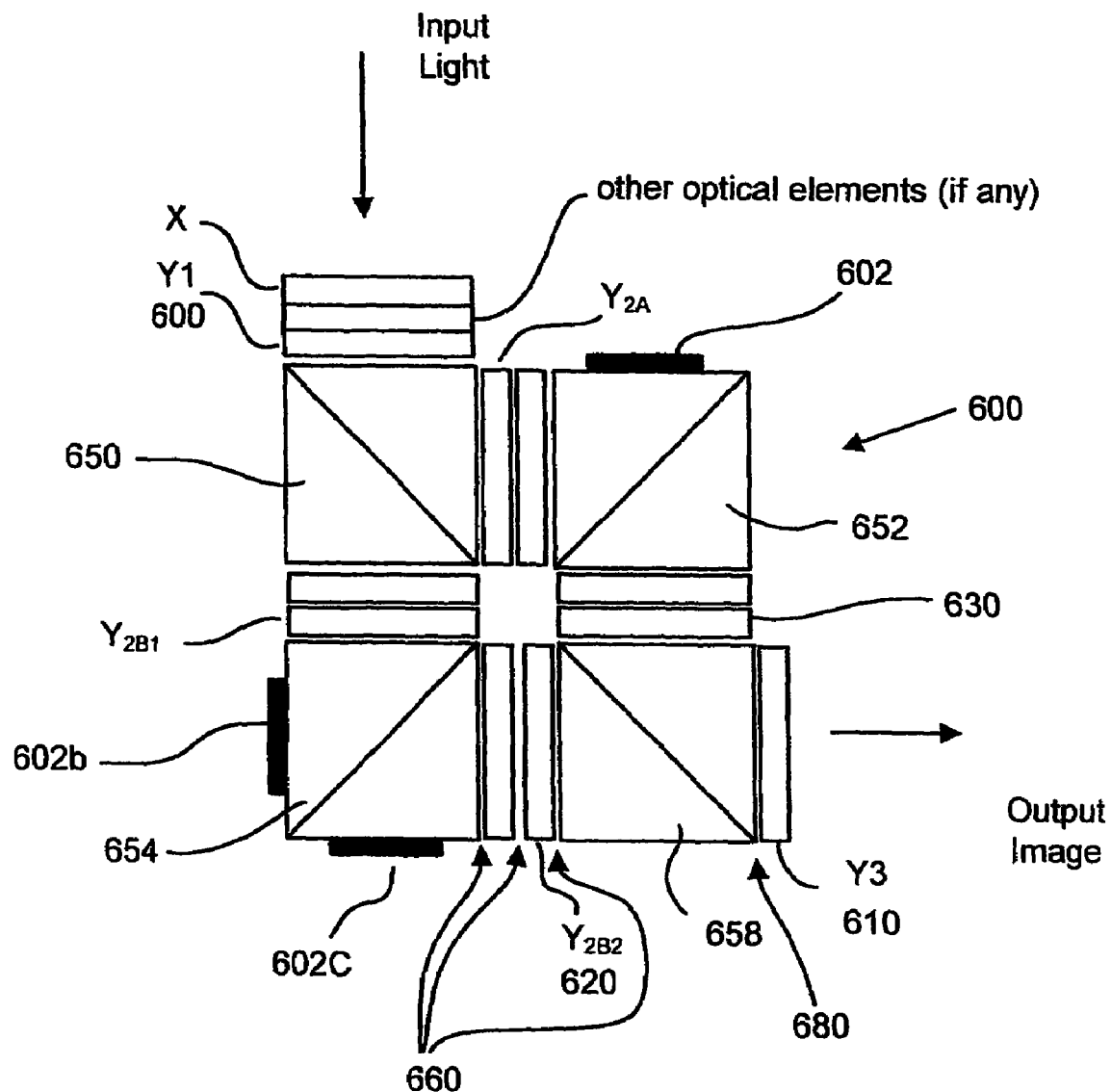
FIG. 86 is an illustration of placements of stray light suppressing components according to various embodiments of the present invention.

Turning now to placement of the stray light suppressing components within a prism/kernel, the stray light suppressing components are located at separate locations within the prism assembly/kernel (not necessarily touching or in close proximity to each other). The stray light suppressing components may also be placed at locations external to the prism assembly/kernel for similar stray light suppression purposes. For example, FIG. 86 illustrates several possibilities for locating horizontal (x) and vertical (y) louvered stray light suppressing components at different locations in and around a kernel of a projection system. Note that some of the proposed possibilities utilize more than 1 horizontal and/or vertical louvered stray light suppression component because placement of the components are in a light path that has been split (e.g., proposed possibilities 2 and 3). Proposed possibility 4 has both the x and y positions external to a prism assembly of kernel 86600. Note that the x and y positions may be swapped and that many other locations for each of the components is possible.

Some additional notes regarding the proposed possibilities. The locations of the louvered glasses may be, for example, at locations that would otherwise contain spacer glasses. For example, in some designs using the configuration of FIG. 86, several of the optical elements serve only as spacers. Therefore, the louvered glasses can replace one or more of the spacer locations (e.g., in at least one design, spacer glasses were replaced with louvered glasses in either of Y2B1 and Y2B2 positions of FIG. 86).

Further, it should be understood that reflections and orientations of a particular prism/kernel design may transform a Y oriented stray light into an X oriented stray light. Therefore, when placing a Y louvered glass into a particular prism design, it may need to be oriented in other than the Y direction with reference to X louvered glasses placed in the same design. Said another way, the X and Y louvered glasses preferably absorb oppositely (or at least differently) oriented stray light regardless of how the glass pieces themselves are oriented within the particular prism/kernel design.

In yet other alternatives, glass pieces having a specific functionality other than merely spacing may be replaced with louvered glass having the same specific functionality in addition to the "louvers." For example, in at least one design, at position Y2A, a green dichroic is replaced with a green dichroic having "louvers." This type of dual functionality optical element (louvered+dichroic in this example) may be produced in the manner described above, with an additional step of adding an additional optical coating (green dichroic coating in this example).

In yet other alternatives, the louvered glasses may be placed in what might otherwise be considered redundant locations (note that redundant louvered glasses are acceptable, and may be needed, depending the sensitivity of a system to stray light, and consideration of other design factors, cost, etc.). For example, X or Y louvers may be placed at both of positions Y1 and Y3. The louvered positions closer to the entrance of the kernel eliminate or reduce stray light from entering the kernel, and louvered glasses nearer the output of the kernel reduce or eliminate stray lights that occur as a result of spurious reflections and other anomalies within the kernel. Louvered pieces positioned within the kernel split the difference between suppressing stray light into the kernel and correcting stray light exiting the kernel, or, said another way, reduce or eliminate stray light that has either entered the kernel or occurring in the kernel prior to the louvered pieces, and may be utilized alone or in conjunction with input and output positioned louvered pieces. In yet another alternative, a first cross-hatch "louvered" glass is inserted in a kernel design along with a second cross-hatched "louvered" glass at a different orientation. Again, many different configurations and combinations of the louvered glasses may be utilized. Preferably, all light passing through the system is affected by at least one of each of the x and y louvered glass pieces.

Although the above describes placement of either x or y oriented louvered glass, cross hatched louvered glasses (e.g., as discussed in the second described construction technique above) may be substituted in any of these or other locations in the prism/kernel. The cross hatched louvered glasses are preferably placed at locations 86620 and 86630 in kernel 86600. It may also be useful to place a cross hatched louvered glasses at either one or more of locations 86610 and 86600 as well. Note that the cross hatched louvered glasses may also be prepared as dual function optical components if needed (e.g., cross hatching plus a dichroic layer).

Although described mainly with reference to prism assembly and kernel designs, the louvered glass described herein may be applied in numerous other optical devices to suppress stray light. The present invention is particularly well suited for use in light management systems, for example, as part of a kernel 86600 as illustrated in FIG. 86.

Kernel 86600 comprises a prism assembly and 3 microdisplays 86602a, 86602b, and 86602c. The prism assembly itself is, for example, composed of 4 main optical components (beamsplitters) 86650, 86652, 86654, and 86658. Each beamsplitter comprises, for example, 2 triangular (of approximately equilateral dimensions) prisms abutted at their diagonals and a beamsplitting layer disposed between the diagonals. The exterior shape of the prism assembly is a cube.

In one embodiment, the main optical components of the prism assembly (e.g., beam splitters and optical elements such as Y2A) are liquid coupled. The beam splitters are set, for example, in prism assembly pathlength matched positions with joints (e.g., joints 86660) between the beamsplitters. The joints are filled with liquid (e.g., an index matching fluid). A frame and/or a mounting plate in conjunction with an adhesive or other seal maintains the fluid within the prism assembly. Optical flats such as ColorSelects (e.g., a product by ColorLink Corporation), dichroics, wavelength specific retarders, if needed for the prism assembly design, may also be inserted into the joints and immersed in the index matching fluid.

The beam splitters each comprise 2 prisms abutted on their diagonals and set in beamsplitter pathlength matched positions. A beam splitting layer is disposed on one or both of the diagonals. The beam splitting layer may be any of, for example, a polarizing beam splitting thin film (a PBS beamsplitter), a single color cholesteric layer, two cholesteric layers of different colors (Cholesteric based Beam Splitters—CBSs), a dichroic layer, or any other material that can perform beam splitting.

Pathlength matched prism assemblies may be described, for example, as prism assemblies where light pathlengths between faces of the beam splitting components having microdisplays mounted thereon and a reference plane are equivalent. For example, pathlength distances from any of the microdisplays 86602a, 86602b, or 86602c, to a reference plane (such as exit face 86680, or an intermediate focal plane) are equivalent. Thus, individual light beams in each of the separately colored light beams corresponding to a same image pixel once reflected off the microdisplays arrive at the reference plane after traveling the same distance. And, since the pathlengths within the prism are matched (a pathlength matched prism assembly), distances traveled within the prism by the light beams reflected from the microdisplays are also the same.

One or more of the beamsplitters in a prism assembly or kernel may be a cholesteric based beamsplitter(s). Several embodiments of cholesteric based beam splitters are described in Berman, U.S. patent application Ser. No. 10/646,291 entitled "Prism Assembly With Cholesteric Reflectors" filed Aug. 22, 2003, and Berman and Detro, U.S. patent application Ser. No. 10/816,996 entitled "Advanced Prism Assemblies and Prism Assemblies With Cholesteric Reflectors" filed Apr. 2, 2004, the contents of each are incorporated herein in their entirety. Projectors built using any of the kernel designs described above, variations of the kernel designs described above, and/or kernel designs in any of the referenced patent applications may be fitted with a transmissive LCD as described in Berman, U.S. patent application Ser. No. 10/844,071, entitled "Method and Apparatus to Increase the Contrast Ratio of the Image Produced by a LCoS Based Light Engine," filed May 12, 2004, the contents of which are incorporated herein. The transmissive LCD is inserted in a lightpath of a video projector and is configured to darken pixels in the lightpath. The darkened pixels are, for example, pixels that will be or pixels that have already been modulated (e.g., brightness and color modulation via LCoS microdisplays). The transmissive LCD is positioned, for example, at an output of the kernel.

In one embodiment, higher order waveplates cut and arranged as disclosed in Berman et al., U.S. patent application Ser. No. 10/371,835 entitled "Method And Apparatus For Use And Construction Of Compensated Higher Order Waveplates" filed Feb. 20, 2003, are utilized. The higher order waveplates however, have been cut and arranged with an absorptive thin film as described above.

In one embodiment, the present invention utilizes two higher order waveplates utilized to suppress stray light and produce a retardation waveplate. The higher order waveplates include a first higher order waveplate having vertically arranged louvers, and a second of the higher order waveplates 87710 which includes horizontally arranged louvers. Each of the higher order waveplates being a retarder material and each having a principle axis of retardation. The substrates are bonded together with their corresponding principle axes of retardation at right angles with respect to each other. The retardation values of the waveplates differ by a desired amount of wavelength retardation (e.g., a ¼ wavelength difference ($\lambda/4$) in retardation values produces a ¼ waveplate at $\lambda$). The axes being at right angles cause the base retardation effects of each substrate to cancel out, leaving the difference which shows up as a resultant amount of retardation. The vertical and horizontal louvers suppress stray light as discussed above. In other embodiments, the thicknesses of the waveplates are adjusted, thereby adjusting the retardation values of the waveplates, to produce waveplates of other retardation values.

FIG. 87 illustrates a compensated higher order waveplate 700 constructed of two substrates (substrate #1 87710 and substrate #2 87720). Each of the substrates being a retarder material and each having a principle axis of retardation. The substrates are bonded together with their corresponding principle axes of retardation at right angles with respect to each other. The retardation values of the waveplates differ by a desired amount of wavelength retardation (e.g., a ¼ wavelength difference (λ/4) in retardation values produces a ¼ waveplate at λ). The axes being at right angles cause the base retardation effects of each substrate to cancel out, leaving the difference which shows up as the resultant retardation. In addition, substrates 87710 and 87720 are constructed to have louvers, and, when the substrates are fixed together with their principle axes of retardation at 90 degrees with respect to each other, the louvers are oriented at an angle with respect to each other. In one embodiment, the louvers are oriented at 90 degrees with respect to each other.

The substrates are preferably a birefringent material, meaning that they have two principal axes of retardation. In birefringent material, the principle axes are typically called the fast (main) axis and the slow axis. The axes relate to the molecular structure of the substrate material. In quartz crystal, the fast and slow axes are perpendicular to each other. The substrates are constructed by cutting slabs from quartz crystal material so the molecular axes are in defined directions. For example, in FIG. 87, Substrate #1 87710 illustrates a fast axis (+) pointing east and a slow axis (−) pointing north. Substrate #2 87720 illustrates a fast axis (+) pointing north and a slow axis (−) pointing east. Thus, the respective axes of retardation of the substrates (87710 and 87720) are bonded together at right angles forming a compensated higher order waveplate (the fast axis of substrate 87710 is oriented at a right angle to the fast axis of substrate 87720, and the slow axis of substrate 87710 is oriented at a right angle to the slow axis of substrate 87720). An alternative way of describing the bonded substrates is that the fast axis of one substrate is parallel to the slow axis of the other substrate.

Example: at 589 nm (in green light) the ordinary index of refraction of quartz $N_O$=1.553 and the extraordinary index $N_e$=1.544. Therefore the birefringence at 589 nm, $\Delta N$=0.009. The thickness of a 40λ waveplate is then 0.644 mm and a 40¼ waveplate is 0.655 nm. Therefore, a compensated higher order ¼ waveplate produced by combining the 40λ and 40¼ waveplates would be 1.299 mm. The selection of a specific base retardation value of 40λ is arbitrary as far as functionality is concerned. The 40λ base retardation was chosen because the thickness of the resulting compensated waveplate would be convenient to handle during assembly of an optical device (e.g., kernel) using the compensated waveplate. Furthermore, estimates have determined that such a waveplate is also affordable. This example specifically targets green light and results in a ¼ waveplate at the target wavelength, 589 nm, and slightly more or less at other wavelengths. Other indexes, birefringence, and thickness may be applied in various ways to produce similar effects at different wavelengths.

The substrates 87710 and 87720 are fitted together via an adhesive, preferably an optical adhesive, such as an epoxy or UV cured adhesive. Although the present inventors primarily envision the invention to be constructed using an optical adhesive, any other method of coupling the substrates may be utilized. For example, in one embodiment (e.g., see FIG. 88A), substrates 88805 and 88810 are coupled by an optical coupling fluid 88815. To couple the substrates with optical coupling fluid, adhesive 88320 secures a perimeter of the substrates, and the optical coupling fluid is injected between the waveplates. A fill hole through the adhesive (not shown) is utilized to inject the optical coupling fluid. Alternatively, surfaces of the substrates are whetted with the optical coupling fluid, placed together, and then adhesive is applied to seal in the fluid.

In another embodiment (see FIG. 88D), the substrates 88805 and 88810 are fitted into a frame (e.g., frame 88840). The frame secures parallelism of the surfaces of the substrates. An adhesive placed in the frame secures the substrates to the frame. Space between the substrates 88850 may be an air gap, or filled with optical coupling fluid. Adhesive 88820 seals the space between the substrates for the liquid filled embodiments (alternatively, frame pieces may be glued in positions across the gap to seal the fluid between the substrates).

Liquid coupling has an advantage of reduced stress, particularly in a central area of the substrates but may increase production costs. Some techniques for utilizing optical coupling fluid are described above and, for example, in Berman et al., U.S. patent application Ser. No. 10/290,867, entitled "METHOD AND APPARATUS FOR PACKAGING OPTICAL ELEMENTS" which is incorporated herein by reference in its entirety.

Thus, using the above example with reference to FIG. 87, the stray light suppressing compensated higher order waveplate 87700 operates as a quarter waveplate and suppresses stray light. Since the corresponding principle retardation axes of the substrates 87710 (40λ waveplate, e.g. an nλ waveplate where n=40) and 87720 (40.25λ waveplate, e.g., an (n+Δ)λ waveplate where n=40 and Δ=0.25) are at right angles, as light passes through both substrates, the effect is an optical subtraction that results in a quarter wavelength retardation (40.25−40=0.25). Any combination of base retardation values nλ (40λ in the example) may be utilized (e.g., 10λ, 20λ, 30λ, 50λ, 60λ, in whole numbers or fractional values, etc.).

The selection of a base retardation value is made so that the final thickness of the compensated higher order waveplate is suitable for any physical requirements or preferences of either a device being constructed, a manufacturing process, or other factor(s) affecting, for example, the design or dimensions of the device. Furthermore, if convenient, more than two substrates may be combined, so long as the resultant optical subtraction results in the desired amount of wavelength retardation.

Figure 89:
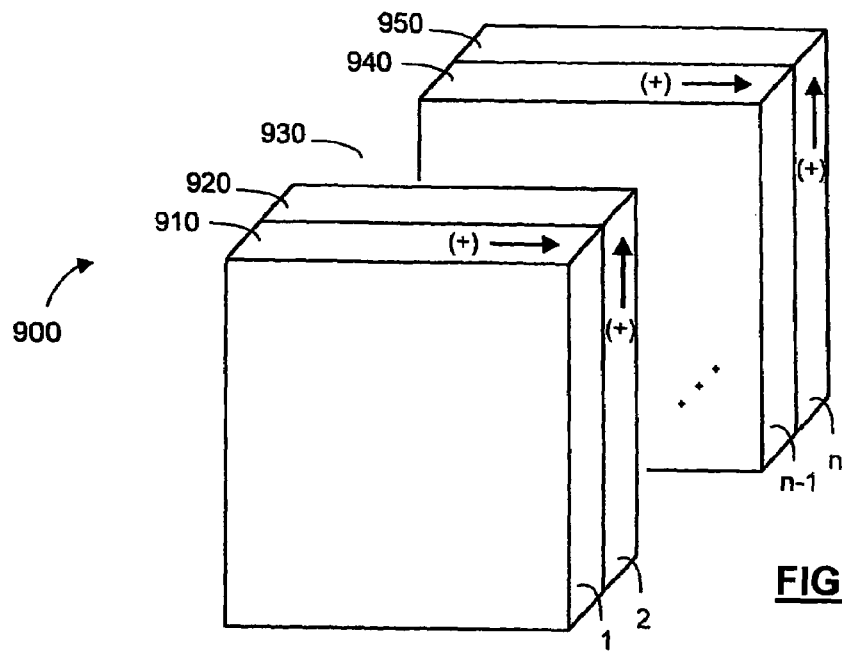
FIG. 89 is an example of a compensated higher order waveplate using n substrates arranged according to an embodiment of the present invention.

FIG. 89 is an example of a compensated higher order waveplate 89900 using n substrates arranged according to an embodiment of the present invention. Substrate 1 89910 is shown with a first principle fast axis of retardation (+), and substrate 2 89920 is shown with a second principle fast axis of retardation (+), which is oriented 90 degrees from the first principle fast axis of substrate 89910. Additional substrates 89930 are also included, and may be any number of individual substrates. Substrate n-1 89940 is shown with a third principle fast axis of retardation (+), and substrate n 89950 is shown with a fourth principle fast axis of retardation (+) oriented 90 degrees from the third principle fast axis of substrate 89940. The thickness of each of the substrates along with the orientation of their respective axes of retardation optically combine so as to produce a desired amount of retardation of polarization at λ of linear polarized light passing through the waveplate. For example, for a ½ waveplate the combined thickness of each substrate having its principle fast axis parallel with the first principle fast axis of substrate 89910 is different from the combined thickness of each substrate having its principle fast axis aligned with the second principle fast axis of substrate 89920. The difference is equivalent to a thickness needed to produce a ½ waveplate at λ (the target wavelength). Many different combinations of base retardations may be utilized. The combined substrates may be configured to produce any value waveplate (e.g., ¼ waveplate, ½ waveplate, ¾ waveplate, etc.). Although the resultant polarization retardation is described herein in commonly used fractional values, the resultant polarization retardation may be produced in less common increments for any amount of retardation that may be desired at any given target wavelength.

In one example, each of the substrates is optimized for red light. In this example, orientation of the substrate is described relative to a reference (ref) line that is parallel with the linear polarization of light input to the waveplate. The substrate 1 89910 is a 40λ substrate with its principle fast axis of retardation parallel to the reference line (+ axis parallel to ref), substrate 2 is a 10λ substrate with its principle fast axis of retardation at 90 degrees to the reference line (+axis in ref+90 degrees), substrate n-1 is 20λ (+axis parallel to ref) substrate, and substrate n is a 20.5λ (+axis in ref+90 degrees) substrate. Additional substrates 930 are a set of substrates that optically combine to produce a net retardation of 30λ (+axis in the ref+90 degrees). Then, the net result of the compensated higher order waveplate 900 is, in this example, an optical combination that produces a ½ waveplate in red light.

Using these various ways to combine substrates, great flexibility is provided to the designer and/or manufacturer of waveplates and/or devices using the waveplates.

A method of designing a waveplate for an optical device is also provided. The method includes measuring an area in which a waveplate is to be inserted into the optical device, calculating thicknesses of 2 substrates to be fitted together to produce a desired waveplate and have a combined thickness within an acceptable thickness range determined by the measured area. The desired waveplate is then constructed from the 2 substrates and the desired waveplate is then utilized to manufacture the optical device.

For example, an optical device includes a spacing of approximately 60.5λ between adjacent optical elements, and a design of the optical device calls for a ¼ waveplate at λ to be inserted between the optical elements. In this case, the ¼ waveplate is constructed using 30λ and 30.25λ substrates to produce a ¼ waveplate (substrates combined as described above). A very small amount of optical adhesive is applied to portions of outer faces of the combined substrates and then the combined substrates are inserted in the 60.5λ spacing.

In one alternative, 5 10λ substrates and a sixth 10.25λ substrate are combined such that substrates 1, 3, and 5 have their principle fast axes of retardation aligned with a linear polarization of input light, and substrates 2, 4, and 6 have their principle fast axes of retardation oriented at 90° with respect to the linear polarization of the input light. In this alternative, 4 of the substrates effectively cancel each other out and one of the substrates combined with the 10.25λ substrate creates the ¼ waveplate. Again, the substrates may be placed in any order so long as the orientations of each of the principle fast axes (or other corresponding axes) are maintained as described above. The point of examples with numerous additional waveplates as shown in the preceding paragraphs is to illustrate design flexibility and alternatives provided by the present invention.

In yet another alternative, 10λ and 10.25λ substrates are combined and placed in the 60.5λ spacing with liquid coupling between at least one face of the adjacent optical elements and at least one face of the combined substrates. Any combination of mounting techniques may be utilized for the waveplate including, but not limited to, liquid coupling, direct mounting, mounting frames with adjustment screws, etc.

Inserting the waveplate (e.g., plain waveplate, or stray light-suppressing waveplate) into an optical device may be performed by gluing (optical adhesive) the manufactured waveplate onto other optical elements (e.g., prism faces) of the optical device. Other methods to insert or otherwise attach the manufactured waveplate to the optical device include liquid coupling, or immersion in a liquid coupling fluid chamber between other optical elements. Some example liquid coupling techniques are described in Berman et al. (II), U.S. patent application Ser. No. 10/328,423 entitled "Method and Apparatus for Enclosing Optical Assemblies," filed Dec. 24, 2002 Detro et al. (II), U.S. patent application Ser. No. 10/290,867 entitled "Method and Apparatus for Packaging Optical Elements," filed Nov. 7, 2002 and Detro et al. (III), U.S. patent application Ser. No. 10/251,104 entitled "Method and Apparatus for Mounting Liquid Crystal on Silicon (LCoS) and Other Sensitive Devices," filed Sep. 20, 2002 the contents of each are incorporated herein by reference in their entirety.

In many optical devices, particularly kernels and/or prism assemblies of projection display devices, physical and optical distances between various components of the optical devices are important. For example, in a kernel of a light management system (LMS) important distances include the optical distances from each of the microdisplay faces to the exit face of the kernel. The importance being that the 3 light beams (e.g., red, green, and blue) need to reach the exit face with essentially the same optical distance. The light management system will typically include a lens (or lens assembly) for focusing and projecting images contained within the three combined light beams. Generally speaking, if corresponding portions of the light beams arrive at the exit face within a depth of field of the focusing lens, then the images will be in focus. Also generally speaking, in some designs, the optical distances (and physical distances of the optical paths) between the faces of optical components (e.g., microdisplay substrates) and the exit face are roughly equivalent or within the depth of field of the focusing lens. Therefore, it is of great convenience to designers and manufacturers of prism assemblies if waveplates (retarders, polarizers, and/or other components) can be produced at equivalent thicknesses or at designer specified thicknesses so that these roughly equivalent distances can be preserved and taken full advantage of.

Methods of designing and constructing waveplates at specified thicknesses is discussed above. Another method is now described with reference to FIG. 88C. A frame 88862 has a designer specified height H. In the frame, substrates 88864 and 866 are arranged as described above (e.g., the principle fast axis of substrate 88864 is perpendicular to the principle fast axis of substrate 88866), and secured to the frame. In this example, the frame includes corners that act as stops (aligning the substrates) and provide a convenient location to secure the substrates. Adhesive (e.g., adhesive 88867) is applied to the frame at the substrates (e.g., adhesive applied and then the substrates are inserted).

A gap 88868 is between substrates 88864 and 88866. The gap compensates for any differences in thicknesses between varying thickness substrates combined to make different waveplates. For example, a red quarter waveplate constructed of 20λ and 20.25λ substrates has a slightly larger total substrate thickness, and consequently a smaller gap 88868, than a green waveplate constructed of similar wavelength based substrate thickness (e.g., using green 20λ and 20.25λ substrates instead of red). Using this frame based technique to create designer specified waveplate dimensions frees the manufacturer to use substrates having a wide range of substrates thicknesses to produce the waveplates (The designer specifies an overall thickness and a target wavelength, and the manufacturer uses available substrate stocks in a combination to produce the target wavelength retardation in a frame size equivalent to the designer's specified overall thickness).

In another example, a kernel designer may want certain optical paths within a kernel to match exactly. The present invention includes constructing a higher order waveplate in an optical path of a kernel in which heights (e.g., both H and h) of frames of higher order waveplates in various optical paths are varied to make each optical path exactly matched.

Figure 91:
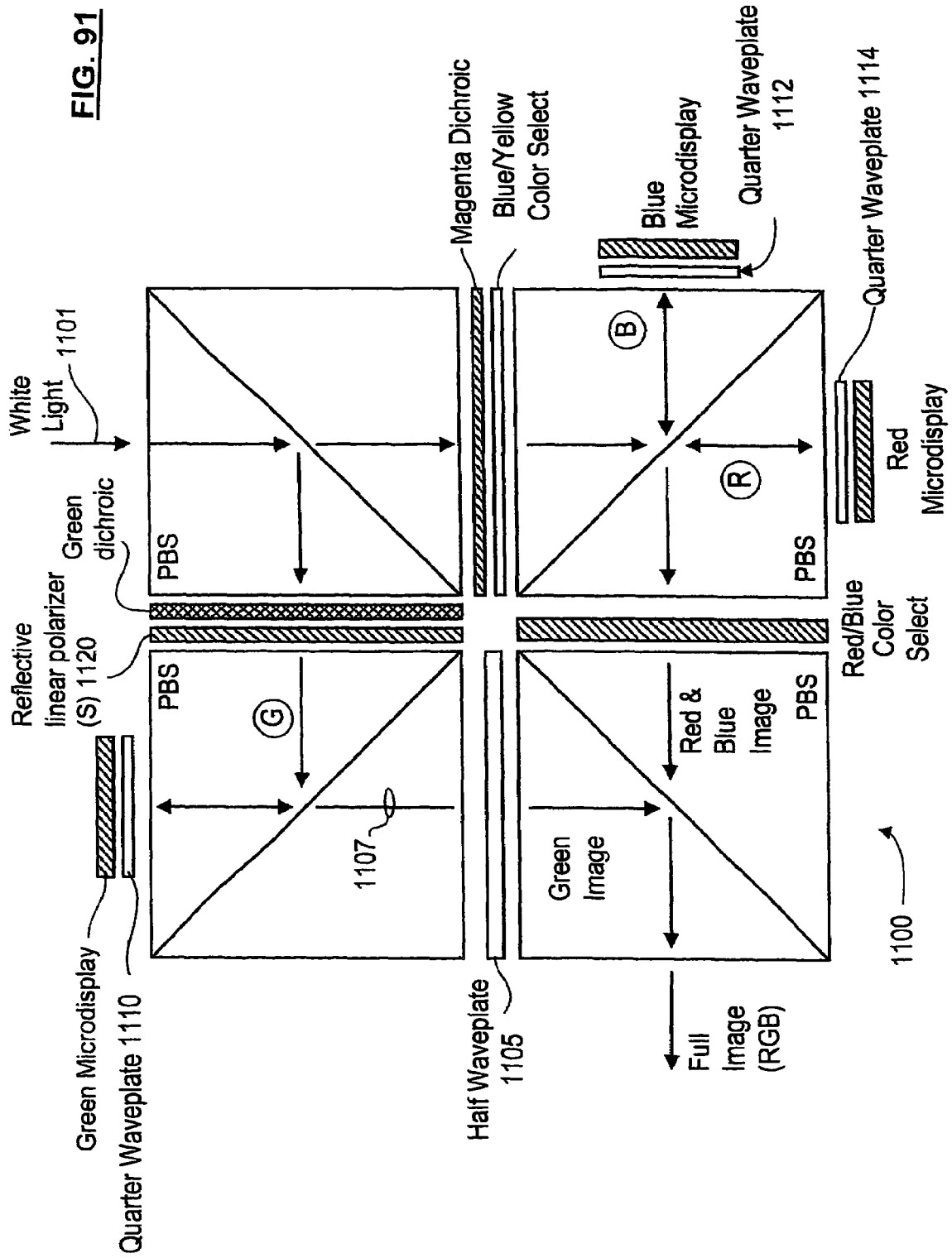
FIG. 91 is a diagram of a quad style LCoS based kernel 1100 that includes at least one stray light suppressing element according an embodiment of the present invention.

FIG. 91 is a diagram of a quad style LCoS based kernel 1100 that converts white light into a full RGB image. Any of waveplates 911110, 911112, 911114, 911105, dichroics, ColorSelects, or spacer glasses (not shown) may be constructed using or in conjunction with one or more of the above described embodiments. Waveplates 911110, 911112, and 911114 may be constructed of specific design requirements in order to match pathlengths from each of the microdisplays to the full image (RGB) output. For example, assuming a prism assembly (kernel without the attached microdisplays) with approximately perfect outside dimensions and approximately equivalent physical light path distances inside the prism assembly, then, the frames for the red waveplates would be slightly longer than frames for green waveplates, which would be slightly longer than frames for blue waveplates. In yet another example, frame heights may be adjusted to compensate for lightpath differences (e.g., differences in internal lightpaths of the prism assembly, assuming less than perfect dimensions within the prism assembly).

Thus, the gap 88868 not only allows flexibility in construction, but also reduces problems encountered when optical components are fixed together (e.g., such as stress build up or other artifacts, such as Newton Rings, which can occur if the optical components were to contact each other).

The gap 88868 is, for example, an air gap between the substrates. Surfaces of the substrates exposed to air are coated with anti-reflection coatings. In another embodiment, the gap 88868 is sealed with adhesive and/or a combination of adhesive and a frame member and the gap is filled with an optical coupling fluid.

The invention includes mounting the waveplates to a face of an optical component. For example, frame 88862 is illustrated as mounted to a face 88860 of a polarizing beamsplitter (PBS) cube. The PBS is, for example, a pathlength matched PBS. The polarizing beam splitter is, for example, a component of a pathlength matched prism assembly. One method of mounting comprises adhesive 88371 applied to a portion of the frame and/or to the face 88360 of the PBS to secure the waveplates to the PBS. With the described frame, a waveplate/component gap 88870 occurs between the component and substrate 88866. Faces of the substrate 88866 and component are coated with anti-reflection coatings (which reduce or eliminate unwanted reflections, including the prevention of standing waves that might otherwise develop between the substrates). In one embodiment, the gap 88870 is sealed and filled with optical coupling fluid.

Figure 88C:
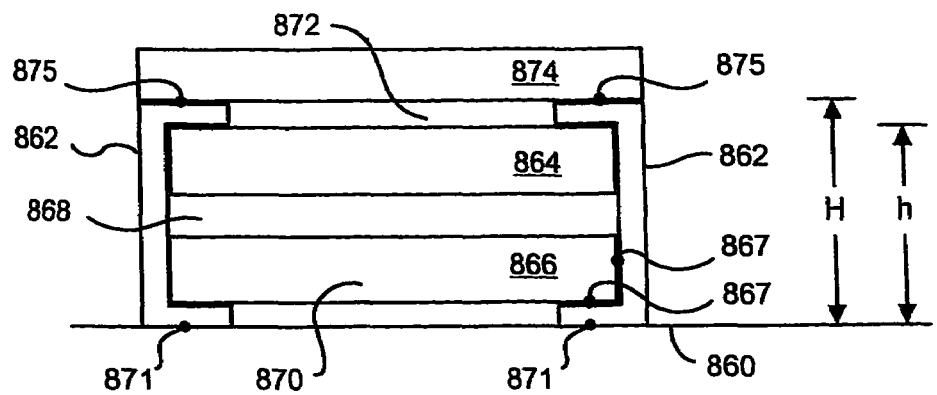
FIG. 88C is a drawing that illustrates a compensated higher order waveplate and a construction method thereof according to embodiments of the present invention.
Figure 88D:
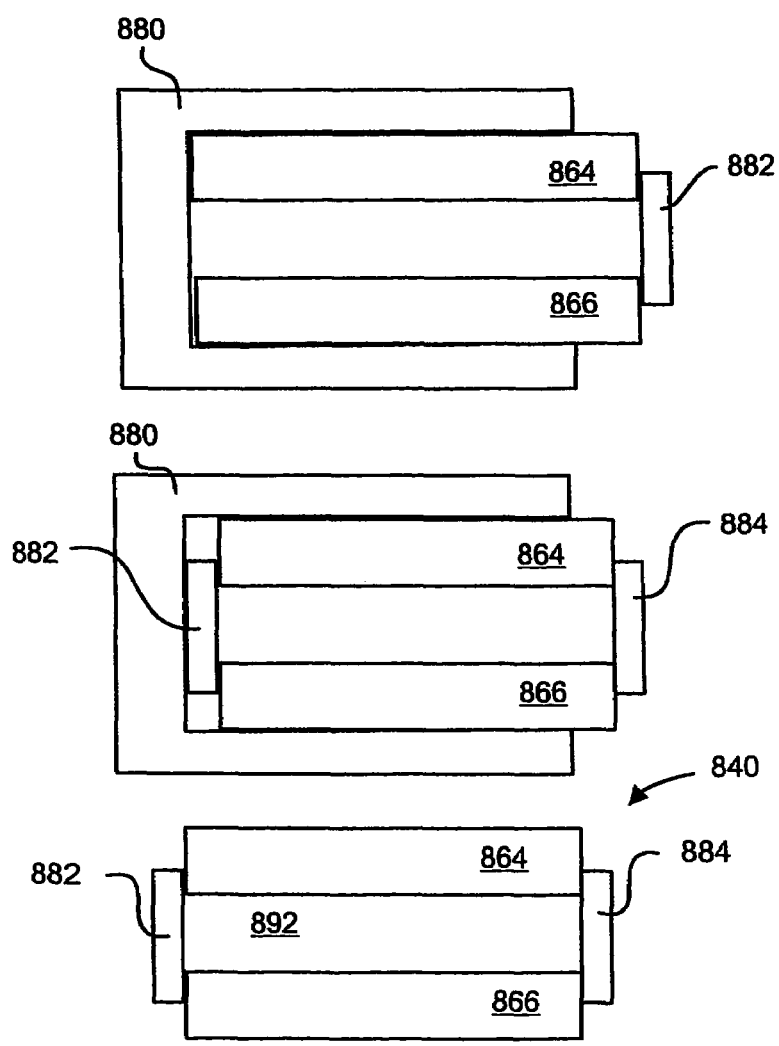
FIG. 88D illustrates construction of another embodiment of a waveplate according to the present invention.

Continuing with FIG. 88C, a microdisplay 88874 is mounted on the frame 88862. Adhesive is applied, for example, at point 88875 securing the microdisplay 88874 to the frame. A microdisplay/waveplate gap 88872 occurs between the waveplate and microdisplay 88874. A face of the substrate 88864 adjacent to the microdisplay and a face of the microdisplay adjacent to substrate 88864 are coated with anti-reflection coatings. In one embodiment, as either an alternative to or combined with anti-reflection coatings, the gap 88872 is sealed and filled with optical coupling fluid.

Any number of alternative techniques for mounting the waveplates and microdisplays may be utilized. Several alternatives are described in Detro et al. III.

Substrates 88864 and 88866 are arranged according to the present invention in a precision C-clamp style holder 88880. The holder 88380 includes, for example, vacuum chucks that temporarily secure the substrates in the holder 88880. Adhesive is applied to end portions of the waveplates and/or frame member 88882 and the frame member is secured by the adhesive at the end portions of the waveplates. Next, the substrates are removed from the holder and reinserted in the opposite direction. A second frame member 88884 is then similarly attached to opposite end portions. Faces of the substrates surrounding gap 88892 are coated with anti-reflection coatings, or the gap is sealed and filled with optical coupling fluid. The finished waveplate 88890 includes the substrates and frame members (as with all drawings submitted herewith, the drawings are not specifically to scale). The holder 88880 may take the form of an adjustable vise device such as that described in Berman et al., which sets spacings of the substrates to any reasonable value.

As noted above, the compensated higher order waveplates are constructed to act as a waveplate at a specific target frequency. However, the single compensated higher order waveplate has effects of polarization rotation at other frequencies not at the target frequency. For some applications, these other retardation effects may be negligible for light in a same spectrum band as the target frequency. For example the compensated higher order waveplate that targets 589 nm light will have more or less retardation at other wavelengths also in the green spectrum, but the differing amounts of retardation in the green spectrum can be acceptable.

However, in other wavelength bands (e.g. red light), the amount of retardation may be of an amount that is either unusable or undesirable. In applications such as some kernel designs (e.g., kernel 911100) the undesirability of retardation effects outside the targeted wavelength band is negated by the fact that only light in the targeted wavelength band is input. For example, in kernel 911100, the green ¼ waveplate 911110 may be a compensated higher order waveplate without much concern for undesirable retardation effects out of the target wavelength band because only (or only substantially) green light is input to the waveplate. The same principle applies to each of waveplates 911112 and 911114.

Nevertheless, some applications require wavelength band specific retarders that affect (retard) the linear polarization in a targeted wavelength band(s) and preserve linear polarization in other wavelength bands (e.g., 1λ, 2λ, . . . nλ retardation in other wavelength bands preserves the original linear polarization). The present inventors have realized the ability of the compensated higher order waveplates to be utilized in creating a desired wavelength band specific retarder for one or multiple wavelengths. The basic process is to calculate a set of compensated higher order waveplates combined at specific angles where the sum of retardations and other optical properties of the set of compensated higher order waveplates together at those specific angles produce the desired wavelength band specific retarder.

Figure 90:
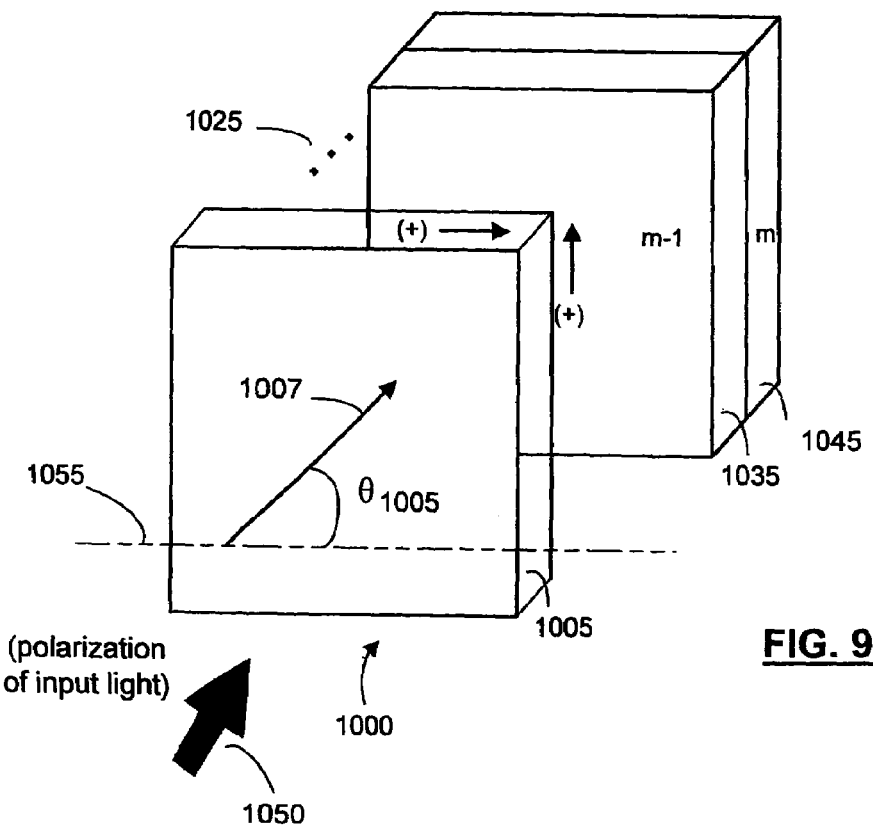
FIG. 90 is an example of one set of possible configurations for a wavelength band specific retarder utilizing compensated higher order waveplates according to an embodiment of the present invention.

FIG. 90 is an example of a wavelength band specific retarder 901000 using m compensated higher order waveplates arranged according to an embodiment of the present invention. Compensated higher order waveplate 901005 is shown with a main axis of retardation 901007 at an orientation of $\theta_{901005}$. Orientation of the main axis 901007 is described in the figure with reference to reference line 901055. Reference line 901055 is aligned at a same angle of linear polarization of input light 901050 entering the wavelength band specific retarder 901000. Orientation of the main axis 901007 is at an angle $\theta_{901005}$ relative to the linear polarization of input light 901050.

Other compensated higher order waveplates 901025 also have main axes of retardation (not shown) which are positioned at various angular orientations with respect to the reference line 901055. Additional other compensated higher order waveplates 901035 and 901045 also each include their own respective main axes of retardation and orientations at respective angles to the reference 901055 (e.g., $\theta_{901035}$ and $\theta_{901045}$). Each of the angles of orientation are either the same, more, or less than any of the previous waveplates, and the actual amount of angular orientation of each waveplate depending on the calculations performed to determine the specific angles needed to produce a desired wavelength band specific retarder. The calculations performed are done in accordance with known wavelength specific properties and using formulas available in textbooks, literature, and other patents. In addition, the actual band(s) in which the desired wavelength band specific retarders operate is also determined by calculation and used in the construction of the component compensated higher order waveplates and/or the orientation and placement of each component in the wavelength band specific retarder.

Each of the above described main axes refer to one of the axes (or combination of axes) present in the substrate components of the compensated higher order waveplates. The construction of the compensated higher order waveplate being the combination of substrates with corresponding axes (e.g., principle fast axes) of the substrates at right angles (e.g., fast axis of the $n\lambda$ substrate parallel to slow axis of the $(n+\Delta)\lambda$ substrate, etc.). Here, when referring to the main axis of the compensated higher order waveplate, we are referring to an axis parallel to the fast axis of the $(n+\Delta)\lambda$ substrate. Each of the compensated higher order waveplates are described using a similarly determined main axis, and all angles of orientation of the axes are relative to the polarization of light input to the wavelength band specific retarder 901000. However, it should be understood that any of the waveplates or wavelength band specific retarders herein may be described using other axes or frames of reference that maintain a similar or functionally equivalent orientation of the substrates, waveplates, etc.

FIG. 90 is operable as a wavelength band specific retarder with or without the additional compensated higher order waveplates 901025. In one example, a red wavelength band specific retarder is produced by using 3 compensated higher order waveplates, a first compensated higher order waveplate 901005 is constructed targeting a 475 nm wavelength, a second compensated higher order waveplate m-1 901025 is constructed targeting a 950 nm wavelength, and a third compensated higher order waveplate m 901045 is constructed also targeting the 950 nm wavelength. The first compensated higher order waveplate 901005 has its main axis set at 45 degrees with respect to the reference line (or intended polarization of input light). The second compensated higher order waveplate 901035 has its main axis set at −13.2 degrees with respect to the reference line, and the third compensated higher order waveplate 901045 has its main axis set at 9.9 degrees with respect to the reference line. The resultant combination of the three compensated higher order waveplates is a wavelength band specific retarder that converts the linear polarized red wavelength band of light input to the wavelength band specific retarder to orthogonal polarization (90 degrees), while preserving the polarization of the input light in the blue and green wavelength bands.

In another example, a red wavelength band specific retarder is produced by using 5 compensated higher order waveplates, a first compensated higher order waveplate 901005 is constructed targeting a 475 nm wavelength. Additional compensated higher order waveplates 901025 comprise 2 individual compensated higher order waveplates, identified as waveplates 901026 and 901027, are each constructed targeting a 950 nm wavelength. 4th and 5th waveplates, 901035 and 901045 respectively are also constructed targeting the 950 nm wavelength. With respect to the polarization of input light (e.g., reference 901055), the main axis of each waveplate is oriented as follows: 901005 at 45 degrees, 1026 at −15.0 degrees, 901027 at 13.1 degrees, 901035 at −2.1 degrees, and 901045 at 6.3 degrees.

In another example, a red wavelength band specific retarder is produced by using 7 compensated higher order waveplates, a first compensated higher order waveplate 901005 is constructed targeting a 475 nm wavelength. Additional compensated higher order waveplates 901025 comprise 4 individual compensated higher order waveplates, identified as waveplates 901026, 901027, 901028, and 901029, each constructed targeting a 950 nm wavelength. 6th and 7th waveplates, 901035 and 901045 respectively are also constructed targeting the 950 nm wavelength. With respect to the polarization of input light (e.g., reference 901055), the principle axis of each waveplate is oriented as follows: 901005 at 45 degrees, 901026 at −15.5 degrees, 901027 at 14.0 degrees, 901028 at −3.4 degrees, 901029 at 7.8 degrees, 901035 at 0.5 degrees, and 901045 at 5.2 degrees.

In yet another example, a red wavelength band specific retarder is produced by using 9 compensated higher order waveplates, a first compensated higher order waveplate 901005 is constructed targeting a 475 nm wavelength. Additional compensated higher order waveplates 901025 comprise 6 individual compensated higher order waveplates, identified as waveplates 901026, 901027, 901028, 901029, 901030, and 901031, each constructed targeting a 950 nm wavelength. 8th and 9th waveplates, 901035 and 901045 respectively are also constructed targeting the 950 nm wavelength. With respect to the polarization of input light (e.g., reference 901055), the main axis of each waveplate is oriented as follows: 901005 at 45 degrees, 901026 at −15.7 degrees, 901027 at 14.5 degrees, 901028 at −4.0 degrees, 901029 at 8.5 degrees, 901030 at −0.4 degrees, 901031 at 6.1 degrees, 901035 at 1.5 degrees, and 901045 at 4.7 degrees.

In the above described example embodiments, as more waveplates are used, the more precisely the wavelength band specific retarder's operations are (e.g., cutting off at a more precise wavelength where polarization rotation either occurs or does not occur). Said another way, as more waveplates are used, a transition band, between polarized light that is rotated and linear polarized light that is not rotated, where the light is elliptically polarized becomes smaller. Further embodiments may use more compensated higher order waveplates to further refine the optical properties of the wavelength band specific retarder.

Although the above examples are red wavelength band specific retarders, the invention is not limited to red wavelength band specific retarders. Similar arrangements may be made for orienting compensated higher order waveplates to construct wavelength band specific retarders for any band of light. For example, wavelength band specific retarders may be constructed using similar techniques for blue and green light. The number of compensated higher order waveplates, each specific target wavelength, and orientation will be set according to the requirements for the desired wavelength band specific retarder.

Stacking wavelength band specific retarders may be used to produce multi non-contiguous wavelength band specific retarders. In this example, multiple wavelength band specific retarders are constructed. The multiple wavelength band specific retarders are placed in series. Light is orthogonally polarized for each of the bands according to the construction of the multiple wavelength band specific retarders and the polarization of other bands of light are left unrotated. For example, wavelength band specific retarders are constructed for each of red and blue wavelength bands. The red and blue wavelength band specific retarders are placed in series and linear polarized input light in both the red and blue bands are rotated and the linear polarization of input light in the green band is maintained.

Wavelength band specific retarders and multi non-contiguous wavelength band specific retarders according to the present invention may be constructed for any one or more wavelength bands or portions of bands.

The set of compensated higher order waveplates may also be stacked without regard to any particular contiguous subset thereof being a wavelength band specific retarder. However, the net effect of the stacked compensated higher order waveplates is either a single or multi non-contiguous wavelength band specific retarder, depending on the requirements, design, and combined properties of the individual compensated higher order waveplates. The possible combinations of individual compensated higher order waveplates, orientations, etc is virtually limitless. The present invention clearly includes any compensated higher order waveplate whether used individually as a waveplate targeting a specific wavelength (or range of wavelengths), as a component in a larger system, or, in combination with other compensated higher order waveplates to produce wavelength band specific retarders in one or more bands.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention.

For example, when describing a spacer device constructed of rolled polycarbonate, any other equivalent device, such as a geometrically shaped (square, triangle, pentagon, hexagon, etc) or other shape roll of polycarbonate or any other material or any other device having an equivalent function or capability, whether or not listed herein, may be substituted therewith. Descriptions of polarizers, waveplates, beam splitters, filters, and other optical components may be substituted with other components having similar functionality. Placement and/or angular relationships of the components may also be changed or rearranged and still have optical properties consistent with the present invention. Furthermore, the inventors recognize that newly developed technologies not now known may also be substituted for the described parts and still not depart from the scope of the present invention.

As another example, when describing cholesteric composed of a layer of cholesteric film, any other equivalent device, such as a cholesteric liquid embedded between layers of glass, or another device having an equivalent function or capability, whether or not listed herein, may be substituted therewith.

All other described items, including, but not limited to prisms, optical elements, depositions, films, encapsulated materials, fittings, air gaps, spacer elements, angles of incidence, re-arrangement or alternative placement of materials, etc should also be consider in light of any and all available equivalents.

In any of the waveplate embodiments described above, plain (waveplate only) waveplates may be constructed, or the waveplates may also be stray light-suppressing waveplates by constructing the substrates to include louvers. In constructing stray light-suppressing higher order waveplates, the orientation of a principle axis of retardation in the retarder material must be properly oriented in the substrate material. One method, for example, utilizing the steps described above with respect to FIG. 84, the starting material (previously glass, but quartz in this example), has a principle axis of retardation perpendicular to the page for the labeled starting material, which results in a principle axis of retardation perpendicular to the thin film layer at steps 1-4.

The present invention includes a High Definition (HD) monitor comprising, a white light source, a set of reflective microdisplays, a prism assembly configured to separate white light from the white light source into component light beams and direct each component light beam to one of the reflective microdisplays and then recombine the reflected component light beams to an output beam, a lens for projecting the output beam, and a screen for displaying the projected output beam when said prism assembly comprises a set of pathlength matched optical components and coupling fluid interspersed between the optical components. The HD monitor is, for example, part of an HD Television (HDTV). The HDTV includes further improvements as discussed in one or more of the embodiments described above.

Obviously, numerous modifications and variations of the present invention are possible in light of the above teachings. It is therefore to be understood that the invention may be practiced otherwise than as specifically described herein.

What is claimed and desired to be secured by Letters Patent of the United States is:

1. A method of modulating a white light beam comprising:
   receiving a white light beam in a receiving surface of a prism assembly, the prism assembly including a set of optical components having equal optical path lengths, wherein the equal optical lengths defines a corresponding exterior dimension for each side of the prism assembly including:
   at least two beam splitters;
   a baseplate attached to at least one of the pathlength matched optical components;
   a seal affixed to at least two of the pathlength matched optical components;
   an optical coupling substance disposed between the sealed optical components;
   a plurality of microdisplays mounted on faces of the at least two beam splitters; and
   a set of perimeter blocks configured to fix placement of outside surfaces of the set of optical components;

separating the received white light beam into a plurality of component light beams;

directing each one of the plurality of component light beams to a corresponding one of the plurality of microdisplays;

modulating each one of the plurality of component light beams according to a corresponding one of a plurality of modulation signals applied to the corresponding one of the plurality of microdisplays;

combining the plurality of modulated component light beams into an output light beam; and outputting the output light beam from the prism assembly.

2. The method of claim 1, wherein the optical coupling substance is a liquid.

3. The method of claim 1, wherein the optical coupling substance is a gas.

4. The method of claim 1, wherein the optical components include at least one anti-reflection coating on a surface of the optical components.

5. The method of claim 1, wherein said optical coupling substance is a gel.

6. The method of claim 1, wherein said optical coupling substance is a cured adhesive.

7. The method of claim 1, wherein the corresponding exterior dimension for each side of the prism assembly are equal.

8. The method of claim 1, wherein said at least two beam splitters include at least one polarizing beam splitter.

9. The method of claim 1, wherein the at least two beam splitters includes a set of four beam splitters arranged in a quad style such that one beam splitter is positioned in each quadrant of the prism assembly and the optical coupling substance is dispersed between adjacent parallel faces of the beam splitters.

10. The method of claim 1, wherein the plurality of microdisplays include reflective Liquid Crystal on Silicon microdisplays.

11. The method of claim 1, wherein prism assembly is part of a projection HDTV.

12. The method of claim 1, wherein the coupling substance is an optical coupling fluid having an index of refraction roughly equivalent to an index of refraction of the optical components.

13. The method of claim 1, wherein the set of optical components include at least one of a polarizing beam splitter, a polarization sensitive reflective beam splitter, and a one way reflective beam combiner.

14. A method of modulating a white light beam comprising:

receiving a white light beam in a receiving surface of a prism assembly, the prism assembly including a set of optical components having equal optical path lengths, wherein the equal optical lengths defines a corresponding exterior dimension for each side of the prism assembl including:

at least two polarizing beam splitters;

a baseplate attached to at least one of the pathlength matched optical components;

a seal affixed to at least two of the pathlength matched optical components;

an optical coupling liquid disposed between the sealed optical components;

a plurality of microdisplays mounted on faces of the at least two beam splitters; and a set of perimeter blocks configured to fix placement of outside surfaces of the set of optical components;

separating the received white light beam into a plurality of component light beams;

directing each one of the plurality of component light beams to a corresponding one of the plurality of microdisplays;

modulating each one of the plurality of component light beams according to a corresponding one of a plurality of modulation signals applied to the corresponding one of the plurality of microdisplays;

combining the plurality of modulated component light beams into an output light beam; and outputting the output light beam from the prism assembly.

* * * * *